(12) United States Patent
Hanawa et al.

(10) Patent No.: US 11,205,820 B2
(45) Date of Patent: Dec. 21, 2021

(54) BATTERY PACK, ELECTRICAL DEVICE USING BATTERY PACK, AND ELECTRICAL DEVICE SYSTEM

(71) Applicant: Koki Holdings Co., Ltd., Tokyo (JP)

(72) Inventors: Hiroyuki Hanawa, Ibaraki (JP); Tomomasa Nishikawa, Ibaraki (JP); Shota Kanno, Ibaraki (JP); Toshio Mizoguchi, Ibaraki (JP); Yasushi Nakano, Ibaraki (JP); Kazuhiko Funabashi, Ibaraki (JP); Takuya Teranishi, Ibaraki (JP); Naoto Wakatabe, Ibaraki (JP); Shinji Watanabe, Ibaraki (JP); Junpei Sato, Ibaraki (JP); Hikaru Tamura, Ibaraki (JP); Nobuhiro Takano, Ibaraki (JP); Osamu Kawanobe, Ibaraki (JP); Hayato Yamaguchi, Ibaraki (JP); Akira Matsushita, Ibaraki (JP); Masaru Hirano, Ibaraki (JP); Takuhiro Murakami, Ibaraki (JP); Masayuki Ogura, Ibaraki (JP); Yusuke Funabiki, Ibaraki (JP); Junichi Toukairin, Ibaraki (JP); Shota Takeuchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 47 days.

(21) Appl. No.: 16/346,120

(22) PCT Filed: Oct. 27, 2017

(86) PCT No.: PCT/JP2017/038950
§ 371 (c)(1),
(2) Date: Apr. 30, 2019

(87) PCT Pub. No.: WO2018/079723
PCT Pub. Date: May 3, 2018

(65) Prior Publication Data
US 2019/0259985 A1 Aug. 22, 2019

(30) Foreign Application Priority Data

Oct. 31, 2016 (JP) .............................. JP2016-213100
Oct. 31, 2016 (JP) .............................. JP2016-213106
(Continued)

(51) Int. Cl.
*H01M 50/213* (2021.01)
*H01M 50/543* (2021.01)

(52) U.S. Cl.
CPC ....... *H01M 50/213* (2021.01); *H01M 50/543* (2021.01); *H01M 2220/30* (2013.01)

(58) Field of Classification Search
CPC ................ H01M 2/1055; H01M 2/30; H01M 2220/30; H01M 2/105; H02J 7/0045
See application file for complete search history.

(56) References Cited

U.S. PATENT DOCUMENTS

| 2006/0091858 A1* | 5/2006 | Johnson | ................. H02J 7/0026 320/128 |
| 2012/0037385 A1* | 2/2012 | Suzuki | ................. H02J 7/0031 173/2 |

(Continued)

FOREIGN PATENT DOCUMENTS

| JP | S6424370 | 1/1989 |
| JP | H0676812 | 3/1994 |

(Continued)

OTHER PUBLICATIONS

"Office Action of Australian Counterpart Application," dated Dec. 11, 2019, p. 1-p. 4.

(Continued)

*Primary Examiner* — Michael L Dignan
(74) *Attorney, Agent, or Firm* — JCIPRNET

(57) ABSTRACT

In an upper cell unit (2146) and a lower cell unit (2147) comprising five battery cells, positive electrode terminals (Continued)

Battery pack (2162, 2172) are set apart and aligned vertically, and negative electrode terminals (2167, 2177) are set apart and aligned vertically. When an electrical device body is rated at 36V, device-side terminals are in contact only at the upper terminals (2162, 2167), and short circuiting of the lower terminals (2172, 2177) is effected using a short bar 2059. When the electrical device body is rated at 18V, the upper and lower terminals (2162 and 2172, 2167 and 2177) are simultaneously made to contact the device-side terminals, and the upper cell unit (2146) and the lower cell unit (2147) assume a parallel connected state. Thus, it is possible to automatically switch the output voltage when a battery pack is mounted according to the difference in terminal shape on the electrical device body side.

24 Claims, 91 Drawing Sheets

(30) Foreign Application Priority Data

| Oct. 31, 2016 | (JP) | JP2016-213115 |
| Jun. 16, 2017 | (JP) | JP2017-118558 |
| Jul. 21, 2017 | (JP) | JP2017-141900 |
| Aug. 10, 2017 | (JP) | JP2017-155368 |

(56) References Cited

U.S. PATENT DOCUMENTS

| 2016/0020443 | A1* | 1/2016 | White | B25F 5/02 |
| | | | | 318/245 |
| 2016/0126533 | A1* | 5/2016 | Velderman | H01M 10/4207 |
| | | | | 429/97 |
| 2017/0072553 | A1* | 3/2017 | Bakker | B25F 5/00 |

FOREIGN PATENT DOCUMENTS

| JP | H1092404 | 4/1998 |
| JP | 2003142051 | 5/2003 |
| JP | 2008177138 | 7/2008 |
| JP | 2012200107 | 10/2012 |
| JP | 2014017954 | 1/2014 |
| TW | I404296 | 8/2013 |
| WO | 2015132606 | 9/2015 |
| WO | 2015179318 | 11/2015 |

OTHER PUBLICATIONS

"Office Action of Australia Counterpart Application", dated May 25, 2020, pp. 1-4.

"Office Action of Canada Counterpart Application", dated May 20, 2020, pp. 1-6.

"International Search Report (Form PCT/ISA/210) of PCT/JP2017/038950," dated Jan. 23, 2018, with English translation thereof, pp. 1-4.

Office Action of Canadian Counterpart Application, dated Jun. 10, 2021, pp. 1-7.

Office Action of Japan Counterpart Application, with English translation thereof, dated Mar. 30, 2021, pp. 1-12.

"Office Action of Taiwan Counterpart Application", dated Aug. 30, 2021, with English translation thereof, pp. 1-28.

* cited by examiner (1)

(2)

(1)

(2)

Battery circuit diagram (1)

(2)

(3)

BATTERY PACK, ELECTRICAL DEVICE USING BATTERY PACK, AND ELECTRICAL DEVICE SYSTEM

CROSS-REFERENCE TO RELATED APPLICATION

This application is a 371 application of the International PCT application serial no. PCT/JP2017/038950, filed on Oct. 27, 2017, which claims the priority benefits of Japan Patent Application No. 2016-213106, filed on Oct. 31, 2016, Japan Patent Application No. 2016-213100, filed on Oct. 31, 2016, Japan Patent Application No. 2016-213115, filed on Oct. 31, 2016, Japan Patent Application No. 2017-118558, filed on Jun. 16, 2017, and Japan Patent Application No. 2017-141900, filed on Jul. 21, 2017 and Japan Patent Application No. 2017-155368, filed on Aug. 10, 2017. The entirety of each of the above-mentioned patent applications is hereby incorporated by reference herein and made a part of this specification.

BACKGROUND

Technical Field

The invention relates to an electrical device including a load such as a motor, a light, etc., and to a power source device such as a battery pack that supplies power to such electrical device.

Description of Related Art

Electrical devices (e.g., electrical tools) have been gradually developed to be driven by battery packs using secondary batteries such as Li-ion batteries, and electrical devices have been gradually developed to become cordless. For example, in a handheld electrical tool in which a front end tool is driven by a motor, a battery pack housing a plurality of secondary battery cells is used, and the motor is driven by using electrical energy stored in the battery pack. The battery pack is configured attachable to and detachable from an electrical tool body. If voltage is reduced due to electric discharge, the battery pack is removed from the electrical tool body and is charged by using an external charging device.

In a cordless electrical tool or electrical device, it is required to ensure a predetermined operation time or to ensure a predetermined output. As performance of the secondary batteries is improved, higher output or higher voltage is realized. Moreover, with the development of electrical devices using a battery pack as a power source, battery packs having various voltages have been gradually commercialized. Generally, the output voltage of a battery pack is fixed. However, Patent Document 1 proposes a power source device for an electrical device as follows. A plurality of battery units are disposed in a housing that houses batteries, and whether to perform output by connecting the battery units in series or by connecting the battery units in parallel is made selectable by a connection part. Therefore, the power source device is compatible with devices of different voltages.

RELATED ART

Patent Document

[Patent Document 1] Japanese Laid-open No. 2014-17954

SUMMARY

Technical Problem

For a user, when using multiple electrical tools and/or electrical devices, it is complicated and troublesome to prepare multiple types of battery packs. Therefore, it is desired to realize a user-friendly battery pack which corresponds to electrical tools or electrical devices of different voltages by switching the voltage. Moreover, it is desired to realize a voltage switching type by a battery pack that can be easily mounted to an electrical device, rather than a power source device separate from the electrical device body such as that in Patent Document 1.

Moreover, according to transportation-related regulations, in a battery pack using a plurality of Li-ion batteries, in a case where a total power capacity of the mutually connected Li-ion batteries exceeds a predetermined value, it is required to take special measures during transportation. Therefore, it is desired to realize a battery pack that can cut off interconnection between a plurality of Li-ion batteries, etc. housed in the battery pack when an electrical device is transported and an electrical device using the battery pack.

The invention has been made in light of the background above. An objective of the invention is to provide a battery pack that can switch an output voltage and an electrical device using the battery pack.

Another objective of the invention is to provide a battery pack that can be shared between electrical devices of different voltages and an electrical device using the battery pack.

Another objective of the invention is to provide a battery pack in which voltage setting compatible with a corresponding electrical device can be easily performed to thereby effectively prevent erroneous voltage setting and an electrical device using the battery pack.

Another objective of the invention is to provide a battery pack that can cut off interconnection between a plurality of cell units housed in the battery pack and an electrical device using the battery pack.

Solution to the Problem

Among the inventions disclosed in the present application, comprehensive inventions are described as follows.

A first general invention is a battery pack, including a plurality of cell units including at least one cell; a housing housing the plurality of cell units; a positive electrode terminal and a negative electrode terminal; and a voltage switching element, switching between whether to output a first voltage by connecting the plurality of cell units to each other in parallel or to output a second voltage by connecting the plurality of cell units to each other in series.

Later-described Embodiments 1 to 13 are all embodiments corresponding to the first general invention.

According to the first general invention, the issue of providing a battery pack that can switch an output voltage can be solved.

A second general invention is, in the battery pack according to the first general invention, the voltage switching element is configured to connect the plurality of cell units to each other in parallel in a state where the battery pack is connected to a low voltage electrical device body driven by the first voltage, and to connect the plurality of cell units to each other in series in a state where the battery pack is connected to a high voltage electrical device body driven by the second voltage.

The later-described Embodiments 1 to 13 are all embodiments corresponding to the second general invention.

According to the second general invention, the issue of providing a battery pack that can be shared between electrical devices of different voltages and an electrical device using the battery pack can be solved.

A third general invention is, in the battery pack according to the second general invention, the voltage switching element is configured to prevent the battery pack from being connected to the low voltage electrical device body in a state where the plurality of cell units remain connected to each other in series, or to prevent the battery pack from being connected to the high voltage electrical device body in a state where the plurality of cell units remain connected to each other in parallel.

The later-described Embodiments 1 to 13 are all embodiments corresponding to the third general invention.

According to the third general invention, the issue of providing a battery pack in which voltage setting compatible with a corresponding electrical device can be easily performed to thereby effectively prevent erroneous voltage setting and an electrical device using the battery pack is solved.

A fourth general invention is a battery pack, including a plurality of cell units including at least one cell; a housing housing the plurality of cell units and configured to be mountable to an electrical device body by being moved relative to the electrical device body in a front-rear direction; a positive electrode terminal connected to a positive electrode of one cell unit forming the plurality of cell units; a negative electrode terminal, connected to a negative electrode of one cell unit forming the plurality of cell units, and disposed separated from the positive electrode terminal in a left-right direction; and a plurality of switching terminals connected to each of the plurality of cell units, wherein in a case where the battery pack is not connected to the electrical device body, the plurality of switching terminals are not short-circuited with each other and a state where the plurality of cell units are disconnected from each other is maintained, and in a case where the battery pack is connected to the electrical device body, the plurality of switching terminals are short-circuited with each other by a connection element included in the electrical device body, so that the plurality of cell units are connected to each other. The later-described Embodiment 2 and Embodiments 5 to 13 are all embodiments corresponding to the fourth general invention.

According to the fourth general invention, the issue of providing a battery pack that can cut off interconnection between a plurality of cell units housed in the battery pack can be solved.

The general inventions described above can also be arbitrarily combined with one or more relatively specific inventions as described below. Alternatively, the general inventions can be combined with one or more specific constitutions included in the later-described embodiments. An invention formed by such combinations can solve at least one issue among the issues described above. Moreover, the inventions described below may be considered to be inventions independent from the general inventions described above. In that case, the inventions described below may solve issues different from the issues described above.

A first invention is an electrical device, including:
a high voltage electrical device body, operating by a predetermined voltage; and a battery pack, connectable to the electrical device body, wherein the battery pack includes: a plurality of cell units, each including at least one cell; a positive electrode terminal group, formed by adjacently disposing a plurality of positive electrode terminals respectively extending from positive electrodes of the plurality of cell units; a negative electrode terminal group, formed by adjacently disposing a plurality of negative electrode terminals respectively extending from negative electrodes of the plurality of cell units; and a housing, housing the plurality of cell units, the positive electrode terminal group, and the negative electrode terminal group, the high voltage electrical device body includes: a high voltage positive input terminal, connectable to one positive electrode terminal among the plurality of positive electrode terminals; a high voltage negative input terminal, connectable to one negative electrode terminal among the plurality of negative electrode terminals; and a short circuit element, connectable to both of other positive electrode terminal among the plurality of positive electrode terminals and other negative electrode terminal among the plurality of negative electrode terminals, when the battery pack is connected to the high voltage electrical device body, the one positive electrode terminal is engaged with the high voltage positive input terminal, the one negative electrode terminal is engaged with the high voltage negative input terminal, the other positive electrode terminals and the other negative electrode terminals are electrically connected via the short circuit element, and the plurality of cell units are connected to each other in series, and when the battery pack is not connected to the high voltage electrical device body, the plurality of cell units are disconnected from each other.

For example, Embodiments 5, 6, and 13 described below are all embodiments corresponding to the first invention.

According to the first invention, the issue of providing a battery pack that can cut off interconnection of a plurality of cell units housed in the battery pack can be solved. Moreover, according to the first invention, the effect of providing a compact battery pack and an electrical device including the battery pack is achieved.

A second invention is an electrical device, wherein:
the battery pack includes a signal terminal for inputting or outputting information or signals, and
the signal terminal is disposed at a position between the positive electrode terminal group and the negative electrode terminal group.

For example, Embodiments 5, 6, and 13 described below are all embodiments corresponding to the second invention.

According to the second invention, the effect of providing a compact battery pack and an electrical device including the battery pack is achieved. Moreover, the effect of providing a battery pack that prevents unintended terminal short-circuiting and an electrical device including the battery pack is achieved.

A third invention is an electrical device, wherein:
the housing of the battery pack includes: a first slot, disposed at a position corresponding to the positive electrode terminal group; and a second slot, disposed at a position corresponding to the negative electrode terminal group, and
when the battery pack is connected to the high voltage electrical device body, the high voltage positive input terminal is inserted into the first slot to be engaged with the one positive electrode terminal, and the high voltage negative input terminal is inserted into the second slot to be engaged with the one negative electrode terminal.

For example, Embodiments 5, 6, and 13 described below are all embodiments corresponding to the third invention.

According to the third invention, the effect of providing a compact battery pack and an electrical device including the battery pack is achieved. Moreover, the effect of providing a battery pack that prevents unintended terminal short-circuiting and an electrical device including the battery pack is achieved.

A fourth invention is an electrical device, wherein:
the positive electrode terminal group is disposed at a position above the plurality of cell units, one positive electrode terminal forming the positive electrode terminal group is connected to one battery cell included in one cell unit forming the plurality of cell units via one connection element,
other positive electrode terminal forming the positive electrode terminal group is connected to other battery cell included in other cell units forming the plurality of cell units via other connection elements, and
the other positive electrode terminal is disposed at a position above or behind the one positive electrode terminal, and the other battery cell is disposed at a position behind the one battery cell, or the other positive electrode terminal is disposed at a position below or in front of the one positive electrode terminal, and the other battery cell is disposed at a position in front of the one battery cell.

For example, Embodiment 8 described below is an embodiment corresponding to the fourth invention.

According to the fourth invention, the effect of providing a compact battery pack and an electrical device including the battery pack is achieved.

A fifth invention is an electrical device, wherein:
the battery pack includes a circuit substrate to which the positive electrode terminal group and the negative electrode terminal group are connected, and
the one connection element includes one wiring pattern disposed on the circuit substrate, the other connection elements include other wiring patterns disposed on the circuit substrate, and the other wiring patterns are disposed at positions behind the one wiring pattern, or the other wiring patterns are disposed at positions in front of the one wiring pattern.

For example, Embodiment 8 described below is an embodiment corresponding to the fifth invention.

According to the fifth invention, the effect of providing a compact battery pack and an electrical device including the battery pack is achieved.

A sixth invention is an electrical device, wherein:
in a state where the battery pack is connected to the high voltage electrical device body, the battery pack or the high voltage electrical device body includes an inter-terminal insulating member, formed by an insulating member extending between one positive electrode terminal and other positive electrode terminals forming the positive electrode terminal group.

For example, Embodiments 6 and 8 described below are embodiments corresponding to the sixth invention.

According to the sixth invention, the effect of providing a battery pack that prevents unintended terminal short-circuiting and an electrical device including the battery pack is achieved.

A seventh invention is an electrical device, wherein:
the low voltage electrical device body includes: a low voltage positive input terminal, connectable to the plurality of positive electrode terminals forming the positive electrode terminal group; and a low voltage negative input terminal, connectable to the plurality of negative electrode terminals forming the negative electrode terminal group, and
when the battery pack is connected to the low voltage electrical device body, the plurality of positive electrode terminals are engaged with the low voltage positive input terminal, the plurality of negative electrode terminals are engaged with the low voltage negative input terminal, and the plurality of cell units are connected to each other in parallel.

For example, Embodiments 5, 6, and 13 described below are embodiments corresponding to the seventh invention.

According to the seventh invention, the issue of providing a battery pack that can switch an output voltage can be solved. Moreover, the issue of providing a battery pack that can be shared between electrical devices of different voltages and an electrical device using the battery pack can be solved. In addition, the issue of providing a battery pack in which voltage setting compatible with a corresponding electrical device can be easily performed to thereby effectively prevent erroneous voltage setting and an electrical device using the battery pack can be solved.

An eighth invention is an electrical device, wherein:
in a state where the battery pack is connected to the low voltage electrical device body, the inter-terminal insulating member allows the plurality of positive electrode terminals forming the positive electrode terminal group to be engaged with the low voltage positive input terminal.

For example, Embodiments 6 and 8 described below are embodiments corresponding to the eighth invention.

According to the eighth invention, the effect of providing a battery pack that prevents unintended terminal short-circuiting and an electrical device including the battery pack is achieved.

A ninth invention is an electrical device system, including: a low voltage electrical device body, operating by a predetermined voltage; a high voltage electrical device body, operating by a voltage higher than the predetermined voltage; and a battery pack, connectable to the low voltage electrical device body and the high voltage electrical device body, wherein
the battery pack includes: a plurality of cell units, each including at least one cell; a first switching terminal group, formed by adjacently disposing a plurality of switching terminals connected to the plurality of cell units; and a housing, housing the plurality of cell units and the first switching terminal group,
the low voltage electrical device body includes a first low voltage switching element engageable with the first switching terminal group,
the high voltage electrical device body includes a first high voltage switching element that is engageable with the first switching terminal group and is formed with a structure different from the first low voltage switching element,
when the low voltage electrical device body is connected to the battery pack, the first low voltage switching element is engaged with the first switching terminal group, and the plurality of cell units are connected to each other in parallel, and
when the high voltage electrical device body is connected to the battery pack, the first high voltage switching element is engaged with the first switching terminal group, and the plurality of cell units are connected to each other in series.

For example, Embodiments 5, 6, and 13 described below are embodiments corresponding to the ninth invention.

According to the ninth invention, the issue of providing a battery pack that can switch an output voltage can be solved. Moreover, the issue of providing a battery pack that can be shared between electrical devices of different voltages and an electrical device using the battery pack can be solved. In addition, the issue of providing a battery pack in which voltage setting compatible with a corresponding electrical device can be easily performed to thereby effectively prevent erroneous voltage setting and an electrical device using the battery pack can be solved.

A tenth invention is an electrical device system, wherein:
the battery pack includes: a second switching terminal group, which is formed by adjacently disposing a plurality of switching terminals connected to the plurality of cell units and is different from the first switching terminal group,
the low voltage electrical device body includes a second low voltage switching element engageable with the second switching terminal group,
the high voltage electrical device body includes a second high voltage switching element that is engageable with the second switching terminal group and is formed with a structure different from the second low voltage switching element,
when the battery pack is connected to the low voltage electrical device body, the first switching terminal group and the first low voltage switching element are engaged, and the second switching terminal group and the second low voltage switching element are engaged, and the plurality of cell units are connected to each other in parallel, and
when the battery pack is connected to the high voltage electrical device body, the first switching terminal group and the first high voltage switching element are engaged, and the second switching terminal group and the second high voltage switching element are engaged, and the plurality of cell units are connected to each other in series.

For example, Embodiments 5, 6, and 13 described below are embodiments corresponding to the tenth invention.

According to the tenth invention, the issue of providing a battery pack that can switch an output voltage can be solved. Moreover, the issue of providing a battery pack that can be shared between electrical devices of different voltages and an electrical device using the battery pack can be solved. In addition, the issue of providing a battery pack in which voltage setting compatible with a corresponding electrical device can be easily performed to thereby effectively prevent erroneous voltage setting and an electrical device using the battery pack can be solved.

An eleventh invention is an electrical device system, wherein:
when the battery pack is not connected to the low voltage electrical device body or the high voltage electrical device body, the plurality of cell units are not connected to each other.

For example, Embodiments 5, 6, and 13 described below are embodiments corresponding to the eleventh invention.

According to the eleventh invention, the issue of providing a battery pack that can cut off interconnection of a plurality of cell units housed in the battery pack can be solved.

A twelfth invention is an electrical device system, wherein:
the first low voltage switching element or the second low voltage switching element included in the low voltage electrical device body is configured to connect the plurality of switching terminals forming the first switching terminal group to form the same potential, and
the first high voltage switching element or the second high voltage switching element included in the high voltage electrical device body is configured to separate the plurality of switching terminals forming the first switching terminal group to form different potentials.

For example, Embodiments 5, 6, and 13 described below are embodiments corresponding to the twelfth invention.

A thirteenth invention is an electrical device system, wherein:
the first switching terminal group is configured as a positive electrode terminal group formed by adjacently disposing to a plurality of positive electrode terminals respectively extending from positive electrodes of the plurality of cell units, and the second switching terminal group is configured as a negative electrode terminal group formed by adjacently disposing a plurality of negative electrode terminals respectively extending from negative electrodes of the plurality of cell units,
the first low voltage switching element is formed to be capable of connecting a plurality of positive electrode terminals forming the positive electrode terminal group, and the second low voltage switching element is formed to be capable of connecting a plurality of negative electrode terminals forming the negative electrode terminal group,
the first high voltage switching element includes: a positive input terminal, engageable with one positive electrode terminal among the plurality of positive electrode terminals; and a first short circuit element, engageable with other positive electrode terminals, and the second high voltage switching element includes: a negative input terminal, engageable with one negative electrode terminal among the plurality of negative electrode terminals; and a second short circuit element, engageable with other negative electrode terminals, wherein the first short circuit element and the second short circuit element are connected to each other,
when the battery pack is connected to the low voltage electrical device body, the positive electrode terminal group and the first low voltage switching element are engaged, such that the plurality of positive electrode terminals are connected to each other, and the negative electrode terminal group and the second low voltage switching element are engaged, such that the plurality of negative electrode terminals are connected to each other, and the plurality of cell units are connected to each other in parallel, and
when the battery pack is connected to the high voltage electrical device body, the one positive electrode terminal and the positive input terminal are engaged, the other positive electrode terminals and the first short circuit element are engaged, the one negative electrode terminal and the negative input terminal are engaged, the other negative electrode terminals and the second short circuit element are engaged, and the plurality of cell units are connected to each other in series.

For example, Embodiments 6 and 8 to 13 described below are embodiments corresponding to the thirteenth invention.

A fourteenth invention is an electrical device system, wherein:
the housing of the battery pack includes: a first slot, disposed at a position corresponding to the plurality of switching terminals forming the first switching terminal group, and
the first slot allows the first low voltage switching element and the first high voltage switching element to be inserted into the first slot to be engaged with the first switching terminal group.

For example, Embodiments 6 and 8 to 13 described below are embodiments corresponding to the fourteenth invention.

According to the fourteenth invention, the effect of providing a compact battery pack and an electrical device including the battery pack is achieved.

A fifteenth invention is an electrical device system, wherein:

one switching terminal forming the first switching terminal group is connected to one battery cell included in one cell unit forming the plurality of cell units via one connection element, other switching terminals forming the first switching terminal group are connected to other battery cells included in other cell units forming the plurality of cell units via other connection elements, and the other switching terminals are disposed at positions above or behind the one switching terminal, and the other battery cells are disposed at positions behind the one battery cell, or the other switching terminals are disposed at positions below or in front of the one switching terminal, and the other battery cells are disposed at positions in front of the one battery cell.

For example, Embodiment 8 described below is an embodiment corresponding to the fifteenth invention.

According to the fifteenth invention, the effect of providing a compact battery pack and an electrical device including the battery pack is achieved.

A sixteenth invention is an electrical device system, wherein:

the battery pack includes a circuit substrate to which the first switching terminal group is connected, and the one connection element includes one wiring pattern disposed on the circuit substrate, the other connection elements include other wiring patterns disposed on the circuit substrate, and the other wiring patterns are disposed at positions behind the one wiring pattern, or the other wiring patterns are disposed at positions in front of the one wiring pattern.

For example, Embodiment 8 described below is an embodiment corresponding to the sixteenth invention.

According to the sixteenth invention, the effect of providing a compact battery pack and an electrical device including the battery pack is achieved.

A seventeenth invention is an electrical device system, wherein:

in a state where the battery pack is connected to the high voltage electrical device body, at least one of the battery pack, the low voltage electrical device body, and the high voltage electrical device body comprises an inter-terminal insulating member, formed by an insulating member extending between one positive electrode terminal and other positive electrode terminals forming the positive electrode terminal group.

For example, Embodiments 6 and 8 described below are embodiments corresponding to the seventeenth invention.

According to the seventeenth invention, the effect of providing a battery pack that prevents unintended terminal short-circuiting and an electrical device including the battery pack is achieved.

An eighteenth invention is an electrical device system, wherein:

in a state where the battery pack is connected to the low voltage electrical device body or the high voltage electrical device body, the inter-terminal insulating member allows the first switching terminal group to be engaged with the first low voltage switching element or the first high voltage switching element.

For example, Embodiments 6 and 8 described below are embodiments corresponding to the eighteenth invention.

A nineteenth invention is a battery pack, including a plurality of cell units and being able to switch a connection state of the plurality of cell units, wherein a switching terminal group connected to a positive electrode or a negative electrode of each of the cell units is adjacently disposed in a common slot, a terminal of an electrical device body is inserted into the slot, and the switching terminal group is short-circuited by the terminal of the electrical device body to thereby switch the connection state of the plurality of cell units.

For example, Embodiments 2, 4, 5, 6, and 8 to 13 described below are embodiments corresponding to the nineteenth invention.

According to the nineteenth invention, the effect of providing a compact battery pack and an electrical device including the battery pack is achieved.

A twentieth invention is an electrical device, wherein:

the electrical device body includes a short circuit element connecting the plurality of cell units to each other in series, when the battery pack is connected to the high voltage electrical device body, at least one terminal among a plurality of terminals forming the switching terminal group is connected to the short circuit element, such that the plurality of cell units are connected to each other in series, and when the battery pack is not connected to the high voltage electrical device body, any one terminal among the plurality of terminals forming the switching terminal group is not connected to the short circuit element, such that the plurality of cell units are disconnected from each other.

For example, Embodiments 2, 5, 6, and 8 to 13 described below are embodiments corresponding to the twentieth invention.

According to the twentieth invention, the issue of providing a battery pack that can switch an output voltage can be solved. Moreover, the issue of providing a battery pack that can cut off interconnection of a plurality of cell units housed in the battery pack can be solved.

A twenty-first invention is an electrical device, wherein:

the electrical device body includes an input terminal connecting the plurality of cell units to each other in parallel, when the battery pack is connected to the low voltage electrical device body, at least two terminals among a plurality of terminals forming the switching terminal group are connected to the input terminal, such that the plurality of cell units are connected to each other in parallel, and when the battery pack is not connected to the low voltage electrical device body, any one terminal among the plurality of terminals forming the switching terminal group is not connected to the input terminal, such that the plurality of cell units are disconnected from each other.

For example, Embodiments 2, 5, 6, and 8 to 13 described below are embodiments corresponding to the twenty-first invention.

According to the twenty-first invention, the issue of providing a battery pack that can switch an output voltage can be solved. Moreover, the issue of providing a battery pack that can cut off interconnection of a plurality of cell units housed in the battery pack can be solved. In addition, the issue of providing a battery pack that can be shared between electrical devices of different voltages and an electrical device using the battery pack can be solved.

A twenty-second invention is an electrical device system, including: the battery pack according to the nineteenth invention, the high voltage electrical device body according to the twentieth invention, and the low voltage electrical device body according to the twenty-first invention.

For example, Embodiments 2, 5, 6, and 8 to 13 described below are embodiments corresponding to the twenty-second invention.

A twenty-third invention is an electrical device system, wherein:

the battery pack includes: a pair of rails, extending in a front-rear direction on left and right sides of the battery pack; and a first slot and a second slot, arranged in a left-right direction between the pair of rails, and the switching terminal group includes: a first switching terminal group, formed by adjacently disposing a plurality of positive electrode terminals connected to positive electrodes of cell units forming the plurality of cell units in the first slot; and a second switching terminal group, formed by adjacently disposing a plurality of negative electrode terminals connected to negative electrodes of the cell units forming the plurality of cell units in the second slot.

For example, Embodiments 2, 5, 6, and 8 to 13 described below are embodiments corresponding to the twenty-third invention.

According to the twenty-third invention, the effect of providing a compact battery pack and an electrical device including the battery pack is achieved.

A twenty-fourth invention is an electrical device, wherein:
the electrical device body includes a short circuit element connecting the plurality of cell units to each other in series, when the battery pack is connected to the high voltage electrical device body, at least one positive electrode terminal among a plurality of positive electrode terminals forming the first switching terminal group is connected to the short circuit element, and at least one negative electrode terminal among a plurality of negative electrode terminals forming the second switching terminal group is connected to the short circuit element, such that the plurality of cell units are connected to each other in series, and when the battery pack is not connected to the high voltage electrical device body, any one terminal among the plurality of terminals forming the first switching terminal group and the second switching terminal group is not connected to the short circuit element, such that the plurality of cell units are disconnected from each other.

For example, Embodiments 2, 5, 6, and 8 to 13 described below are embodiments corresponding to the twenty-fourth invention.

A twenty-fifth invention is an electrical device, wherein:
the electrical device body includes a positive input terminal and a negative input terminal connecting the plurality of cell units to each other in parallel, when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

For example, Embodiments 2, 5, 6, and 8 to 13 described below are embodiments corresponding to the twenty-fifth invention.

A twenty-sixth invention is an electrical device system, including: the battery pack according to the twenty-third invention, the high voltage electrical device body according to the sixth invention, and the low voltage electrical device body according to the seventh invention.

For example, Embodiments 2, 5, 6, and 8 to 13 described below are embodiments corresponding to the twenty-sixth invention.

A twenty-seventh invention is an electrical device system, wherein:

the plurality of positive electrode terminals forming the first switching terminal group are disposed to be arranged in a direction substantially perpendicular to the left-right direction in the first slot, and the plurality of negative electrode terminals forming the second switching terminal group are disposed to be arranged in a direction substantially perpendicular to the left-right direction in the second slot.

For example, Embodiments 2, 5, 6, and 8 to 13 described below are embodiments corresponding to the twenty-seventh invention.

According to the twenty-seventh invention, the effect of providing a compact battery pack and an electrical device including the battery pack is achieved.

A twenty-eighth invention is an electrical device system, wherein:

the electrical device body includes a short circuit element connecting the plurality of cell units to each other in series, the short circuit element includes a first terminal part and a second terminal part extending in a direction substantially perpendicular to the left-right direction, and a connection part connecting the first terminal part and the second terminal part, when the battery pack is connected to the high voltage electrical device body, at least one positive electrode terminal among the plurality of positive electrode terminals forming the first switching terminal group is connected to the first terminal part of the short circuit element, and at least one negative electrode terminal among the plurality of negative electrode terminals forming the second switching terminal group is connected to the second terminal part of the short circuit element, such that the plurality of cell units are connected to each other in series, and when the battery pack is not connected to the high voltage electrical device body, any one terminal among the plurality of terminals forming the first switching terminal group and the second switching terminal group is not connected to the short circuit element, such that the plurality of cell units are disconnected from each other.

For example, Embodiments 6 and 8 to 13 described below are embodiments corresponding to the twenty-eighth invention.

A twenty-ninth invention is an electrical device system, wherein:

the electrical device body includes a positive input terminal and a negative input terminal connecting the plurality of cell units to each other in parallel, the positive input terminal and the negative input terminal are formed to extend in a direction substantially perpendicular to the left-right direction, when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

For example, Embodiments 6 and 8 to 13 described below are embodiments corresponding to the twenty-ninth invention.

A thirtieth invention is an electrical device system, including:

the battery pack according to the twenty-seventh invention, the high voltage electrical device body according to the twenty-eighth invention, and the low voltage electrical device body according to the twenty-ninth invention.

For example, Embodiments 6 and 8 to 13 described below are embodiments corresponding to the thirtieth invention.

A thirty-first invention is a battery pack, wherein:

the switching terminal group connected to the positive electrode is an upper terminal and a lower terminal that are electrically independent, the switching terminal group connected to the negative electrode is an upper terminal and a lower terminal that are electrically independent, the upper terminal of the positive electrode and the lower terminal of the negative electrode are connected to a first cell unit, and the lower terminal of the positive electrode and the upper terminal of the negative electrode are connected to a second cell unit.

For example, Embodiments 5, 6, and 13 described below are embodiments corresponding to the thirty-first invention.

A thirty-second invention is a battery pack, wherein:

an insulating partition wall is disposed between the plurality of terminals forming the switching terminal group, and the partition wall allows terminals of the electrical device body to connect the switching terminal group.

For example, Embodiment 8 described below is an embodiment corresponding to the thirty-second invention.

A thirty-third invention is an electrical device system, wherein:

one switching terminal forming the switching terminal group is disposed at a position above the plurality of cell units and is connected to one battery cell included in one cell unit forming the plurality of cell units, another switching terminal forming the switching terminal group is disposed at a position above the plurality of cell units and is connected to another battery cell included in another cell unit forming the plurality of cell units, and the another switching terminal is disposed at a position above or behind the one switching terminal, and the another battery cell is disposed at a position behind the one battery cell.

For example, Embodiment 8 described below is an embodiment corresponding to the thirty-third invention.

Other features of invention further disclosed in the present application are described as follows. These features of invention may be combined in any manner with one or more specific configurations included in the later-described embodiments to constitute the invention.

According to a feature of the invention, in a battery pack that can switch a connection state of a plurality of cell units, a switching terminal group connected to positive electrodes or negative electrodes of the cell units is adjacently disposed in a common slot. A terminal of an electrical device body is inserted into the slot. The switching terminal group is short-circuited through the terminal of the electrical device body to thereby switch the connection state of the plurality of cell units. This configuration corresponds to Embodiments 2, 4 to 6, 8, 11, and 13, for example. Moreover, the electrical device body includes a short circuit element connecting the plurality of cell units to each other in series. When the battery pack is connected to the high voltage electrical device body, at least any one terminal among a plurality of terminals forming the switching terminal group is connected to the short circuit element, and the plurality of cell units are connected to each other in series. Here, the short circuit element is an element disposed on the electrical device body side. A connection element of Embodiment 2, a series/parallel switching element 683 of Embodiment 4, a conduction terminal 734 of Embodiment 5, a short bar 1059 of Embodiment 6, a short bar 1062 of Embodiment 7, a short bar 2859 of Embodiment 13, etc. are equivalent to the short circuit element. When the battery pack is not connected to the high voltage electrical device body, no terminal among the plurality of terminals forming the switching terminal group is connected via the short circuit element, and the plurality of cell units are disconnected from each other. Furthermore, the electrical device body includes an input terminal connecting the plurality of cell units to each other in parallel. When the battery pack is connected to the low voltage electrical device body, at least two terminals among a plurality of terminals (e.g., positive electrode terminals 712, 713 and negative electrode terminals 715 and 716 of Embodiment 5; positive electrode terminals 1162, 1172 and negative electrode terminals 1167, 1177 of Embodiment 6) forming the switching terminal group are connected to the input terminal, and the plurality of cell units are connected to each other in parallel. When the battery pack is not connected to the low voltage electrical device body, no terminal among the plurality of terminals forming the switching terminal group is connected to the input terminal, and the plurality of cell units are disconnected from each other. An electrical device system is formed of such battery pack, the high voltage electrical device body, and the low voltage electrical device body.

According to another feature of the invention, the battery pack includes: a pair of rails, extending in a front-rear direction on left and right sides of the battery pack; and a first slot and a second slot, aligned in a left-right direction between the pair of rails. The switching terminal group includes: a first switching terminal group, formed by adjacently disposing a plurality of positive electrode terminals connected to positive electrodes of cell units forming the plurality of cell units in the first slot; and a second switching terminal group, formed by adjacently disposing a plurality of negative electrode terminals connected to negative electrodes of the cell units forming the plurality of cell units in the second slot. The plurality of positive electrode terminals forming the first switching terminal group are disposed to be aligned in a direction substantially perpendicular to the left-right direction in the first slot, and the plurality of negative electrode terminals forming the second switching terminal group are disposed to be aligned in the direction substantially perpendicular to the left-right direction in the second slot. This configuration corresponds to Embodiments 2, 5, 6, 11, and 13, for example. The switching terminal group connected to the positive electrodes includes electrically independent upper terminal and lower terminal. The switching terminal group connected to the negative electrodes includes electrically independent upper terminal and lower terminal. The upper terminal of the positive electrode and the lower terminal of the negative electrode are connected at a first cell unit. The lower terminal of the positive electrode and the upper terminal of the negative electrode are connected at a second cell unit.

According to another feature of the invention, in a battery pack that includes a plurality of cell units and can switch a connection state of the plurality of cell units, a switching terminal group connected to positive electrodes or negative electrodes of the cell units is adjacently disposed in a common slot. Terminals of an electrical device body are inserted into the slot. The switching terminal group is short-circuited through the terminals of the electrical device body to thereby switch the connection state of the plurality of cell units. The switching terminal group includes a positive electrode side parallel terminal group formed by adjacently disposing terminals connected to the positive electrodes of the cell units, and a negative electrode side parallel terminal group formed by adjacently disposing terminals connected to the negative electrodes of the cell units. The slot includes positive electrode side slots for disposing the positive electrode side parallel terminal group and negative electrode side slots for disposing the negative electrode side parallel terminal group. If the terminals of the electrical device body are respectively inserted into the positive electrode side slots and the negative electrode side slots, and the positive electrode side parallel terminal group and the negative electrode side parallel terminal group are respectively short-circuited through the terminals of the electrical device body, the plurality of cell units are connected to each other in parallel. This configuration corresponds to Embodiments 1 to 6, 8, and 13, for example.

According to another feature of the invention, the switching terminal group of the battery pack includes a series connection terminal group formed by adjacently disposing a terminal connected to a positive electrode of one cell unit and a terminal connected to a negative electrode of another cell unit in a series connection slot. If the terminals of the electrical device body are inserted into the series connection slot and the series connection terminal group is short-circuited through the terminals of the electrical device body, the plurality of cell units are connected to each other in series. The switching terminal group is disposed to be aligned in a mounting direction to the electrical device body. This configuration corresponds to Embodiments 2, 4, and 13, for example. If a positive electrode power input terminal and a negative electrode power input terminal of the electrical device body are respectively connected to the positive electrode side parallel terminal group and the negative electrode side parallel terminal group, the positive electrode side parallel terminal group and the negative electrode side parallel terminal group are short-circuited. Furthermore, series connection terminals of the electrical device body disposed separately from the positive electrode power input terminal and the negative electrode power input terminal are connected to the series connection terminal group.

According to still another feature of the invention, a positive electrode terminal pair and a negative electrode terminal pair of the battery pack are disposed to be aligned in an upper-lower direction. A positive electrode power receiving terminal and a negative electrode power receiving terminal of the electrical device body driven by a first voltage are formed into a terminal plate having a width so as to be in contact with respectively both of the positive electrode terminal pair and the negative electrode terminal pair. A positive electrode power receiving terminal of the electrical device body driven by a second voltage is reduced in width so as to be in contact with only an upper side or a lower side of the positive electrode terminal pair. A negative electrode power receiving terminal of the electrical device body driven by the second voltage is reduced in width so as to be in contact with only an upper side or a lower side of the negative electrode terminal pair. The uncontacted terminals on the lower side or the upper side are respectively wired to a series connection terminal pair. This configuration corresponds to Embodiments 5 to 8 and 10 to 12, for example. Moreover, the positive electrode terminal pair and the negative electrode terminal pair of the battery pack are disposed to be aligned on a near side and a deep side in a connection direction of the battery pack to the electrical device body. In the electrical device body driven by the first voltage, the positive electrode power receiving terminal is formed to have a length so as to be in contact with both of the positive electrode terminal pair. In the electrical device body driven by the second voltage, the positive electrode power receiving terminal is shortened to be in contact with only the near side of the positive electrode terminal pair, and the negative electrode power receiving terminal is shortened to be in contact with only the near side of the negative electrode terminal pair. The uncontacted terminals on the deep side may be respectively wired to the series connection terminal pair. At this time, one of the series connection terminal pair is disposed on the near side in the connection direction of the battery pack to the electrical device body, and the other one is disposed separately on the depth side. Moreover, one of the series connection terminal pair is disposed on one side crossing the connection direction of the battery pack to the electrical device body, and the other one is disposed separately on the other side.

According to still another feature of the invention, a plurality of cell units are included, and the plurality of cell units may be switched between a parallel connection state and a series connection state. The switching terminal group connected to the positive electrodes or negative electrodes of the cell units is adjacently disposed, and switching may be performed between parallel connection and series connection according to the connection state between the terminals of the electrical device body and the switching terminal group. Here, the switching terminal group is, for example, equivalent to a series terminal group and a parallel terminal group of Embodiment 2, is equivalent to a parallel terminal group or a series terminal group of Embodiment 4, and is equivalent to a positive electrode terminal group and a negative electrode terminal group of Embodiments 5, 8, and 13.

According to a feature of the invention, a battery pack includes: two cell units, formed of a plurality of battery cells connected in series; and a plurality of connection terminals, connected to device side terminals formed in a mounting part on an electrical tool body side. The battery pack is formed in the following manner. The connection terminals include power terminals and signal terminals. The power terminals include electrically independent upper terminal and lower terminal. When the battery pack is mounted to a low voltage electrical tool body, the upper terminal and the lower terminal are collectively connected to power terminals of the low voltage electrical tool body. When the battery pack is mounted to a high voltage electrical tool body, only one of the upper terminal and the lower terminal is connected to the power terminals of the high voltage electrical tool body, and the other terminal not connected to the power terminals is short-circuited through a short circuit element disposed on the electrical tool body side. This configuration mainly corresponds to Embodiments 6 and 8, for example.

A positive electrode of the upper terminal and a negative electrode of the upper terminal of the power terminals are connected to a first cell unit. A positive electrode of the lower terminal and a negative electrode of the lower terminal of the power terminals are connected to a second cell unit. In the power terminals, fitting parts engaged to clamp the device side terminals are disposed to be aligned vertically. The fitting part of the upper terminal and the fitting part of the lower terminal are disposed at different positions when viewed in the mounting direction of the battery pack. Moreover, the upper terminal and the lower terminal of the power terminals each include an arm part set in which the fitting part is formed. A substrate cover part including a non-conductive material is provided. The substrate cover part covers both side surfaces and a portion of an upper side of the lower terminal so as to extend to be interposed in a gap between the arm part set of the upper terminal and the arm part set of the lower terminal in an upper-lower direction, and partitions the adjacent connection terminals. The substrate cover part includes a vertical wall extending in a vertical direction in parallel with the adjacent terminals and a horizontal wall extending in a horizontal direction so as to be interposed in the gap.

According to another feature of the invention, the upper terminal and the lower terminal of the power terminals each include two arm parts in which the fitting part is formed. Moreover, the arm part of the upper terminal is longer than the arm part of the lower terminal, and the fitting part of the upper terminal is disposed closer to a front side than the fitting part of the lower terminal. Conversely, the arm part of the upper terminal may also be configured to be shorter than the arm part of the lower terminal, and the fitting part of the upper terminal may be disposed to be closer to a rear side than the fitting part of the lower terminal. The power terminals are formed to include a charging positive electrode terminal and a discharging positive electrode terminal, and a negative electrode terminal, and respectively include electrically independent upper terminals and lower terminals. Among them, the upper terminals of the charging positive electrode terminal and the discharging positive electrode terminal are electrically connected, and the lower terminals of the charging positive electrode terminal and the discharging positive electrode terminal are electrically connected. The signal terminals include an upper arm part and a lower arm part connected to a same base body part. The upper arm part and the lower arm part respectively include fitting parts engaged with the device side terminals. The fitting part of the upper arm part and the fitting part of the lower arm part are disposed at the same positions when viewed in the mounting direction of the battery pack. The upper arm part and the lower arm part of the signal terminals have the same length, width, and thickness in shape and are formed to extend in parallel with the mounting direction of the battery pack from the base body part.

According to still another feature of the invention, in the electrical tool body mounted with the battery pack, a power-use power receiving terminal, connected to only one of the upper terminal and the lower terminal; and a short circuit element for causing short-circuiting on a side of the upper terminal and the lower terminal that is not connected to the power-use power receiving terminal. At this time, the fitting part of the upper terminal may be disposed to be closer to the front side than the fitting part of the lower terminal, and a notch part for preventing contact with the lower terminal may be disposed at a lower side portion of the plate-shaped power-use power receiving terminal. Conversely, the fitting part of the upper terminal may also be disposed to be closer to the rear side than the fitting part of the lower terminal, and a notch part for preventing contact with the upper terminal may be disposed at an upper side portion of the plate-shaped power-use power receiving terminal.

According to still another feature of the invention, a battery pack includes a first cell unit and a second cell unit formed of a plurality of battery cells connected in series and includes a plurality of power terminals and signal terminals connected to device side terminals formed in a mounting part on an electrical tool body side. The battery pack is formed in the following manner. The power terminals respectively include an upper terminal and a lower terminal. When mounted to a low voltage first electrical tool body, both the upper terminal and the lower terminal are connected to power source terminals of the first electrical tool body. When mounted to a second electrical tool body, only one of the upper terminal and the lower terminal is connected, and the other terminal of the upper terminal and the lower terminal is short-circuited. The upper terminal and the lower terminal respectively includes an arm part set clamping a terminal part of the first electrical tool body or the second electrical tool body. The arm part set of the upper terminal and the arm part set of the lower terminal are disposed to be aligned in the upper-lower direction. By disposing a battery pack mounting part for mounting such a battery pack, an electrical tool in which a motor is driven by using power from the battery pack to cause an operation device to work is realized.

According to still another feature of the invention, an electrical device connected with a battery pack is formed in the following manner. The battery pack includes a plurality of cell units, a positive electrode terminal pair formed by adjacently disposing a plurality of positive electrode terminals connected to positive electrodes of the cell unit in a first slot, and a negative electrode terminal pair formed by adjacently disposing a plurality of negative electrode terminals connected to negative electrodes of the cell units in a second slot different from the first slot. An electrical device body includes a positive input terminal connected to one positive electrode terminal of the positive electrode terminal pair, a negative input terminal connected to one negative electrode terminal of the negative electrode terminal pair, and a short circuit element electrically connecting the other positive electrode terminal of the positive electrode terminal pair and the other negative electrode terminal of the negative electrode terminal pair to each other. If the battery pack is connected to the electrical device body, the cell units are connected to each other in series via the short circuit element. Moreover, the battery pack includes: a first cell unit and a second cell unit; a first terminal, connected to the first cell unit; a second terminal, connected to the second cell unit and disposed to be adjacent to the first terminal; and a single slot, disposed at a position corresponding to the first terminal and the second terminal. In the electrical device body, a third terminal inserted into the single slot and connected to only the first terminal of the first terminal and the second terminal and a fourth terminal inserted into the single slot and connected to only the second terminal of the first terminal and the second terminal are disposed. If the battery pack is connected to the electrical device body, in the single slot, the first terminal and the third terminal are connected to each other to form a first potential, and the second terminal and the fourth terminal are connected to each other to form a second potential different from the first potential.

According to still another feature of the invention, a battery pack includes: two cell units, formed of battery cells, each plurality of which is connected to each other in series; and a plurality of connection terminals, connected to device side terminals formed in a mounting part on an electrical tool body side. The connection terminals include power terminals and signal terminals. The power terminals include electrically independent upper terminal and lower terminal. When the battery pack is mounted to a low voltage electrical tool body, the upper terminal and the lower terminal are collectively connected to power terminals of the low voltage electrical tool body. When the battery pack is mounted to a high voltage electrical tool body, only one of the upper terminal and the lower terminal is connected to power terminals of the high voltage electrical tool body, and the other terminal not connected to the power terminals is short-circuited by a short circuit element of the high voltage electrical tool body. A positive electrode of the upper terminal and a negative electrode of the lower terminal of the power terminals are connected at a first cell unit. A positive electrode of the lower terminal and a negative electrode of the upper terminal of the power terminals are connected at a second cell unit. In the power terminals, fitting parts engaged to clamp the device side terminals are disposed to be aligned vertically. The fitting part of the lower terminal is disposed to be closer to a front side than the fitting part of the upper terminal when viewed in the mounting direction of the battery pack. In this way, two sets of the positive electrode terminals and the negative electrode terminals are disposed independently of each other. The first cell unit is connected to one set of the positive electrode terminal and the negative electrode terminal. The second cell unit is connected to the other set of the positive electrode terminal and the negative electrode terminal. When the battery pack is connected to the high voltage electrical device body, the first cell unit and the second cell unit are brought into a series connection state. When the battery pack is connected to the low voltage electrical device body, the first cell unit and the second cell unit are brought into a parallel connection state.

According to still another feature of the invention, an electrical device includes a battery pack, and an electrical device body connected to the battery pack. The electrical device is formed in the following manner. The battery pack includes a plurality of cell units, a positive electrode terminal pair formed by adjacently disposing a plurality of positive electrode terminals connected to positive electrodes of the cell units in a first slot, and a negative electrode terminal pair formed by adjacently disposing a plurality of negative electrode terminals connected to negative electrodes of the cell units in a second slot different from the first slot. The electrical device body includes a positive input terminal connected to one positive electrode terminal of the positive electrode terminal pair, a negative input terminal connected to one negative electrode terminal of the negative electrode terminal pair, and a short circuit element electrically connecting the other positive electrode terminal of the positive electrode terminal pair and the other negative electrode terminal of the negative electrode terminal pair to each other. If the battery pack is connected to the electrical device body, the cell units are connected to each other in series via the short circuit element.

According to still another feature of the invention, the battery pack includes: a first cell unit and a second cell unit; a first terminal and a second terminal, disposed to be respectively connected to the first cell unit and the second cell unit and adjacent to each other; and a single slot, disposed at a position corresponding to the first terminal and the second terminal. A device body includes: a third terminal, inserted into the single slot and connected to only the first terminal of the first terminal and the second terminal; and a fourth terminal, inserted into the single slot and connected to only the second terminal of the first terminal and the second terminal. The second terminal and the fourth terminal are disposed at positions vertically offset with respect to the first terminal and the third terminal. The slot is formed to extend in an upper-lower direction. Moreover, a short circuit is disposed to cause short-circuiting between the second terminal for the positive electrode and the plurality of fourth terminals connected to the second terminal for the negative electrode. A switch part capable of connecting or cutting off by an operation of an operator is disposed in the short circuit. The switch part may perform control of switching on or switching off in conjunction with an operation of a trigger lever of the electrical device. Moreover, the switch part may be switched on with a time difference from the switch-on operation of the trigger lever of the electrical device and may be switched off with a time difference from the switch-off operation of the trigger lever. Furthermore, in a state where the battery pack is connected to the electrical device, a state where the plurality of cell units are disconnected from each other is maintained until the trigger lever is operated. If the trigger switch is operated, the plurality of cell units are connected in series. A microcomputer is disposed on the electrical device body side to control operation of the entire electrical device. The switch part functions as a main switch for activating or deactivating the microcomputer of the electrical device.

According to still another feature of the invention, a battery pack includes: two cell units, formed of battery cells, each plurality of which is connected to each other in series; positive electrode terminals and negative electrode terminals, connected to device side terminals formed in a mounting part on an electrical tool body side; and a positive electrode terminal slot and a negative electrode terminal slot for the device side terminals to pass through. The positive electrode terminals include a front positive electrode terminal and a rear positive electrode terminal disposed to be aligned and spaced apart in an insertion direction of the device side terminals in the same slot. The negative electrode terminals include a front negative electrode terminal and a rear negative electrode terminal disposed to be aligned and spaced apart in the insertion direction of the device side terminals in the same slot. The front positive electrode terminal and the rear negative electrode terminal are connected at a first cell unit. The front negative electrode terminal and the rear positive electrode terminal are connected at a second cell unit. When the battery pack is mounted to a low voltage electrical tool body, the front positive electrode terminal and the rear positive electrode terminal, and the front negative electrode terminal and the rear negative electrode terminal are respectively connected to be short-circuited via a positive input terminal and a negative input terminal of the low voltage electrical tool body. When the battery pack is mounted to a high voltage electrical tool body, only one of the front positive electrode terminal and the rear positive electrode terminal is connected to the positive input terminal of the high voltage electrical tool body, only one of the front negative electrode terminal and the rear negative electrode terminal is connected to the negative input terminal of the high voltage electrical tool body, and the other terminals are short-circuited. Here, a distance between the front positive electrode terminal and the rear positive electrode terminal and a distance between the front negative electrode terminal and the rear negative electrode terminal are greater than a length in the insertion direction of an electrode portion of a short circuit element for causing short-circuiting between terminals. The front positive electrode terminal and the front negative electrode terminal have a shape that allows passage of the short circuit element of the high voltage electrical tool body, or a portion of the positive input terminal and a portion of the negative input terminal of the low voltage electrical tool body, in the mounting direction. For example, the front positive electrode terminal and the front negative electrode terminal have an inverted-$\Omega$ shape in cross-section, and have on an upper part an opening part expanding in a left-right direction, and both sides of the plate-shaped positive input terminal and negative input terminal are engaged. The front positive electrode terminal includes a fitting part that clamps from two surface sides of the positive input terminal of the electrical tool body. The front negative electrode terminal includes a fitting part that clamps from two surface sides of the negative input terminal of the electrical tool body. A length direction of a contact region of each fitting part becomes a direction parallel to the insertion direction of the device side terminals.

According to still another feature of the invention, the front positive electrode terminal includes a fitting part that clamps from two surface sides of the positive input terminal of the electrical tool body. The front negative electrode terminal includes a fitting part that clamps from two surface sides of the negative input terminal of the electrical tool body. A length direction of a contact region of each fitting part becomes a direction substantially perpendicular to the insertion direction of the device side terminals. The rear positive electrode terminal and the front positive electrode terminal and the rear negative electrode terminal and the front negative electrode terminal are formed of common parts. The common parts are connected to the circuit substrate by soldering. The low voltage electrical device body side includes: a positive input terminal, having a long side in the insertion direction so as to be engaged with both the front positive electrode terminal and the rear positive electrode terminal when being mounted; and a negative input terminal, having a long side in the insertion direction so as to be engaged with both the front negative electrode terminal and the rear negative electrode terminal when being mounted, and is operated by a voltage of parallel connection of the first cell unit and the second cell unit. The high voltage electrical device body includes: a positive input terminal, connected to only one of the front positive electrode terminal and the rear positive electrode terminal when being mounted; a negative input terminal, connected to only one of the front negative electrode terminal and the rear negative electrode terminal when being mounted; and a short circuit element, for causing the other terminal of the front positive electrode terminal and the rear positive electrode terminal and the other terminal of the front negative electrode terminal and the rear negative electrode terminal to be short-circuited, and is operated by a voltage of series connection of the first cell unit and the second cell unit. The short circuit element is a short bar formed by bending a thin plate made of metal into a reflected-C shape and includes a connection part extending in a horizontal direction and a terminal part extending in a vertical direction and engaged with either of the positive electrode terminal and the negative electrode terminal.

According to still another feature of the invention, a plurality of power terminals and a plurality of signal terminals are disposed. The power terminals and the signal terminals are formed to be adjacently disposed in a lateral direction. A substrate cover is disposed including an insulator partition between the terminals. The substrate cover includes a connection member located on a front side of the terminals adjacently disposed in the lateral direction, and a plurality of vertical walls formed to be connected to a rear side of the connection member and extend to be closer to an upper side than an upper surface of the connection member. The plurality of vertical walls adjacent to the power terminals extend upward to a position partially overlapping arm parts on both sides of the power terminals in a side view. The vertical wall only adjacent to the signal terminals is formed to have a height identical to or less than that of the vertical wall adjacent to the power terminals in a side view. The power terminals include an upper arm part set and a lower arm part set. An upper end of the vertical wall adjacent to the power terminals is located above an upper end of the lower arm part set. The battery pack includes a first cell unit and a second cell unit formed of a plurality of battery cells, each plurality of which is connected to each other in series. The power terminals include electrically independent upper terminal and lower terminal. Leg parts of the upper terminal and the lower terminal are adjacently disposed in a front-rear direction. A positive electrode of the upper terminal and a negative electrode of the lower terminal of the power terminals are connected at the first cell unit. A positive electrode of the lower terminal and a negative electrode of the upper terminal of the power terminals are connected at the second cell unit. A rear end position of the vertical wall adjacent to the power terminals is located closer to the rear side than the leg part of the lower terminal. The rear end position of the vertical walls adjacent to the power terminals is closer to the rear side than the leg part of the upper terminal.

According to still another feature of the invention, the power terminals and the signal terminals of the battery pack include leg parts and are fixed by soldering the leg parts after passing the leg parts through through holes formed in the circuit substrate. The substrate cover is fixed to the circuit substrate in a state where the connection member of the substrate cover is located closer to the front side than the plurality of leg parts and the vertical walls are located between the terminals. The upper terminal and the lower terminal of the power terminals respectively include an arm part set in which the fitting part is formed. A horizontal wall extending so as to be interposed in a gap between the arm part set of the upper terminal and the arm part set of the lower terminal in an upper-lower direction is connected to the vertical wall adjacent to the power terminals. A substrate cover part is an integral part including an insulating material that partitions the plurality of terminals.

According to still another feature of the invention, an electrical device includes: a battery pack, including a plurality of cell units; and a tool body, including a plurality of series terminals formed by connecting the plurality of cell units in series. The electrical device is formed in the following manner. A trigger switch is connected between the plurality of series terminals. In a state where the battery pack is connected to a tool, a state where the plurality of cell units are disconnected from each other is maintained until the trigger switch is operated. If the trigger switch is operated, the plurality of cell units are connected in series.

According to another feature of the invention, a battery pack includes: two cell units, formed of a plurality of cells, each plurality of which is connected to each other in series; and a plurality of connection terminals, connected to device side terminals formed in a mounting part on an electrical device body side. The battery pack is formed in the following manner. The connection terminals include power terminals and signal terminals. The power terminals include electrically independent upper terminal and lower terminal. The signal terminals include independent upper terminal and lower terminal. Here, a bridge part of the upper terminals extends in a front-rear direction, and a bridge part of the lower terminals extends in an upper-lower direction, such that a length of an arm part set of the upper terminals and a length of the arm part set of the lower terminals are formed to be identical. In addition, a battery pack includes: two cell units, formed of a plurality of cells, each plurality of which is connected to each other in series; and a plurality of connection terminals, connected to device side terminals formed in a mounting part on an electrical device body side. The connection terminals include power terminals and signal terminals. The power terminals include electrically independent upper terminal and lower terminal. When the battery pack is mounted to a low voltage electrical device body, the upper terminal and the lower terminal are collectively connected to power terminals of the low voltage electrical device body. When the battery pack is mounted to a high voltage electrical device body, only one of the upper terminal and the lower terminal is connected to the power terminals of the high voltage electrical device body, and a length of an arm part set of the upper terminal and a length of an arm part set of the lower terminal are set to be identical.

According to another feature of the invention, a clamp load of the arm part set of the upper terminal and a clamp load of the arm part set of the lower terminal are set to be identical. A plurality of power terminals and signal terminals are held by a circuit substrate included in the battery pack. A leg part for passing through a through hole formed in the circuit substrate is formed on a lower side of the power terminals. The side of the leg part passing through the circuit substrate is joined with the circuit substrate. A joined portion of the leg part of the upper terminal with the circuit substrate is disposed to be closer to the rear side than the joined portion of the leg part of the lower terminal with the circuit substrate when viewed in the mounting direction of the battery pack. Moreover, a positive electrode of the upper terminal and a negative electrode of the upper terminal of the power terminals are connected at a first cell unit. A positive electrode of the lower terminal and a negative electrode of the lower terminal of the power terminals are connected at a second cell unit. In a state where the battery pack is not mounted to the electrical device body, the upper terminal and the lower terminal are in an electrically independent state. Furthermore, the arm part set of the upper terminal and the arm part set of the lower terminal include fitting parts engaged to clamp the device side terminals. In a state of not being mounted to the electrical device body, the fitting part of the arm part set of the upper terminal is kept in a non-contact state, and the fitting part of the arm part set of the lower terminal is kept in a non-contact state.

According to still another feature of the invention, in a state of not being mounted to the electrical device body, a minimum interval d1 of the arm part of the upper terminal and a minimum interval d2 of the arm part of the lower terminal are set to be d1≤d2. A power receiving terminal of the electrical device body is in a plate shape. In a case of simultaneous connection to the upper terminal and the lower terminal, an engagement pressure between the upper terminal and the power receiving terminal and an engagement pressure between the lower terminal and the power receiving terminal are set to be almost identical. Here, a shape of a base body part to which the arm part set of the upper terminal is connected is different from a shape of a base body part holding the arm part of the lower terminal. A front end position of the arm part set of the upper terminal is aligned with a front end position of the arm part set of the lower terminal at the same position when viewed in the mounting direction of the battery pack. Moreover, a connected portion between the base body part and the arm part set of the upper terminal is in a substantially L-shape in a side view. A connection reinforcement part that is obliquely reinforced is disposed at an internal angle portion. A connected portion between the base body part and the arm part set of the lower terminal are in a substantially L-shape in a side view. A cutout part that is obliquely cut out is disposed at an external angle portion. Furthermore, a substrate cover part including a non-conductive material is disposed to partition the plurality of terminals.

According to still another feature of the invention, a plurality of power terminals and a plurality of signal terminals are disposed. The power terminals and the signal terminals have an upper arm part set and a lower arm part set engaged to clamp device side terminals. The upper arm part set and the lower arm part of the power terminals are connected to different base body parts to achieve electrical independence. The two different base body parts are fixed separated in a circuit substrate. An upper arm part set and a lower arm part set of the signal terminals are connected to a common base body part to be electrically identical The common base body part is fixed to the circuit substrate. The base body part of the power terminals are in a substantially L-shape in a side view and is formed so that an engagement pressure of the upper arm part set of the power terminals becomes identical to an engagement pressure of the lower arm part set. The upper arm part set and the lower arm part set of the power terminals include fitting parts that are bent in a convex shape toward opposite inner sides, such that a radius of curvature R1 of an inner surface of each fitting part is identical.

According to still another feature of the invention, a battery pack includes: a battery cell, a plurality of connection terminals connected to device side terminals of a mounting target device, and a housing. The housing houses the battery cell and the connection terminals and a mounting part that may be attached to and removed from the mounting target device is formed therein. In the battery pack, the connection terminals include an arm part having elasticity. A connection part in contact with the device side terminals is formed in a portion of the arm part. The connection part has a convex shape in order to contact the device side terminals by a linear contact part or an elongated surface-shaped contact region, and is disposed such that a length direction of the contact part or the contact region of the connection part is tilted with respect to the mounting direction of the device side terminals on a surface of the device side terminals. The connection terminal includes a base body part formed by bending a metal plate in a U-shape, and two arm parts are formed from a portion respectively of one side surface and the other side surface of the base body part to extend in parallel.

According to still another feature of the invention, a convex outer face shape of the connection part is a semi-cylindrical shape. The device side terminals are metal flat plates extending in the vertical direction and the mounting direction. The connection part is in contact with the flat plate from both left and right sides of the flat plate. Moreover, a fitting part is obliquely formed such that an upper side of the contact part or the contact region along a longitudinal center line falls toward a rear side or toward a front side with respect to a lower side.

According to still another feature of the invention, a circuit substrate formed with a plurality of terminal mounting holes is disposed to align and fix a plurality of connection terminals in a lateral direction. A leg part is disposed in the connection terminal, extending downward from a lower side part of each of one side surface and the other side surface of the base body part. The leg part is passed through the terminal mounting hole and is soldered to the circuit substrate. Thereby, the plurality of connection terminals are fixed to the circuit substrate. Moreover, the connection terminals are adjacently disposed in two layers in an upper-lower direction. The arm parts of the connection terminals are disposed to be aligned in the upper-lower direction. Furthermore, the connection terminals each include two arm parts separated and extending from the base body part in the upper-lower direction. A fitting part is formed in each arm part. An inclination direction of the longitudinal center line of the contact part or the contact region caused by the upper arm part is formed to be a direction identical to or different from an inclination direction caused by the lower arm part.

According to still another feature of the invention, the arm part is formed to include: a contraction part, bent into a tapered shape as it extends away from the base body part bent in a U-shape; a fitting part, formed at a front end of the contraction part and protruding in a convex shape toward the opposite arm part; and a guide part, formed on a front side of the fitting part and formed into a shape widened toward a front end to facilitate insertion of device side terminals. To make a battery pack including the connection terminals formed in this way attachable and detachable, an electrical device including a battery pack mounting part and a terminal holder holding a plurality of device side terminals connected to the connection terminals is realized and an operation device is operated by using the power of the battery pack.

According to still another feature of the invention, an electrical tool includes a battery pack, and a terminal holder (terminal part) which establishes an electrical connection state with connection terminals of the battery pack and holds a plurality of device side terminals. In the electrical tool, two parallel projection parts are disposed in the battery pack to extend in a front-rear direction. Rail parts engaged with tool side rail grooves are disposed in each of the projection parts. An engaged part engaged with the terminal holder is disposed in an opening part formed between the projection parts to inhibit relative movement between the terminal holder and the battery pack in an upper-lower direction. The battery pack includes an upper step surface between rail surfaces disposed in parallel, a lower step surface that descends in a stepped shape from the upper step surface, a plurality of slits in a step portion between the upper step surface and the lower step surface, and an opening part connected between the slits. Moreover, an engaging part for engaging with the engaged part is disposed in the terminal holder.

According to still another feature of the invention, the terminal holder is a molded article of synthetic resin, in which a vertical plane and a horizontal plane are formed, and the terminal holder is fixed by casting plate-shaped device side terminals to be perpendicular to the two planes. The device side terminals are rectangular metal plates, wherein one long edge is connected to the horizontal plane, and one short edge is connected to the vertical plane. In the terminal holder, a protrusion protruding from both left and right ends in the left-right direction is disposed as the engaging part. Moreover, a guide plane is formed in the terminal holder. The guide plane is collectively connected to a portion of the other long edge of the device side terminal and connected to the vertical plane, and is disposed in parallel with the horizontal plane. The engaging part is formed on both left and right sides of the guide plane. The engaging part is formed to be on the same plane as the guide plane, and the engaging part is located in, for example, a concave part directly formed on the housing of the battery pack. Furthermore, a cover part for covering the substrate inside is disposed on the opening part of the battery pack. The engaged part is disposed in the cover part. The engaging part and the engaged part are engaged with each other. Moreover, a cushion material such as self-lubricating rubber may also be disposed on a surface of the guide plane facing the battery pack to be in contact with an external wall surface of the battery pack. Furthermore, a partition including an insulating material is disposed on a side of the plate-shaped device side terminals of the terminal holder on the body side and between the plurality of horizontally aligned device side terminals. In other words, the partition formed of an insulator is disposed between a positive input terminal and a negative input terminal. A plurality of plate-shaped signal terminals may be disposed between the positive input terminal and the negative input terminal. The partition formed of the insulator may be disposed between the signal terminals and the positive input terminal. The partition is formed to have a size identical to or larger than a size of the positive input terminal in the upper-lower direction and may be manufactured integrally with a base of the terminal holder by using the same material. Moreover, the device side terminals may be manufactured from a highly elastic material.

According to still another feature of the invention, a battery pack includes: positive electrode terminals, including two arm part sets aligned in an upper-lower direction; and negative electrode terminals, including two arm part sets aligned in the upper-lower direction. A terminal holder is engaged with the battery pack. Moreover, plate-shaped device side upper terminals inserted between the upper arm part sets and plate-shaped device side lower terminals inserted between the lower arm part sets are spaced apart and are disposed in an unconnected state. A first guide part formed of an insulator is disposed between the device side upper terminals and the device side lower terminals of the terminal holder to guide the upper arm part sets and the lower arm part sets. Moreover, a guide part including an insulating material is disposed in the terminal holder to be engaged with the positive electrode terminals and the negative electrode terminals. Furthermore, a second guide part formed of an insulator is disposed on an upper side of the upper terminals and a lower side of the lower terminals of the terminal holder to guide the upper arm part sets and the lower arm part sets.

Effect of the Invention

According to the invention, a plurality of cell units housed in the battery pack may be switched between parallel connection and series connection to each other. Therefore, a battery pack that can switch the output voltage may be switched and that can be shared between electrical devices of different voltages, and an electrical device using the battery pack can be provided.

Moreover, according to the invention, when the battery pack is connected to the electrical device body, since the output voltage of the battery pack is automatically switched to an output voltage suitable for the connected electrical device body, voltage setting compatible with a corresponding electrical device can be easily performed. Thereby, a battery pack effectively preventing erroneous voltage setting and an electrical device using the battery pack can be provided. According to the invention, a battery pack that can inhibit an increase in the size or weight of the battery pack can be provided.

Moreover, according to the invention, since a voltage switching element for switching the output voltage of the battery pack is disposed in a terminal arrangement region where power source terminals of the battery pack are disposed, or is disposed at a position substantially at the same height as the power source terminals of the battery pack, an electrical device can be provided in which both or one of an electrical device body and a battery pack is compactly formed.

Moreover, according to the invention, since the voltage switching element for switching the output voltage of the battery pack is formed of terminals of the battery pack, a mechanical switch mechanism for switching between a low voltage parallel connection circuit and a high voltage series connection circuit is unneeded, and the battery pack can be shared between electrical devices of different voltages. Accordingly, a battery pack that is easy to use can be realized. In addition, compared to using the mechanical switch mechanism, manufacturing cost can be kept low, and durability can be enhanced. Thereby, an electrical device can be provided in which both or one of an electrical device body and a battery pack is formed in a simple structure.

Moreover, according to the invention, a contact terminal serving as a 108V output is disposed closer to a deep side of the battery pack than a 36V output terminal. Therefore, a far surface distance may be guaranteed at the time of high voltage output.

In addition, according to the invention, the voltage switching element of the battery pack is formed of battery pack side terminals connected to the plurality of cell units. The voltage switching element of the electrical device body is formed of electrical device side terminals that can be connected to the battery pack side terminals. Therefore, when the battery pack is removed, the plurality of cell units are brought into an unconnected state, which is the most suitable state during transportation or storage. Thereby, a battery pack that can cut off interconnection between a plurality of Li-ion batteries, etc. housed in the battery pack when the electrical device is transported and an electrical device using the battery pack can be provided.

Figure 6:
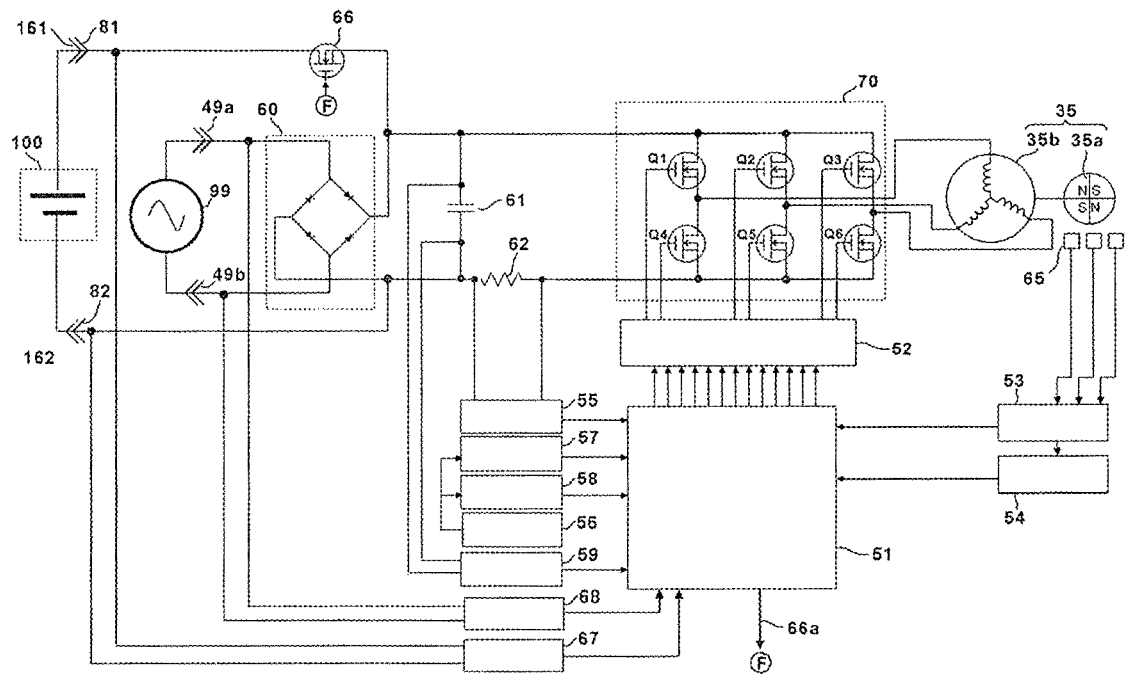
Figure 6:
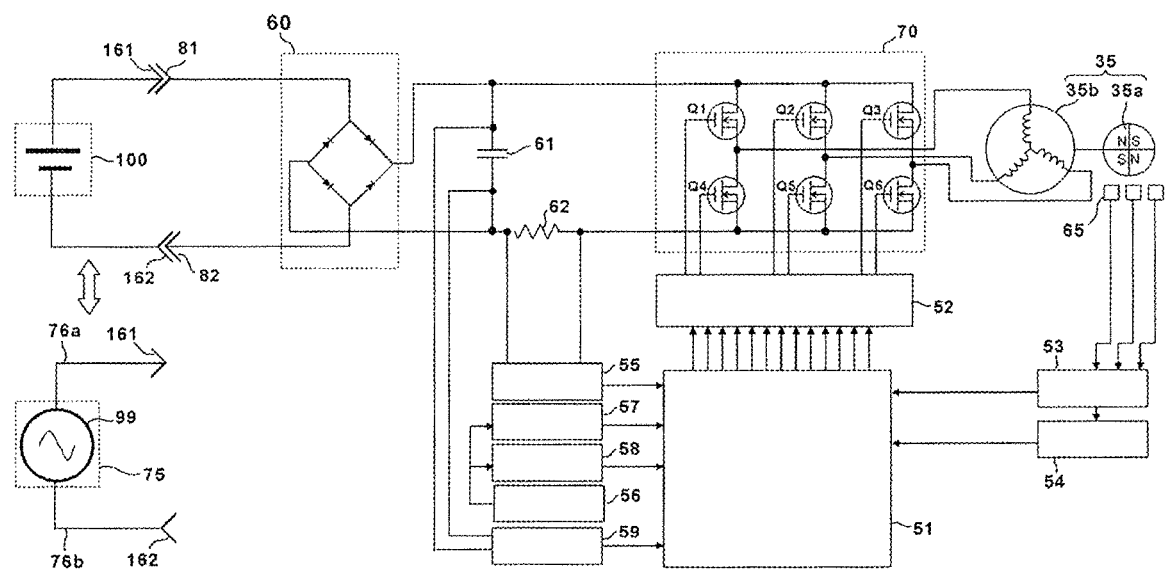

(1) of FIG. 6 is a circuit block diagram of a driving control system of an electrical tool body 30B. (2) of FIG. 6 is a circuit block diagram of a driving control system of an electrical tool body 30C.

Figure 7:
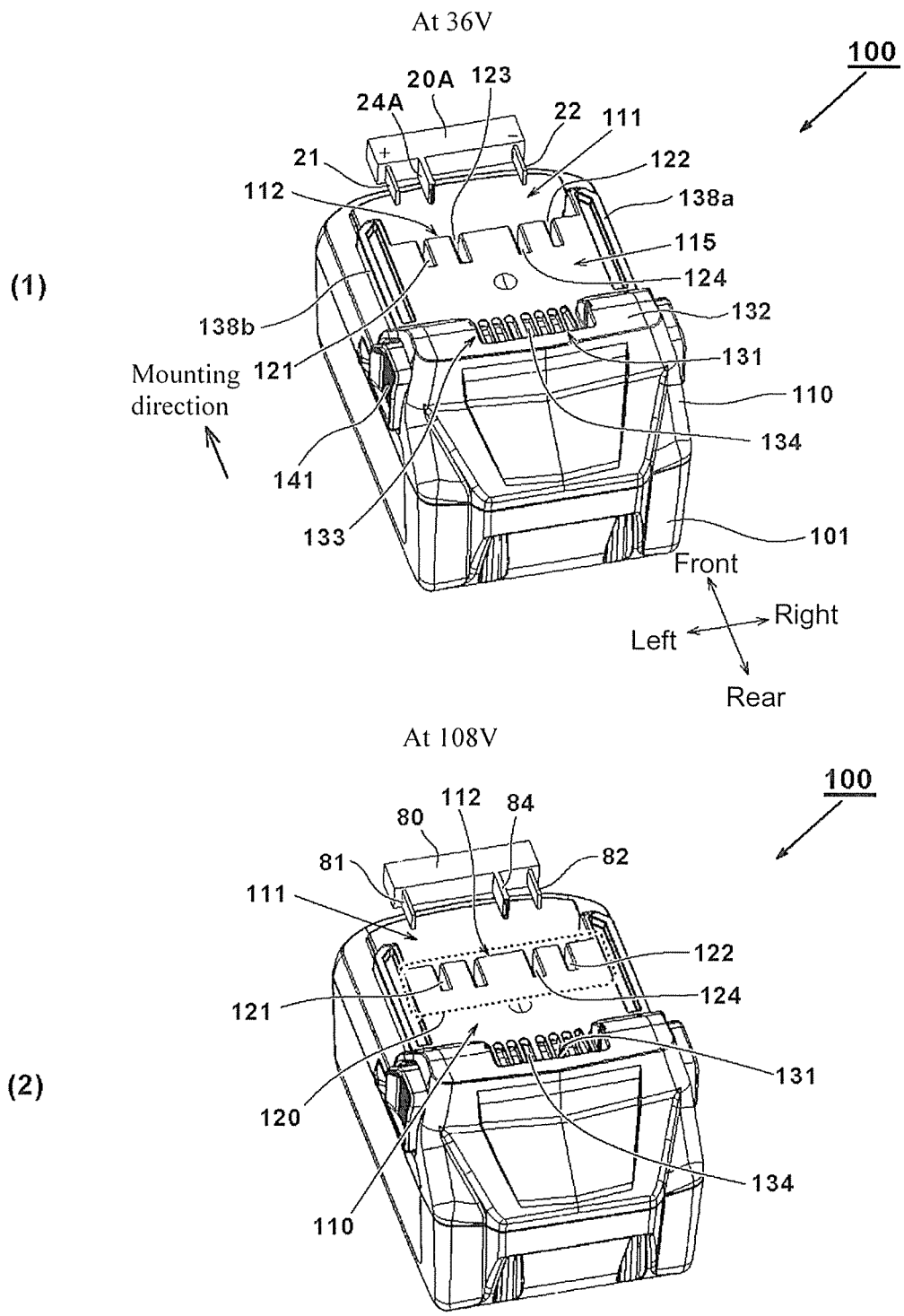

FIG. 7 is a perspective view illustrating an appearance/shape of a battery pack 100 of a first embodiment.

Figure 8:
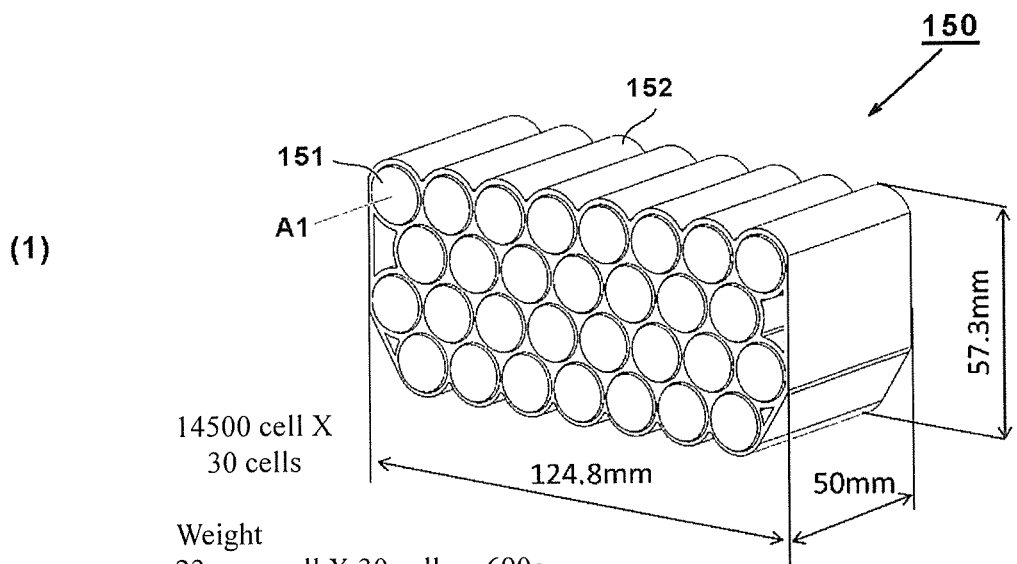
Figure 8:
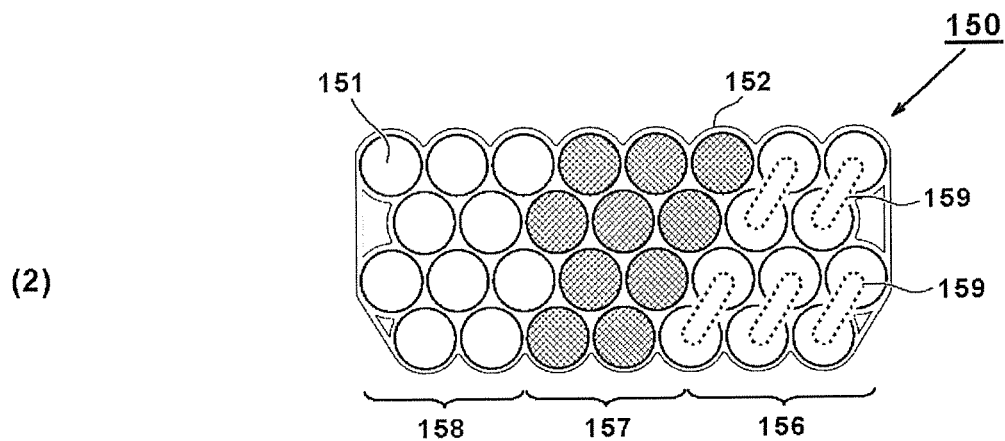

FIG. 8 is a diagram illustrating a cell pack 150 housed inside the battery pack 100. (1) of FIG. 8 is a perspective view. (2) of FIG. 8 is a side view of the cell pack 150 viewed from an axial direction of a cell 151.

Figure 9:
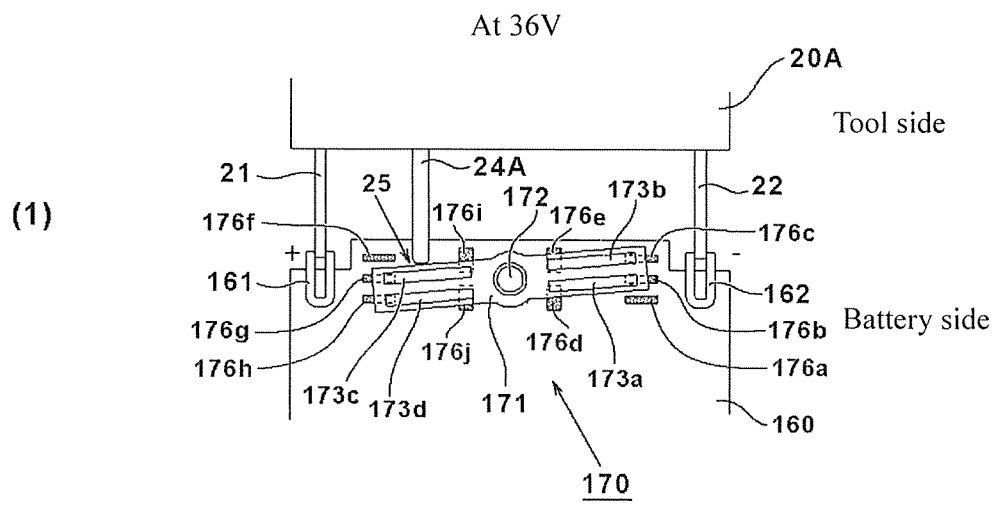
Figure 9:
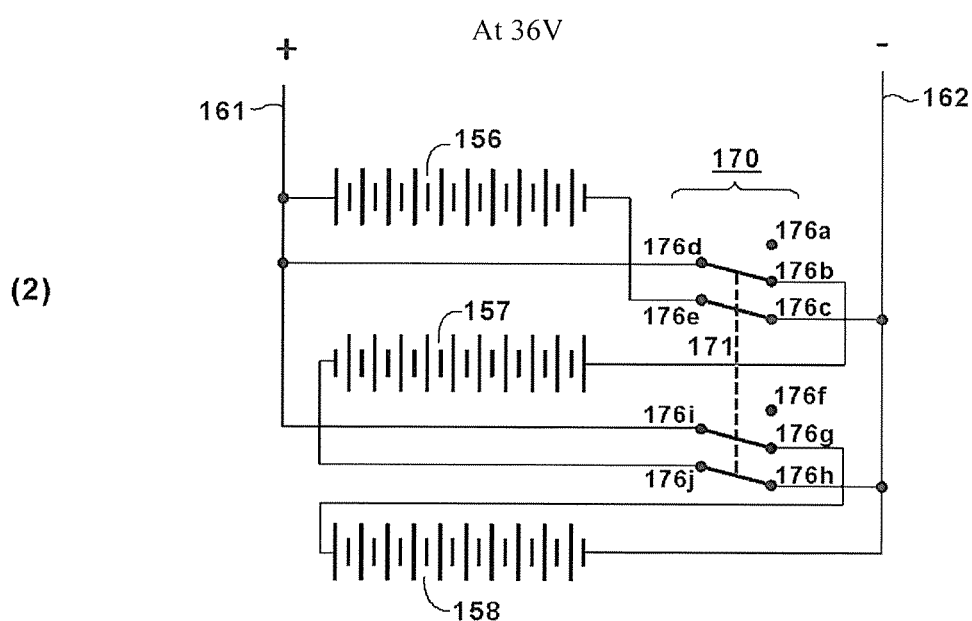
Figure 10:
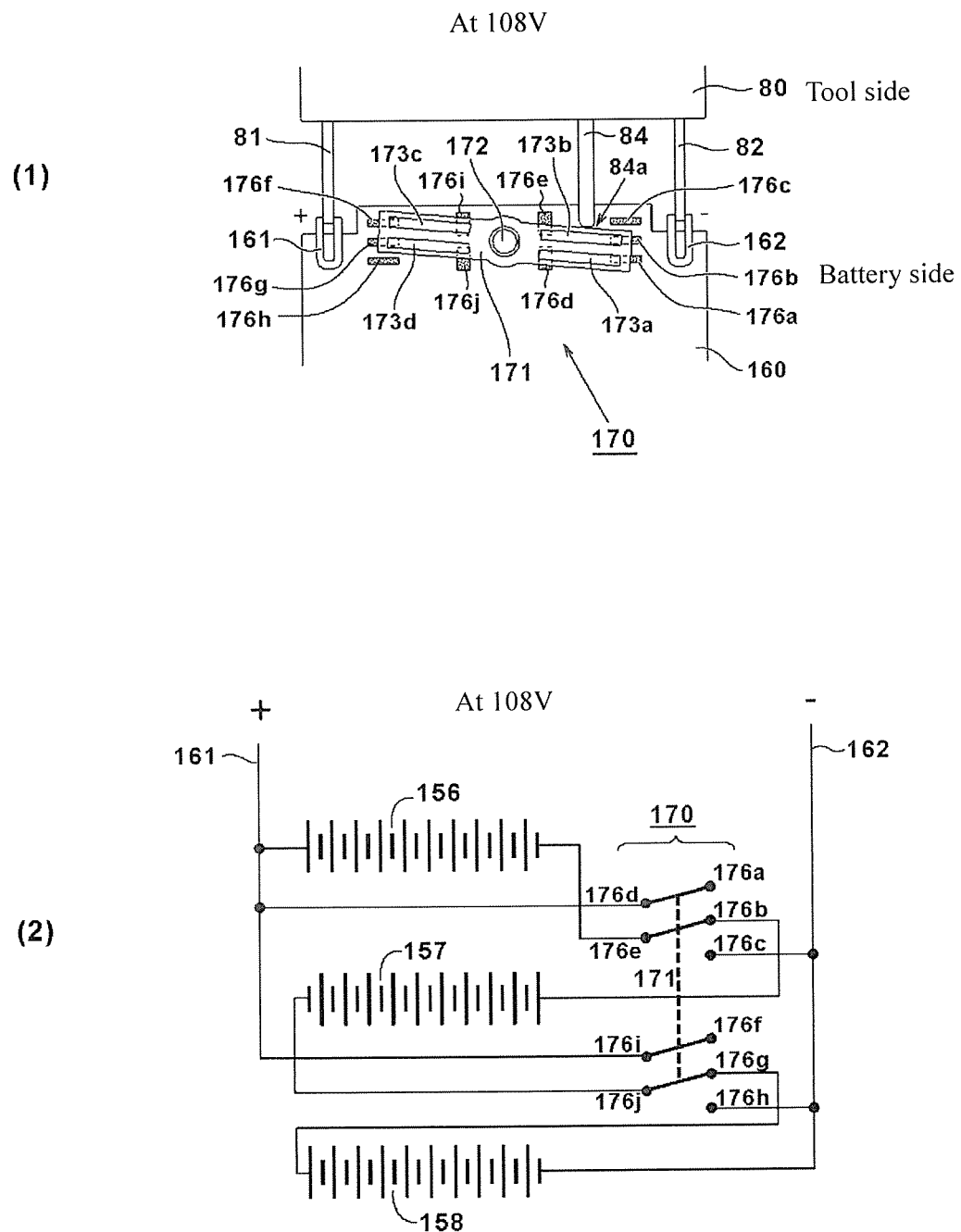

(1) of FIG. 9 is a diagram illustrating a state in the vicinity of a terminal part 20A when the battery pack 100 is mounted to an electrical tool body rated at 36V, and (2) of FIG. 9 is a connection circuit diagram thereof (1) of FIG. 10 is a diagram illustrating a state in the vicinity of a terminal part 80 when the battery pack 100 is mounted to an electrical tool body rated at 108V, and (2) of FIG. 10 is a connection circuit diagram thereof.

Figure 11:
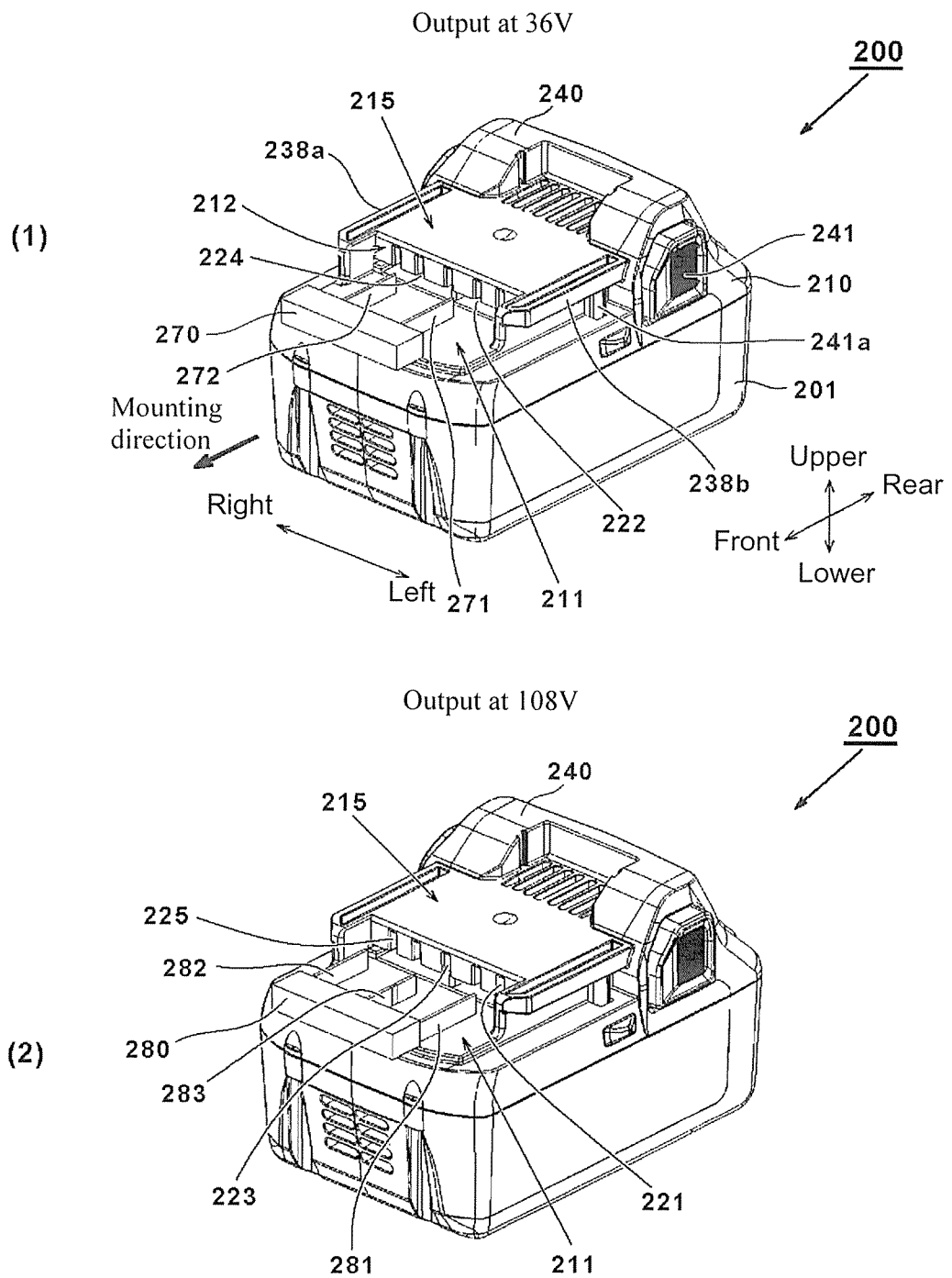

FIG. 11 is a perspective view illustrating shapes of a battery pack 200 of a second embodiment and a terminal part connected thereto. (1) of FIG. 11 illustrates a state at the time of connection to an electrical device rated at 36V. (2) of FIG. 11 illustrates a state at the time of connection to an electrical device rated at 108V.

Figure 12:
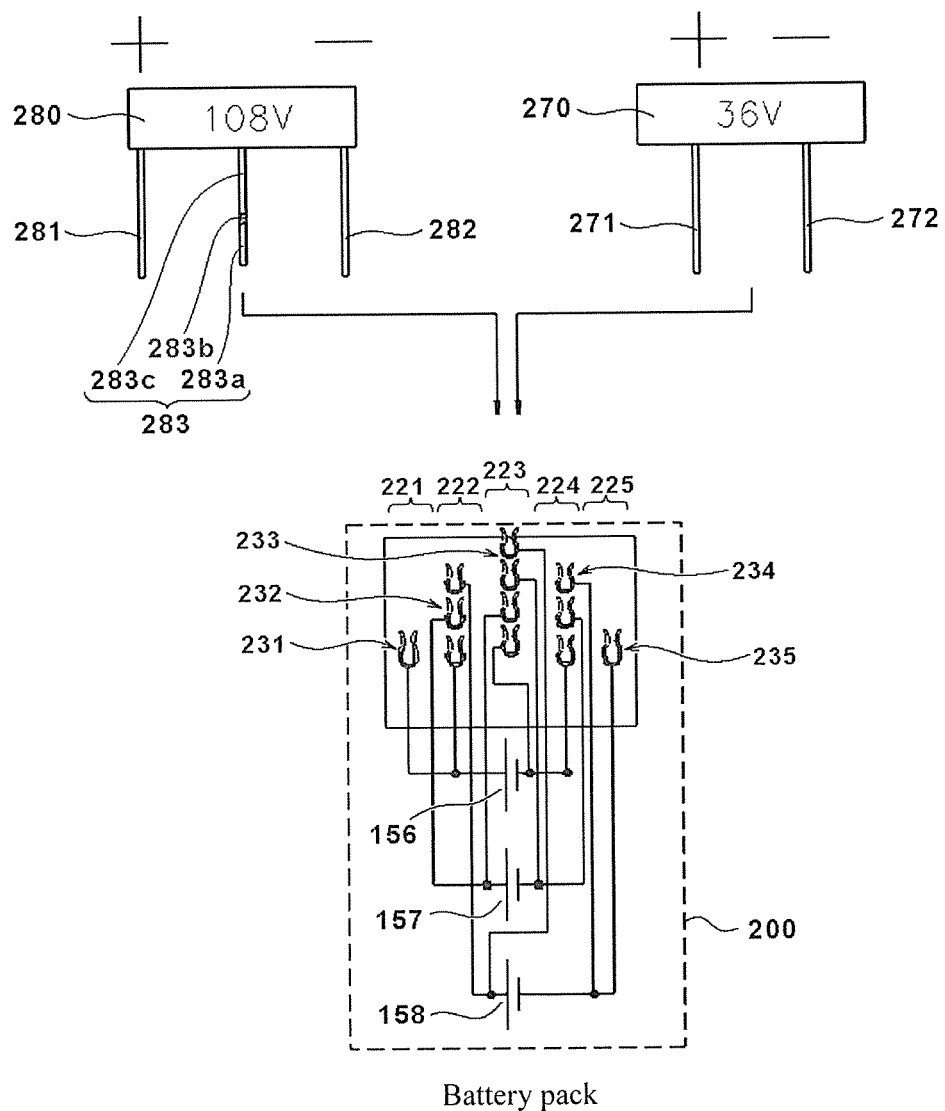

FIG. 12 is a connection circuit diagram of the battery pack 200 of FIG. 11.

Figure 13:
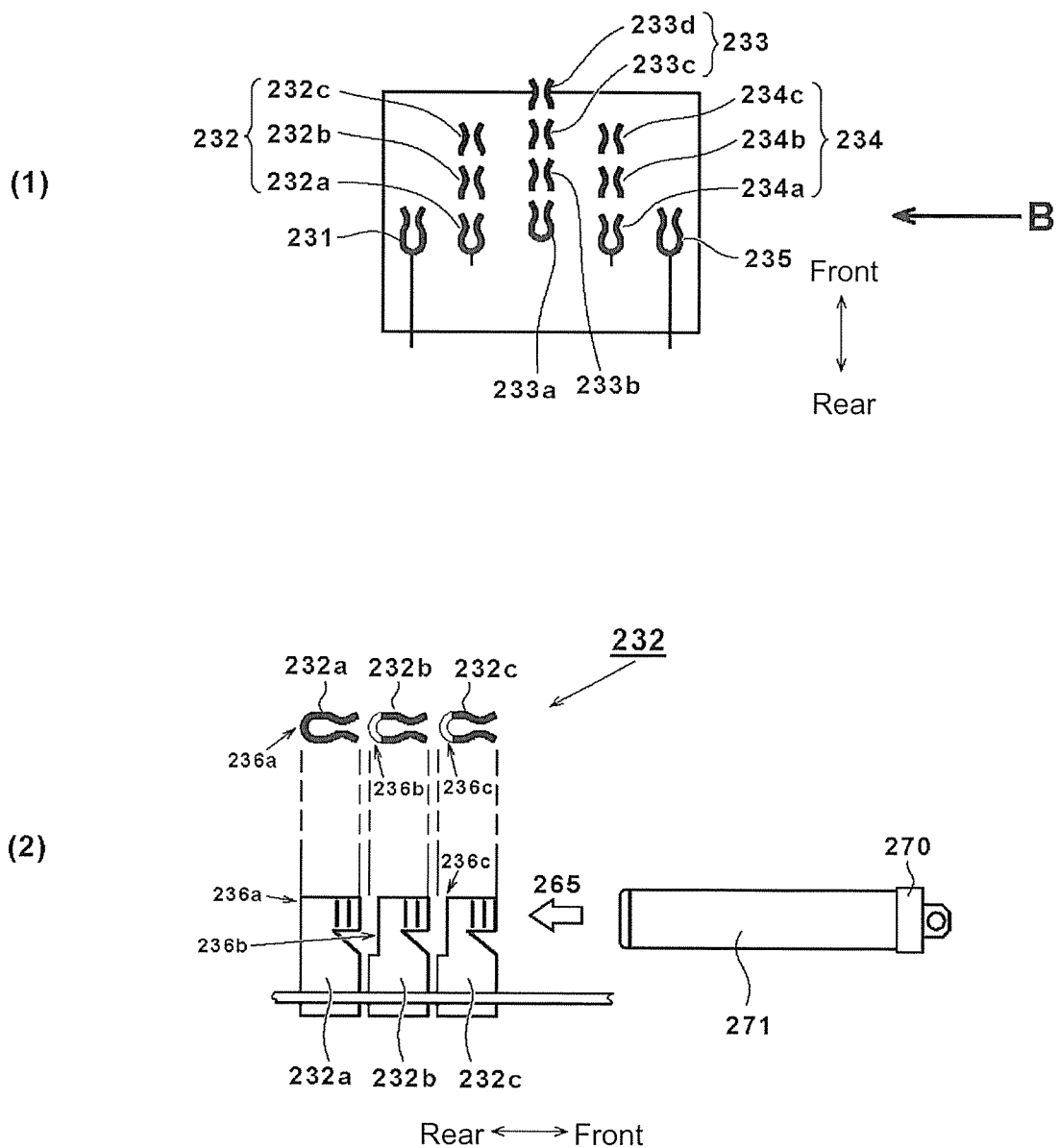

FIG. 13 is a diagram illustrating shapes of terminals 231 to 235 of FIG. 12. (1) of FIG. 13 is a top view. (2) of FIG. 13 is a side view of a terminal group 232 (viewed in the direction of arrow B of (1) of FIG. 13).

Figure 14:
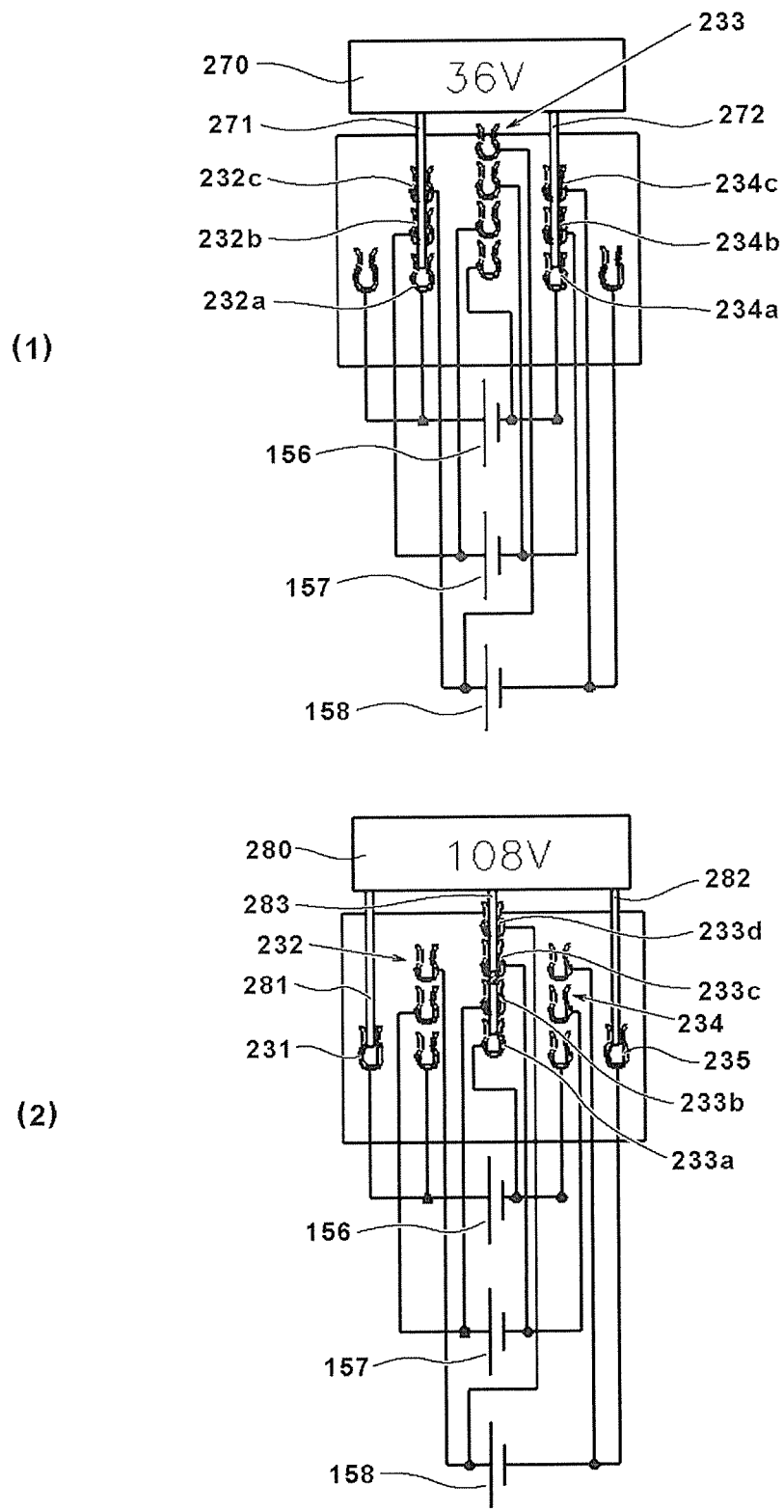

FIG. 14 is a diagram illustrating a state where the battery pack 200 is mounted to terminal parts 270, 280. (1) of FIG. 14 shows a 36V output state. (2) of FIG. 14 shows a 108V output state.

Figure 15:
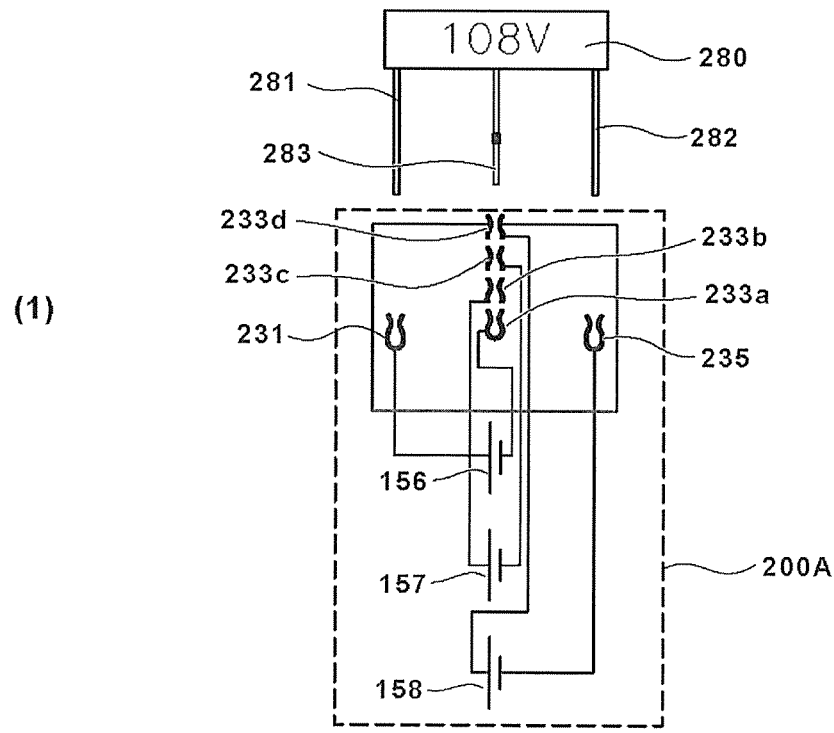
Figure 15:
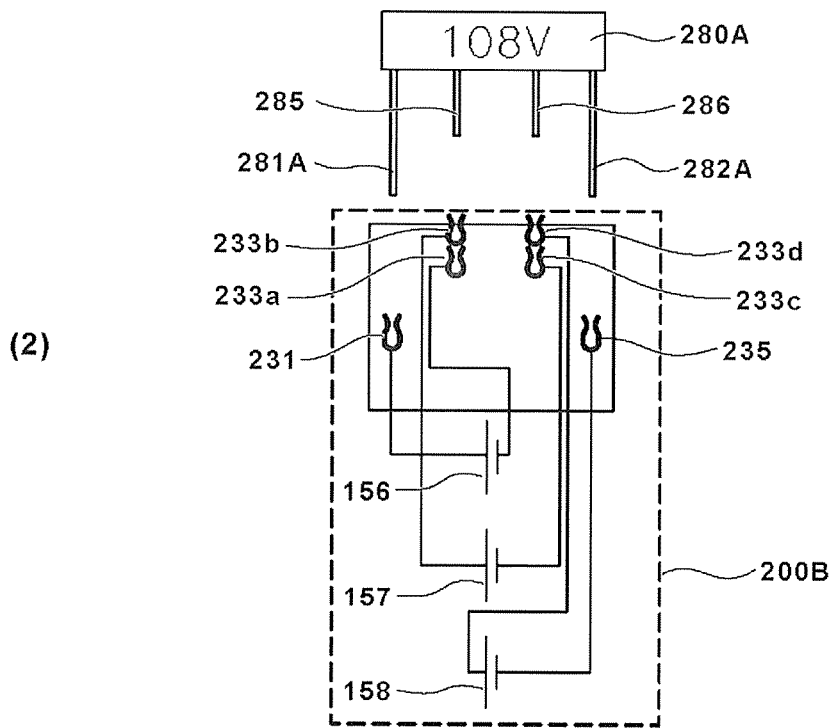

FIG. 15 is a diagram for illustrating a battery pack 200A exclusively used for 108V of a modification example of the second embodiment. (1) of FIG. 15 illustrates a situation of using the same terminal part 280 as FIG. 11 and FIG. 12. (2) of FIG. 15 illustrates a situation of using a terminal part 280A of the modification example.

Figure 16:
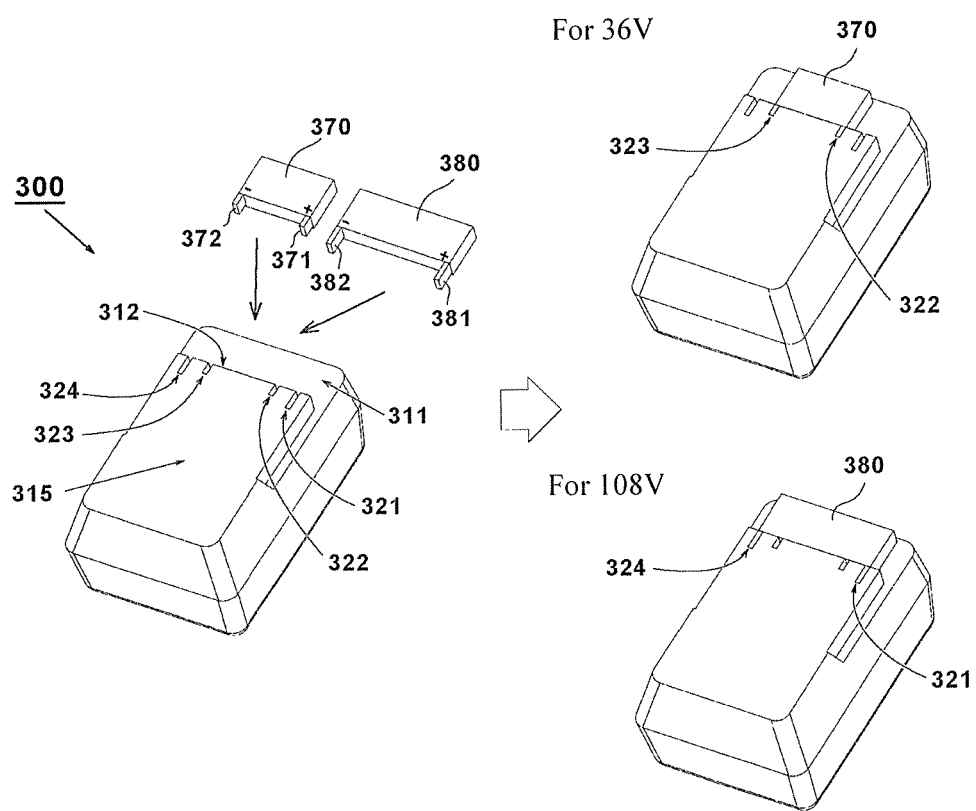

FIG. 16 is a schematic perspective view illustrating shapes of a battery pack 300 of a third embodiment of the invention and terminal parts 370, 380 mounted therein.

Figure 17:
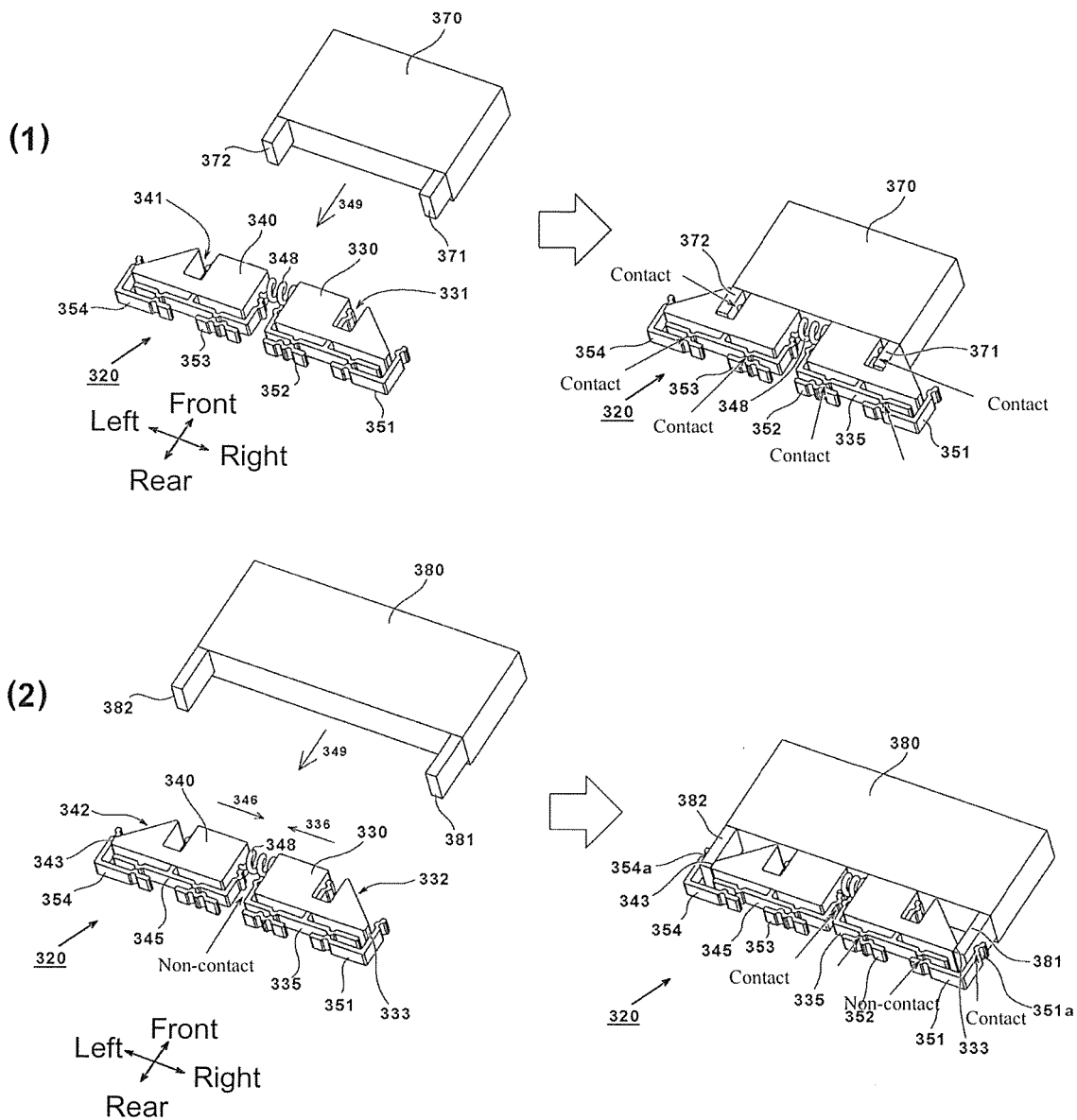

FIG. 17 is a diagram illustrating the inside of the battery pack 300 of FIG. 16, and in particular, constituting components of a voltage switching mechanism 320 disposed in the vicinity of positions of slits 321 to 324 on the rear side of a stepped part 312.

Figure 18:
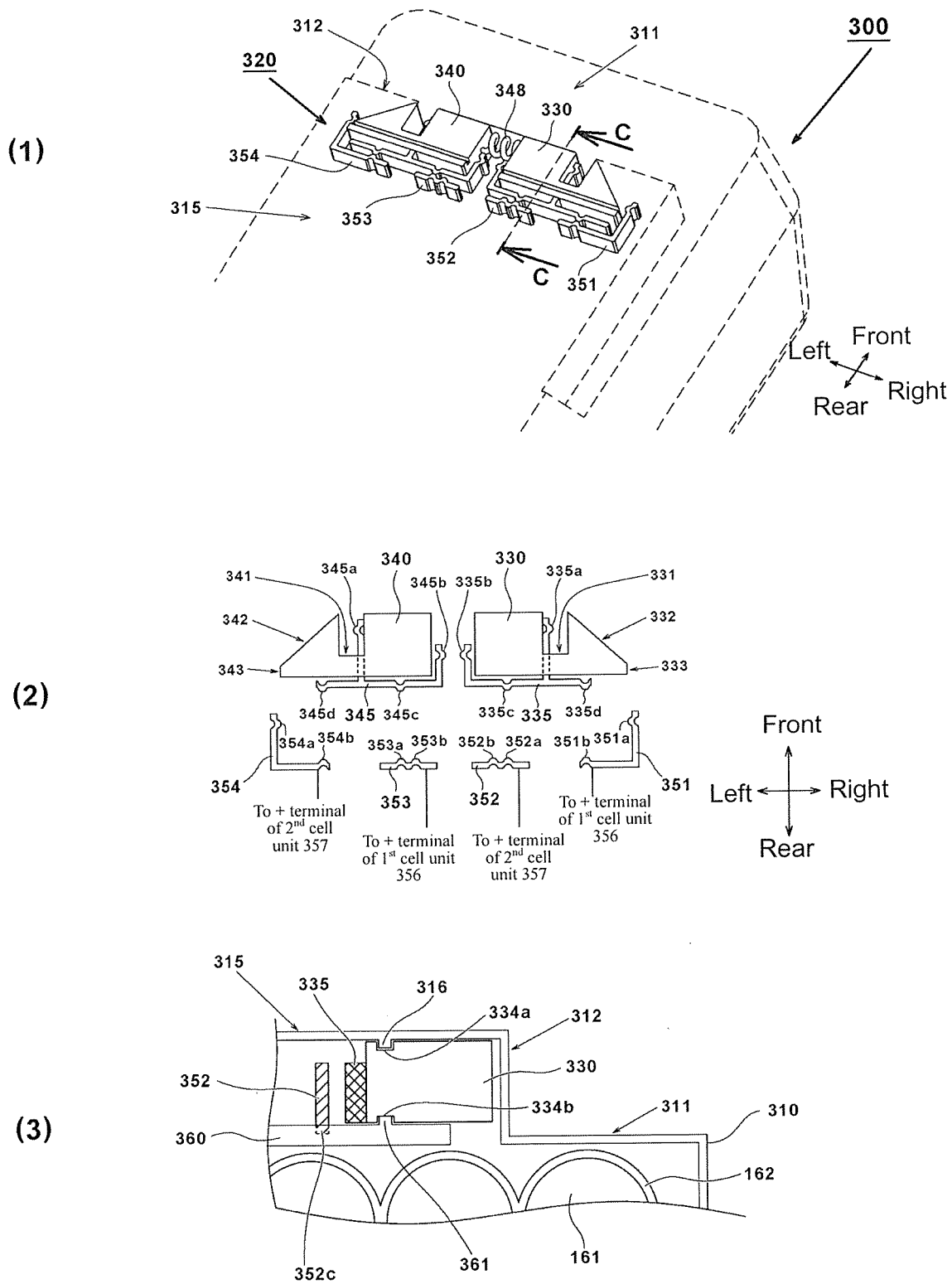

FIG. 18 is a diagram for illustrating the voltage switching mechanism 320 using movable guide members 330, 340 and terminals 351 to 354. (1) of FIG. 18 is a diagram illustrating a housing position of the voltage switching mechanism 320 in the battery pack 300. (2) of FIG. 18 is an exploded view viewed from the upper surface of the voltage switching mechanism 320. (3) of FIG. 18 is a cross-sectional diagram of line C-C in (1) of FIG. 18.

Figure 19:
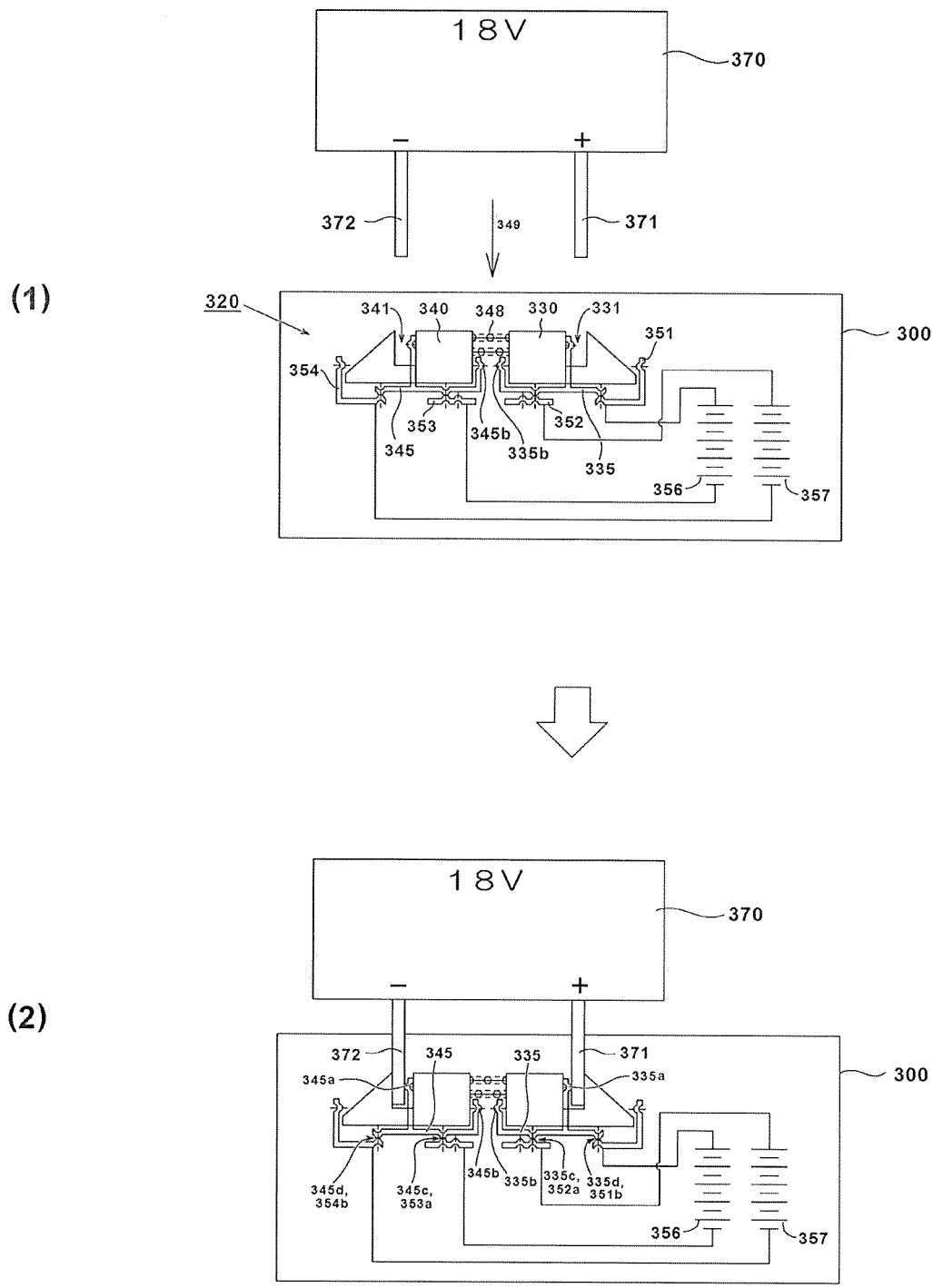

FIG. 19 is an explanatory diagram of a connection state of a cell pack achieved through the voltage switching mechanism 320 when connected to an electrical device rated at 18V. (1) of FIG. 19 is a diagram illustrating a state before the terminal part 370 is mounted to the battery pack 300. (2) of FIG. 19 is a diagram illustrating a state after the mounting.

Figure 20:
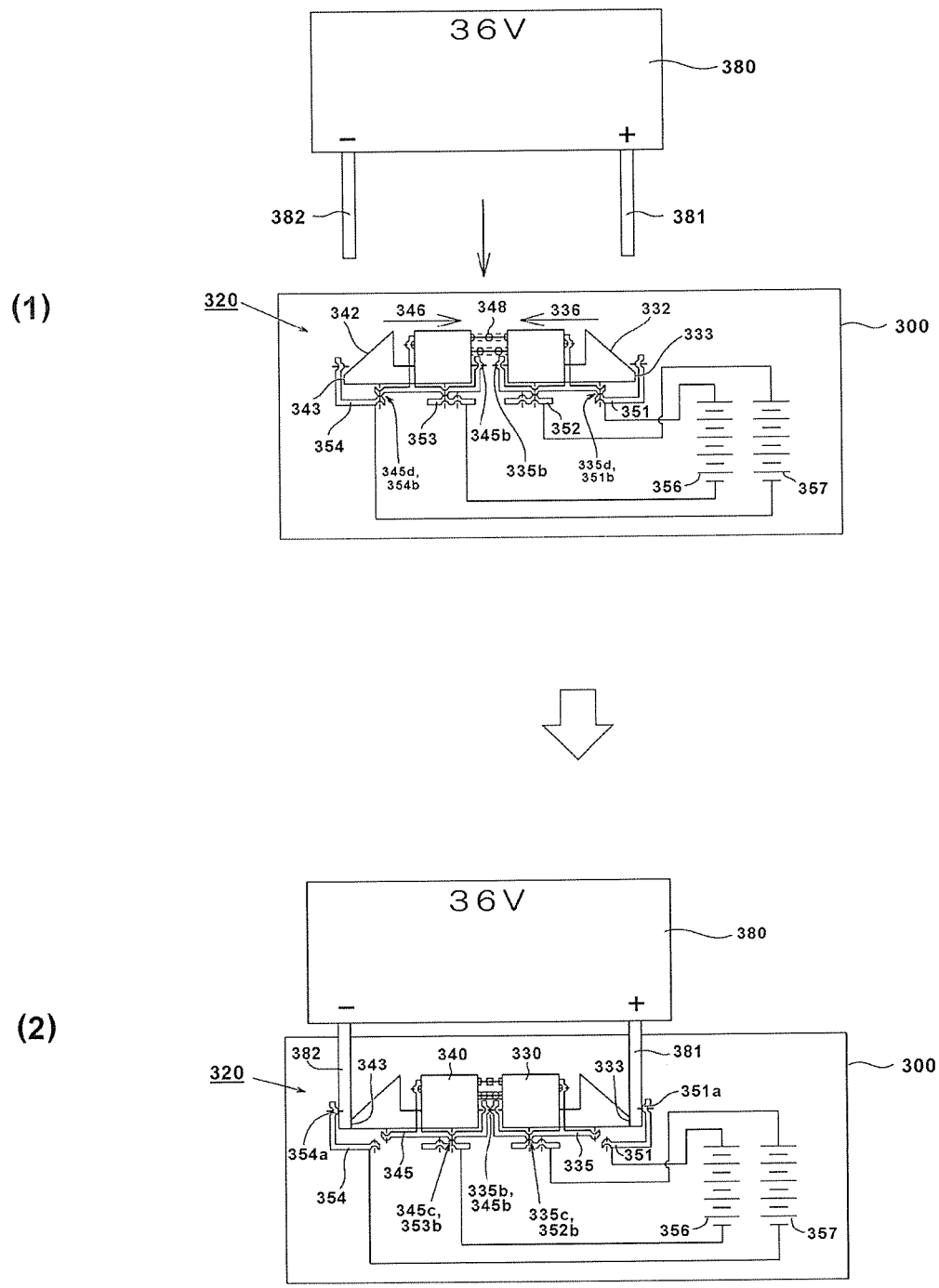

FIG. 20 is an explanatory diagram of a connection state of a cell pack achieved through the voltage switching mechanism 320 when connected to an electrical device rated at 36V. (1) of FIG. 20 is a diagram illustrating a state before the terminal part 380 is mounted to the battery pack 300. (2) of FIG. 20 is a diagram illustrating a state after the mounting.

Figure 21:
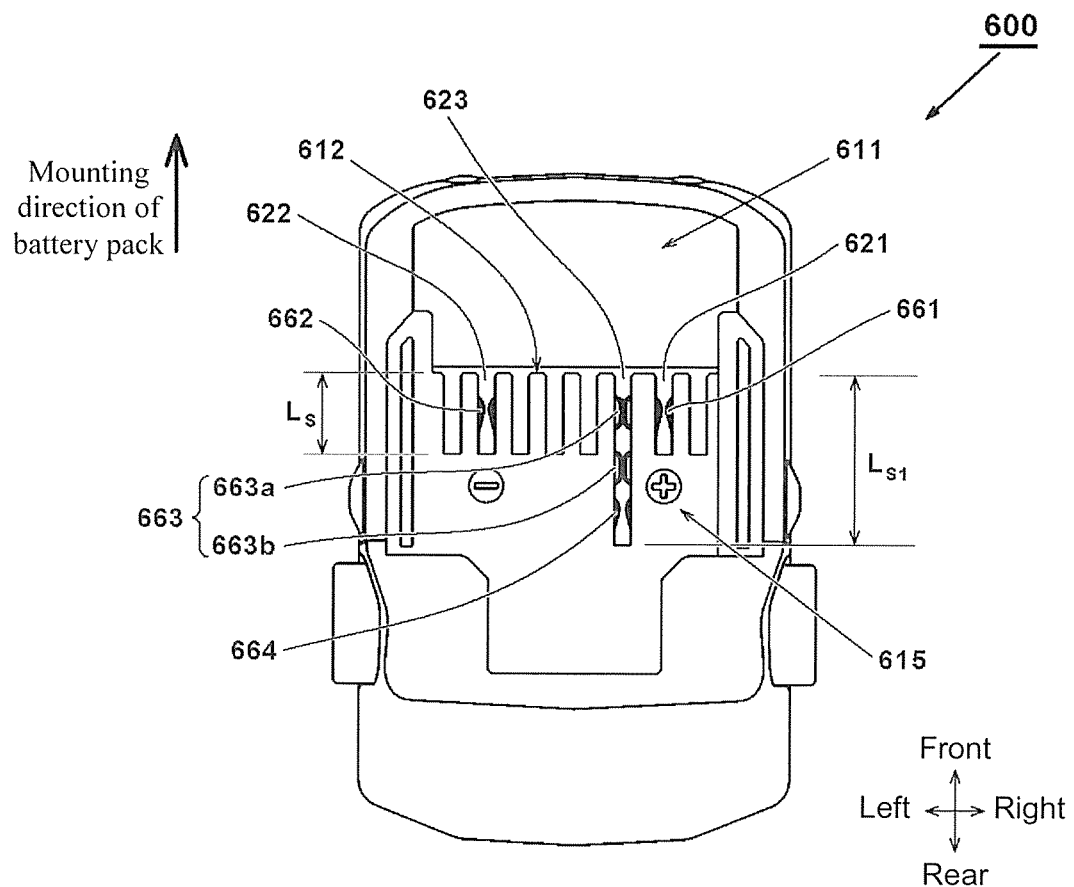

FIG. 21 is a top view of a battery pack 600 of a fourth embodiment of the invention.

Figure 22:
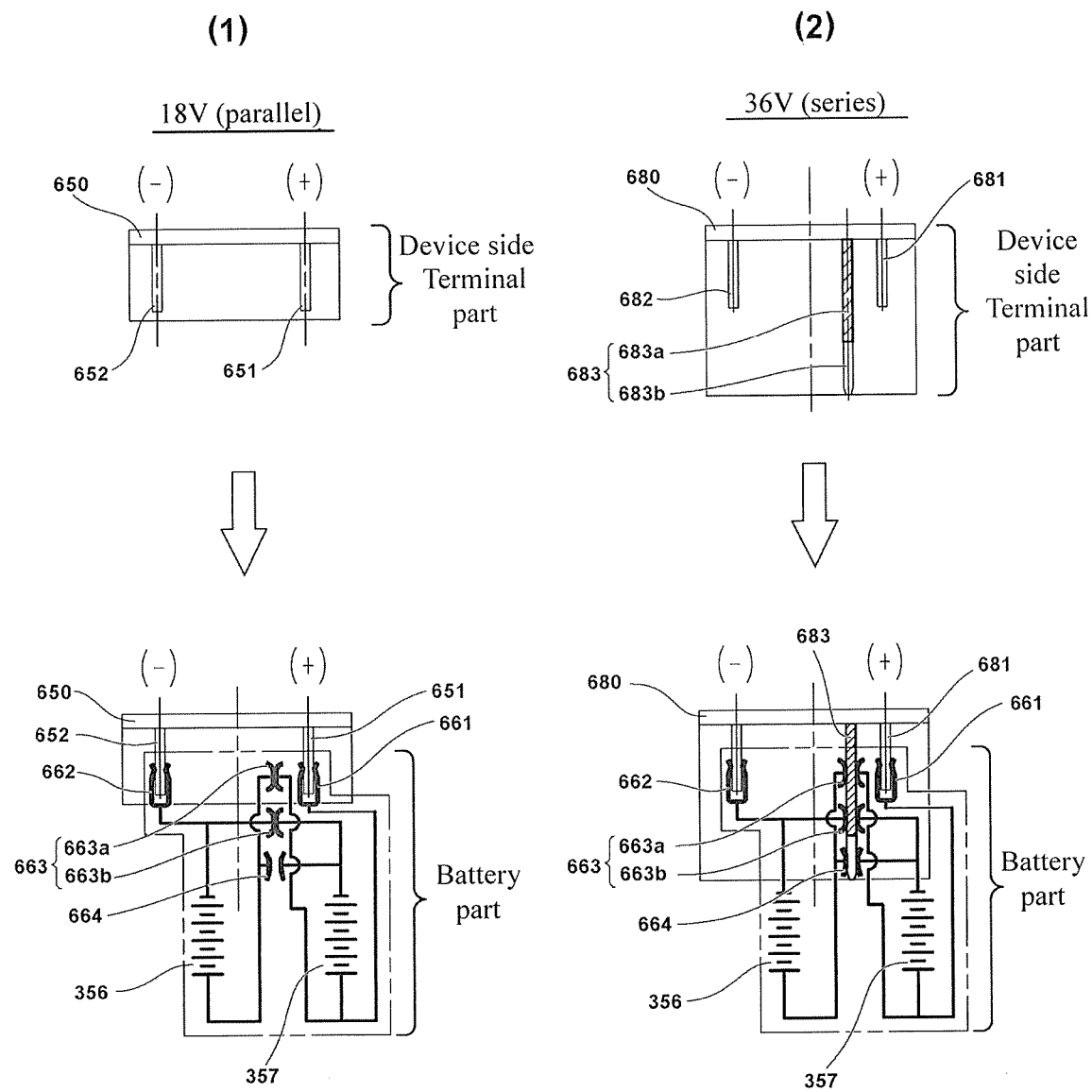

FIG. 22 is a diagram lustrating a state where the battery pack 600 is mounted to an electrical device body to connect terminal parts 650, 680 to the battery pack 600. (1) of FIG. 22 illustrates a connection state at the time of 18V output. (2) of FIG. 22 illustrates a connection state at the time of 36V output.

Figure 23:
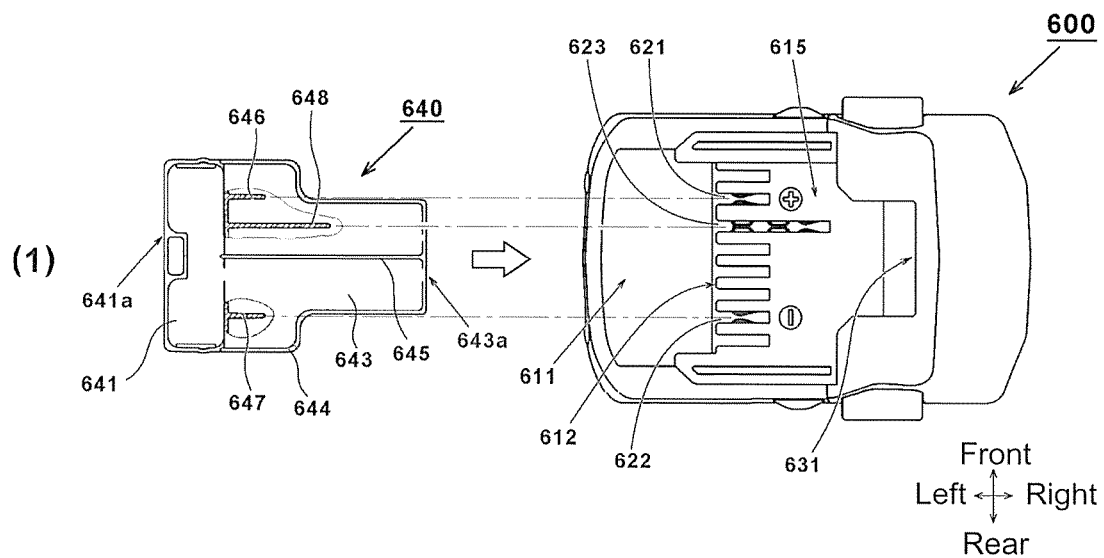
Figure 23:
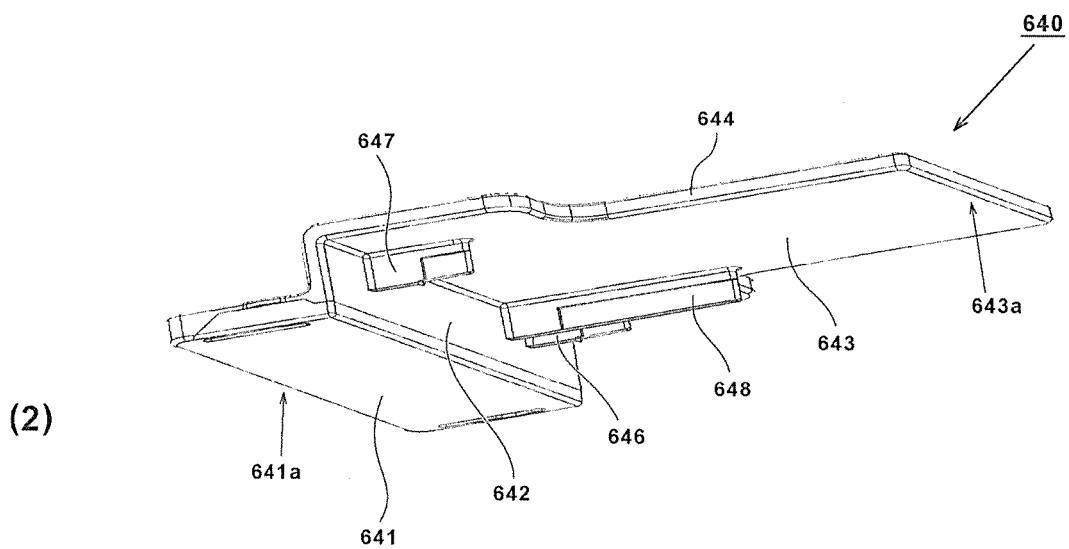

FIG. 23 is a diagram illustrating a shape of a mounted battery pack cover 640 in a state where the battery pack 600 is not mounted to an electrical device body.

Figure 24:
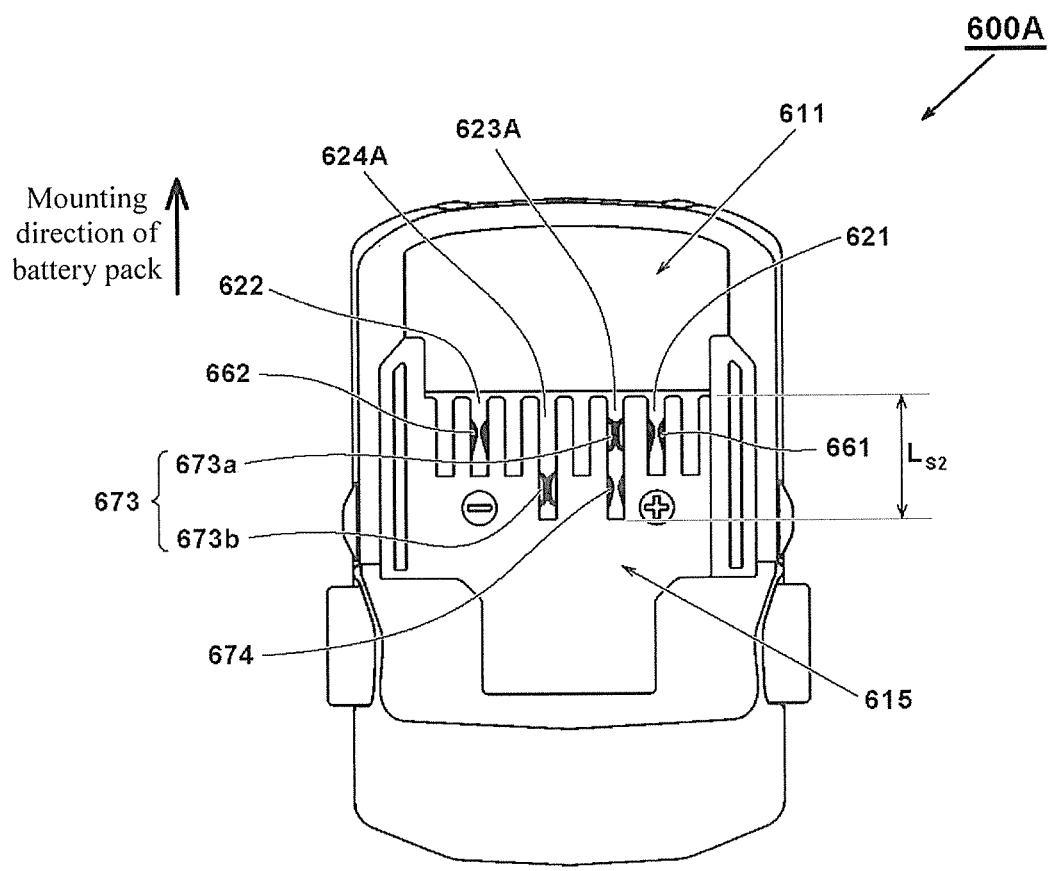

FIG. 24 is a top view of a battery pack 600A of a modification example of a sixth embodiment of the invention.

Figure 25:
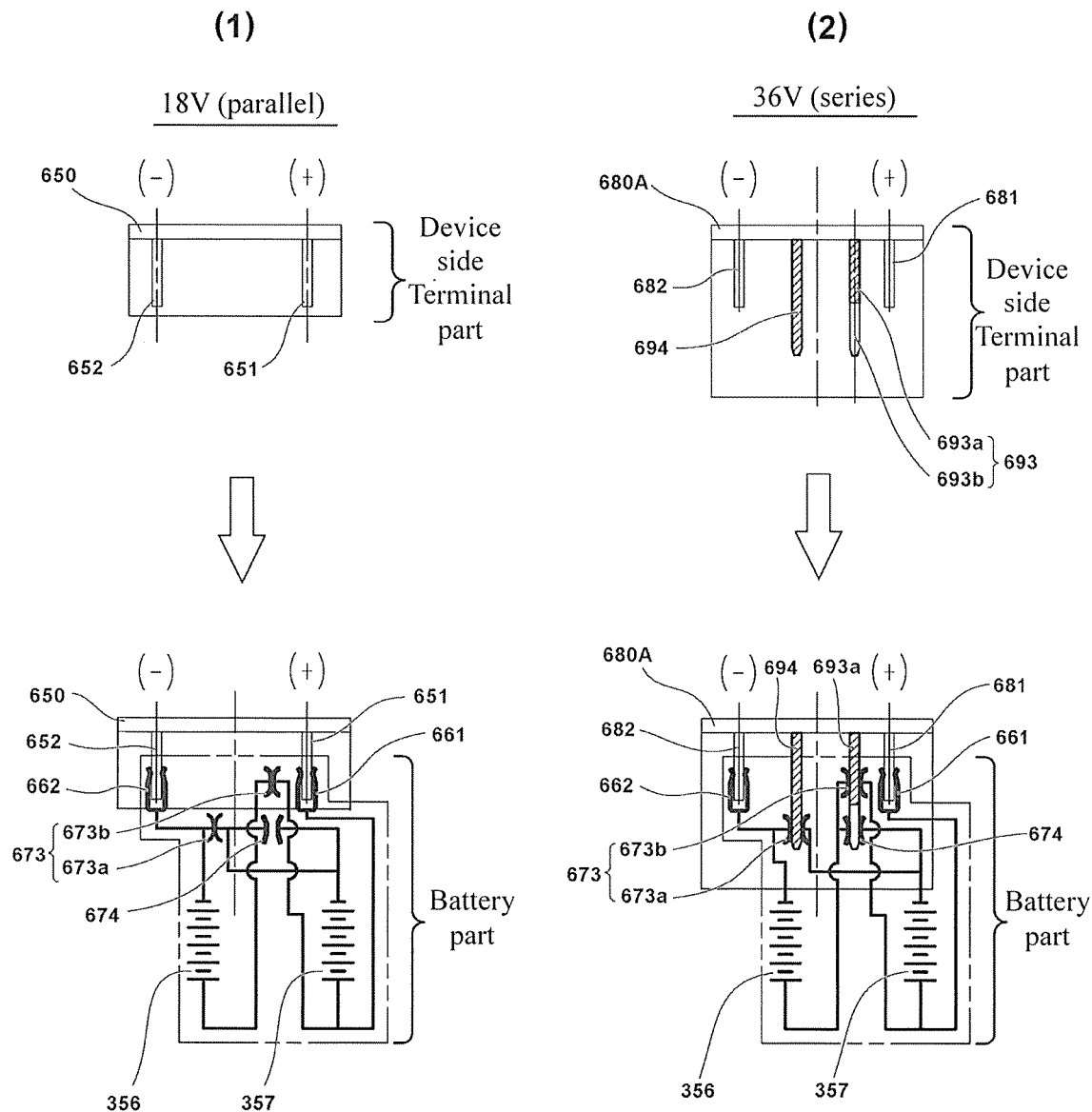

FIG. 25 is a diagram illustrating a state where the battery pack 600A is mounted to an electrical device body to connect to terminal parts 650, 680A. (1) of FIG. 25 illustrates a connection state at the time of 18V output. (2) of FIG. 25 illustrates a connection state at the time of 36V output.

Figure 26:
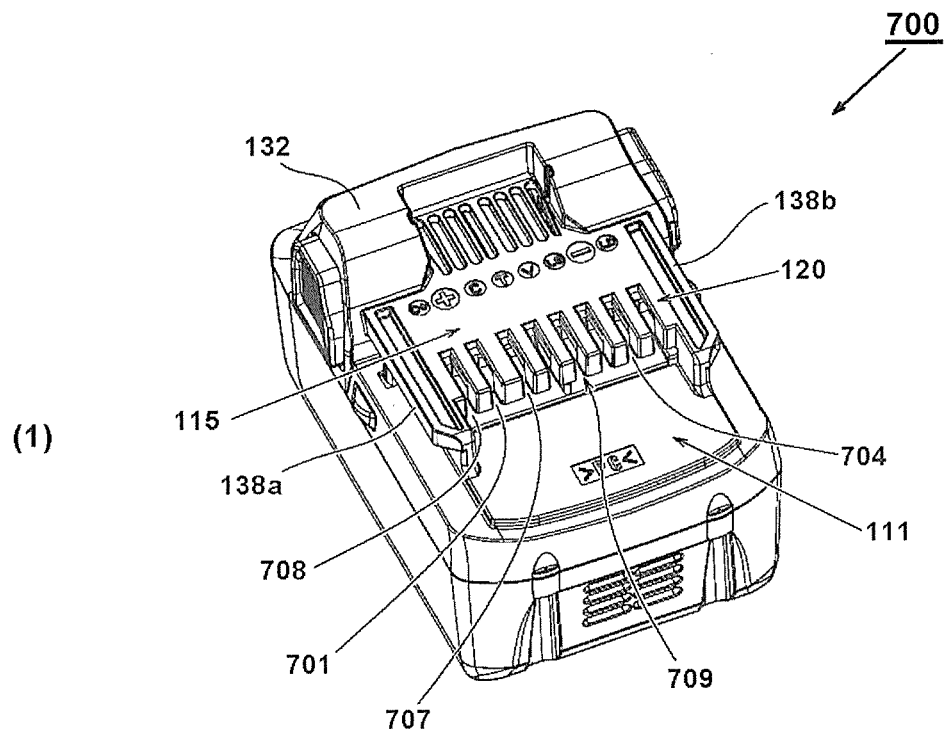
Figure 26:
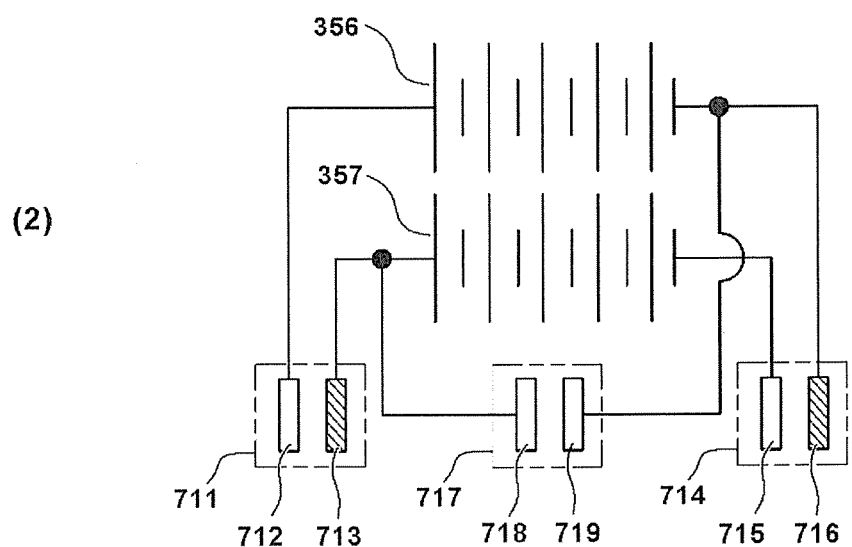

FIG. 26 is a perspective view illustrating an appearance/shape of a battery pack 700 of a fifth embodiment of the invention.

Figure 27:
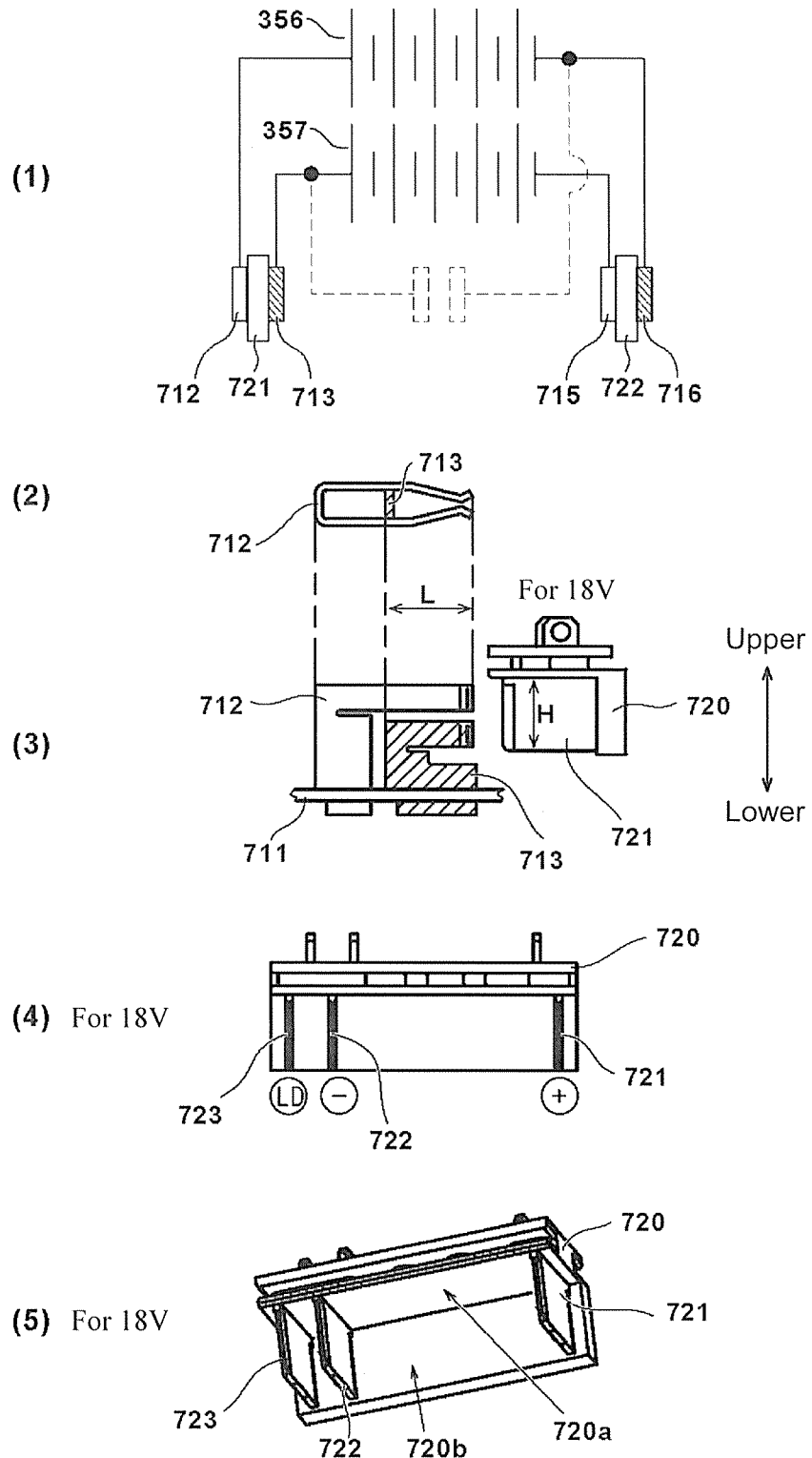

FIG. 27 is a diagram illustrating a state where a battery pack 700 is connected to the above-mentioned electrical device body (electrical tool body) rated at 18V. (1) of FIG. 27 is a circuit diagram at the time of connection. (2) of FIG. 27 is a top view of positive electrode terminals 712, 713. (3) of FIG. 27 is a side view of a terminal part 720. (4) of FIG. 27 and (5) of FIG. 27 are a front view and a perspective view of the terminal part 720.

Figure 28:
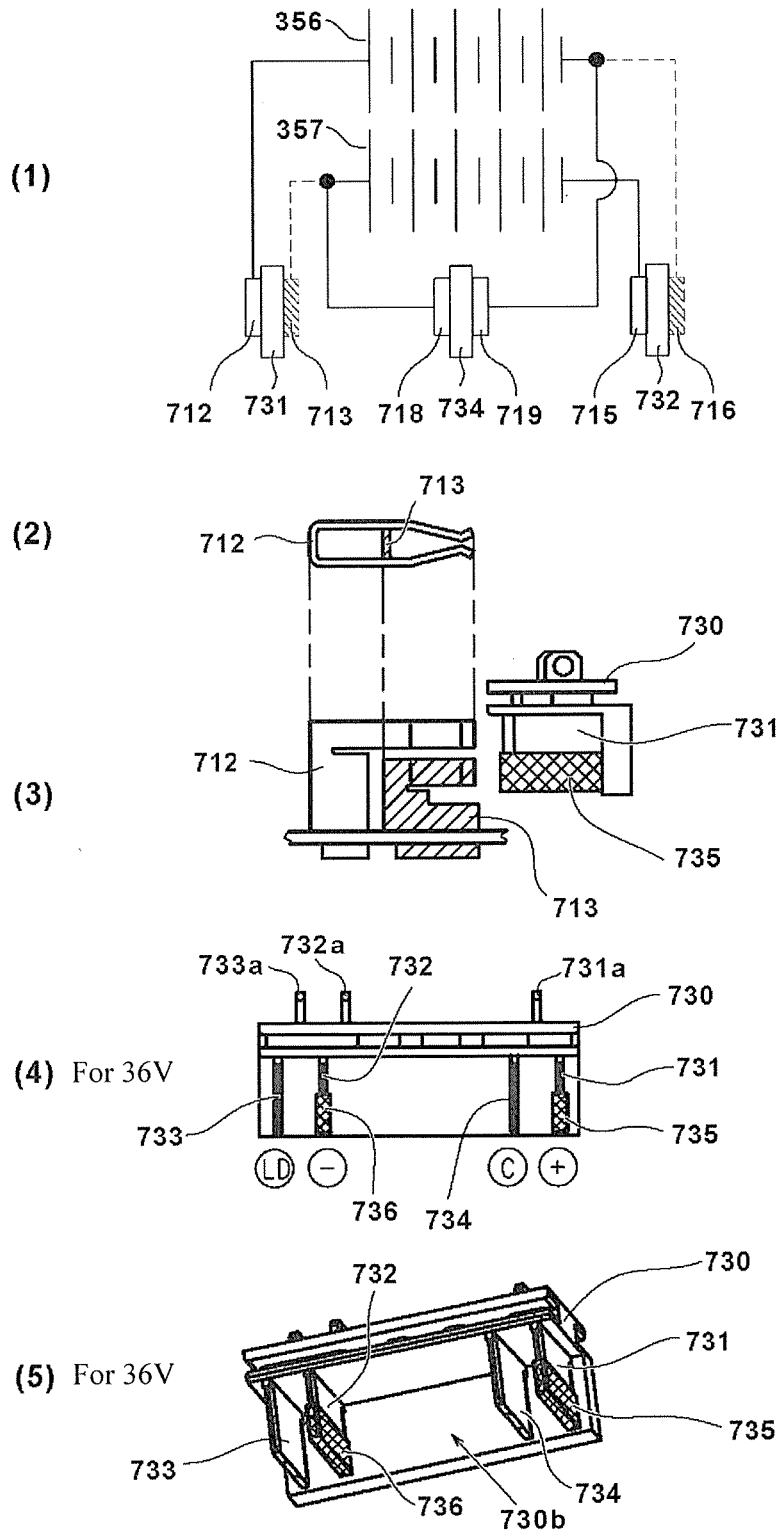

FIG. 28 is a diagram illustrating a state where the battery pack 700 is connected to an electrical device body (electrical tool body) rated at 36V. (1) of FIG. 28 is a circuit diagram at the time of connection. (2) of FIG. 28 is a top view of positive electrode terminals 712, 713. (3) of FIG. 28 is a side view of a terminal part 730. (4) of FIG. 28 and (5) of FIG. 28 are a front view and a perspective view of the terminal part 730.

Figure 29:
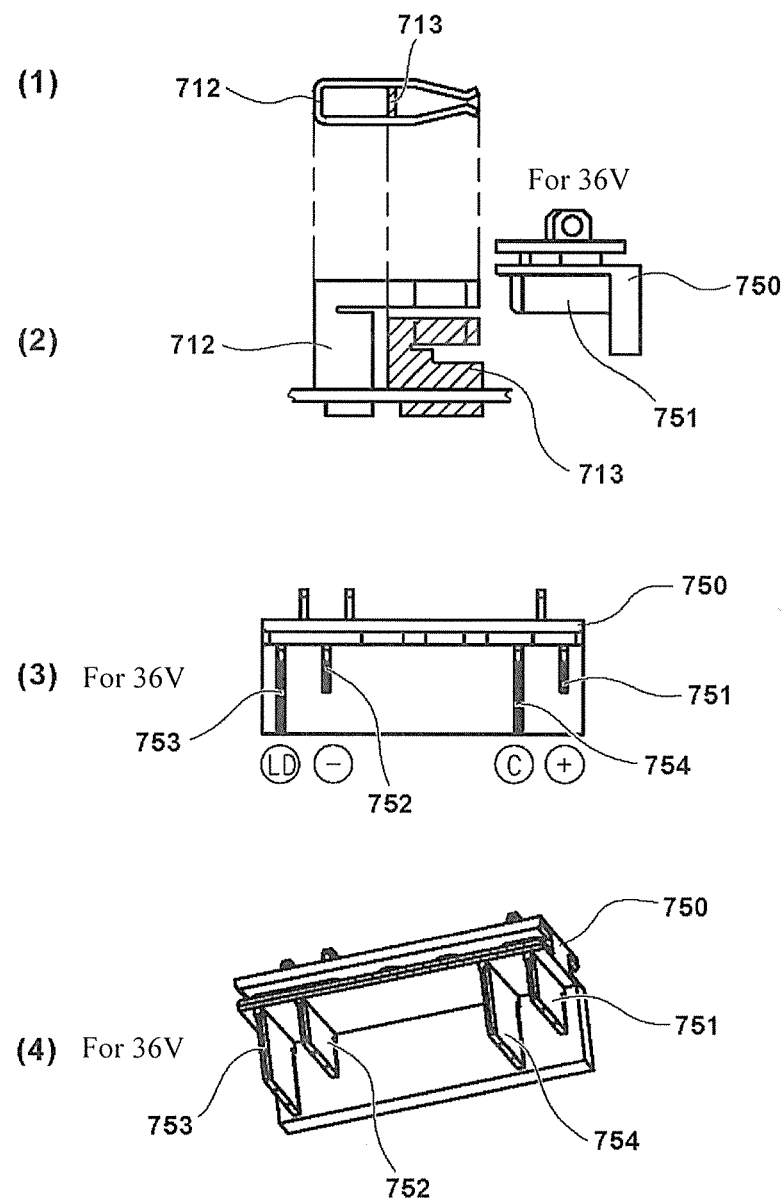

FIG. 29 is a diagram for illustrating a shape of a terminal part 750 of a modification example 1 of the fifth embodiment.

Figure 30:
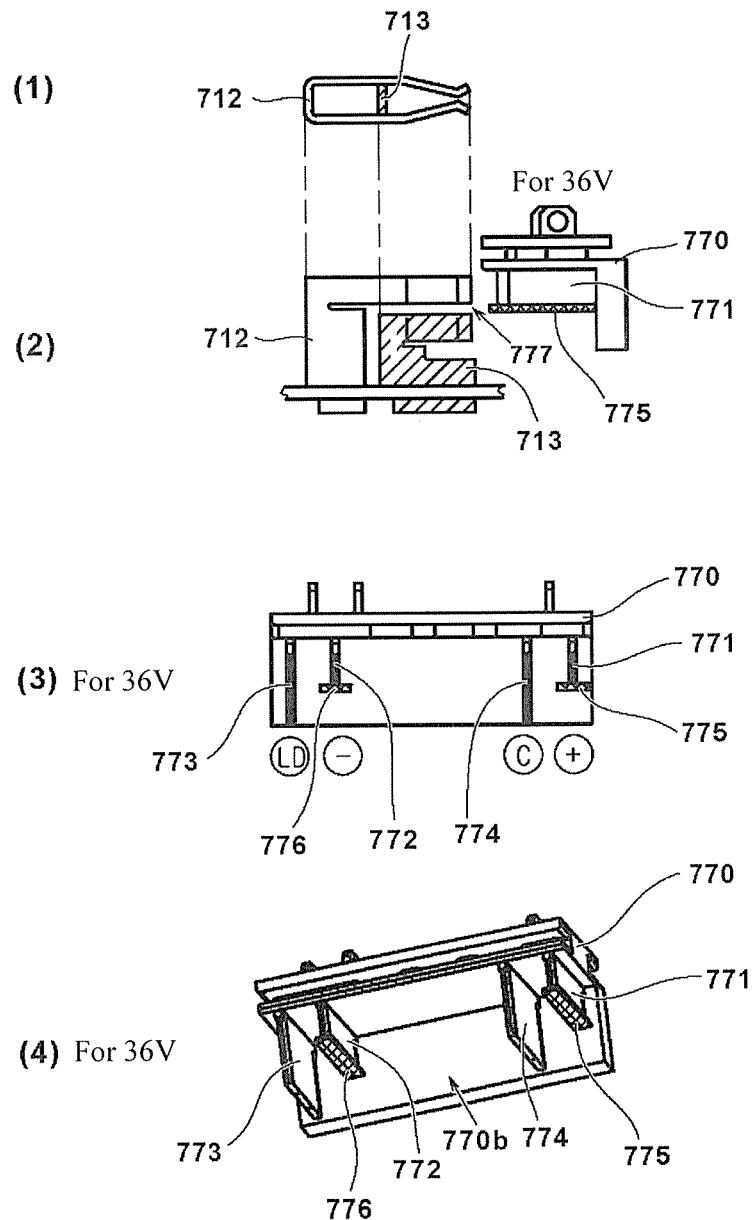

FIG. 30 is a diagram for illustrating a shape of a terminal part 770 of a modification example 2 of the fifth embodiment.

Figure 31:
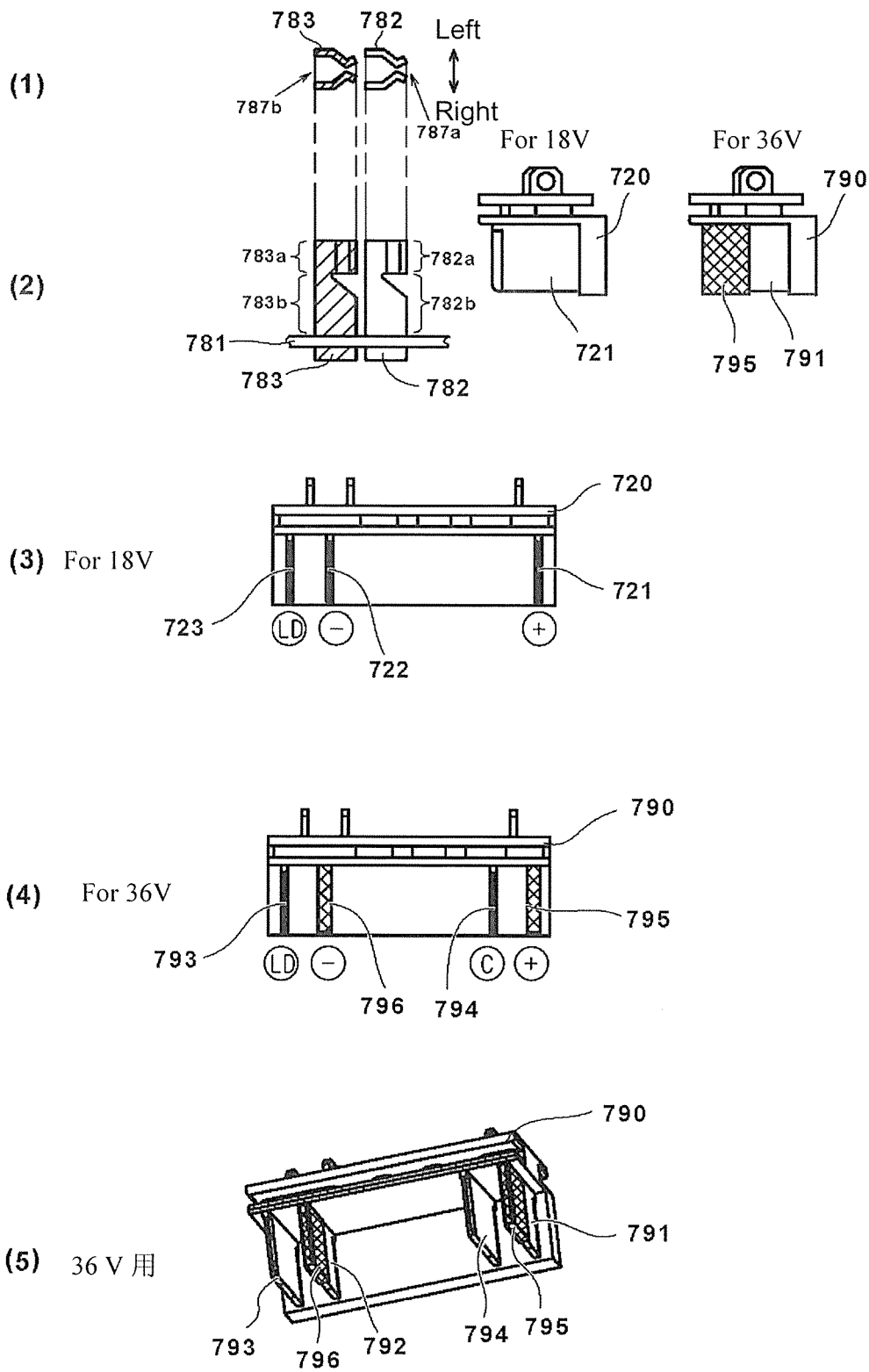

FIG. 31 is a diagram for illustrating a shape of a terminal part 790 of a modification example 3 of the fifth embodiment.

Figure 32:
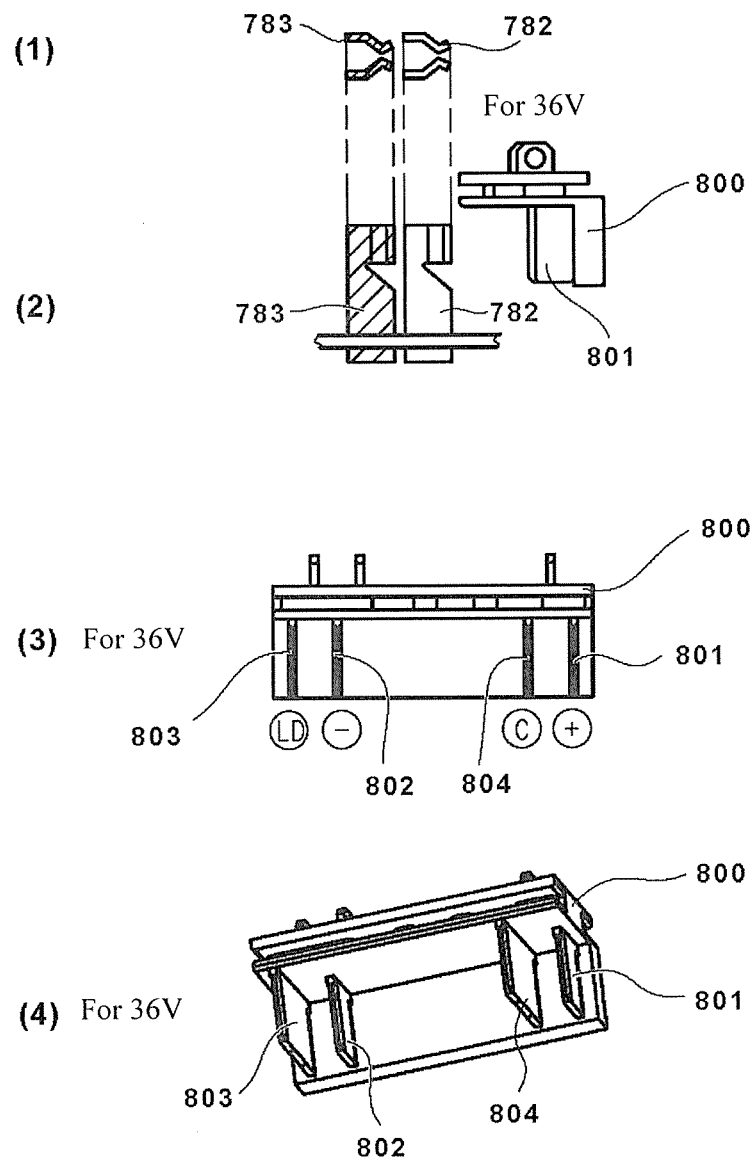

FIG. 32 is a diagram for illustrating a shape of a terminal part 800 of a modification example 4 of the fifth embodiment.

Figure 33:
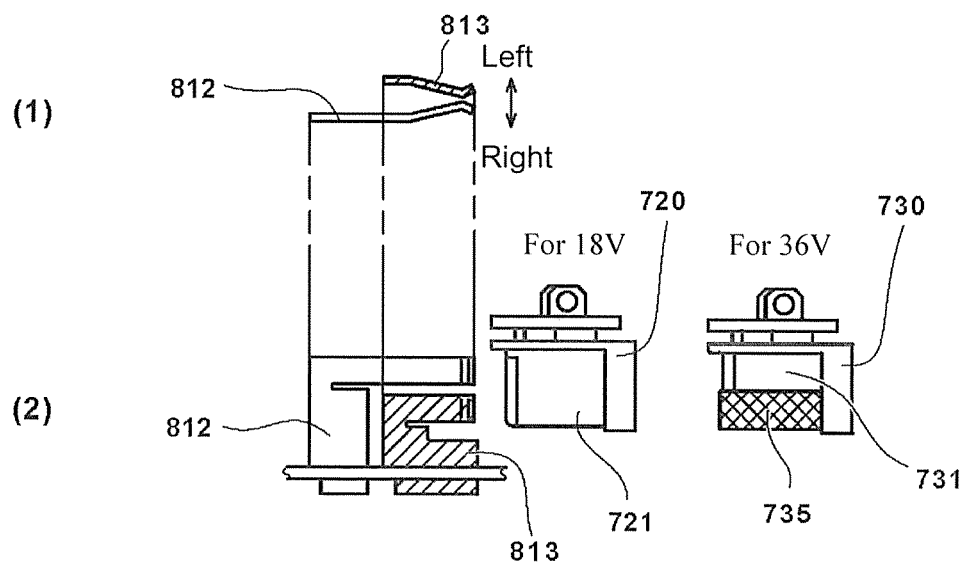

FIG. 33 is a diagram of a modification example 5 illustrating a change to shapes of a positive electrode terminal pair and a negative electrode terminal pair on the battery pack side of the fifth embodiment.

Figure 34:
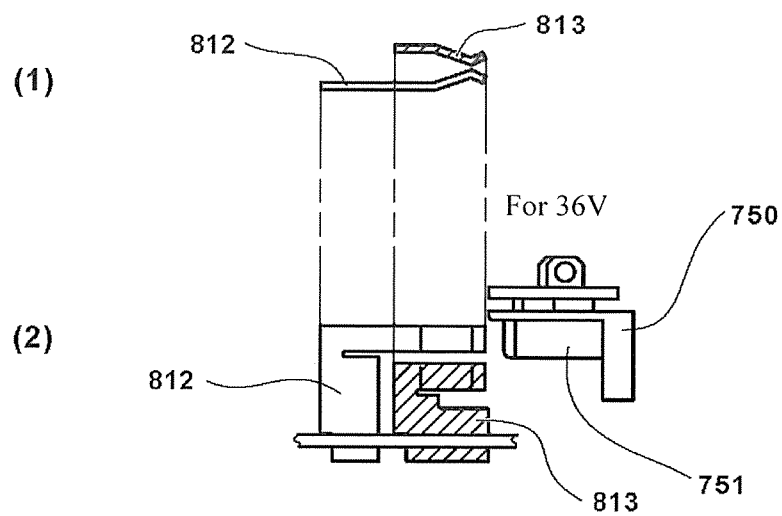

FIG. 34 is a diagram of a modification example 6 illustrating a change made only to the terminal part 750 used for 36V as compared to the modification example 5 of FIG. 33.

Figure 35:
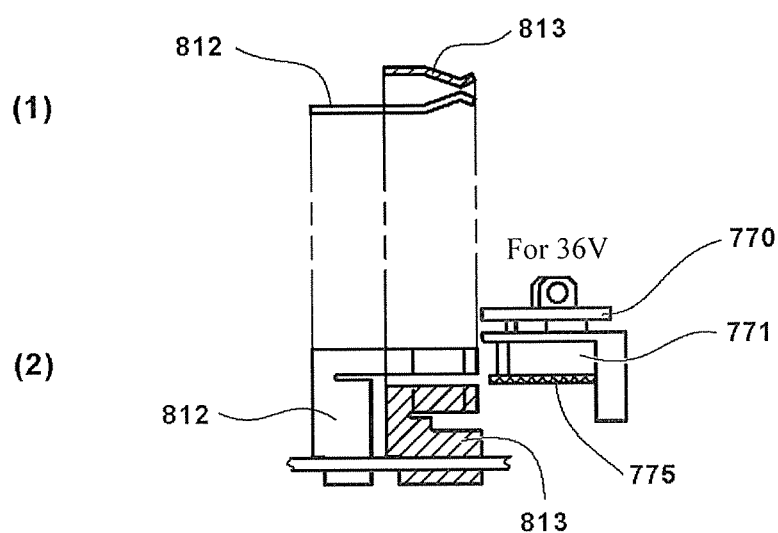

FIG. 35 is a diagram of a modification example 7 illustrating a change made only to the terminal part 770 used for 36V as compared to the modification example 5 of FIG. 33.

Figure 36:
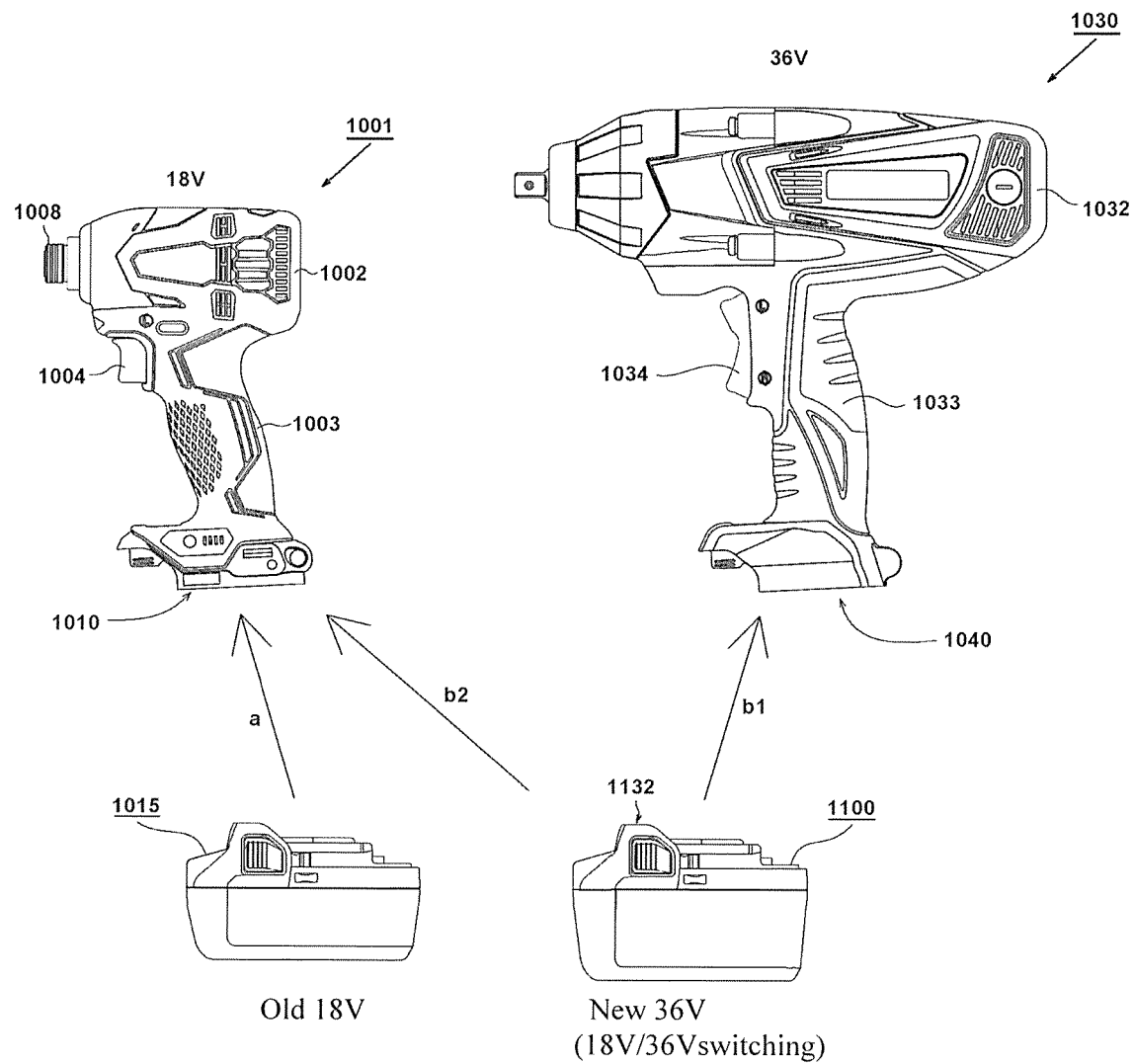

FIG. 36 is a diagram for illustrating mounting of a battery pack of the sixth embodiment of the invention to an electrical tool.

Figure 37:
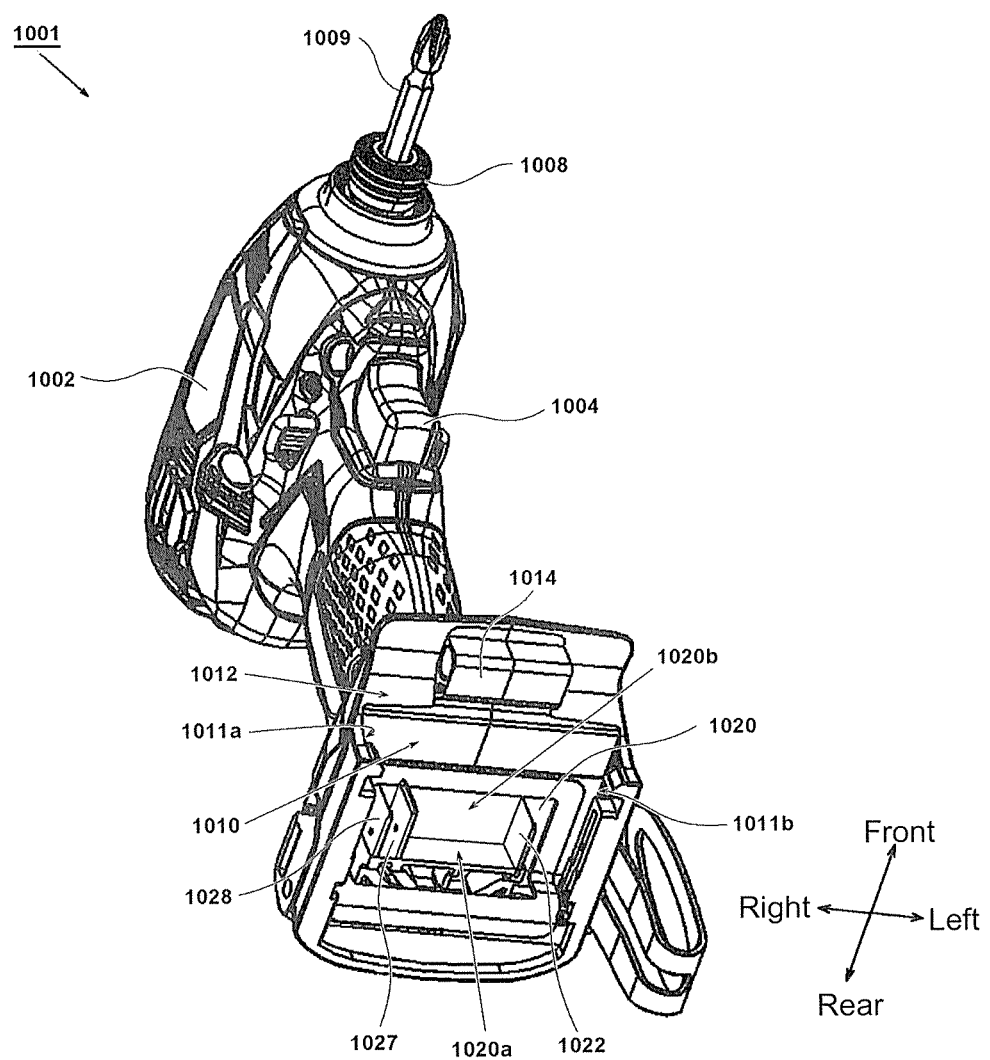

FIG. 37 is a perspective view illustrating a shape of a battery pack mounting part 1010 of an electrical tool body 1001 of FIG. 36.

Figure 38:
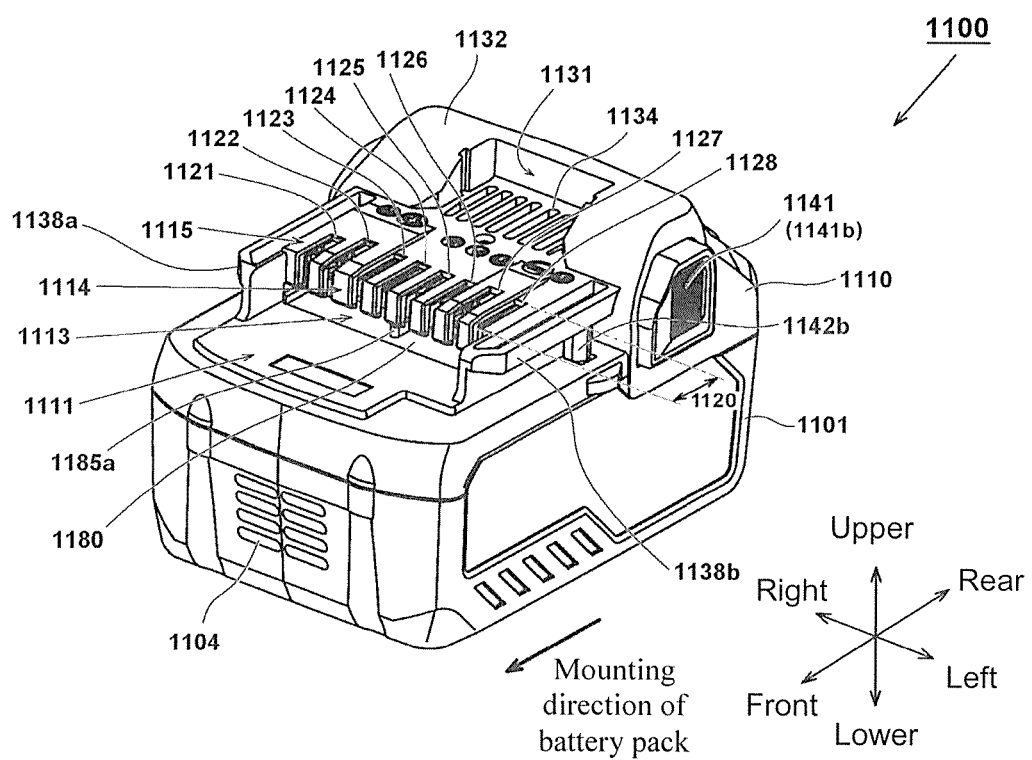

FIG. 38 is a perspective view of a battery pack 1100 of the sixth embodiment of the invention.

Figure 39:
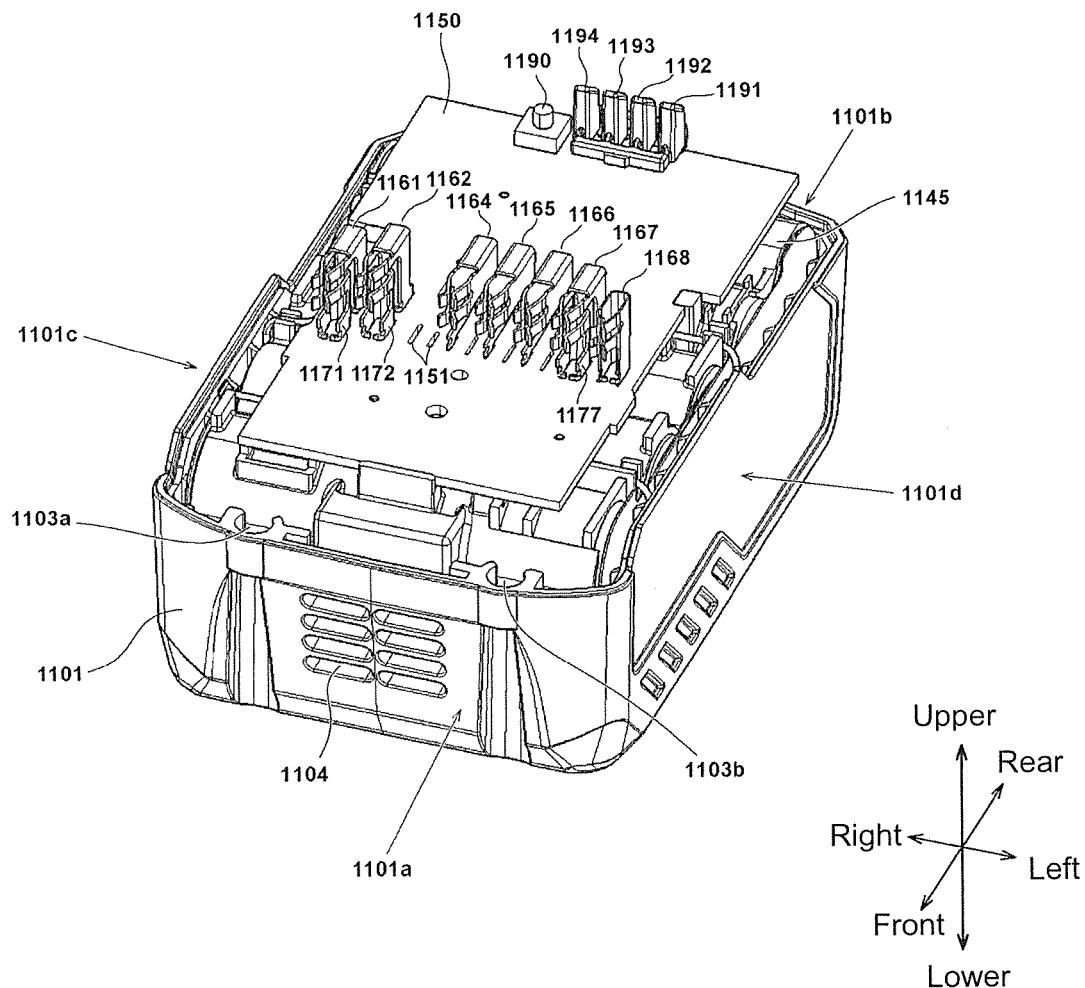

FIG. 39 is a perspective view of a state after an upper case 1110 of the battery pack 1100 of FIG. 38 is removed.

Figure 40:
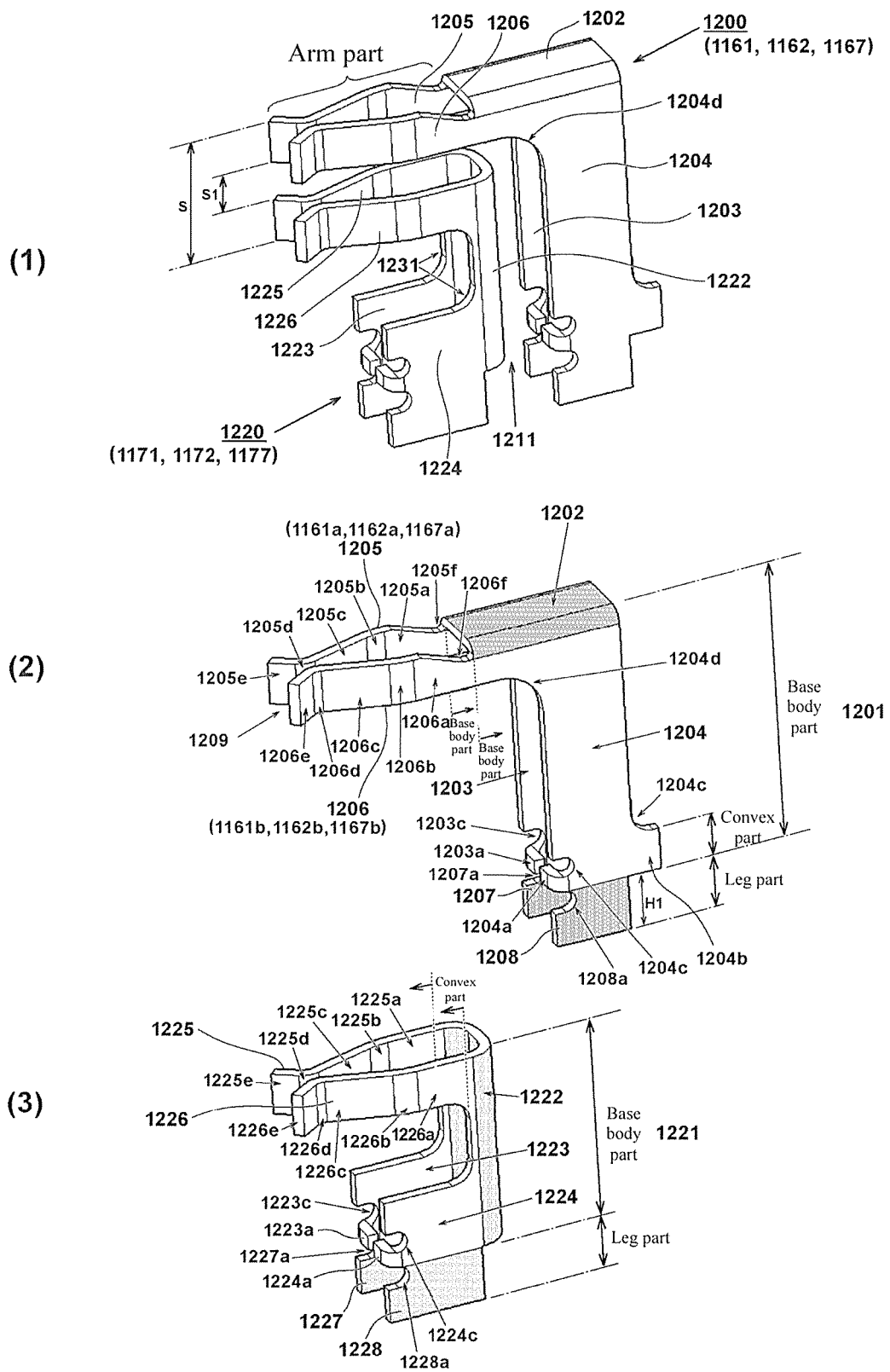

FIG. 40 is a diagram illustrating individual shapes of power terminals (1161 and 1171, 1162 and 1172, 1167 and 1177) of FIG. 39. (1) of FIG. 40 is a perspective view of the whole component. (2) of FIG. 40 is a perspective view of an upper terminal part 1200. (3) of FIG. 40 is a perspective view of a lower terminal part 1220.

Figure 41:
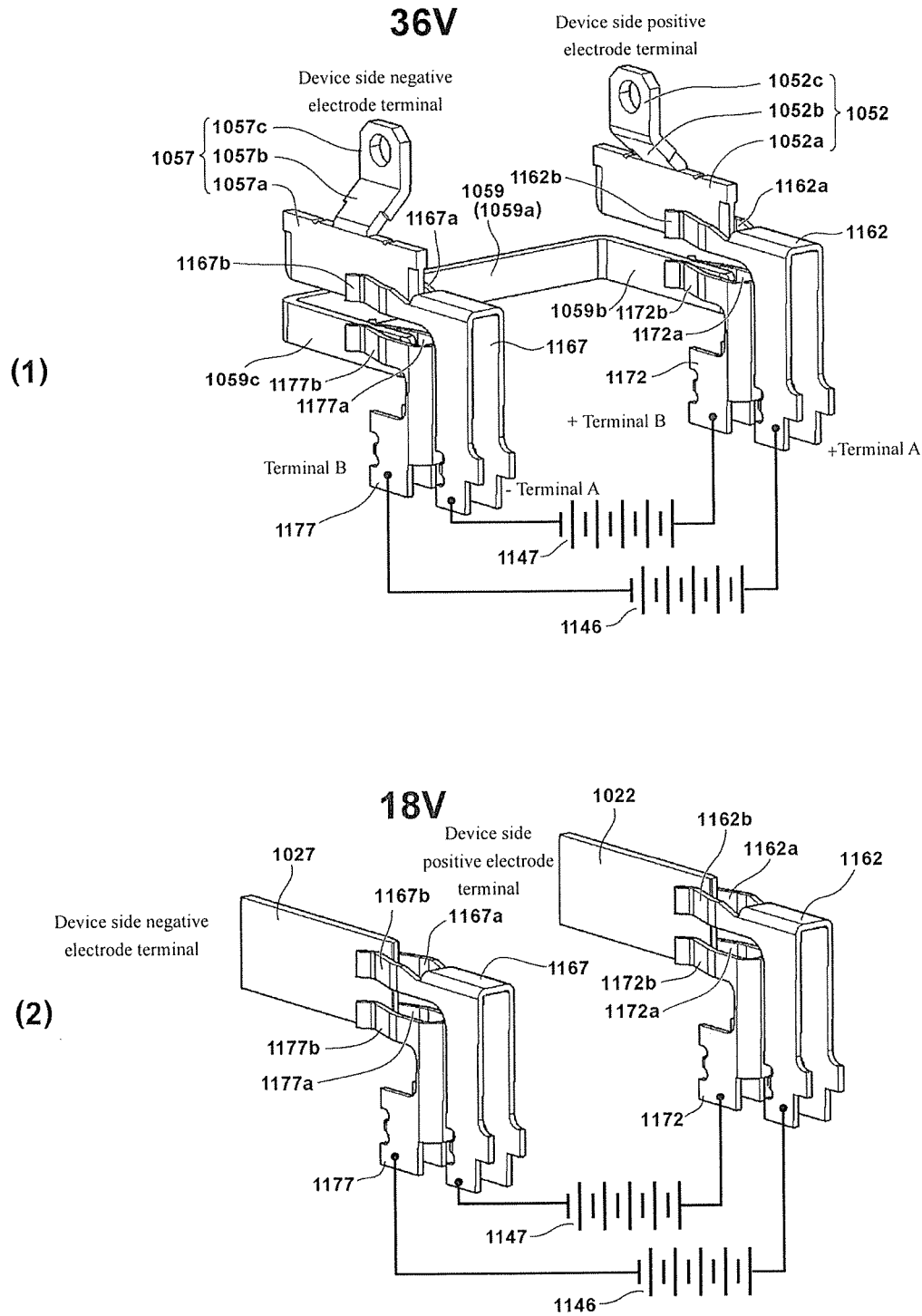

FIG. 41 is a perspective view illustrating a connection state of the power terminals to an electrical tool body. (1) of FIG. 41 illustrates a state of connection to an electrical tool body 1030 of the present embodiment. (2) of FIG. 41 illustrates a state of connection to the above-mentioned electrical tool body 1001.

Figure 42:
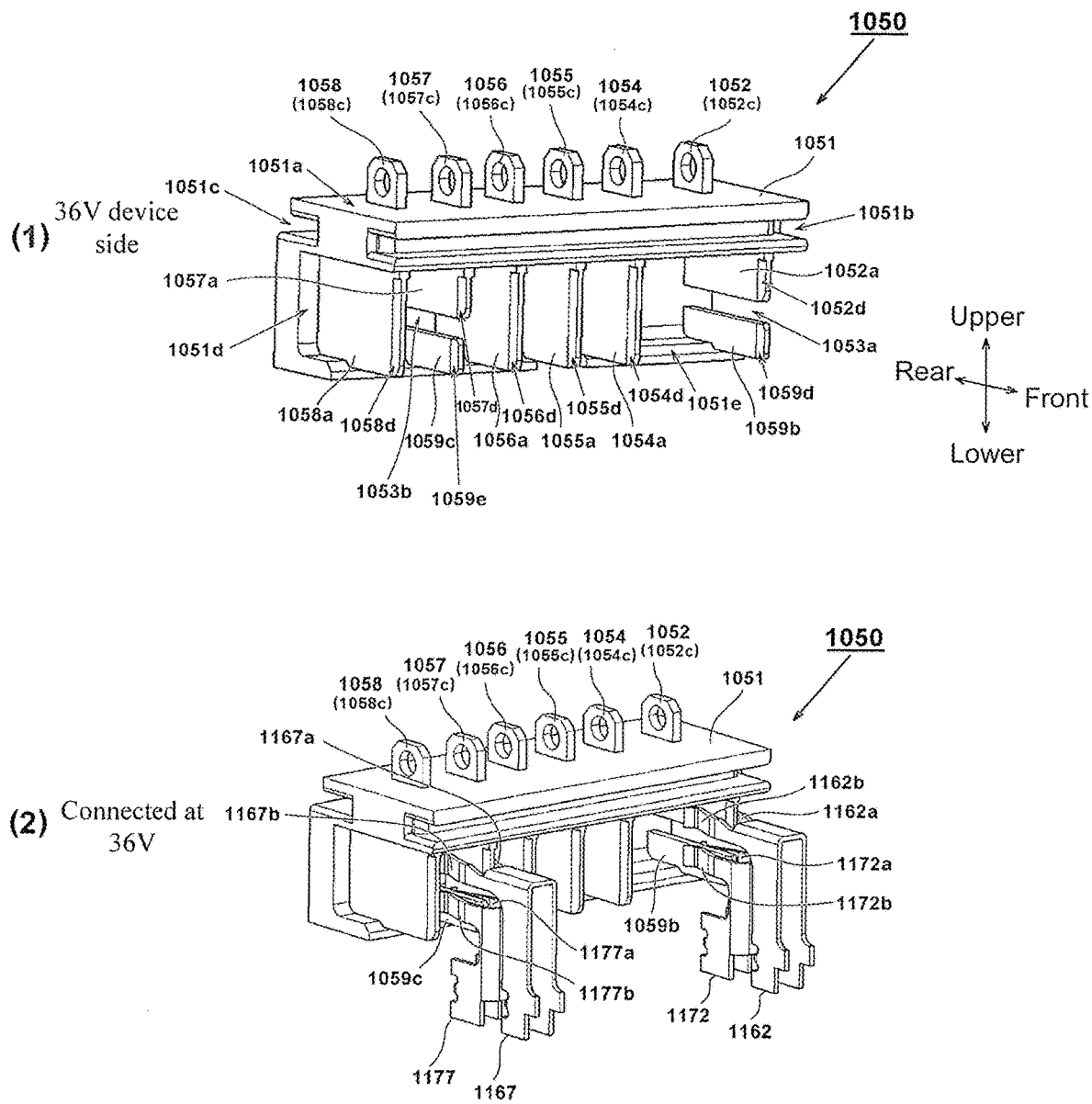

(1) of FIG. 42 is a perspective view of a terminal part 1050 of the electrical tool body 1030 of the sixth embodiment, and (2) of FIG. 42 is a diagram illustrating connection of the terminal part 1050 and the power terminals of the battery pack 1100.

Figure 43:
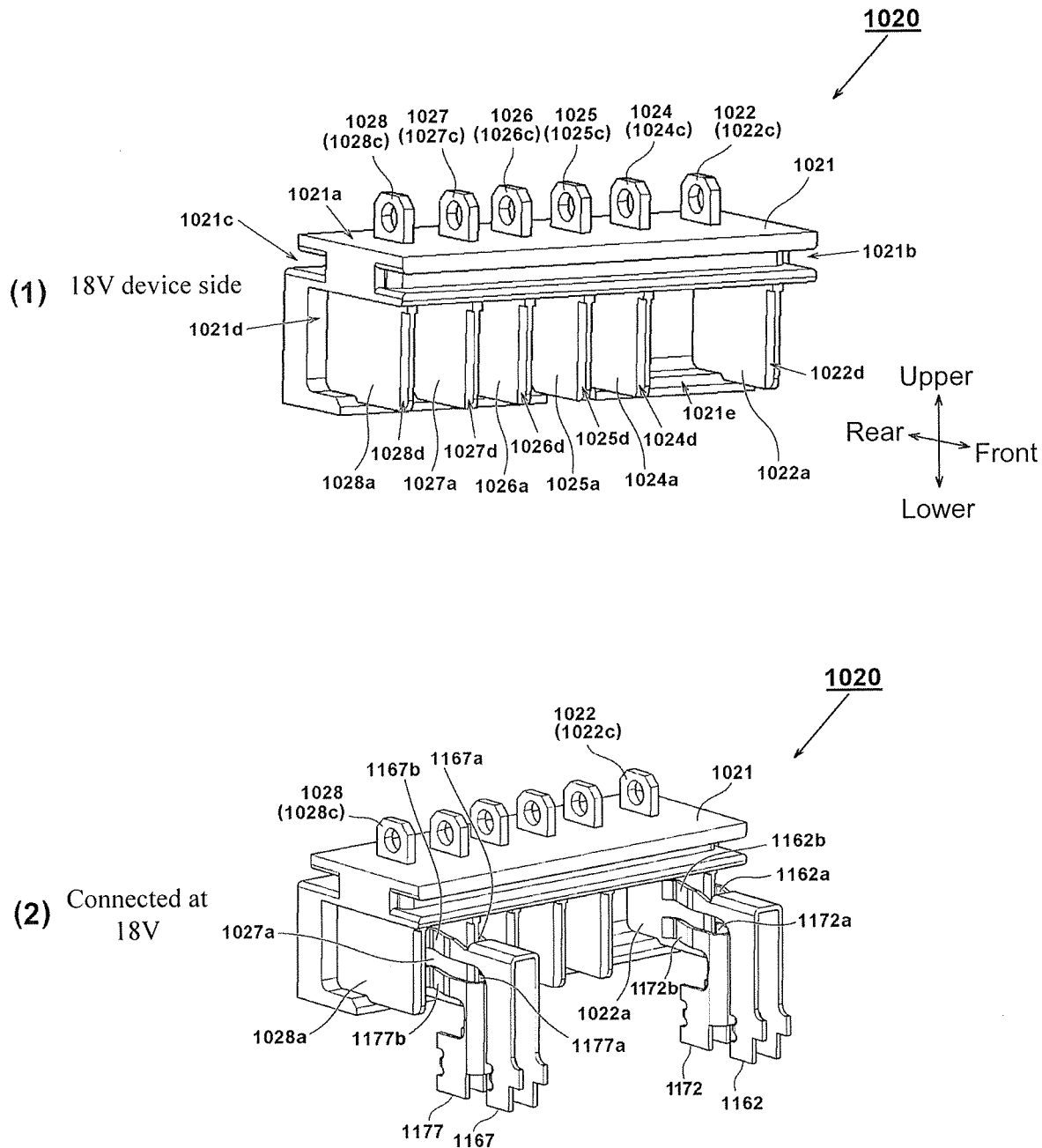

(1) of FIG. 43 is a perspective view of a terminal part 1020 of the above-mentioned electrical tool body 1001, and (2) of FIG. 43 is a diagram illustrating connection of the terminal part 1020 and the power terminals of the battery pack 1100.

Figure 44:
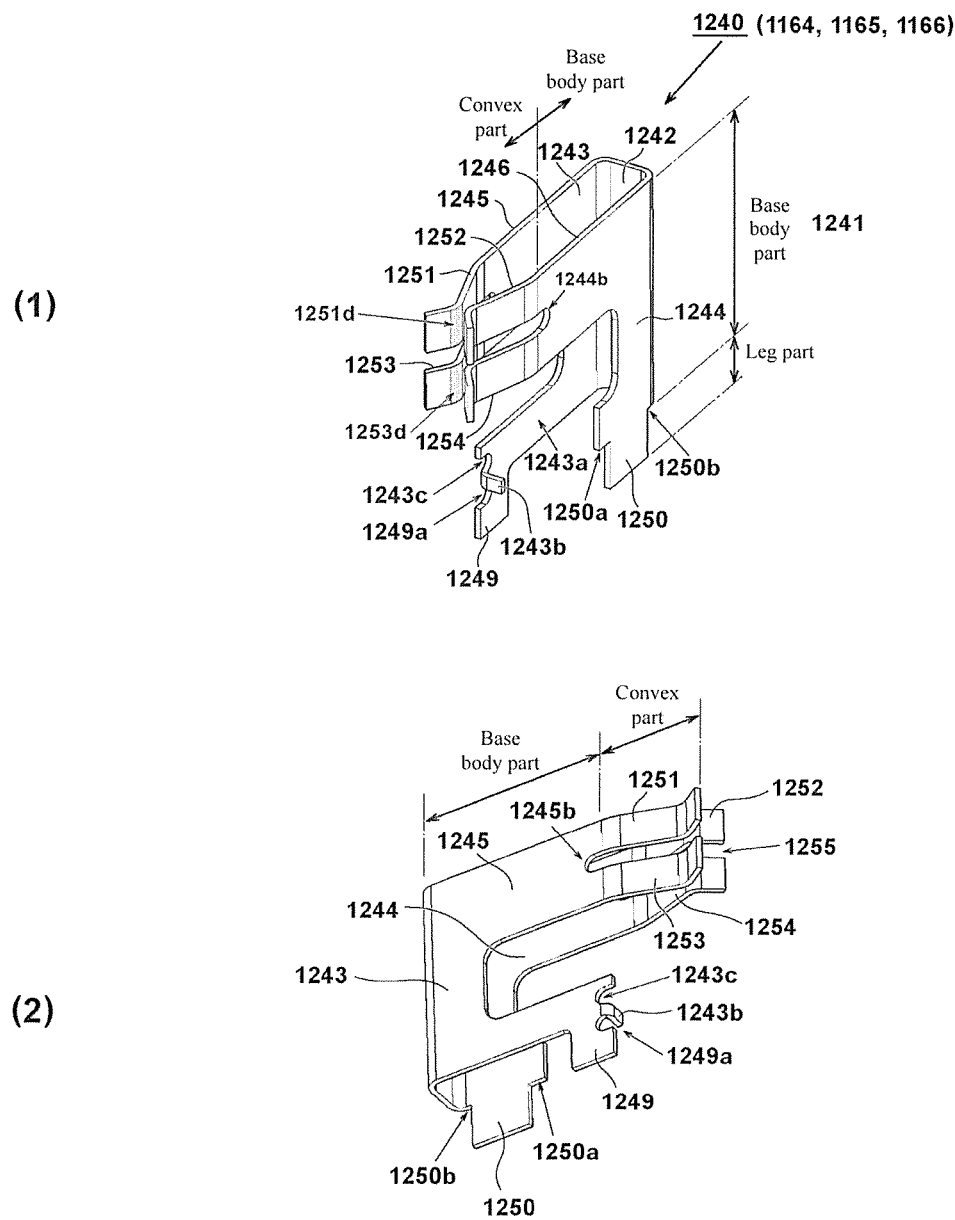

FIG. 44 is a diagram illustrating an individual shape of a signal terminal part 1240 of FIG. 39. (1) of FIG. 44 is a perspective view viewed from the front-left side. (2) of FIG. 44 is a perspective view viewed from the lower-right side.

Figure 45:
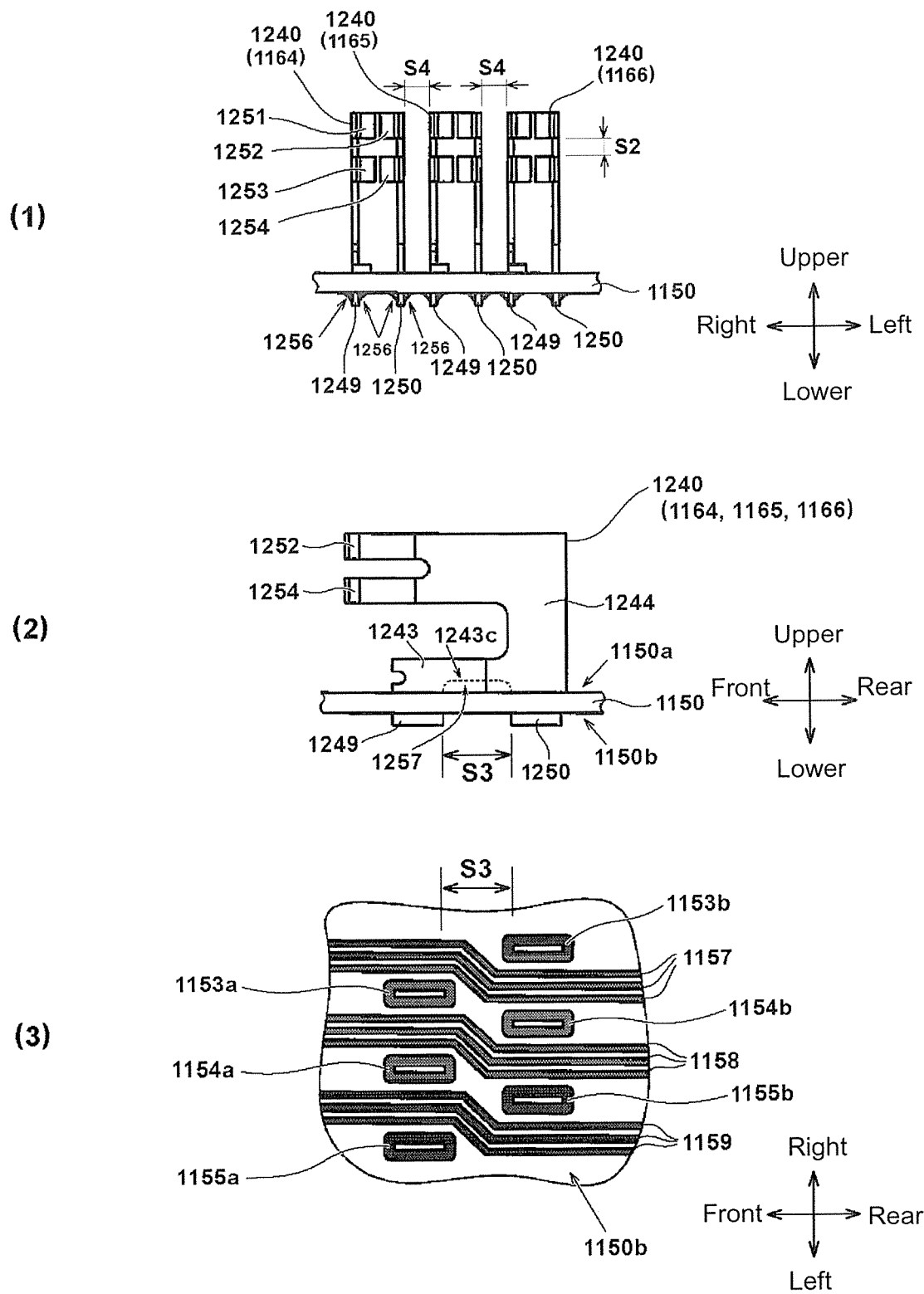

FIG. 45 is a diagram illustrating fixing of a plurality of signal terminal parts 1240 to a circuit substrate 1150. (1) of FIG. 45 is a diagram viewed from the front side. (2) of FIG. 45 is a diagram of the signal terminal part 1240 viewed from the left side. (3) of FIG. 45 is a bottom view viewed from the lower side of (1) of FIG. 45.

Figure 46:
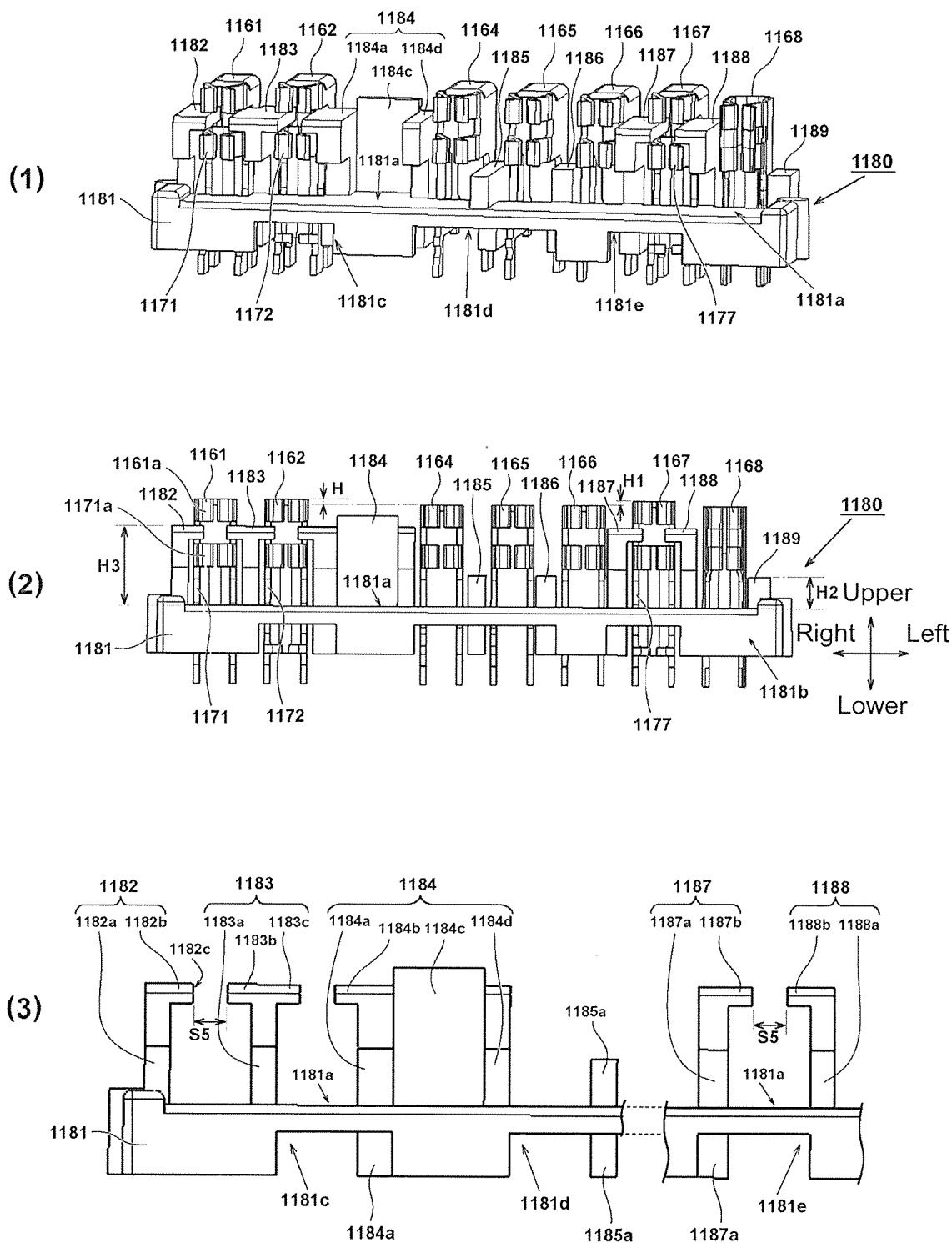

FIG. 46 is a diagram illustrating shapes of a connection terminal group of FIG. 39 and a substrate cover 1180 disposed around it. (1) of FIG. 46 is a perspective view. (2) of FIG. 46 is a front view. (3) of FIG. 46 is a partially enlarged view of the substrate cover 1180 of (2) of FIG. 46.

Figure 47:
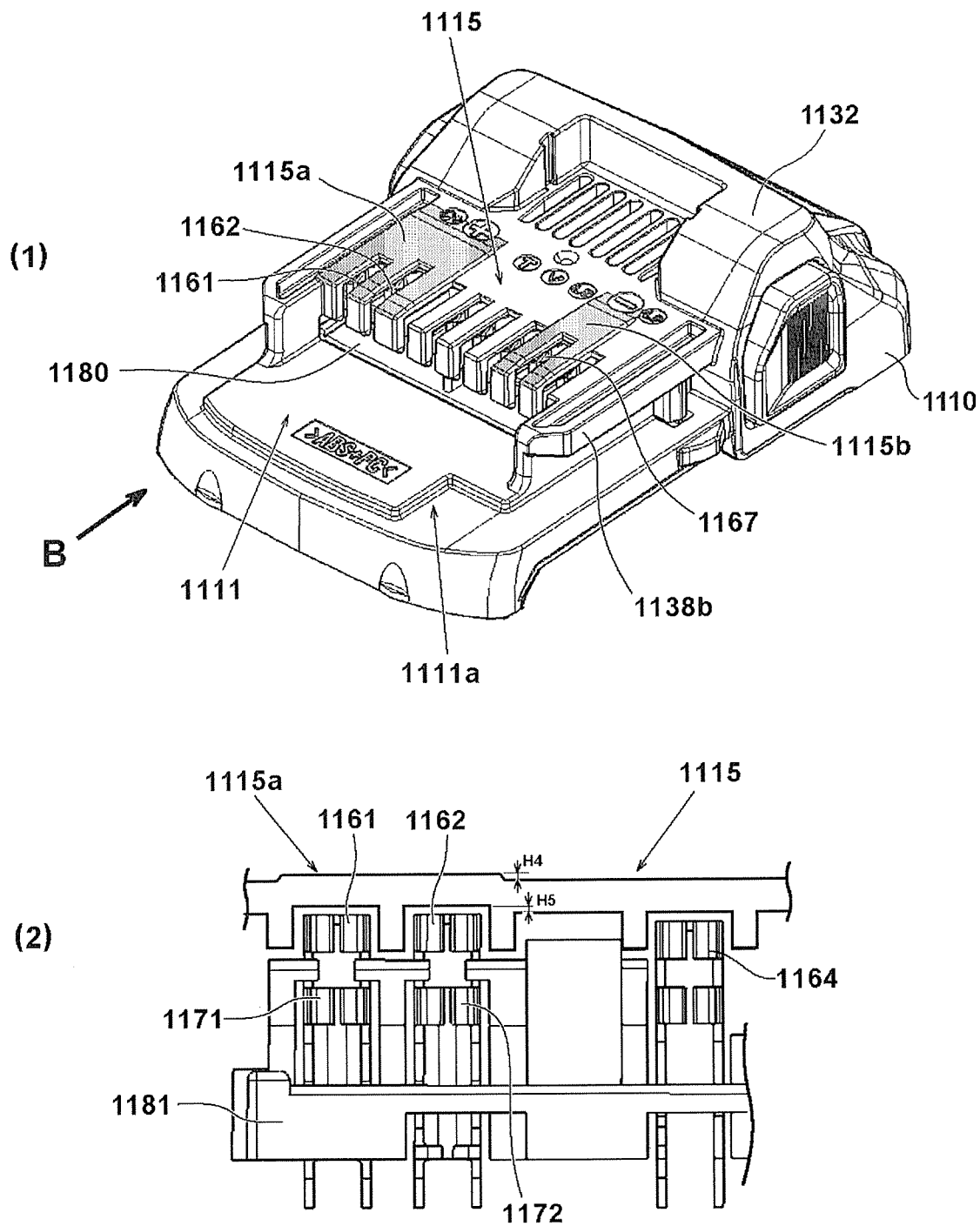

FIG. 47 is a perspective view of the upper case 1110 of FIG. 38.

Figure 48:
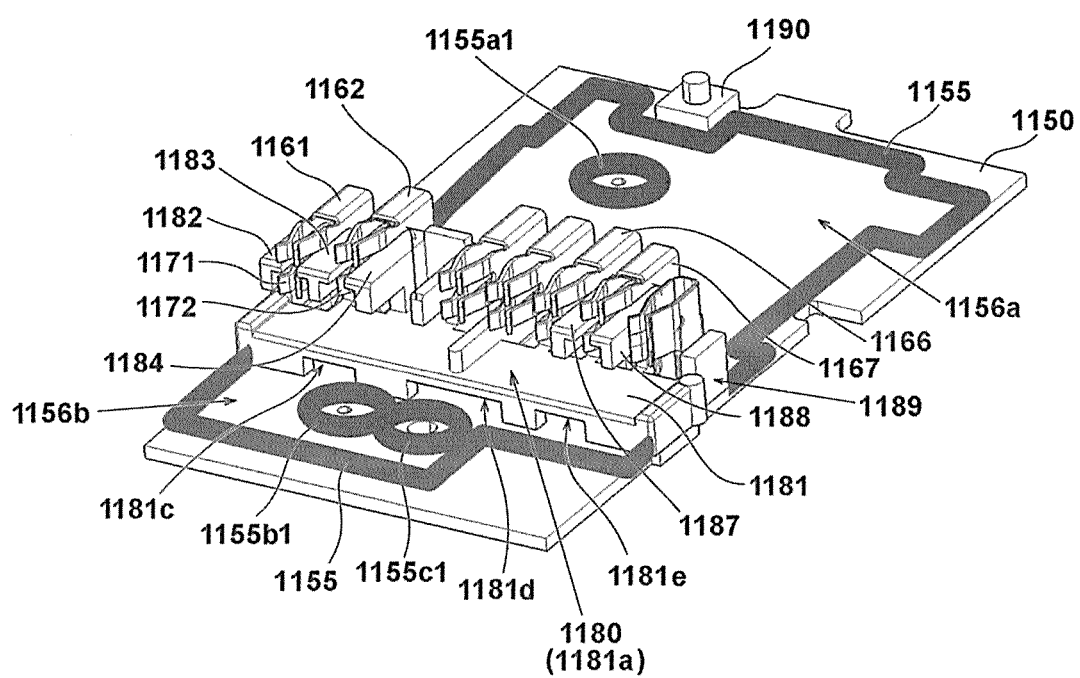

FIG. 48 is a perspective view for illustrating a method of coating a resin to the circuit substrate 1150.

Figure 49:
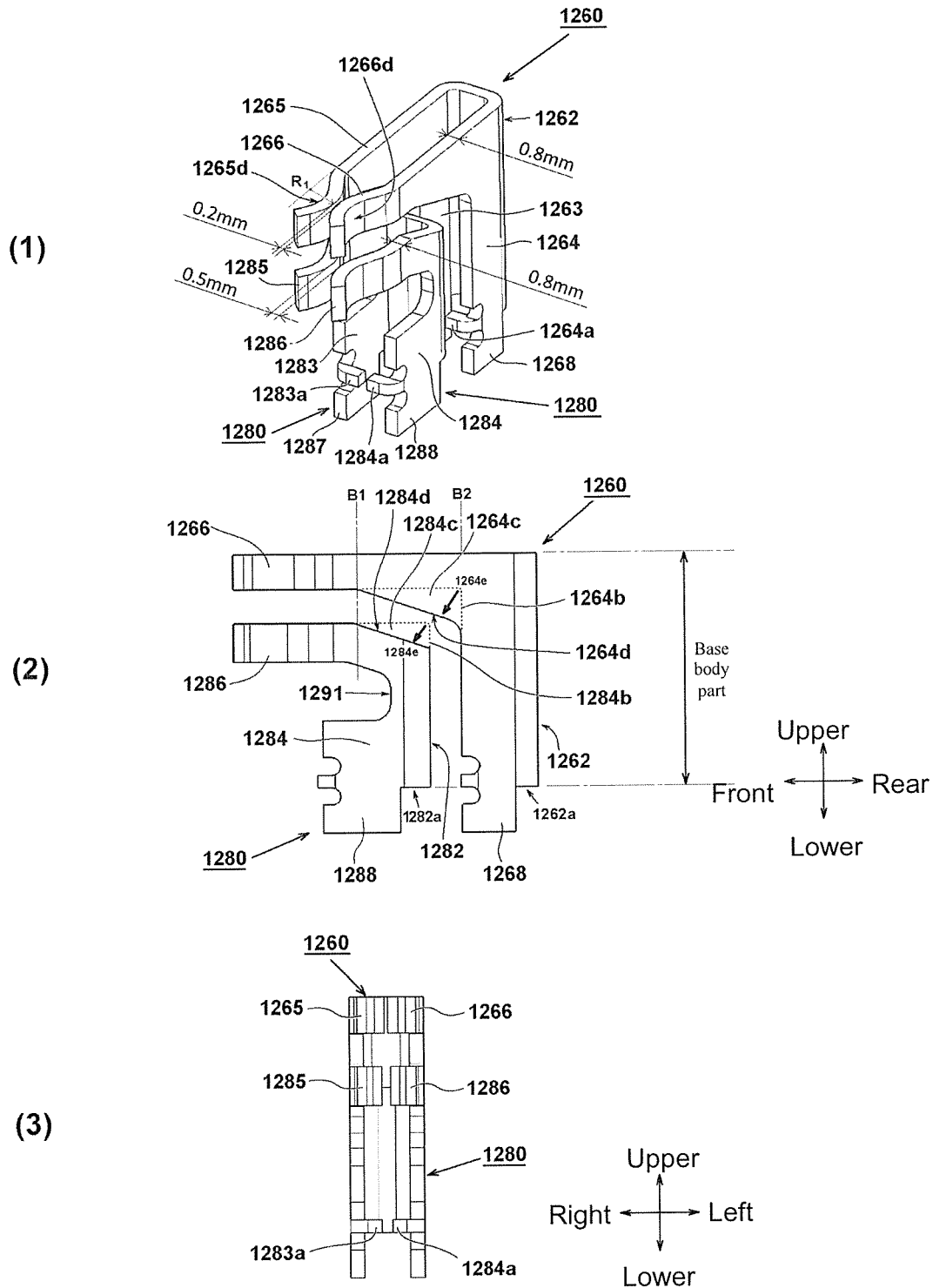

FIG. 49 is a diagram illustrating a first modification example of the sixth embodiment. (1) of FIG. 49 is a perspective view of an upper terminal part 1260 and a lower terminal part 1280. (2) of FIG. 49 is a left side view. (3) of FIG. 49 is a front view.

Figure 50:
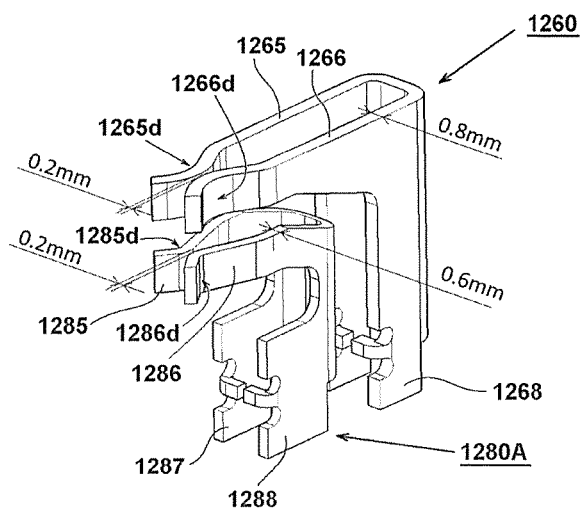

FIG. 50 is a diagram illustrating a second modification example of the sixth embodiment and is a perspective view illustrating the upper terminal part 1260 and a lower terminal part 1280A.

Figure 51:
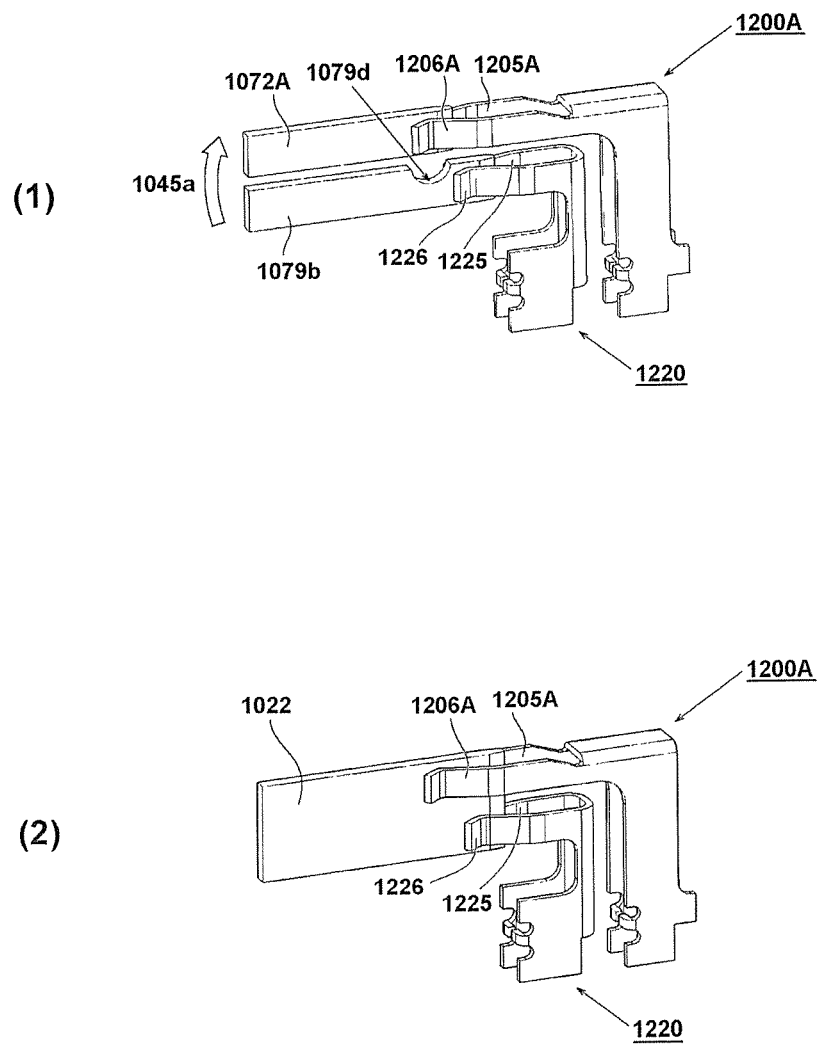

FIG. 51 is a perspective view illustrating an upper terminal part 1200A and the lower terminal part 1220 of a third modification example of the sixth embodiment. (1) of FIG. 51 is a diagram illustrating a state of connection to body side terminals of an electrical tool body 1030A. (2) of FIG. 51 is a diagram illustrating a state of connection to body side terminals of the above-mentioned electrical tool body 1001.

Figure 52:
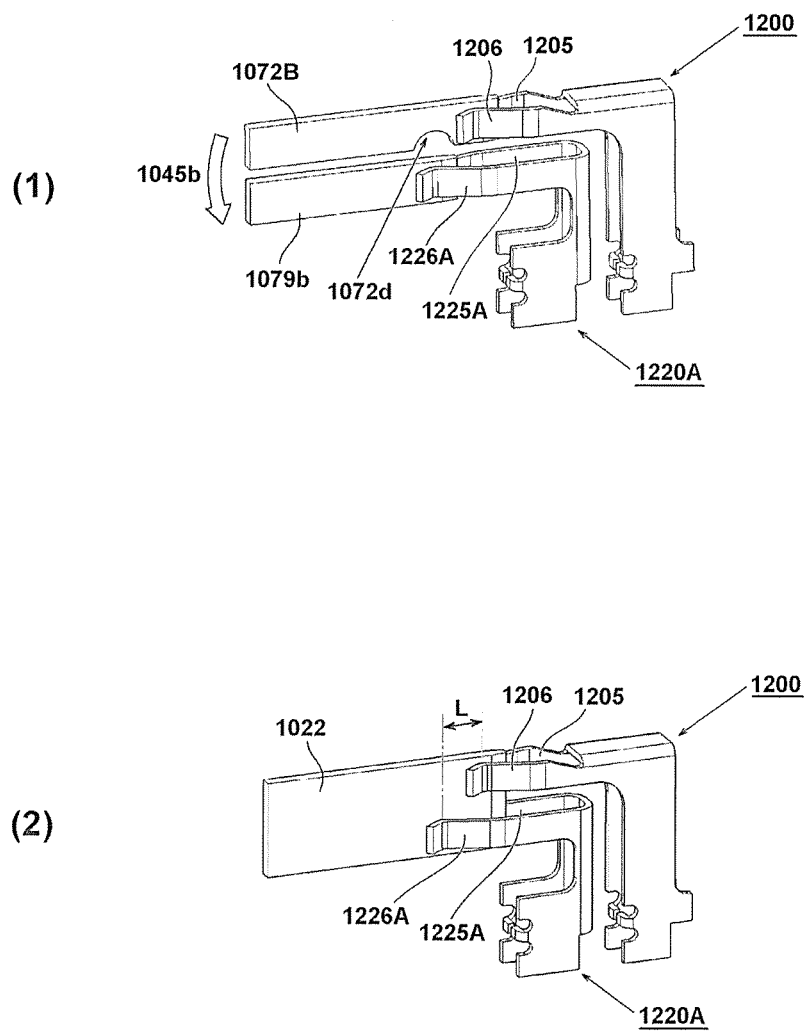

FIG. 52 is a perspective view illustrating the upper terminal part 1200 and a lower terminal part 1220A of a fourth modification example of the sixth embodiment. (1) of FIG. 52 is a diagram illustrating a state of connection to body side terminals of an electrical tool body 1030B. (2) of FIG. 52 is a diagram illustrating a state of connection to body side terminals of the above-mentioned electrical tool body 1001.

Figure 53:
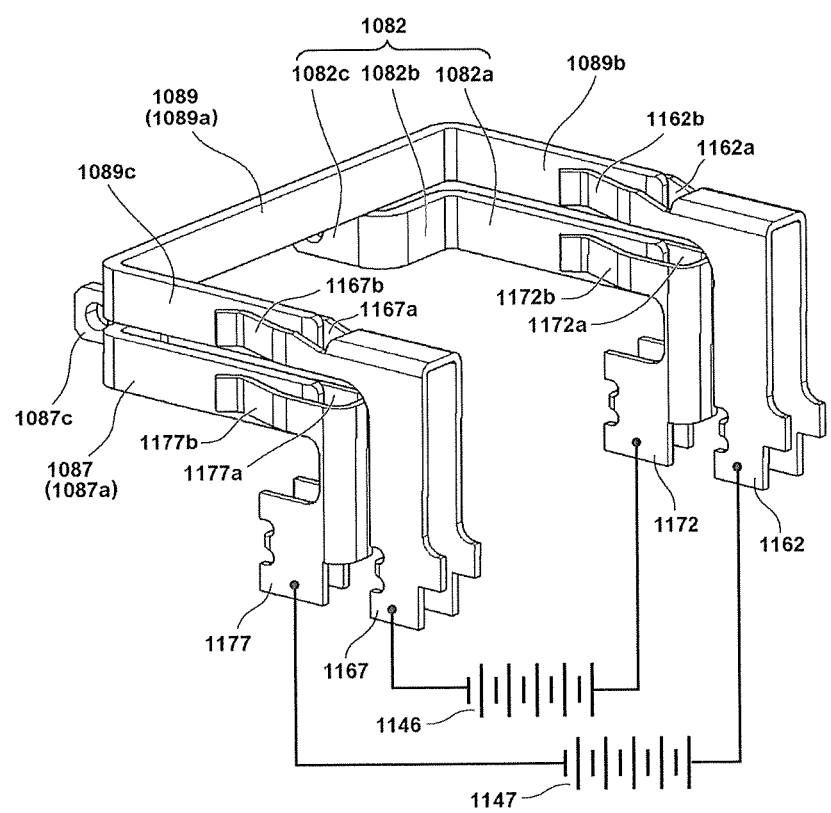

FIG. 53 is a perspective view illustrating a state of connection to a terminal part of an electrical tool body of a fifth modification example of the sixth embodiment.

Figure 54:
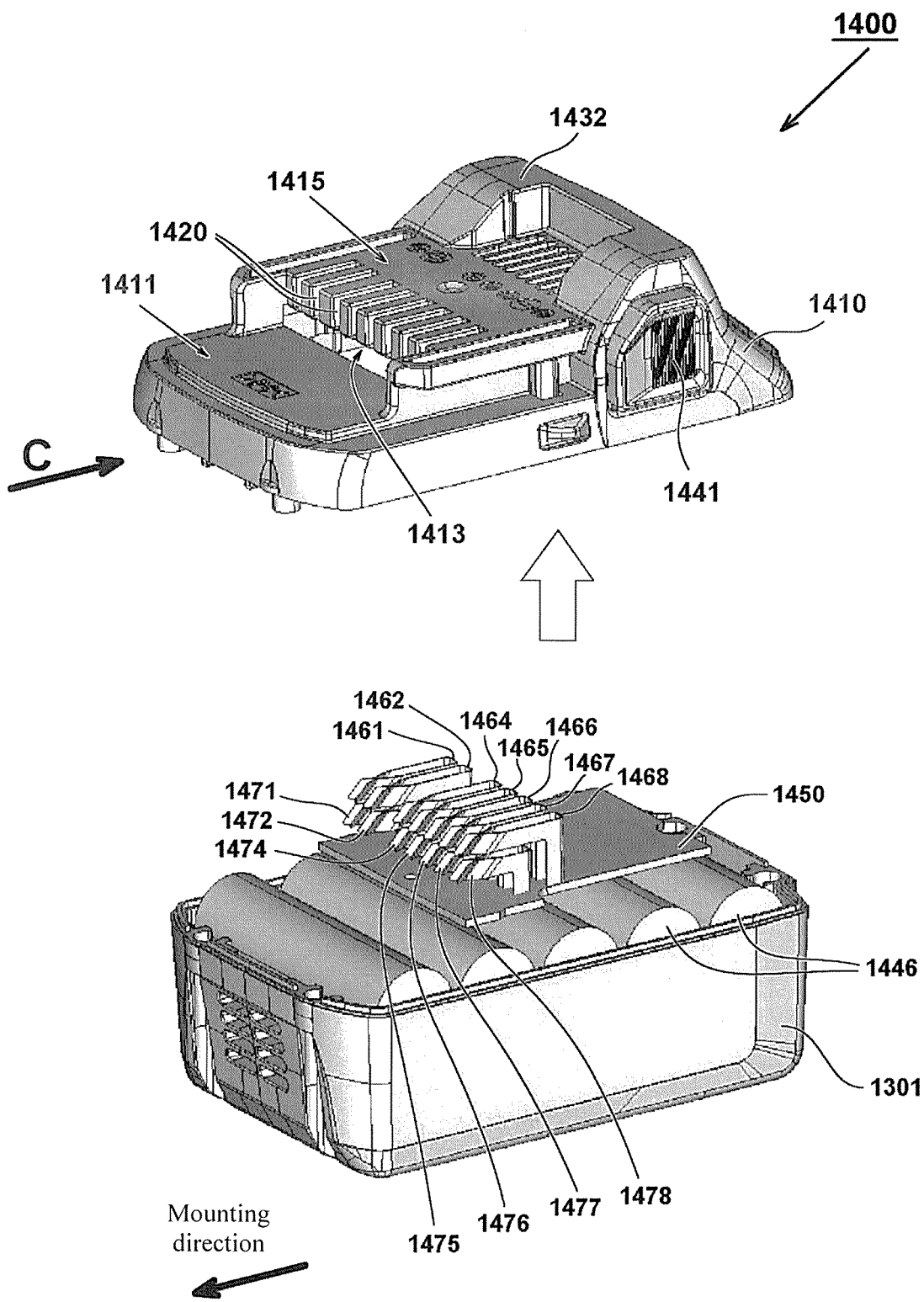

FIG. 54 is a disassembly perspective view illustrating a battery pack 1400 of a seventh embodiment of the invention.

Figure 55:
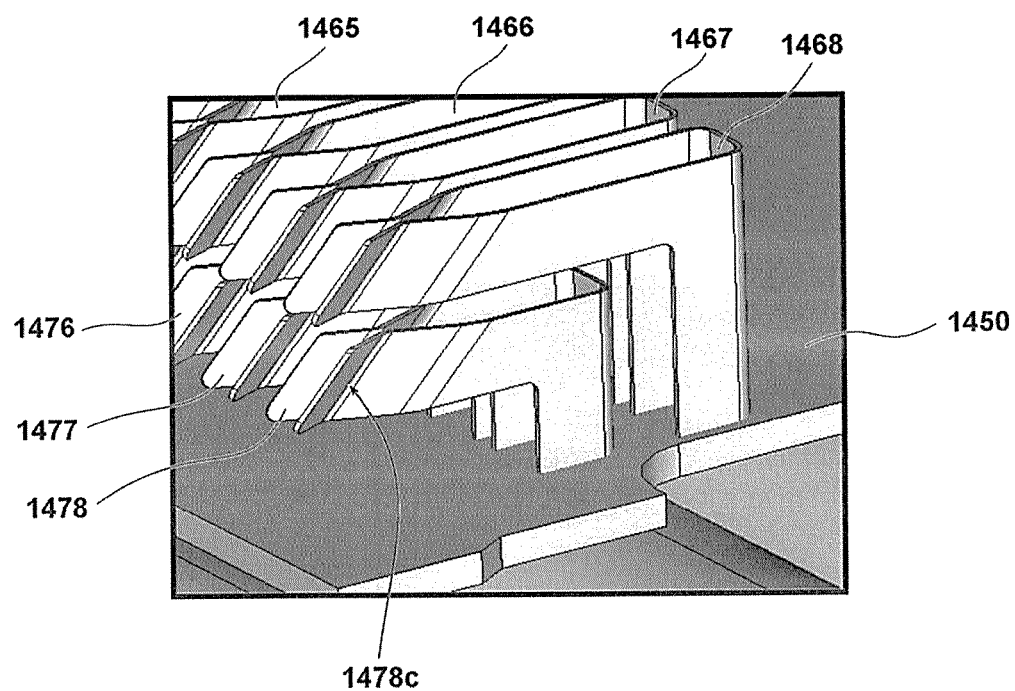

FIG. 55 is a partially enlarged view of a connection terminal of FIG. 54.

Figure 56:
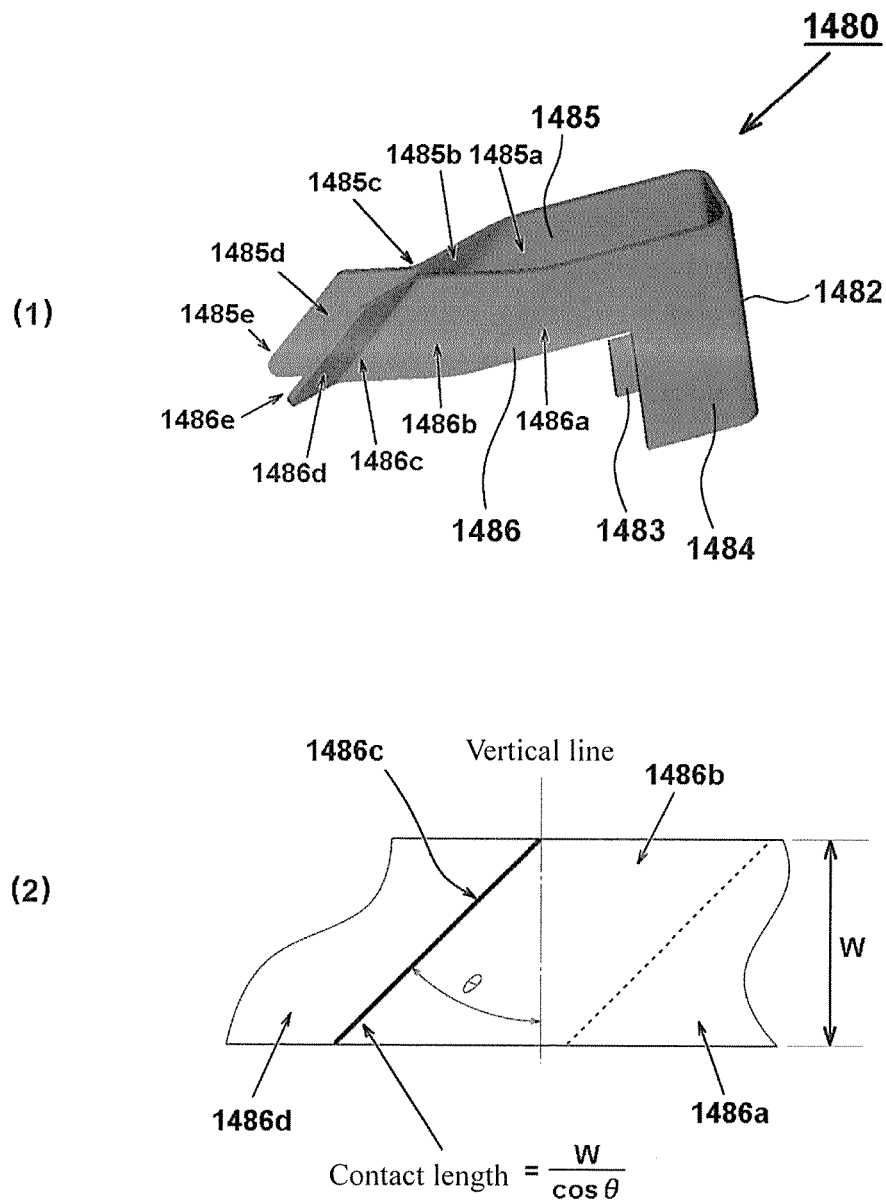

FIG. 56 is an enlarged view of a terminal part of FIG. 54. (1) of FIG. 56 is a perspective view. (2) of FIG. 56 is a diagram for illustrating a contact length in a fitting part.

Figure 57:
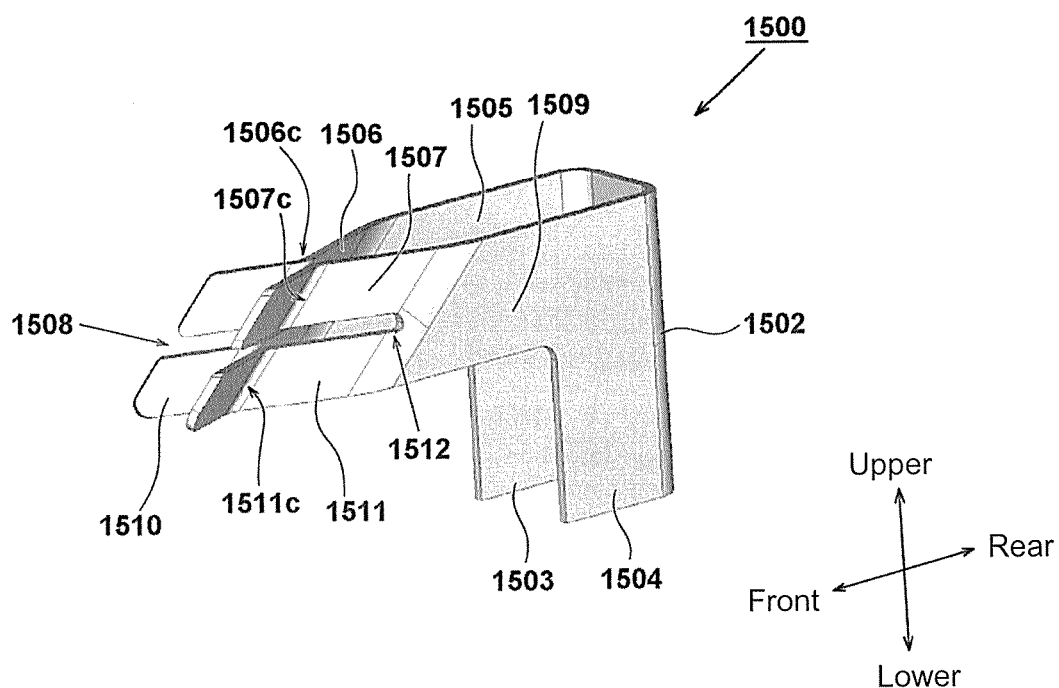

FIG. 57 is a perspective view illustrating a terminal part 1500 of a modification example of the seventh embodiment.

Figure 58:
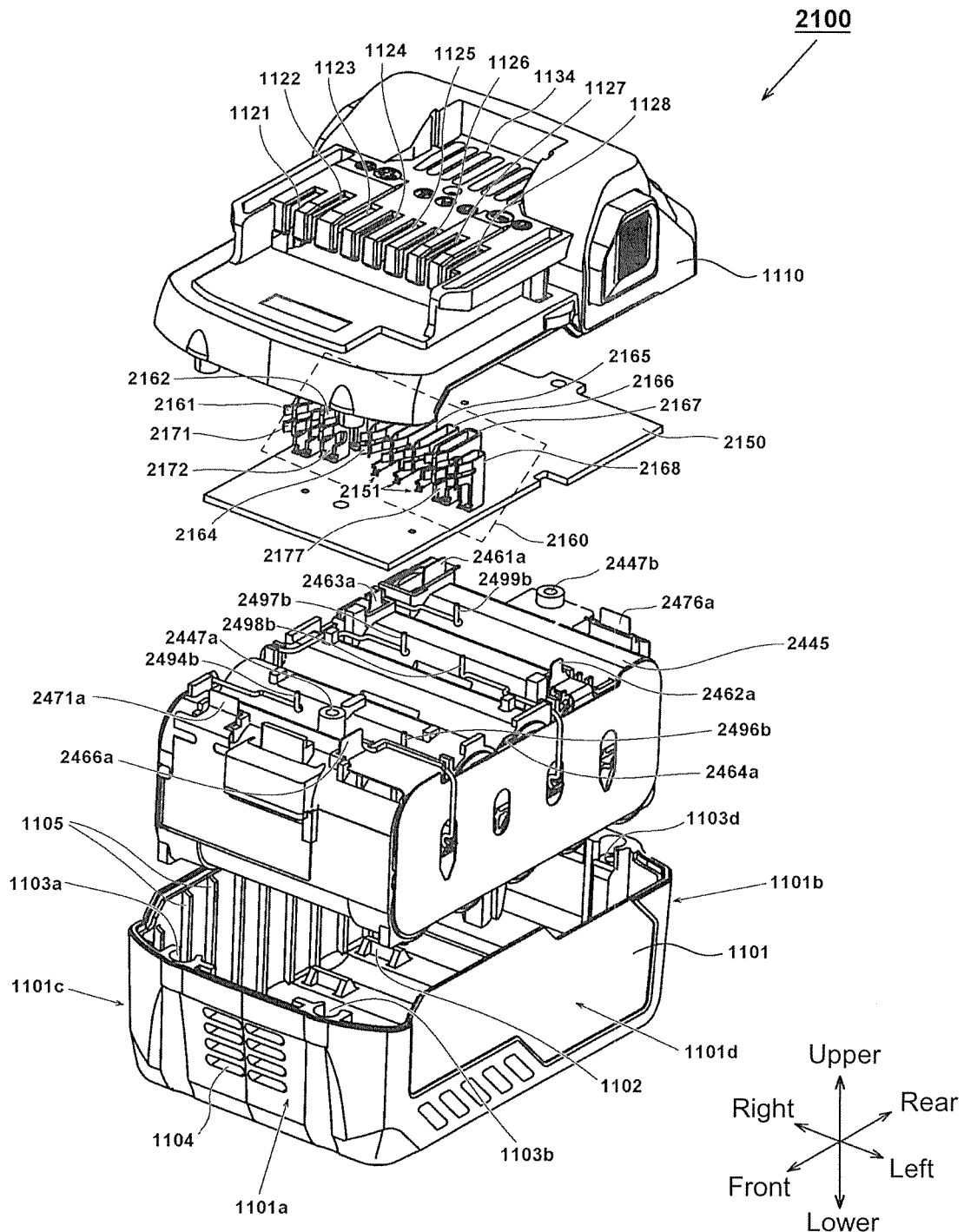

FIG. 58 is an exploded perspective view illustrating a battery pack 2100 of an eighth embodiment of the invention.

Figure 59:
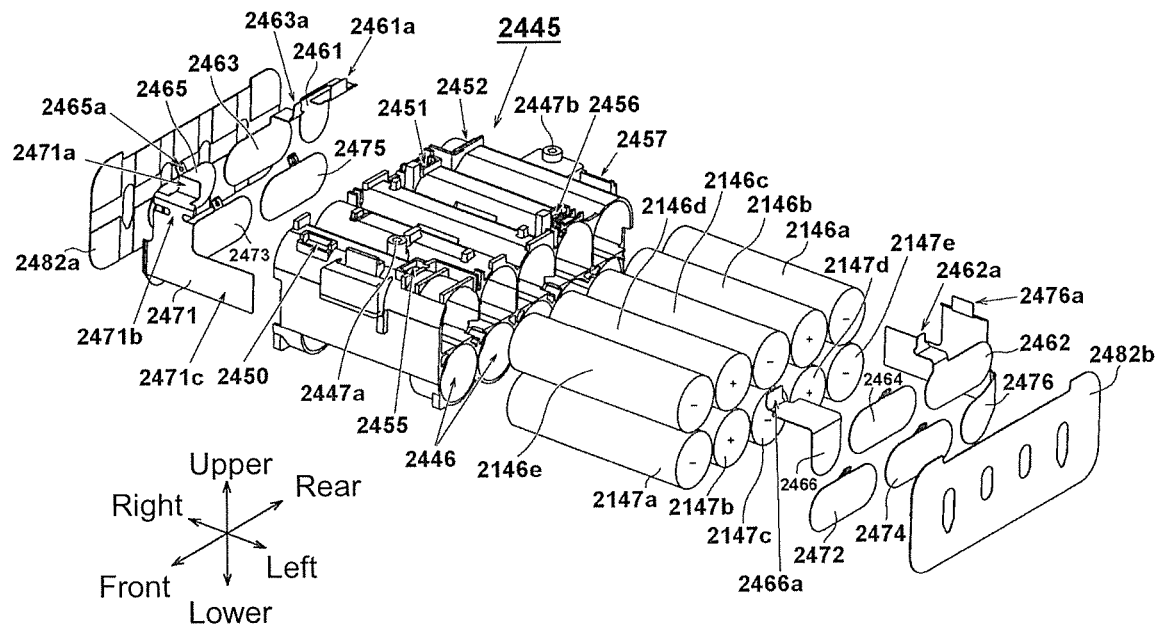

FIG. 59 is an exploded perspective view for illustrating stacking and a wiring method of a battery cell using a separator 2445 of FIG. 58.

Figure 60:
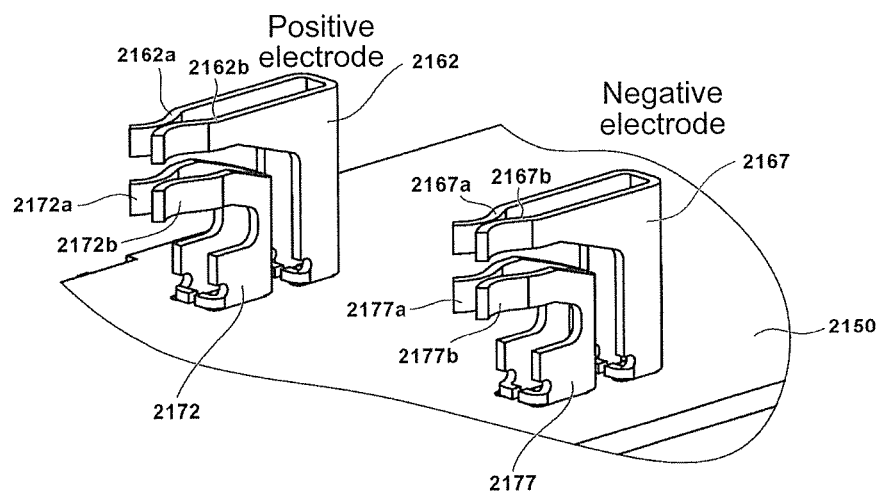

FIG. 60 is a diagram illustrating individual shapes of a positive electrode terminal pair (2162 and 2172) and a negative electrode terminal pair (2167 and 2177) used for electrical discharge in power terminals of FIG. 58.

Figure 61:
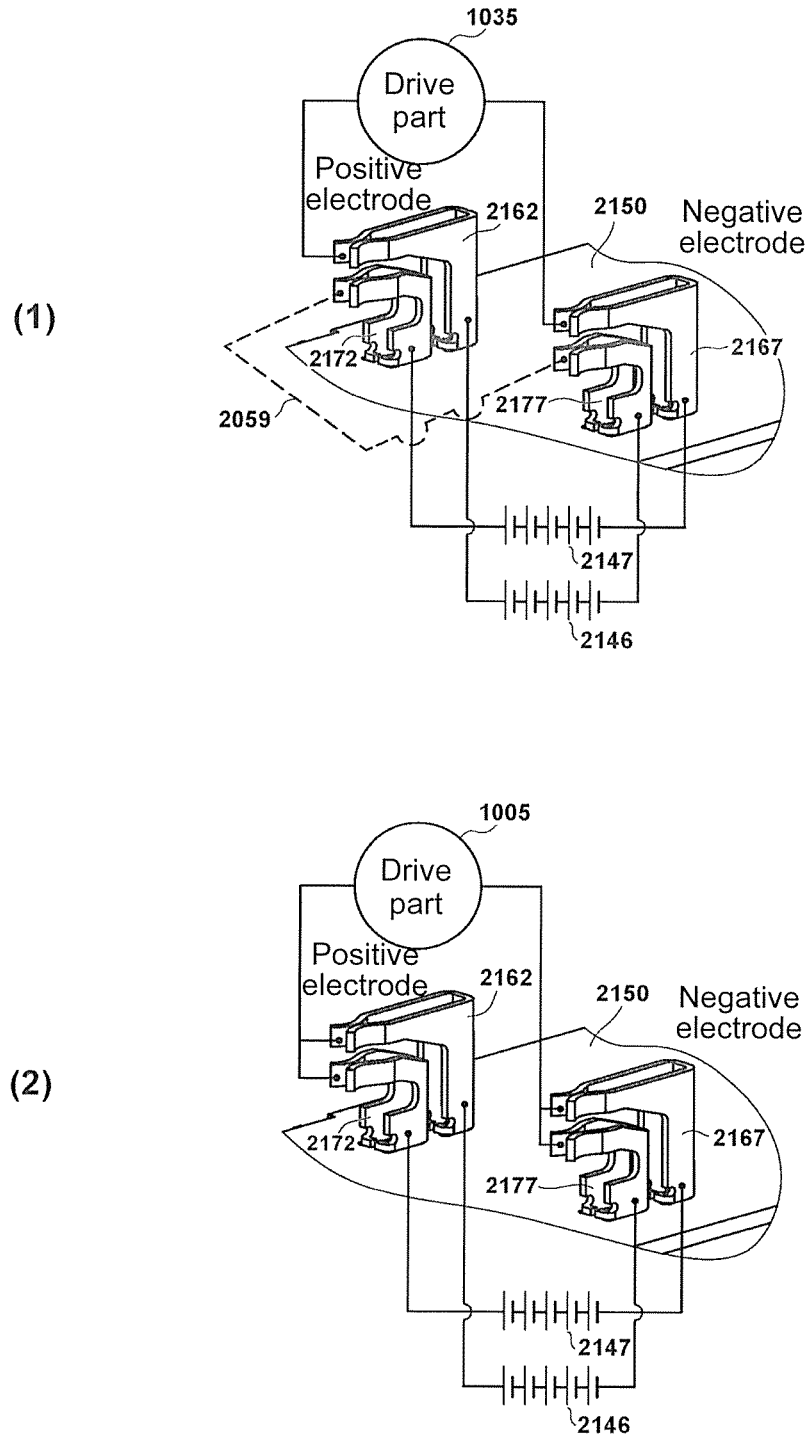

FIG. 61 is a diagram for illustrating connection of an electrical device body and the power terminals of the battery pack 2100. (1) of FIG. 61 illustrates a connection circuit in a state of connection to the electrical tool body 1030 of the present embodiment. (2) of FIG. 61 illustrates a connection circuit connected to the above-mentioned electrical tool body 1001.

Figure 62:
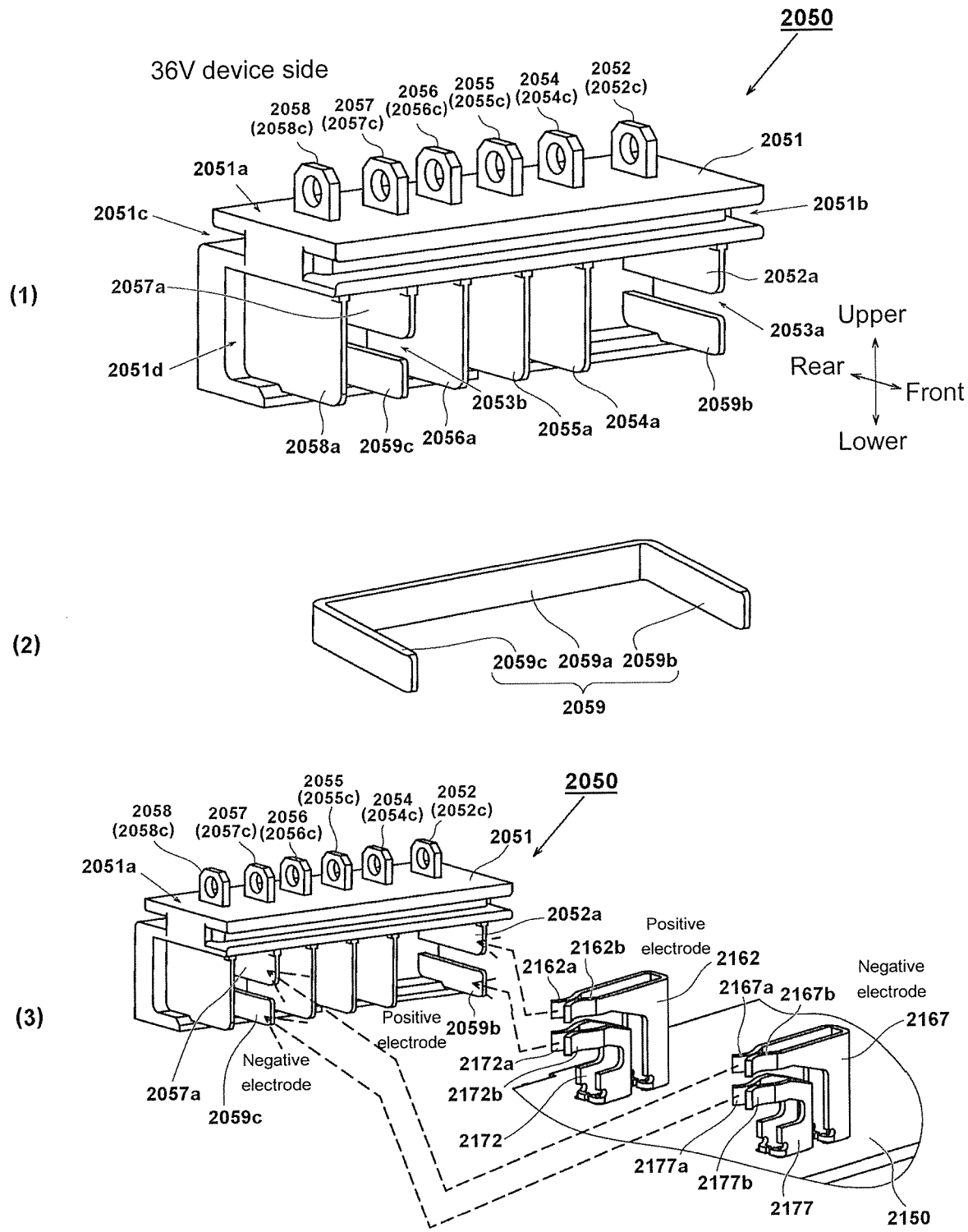

(1) of FIG. 62 is a perspective view of a terminal part 2050 of the electrical tool body 1030 of the present embodiment, (2) of FIG. 62 is a perspective view of a short bar 2059 alone, and (3) of FIG. 62 is a diagram illustrating a connection method of the terminal part 2050 and the power terminals of the battery pack 2100.

Figure 63:
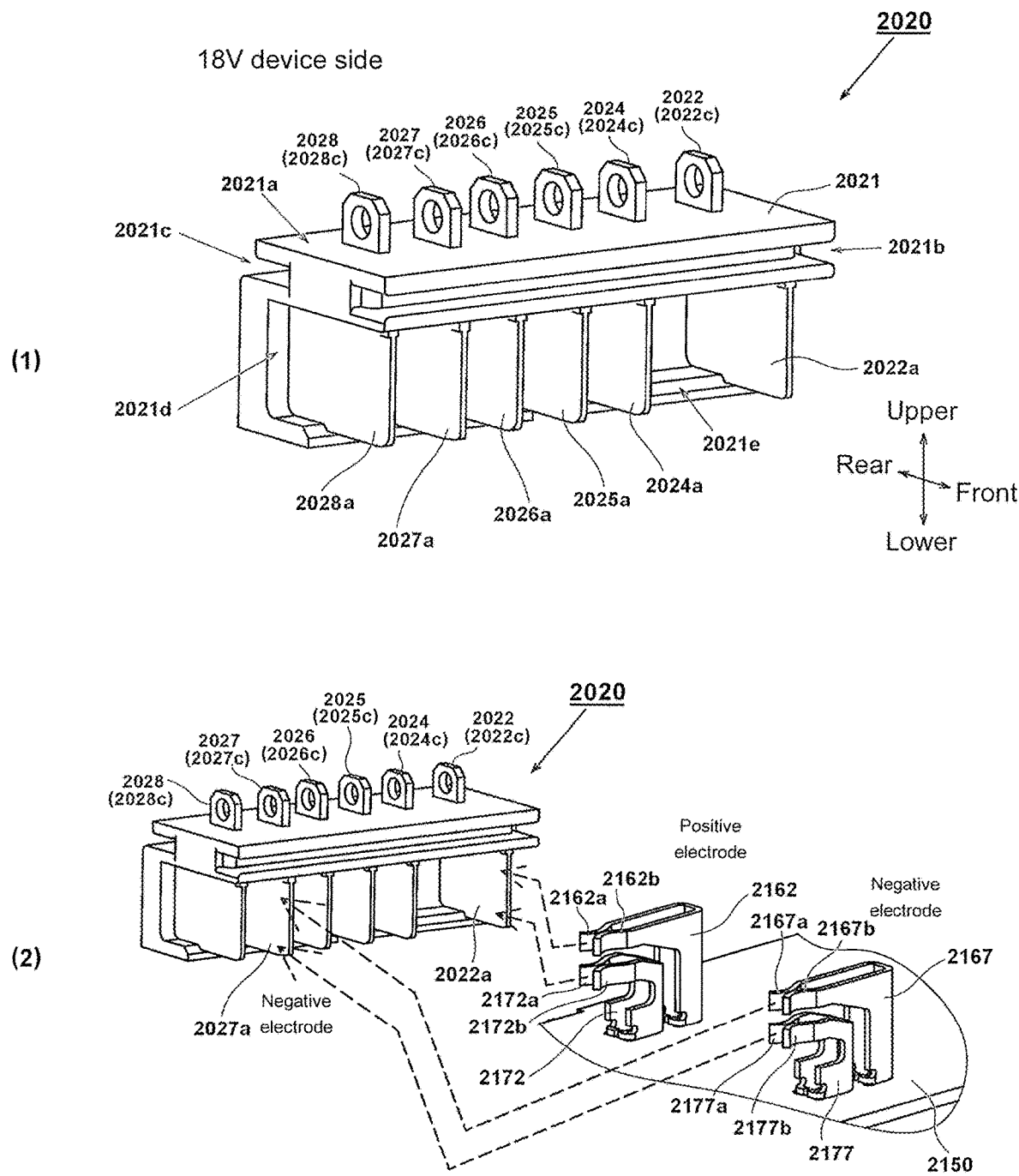

(1) of FIG. 63 is a perspective view of a terminal part 2020 of the above-mentioned electrical tool body 1001, and (2) of FIG. 63 is a diagram illustrating connection of the terminal part 2020 and the power terminals of the battery pack 2100.

Figure 64:
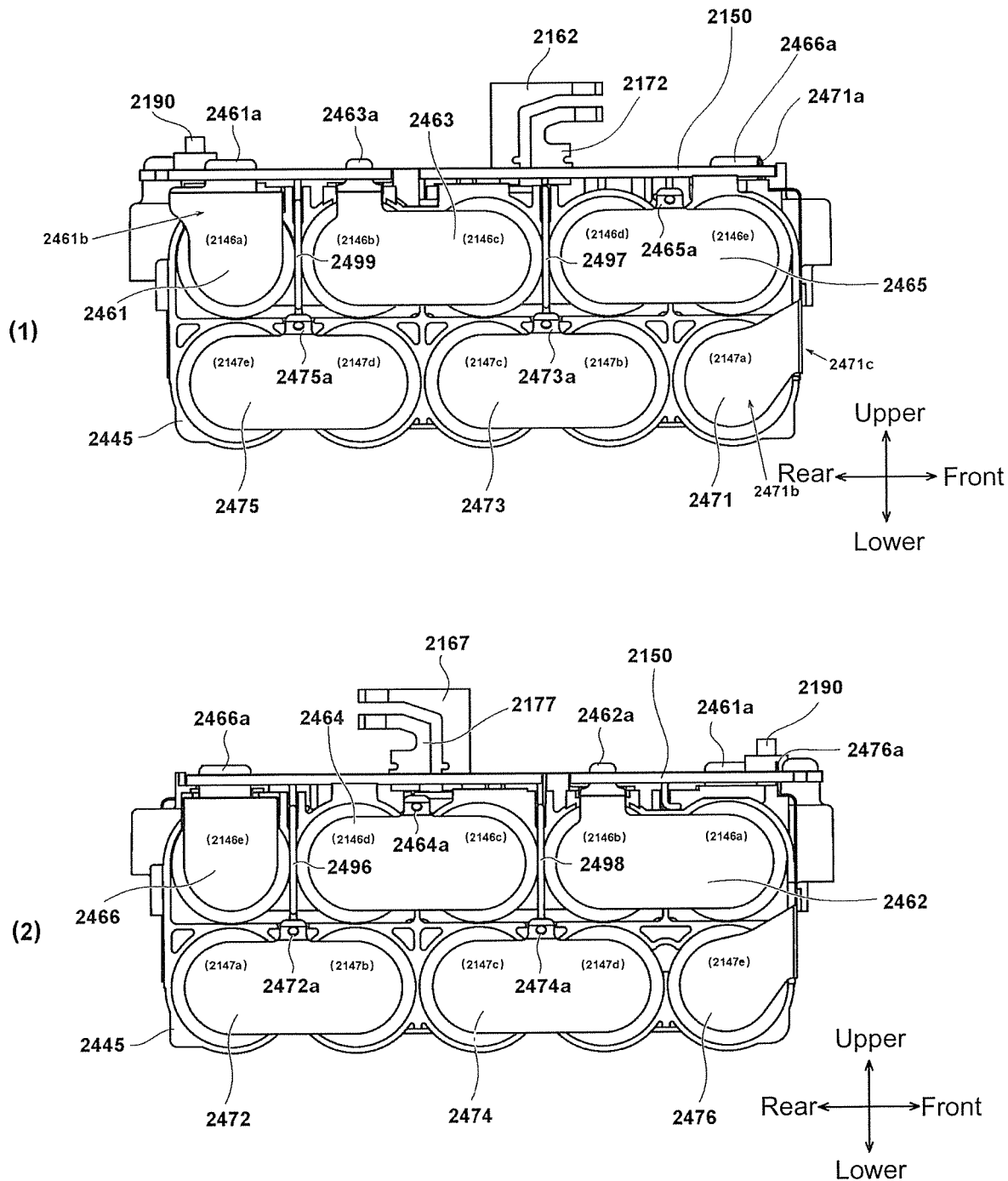

FIG. 64 is a side view of the separator 2445 after the components shown in FIG. 59 are assembled. (1) of FIG. 64 is a right side view. (2) of FIG. 64 is a left side view.

Figure 65:
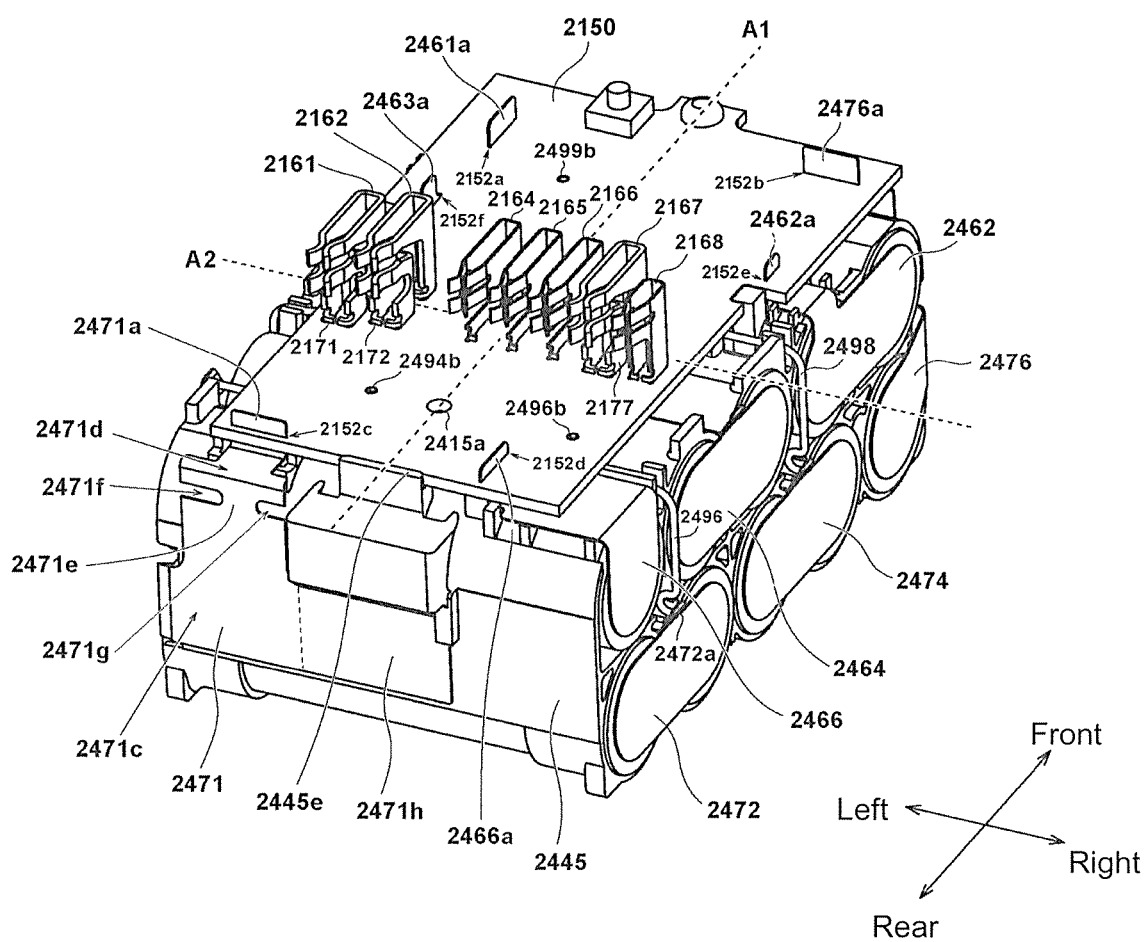

FIG. 65 is a perspective view (a perspective view viewed from the upper-front-left side) illustrating a state where a circuit substrate 2150 is fixed to the separator 2445.

Figure 66:
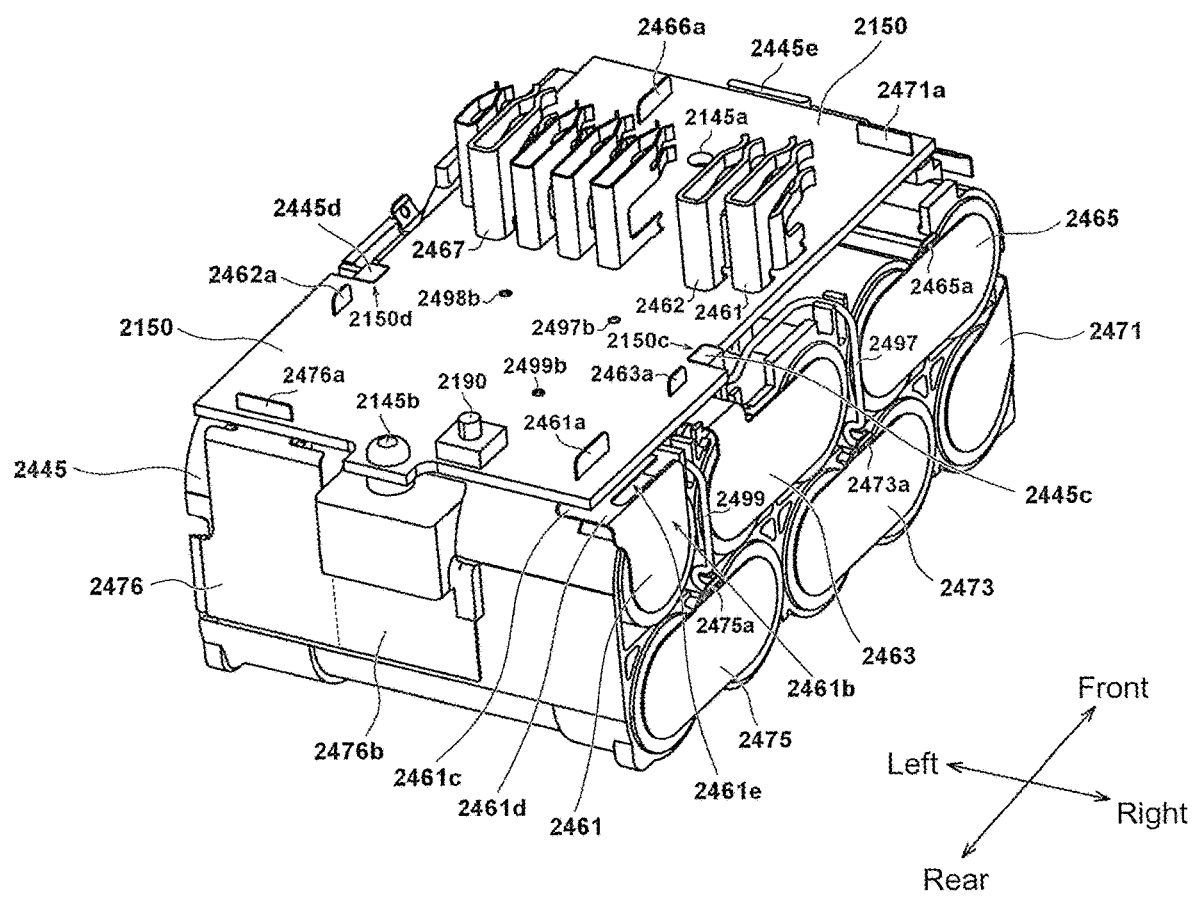

FIG. 66 is a perspective view (a perspective view viewed from the upper-rear-right side) illustrating a state where the circuit substrate 2150 is fixed to the separator 2445.

Figure 67:
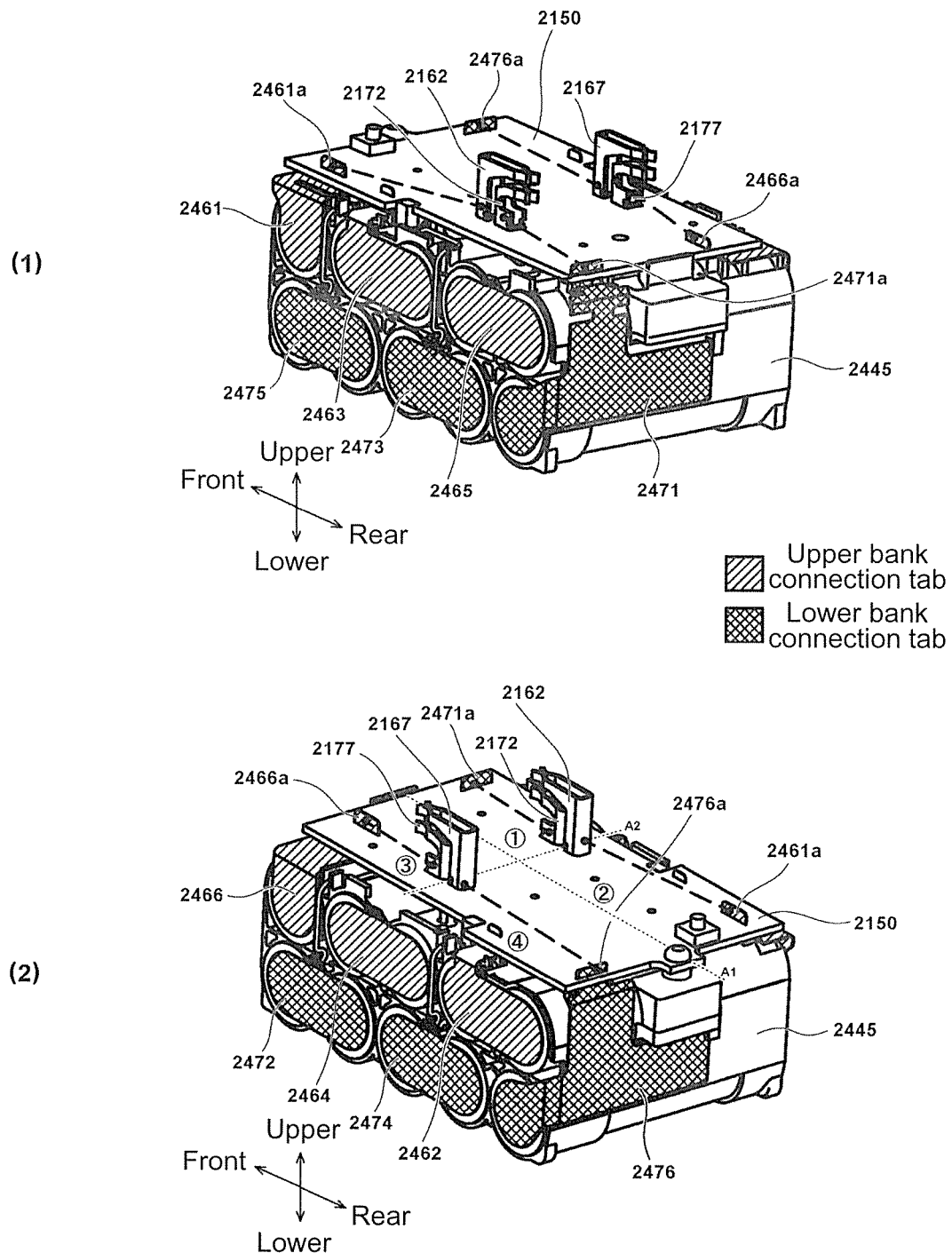

FIG. 67 is a diagram for illustrating a method of connecting the battery pack 2100 to drawer plates 2461, 2466, 2471, 2476 and positive electrode terminals (2162, 2172) and negative electrode terminals (2167, 2177).

Figure 68:
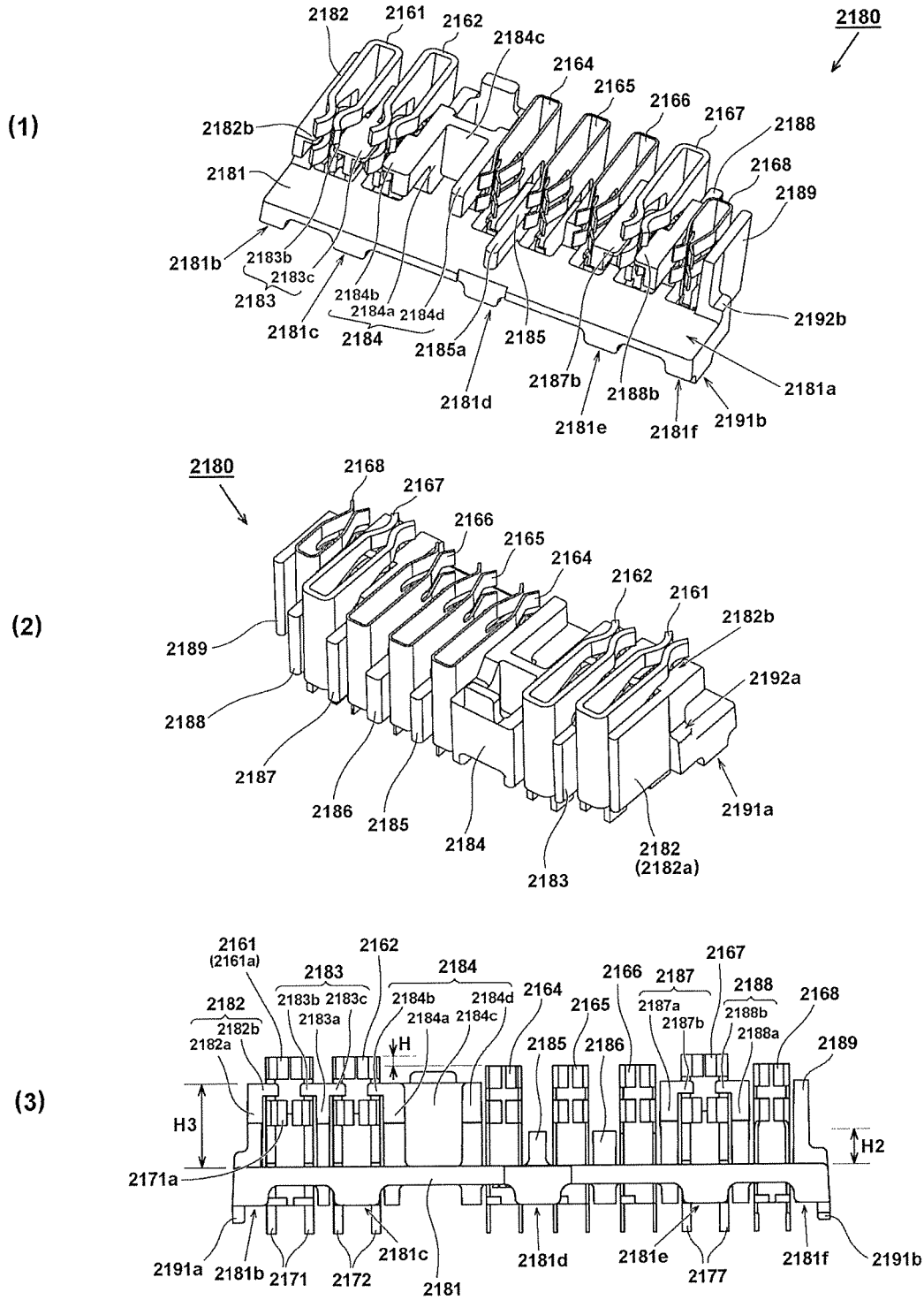

FIG. 68 is a diagram illustrating a connection terminal group of FIG. 66 and a substrate cover 2180 disposed around it. (1) of FIG. 68 is a perspective view viewed from the upper-front-left side. (2) of FIG. 68 is a perspective view viewed from the upper-rear-right side. (3) of FIG. 68 is a front view.

Figure 69:
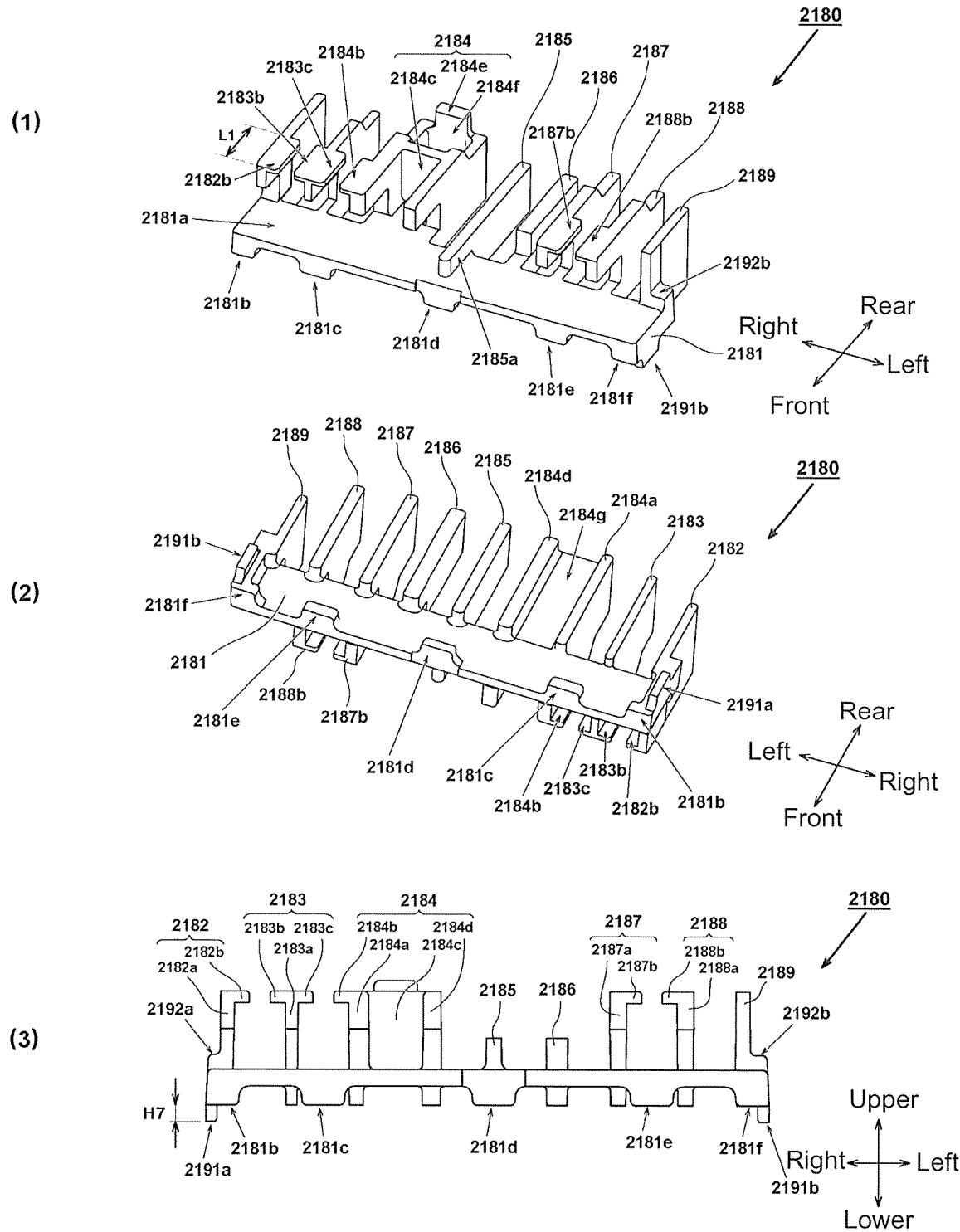

FIG. 69 is a diagram illustrating the substrate cover 2180 of FIG. 68 alone. (1) of FIG. 69 is a perspective view viewed from the upper-front-left side. (2) of FIG. 69 is a perspective view viewed from the lower-front-right side. (3) of FIG. 69 is a front view.

Figure 70:
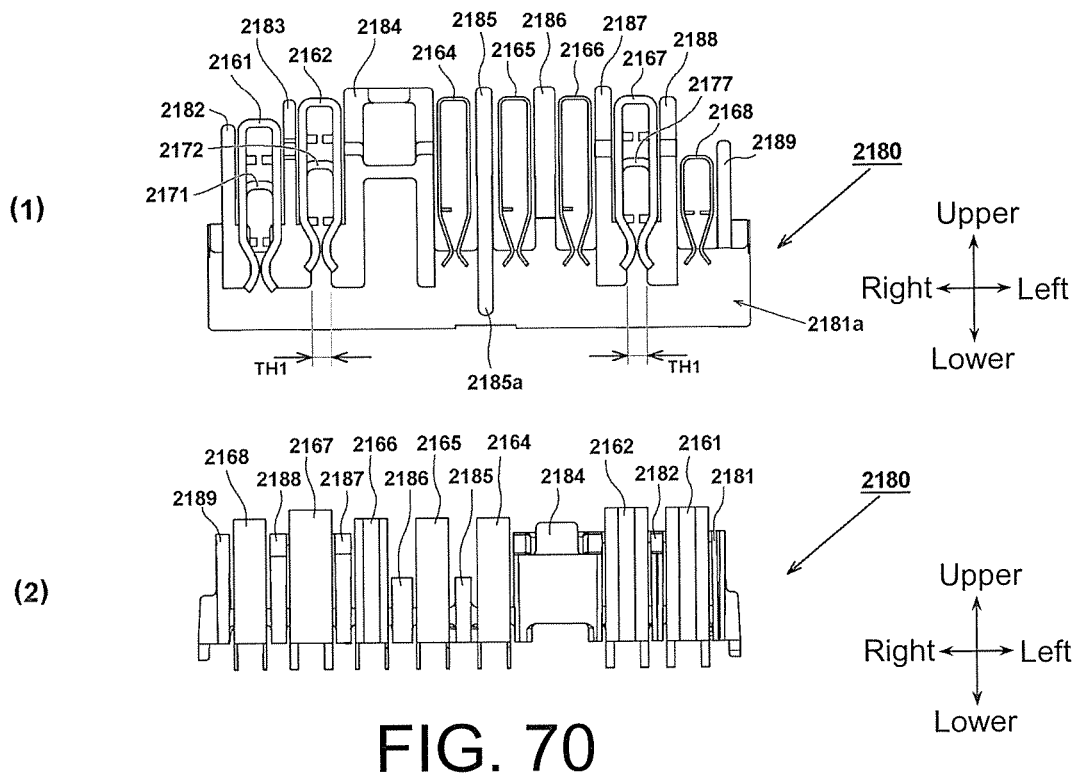

FIG. 70 is a diagram illustrating the connection terminal group of FIG. 66 and the substrate cover 2180 disposed around it. (1) of FIG. 70 is a top view. (2) of FIG. 70 is a rear view.

Figure 71:
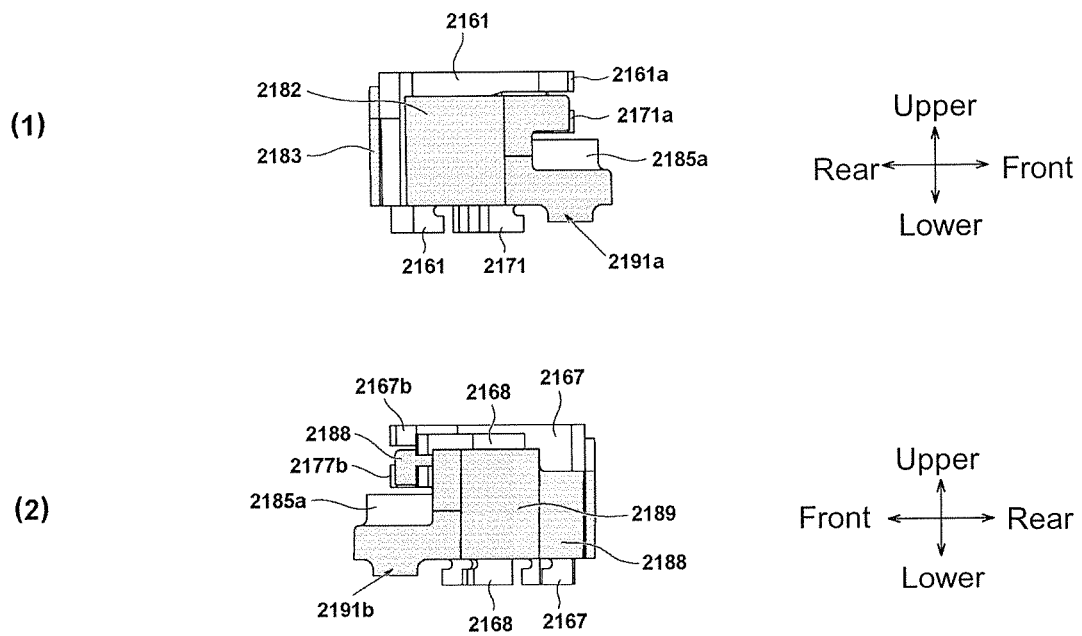

FIG. 71 is a diagram illustrating the connection terminal group of FIG. 66 and the substrate cover 2180 disposed around it. (1) of FIG. 71 is a right side view. (2) of FIG. 71 is a left side view.

Figure 72:
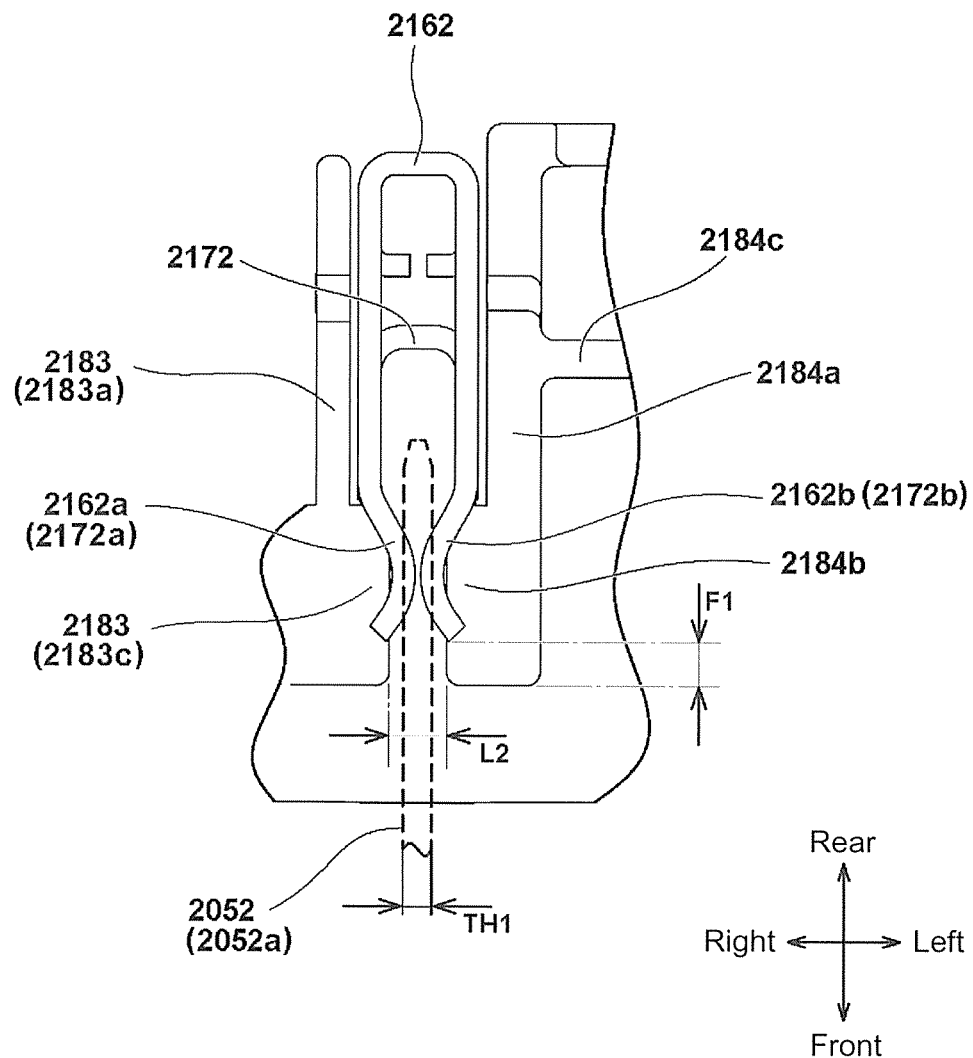

FIG. 72 is a diagram for illustrating a situation where a device side terminal is inserted into the substrate cover 2180.

Figure 73:
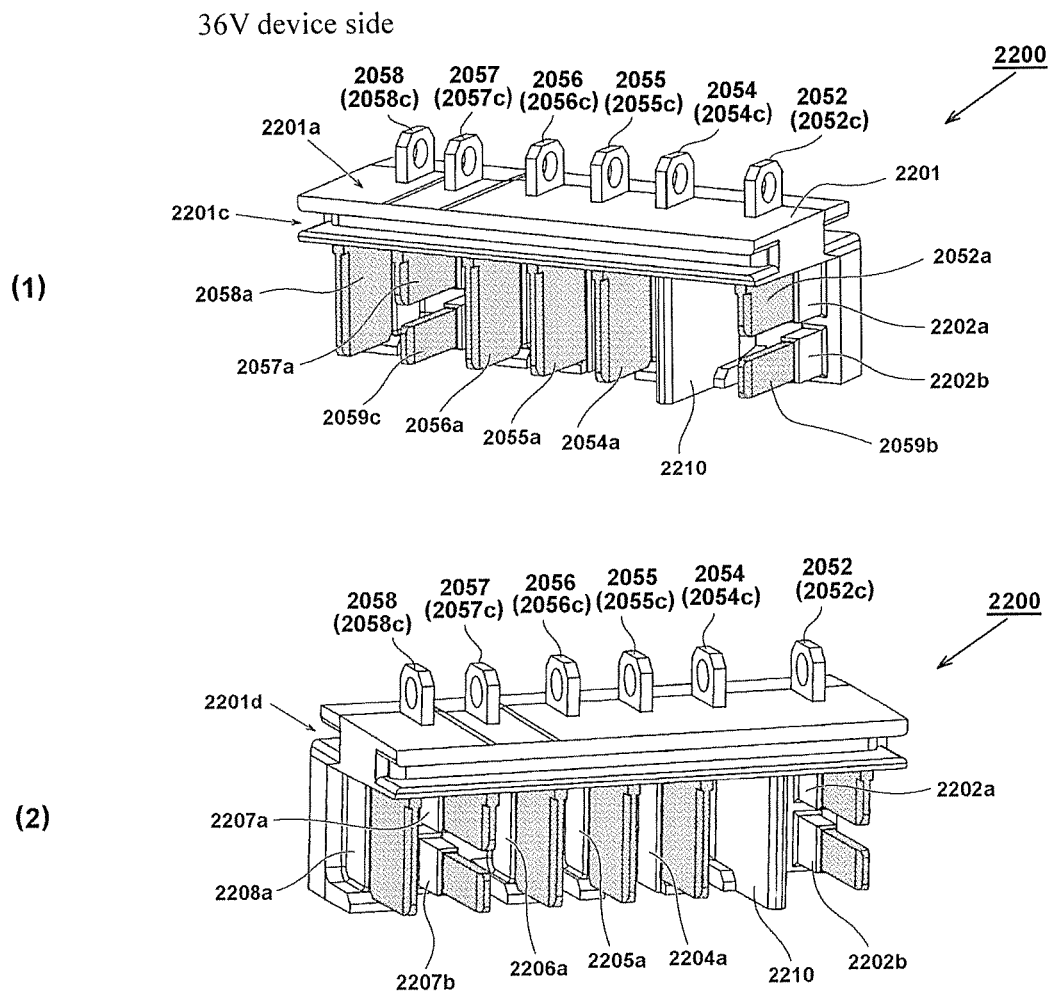

(1) of FIG. 73 and (2) of FIG. 73 are perspective views illustrating a terminal part 2200 of a ninth embodiment of the invention.

Figure 74:
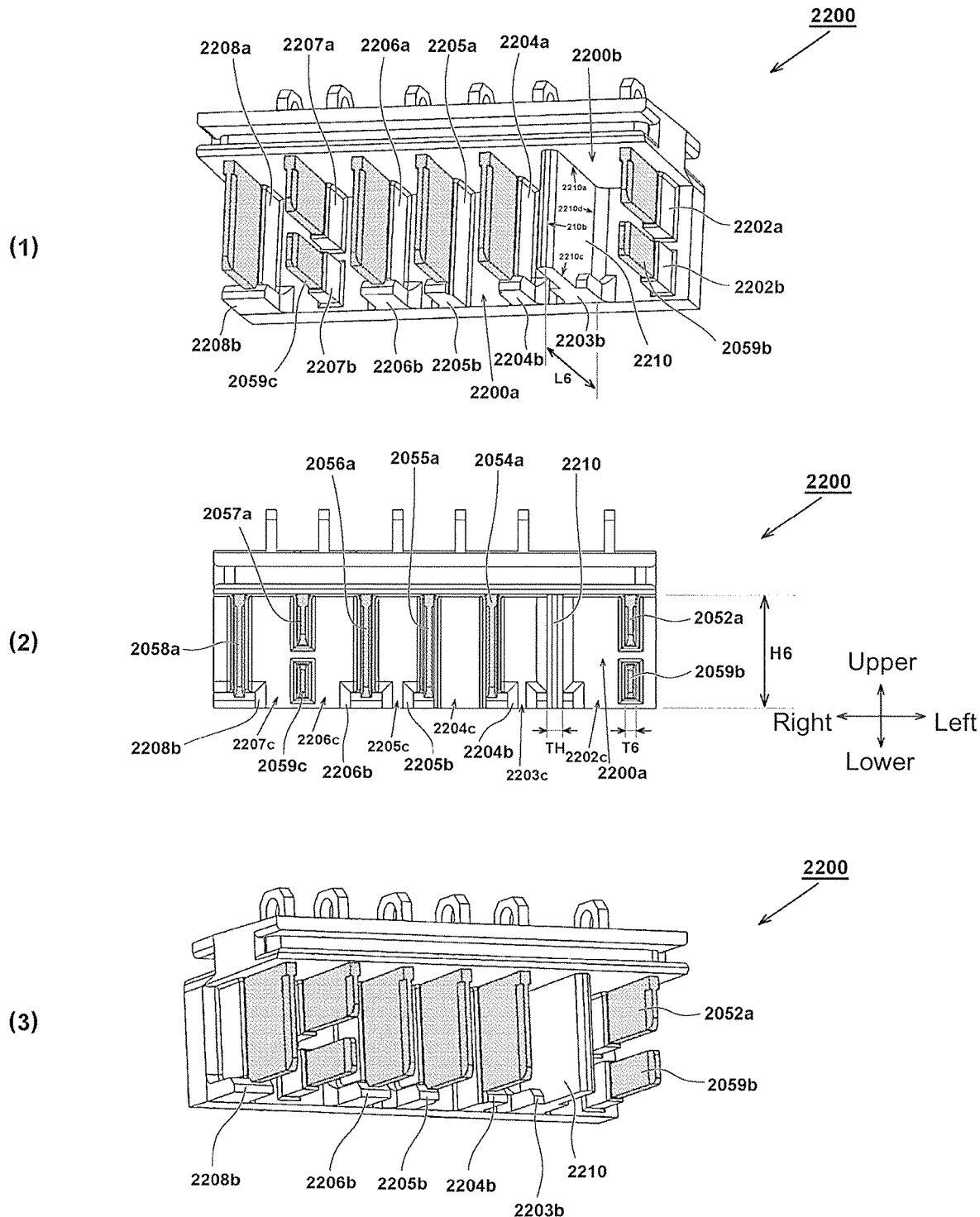

(1) of FIG. 74 and (3) of FIG. 74 are perspective views of the terminal part 2200 from another angle, and (2) of FIG. 74 is a front view.

Figure 75:
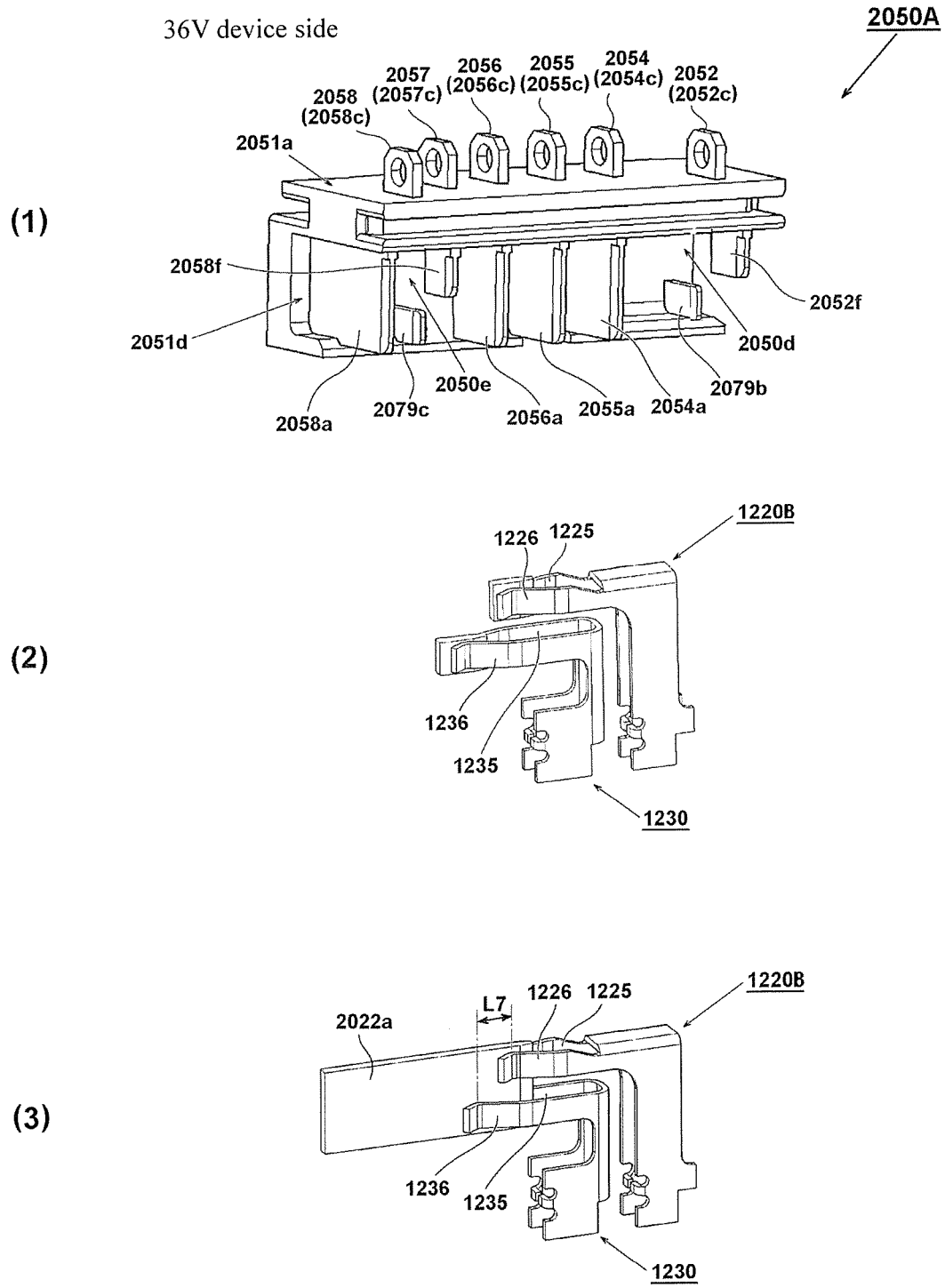

(1) of FIG. 75 is a perspective view of a terminal part 2050A of a tenth embodiment of the invention. (2) of FIG. 75 and (3) of FIG. 75 are perspective views of a power terminal part.

Figure 76:
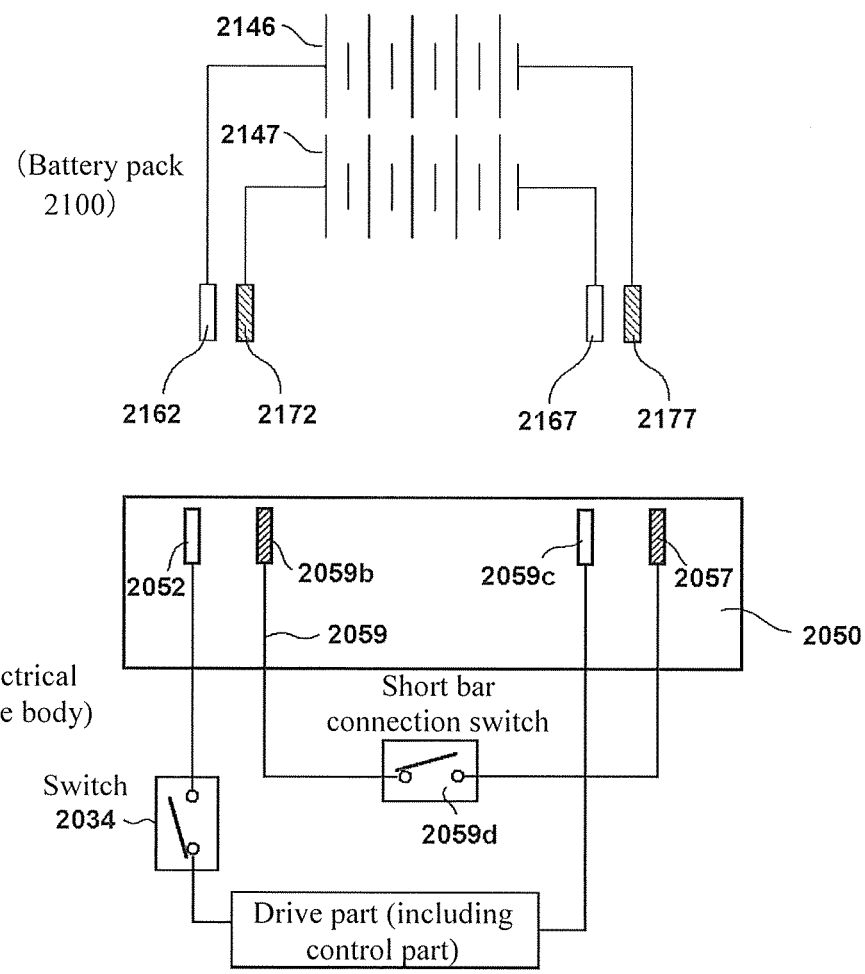

FIG. 76 is a schematic circuit diagram of a battery pack and an electrical device body of an eleventh embodiment of the invention.

Figure 77:
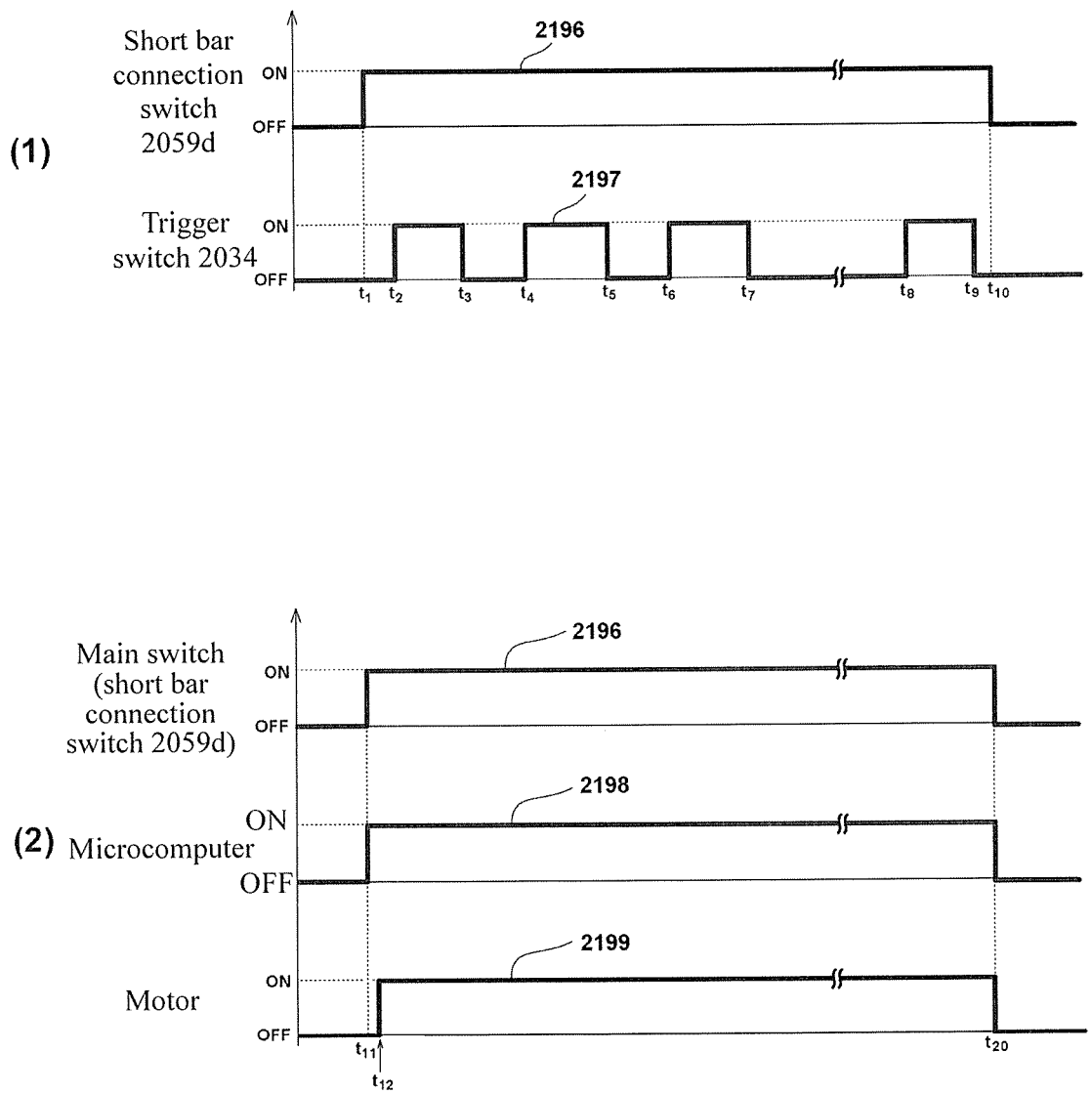

FIG. 77 is a diagram for illustrating sequences of operation of a short bar connection switch 2059d and operation of a trigger switch 2034 and a motor in FIG. 76.

Figure 78:
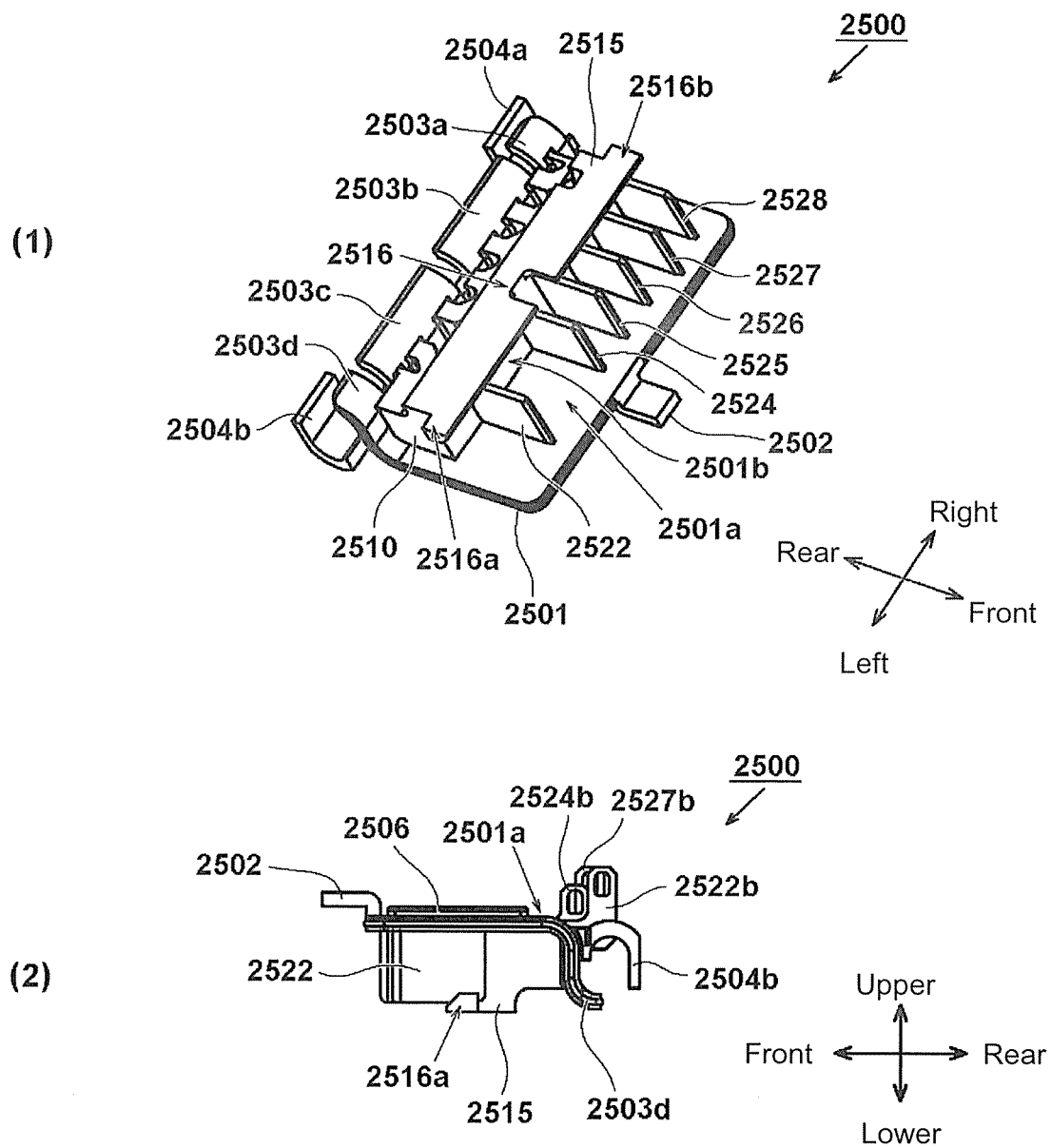

FIG. 78 is a diagram illustrating a terminal holder 2500 used for 18V of a twelfth embodiment of the invention. (1) of FIG. 78 is a perspective view. (2) of FIG. 78 is a front view.

Figure 79:
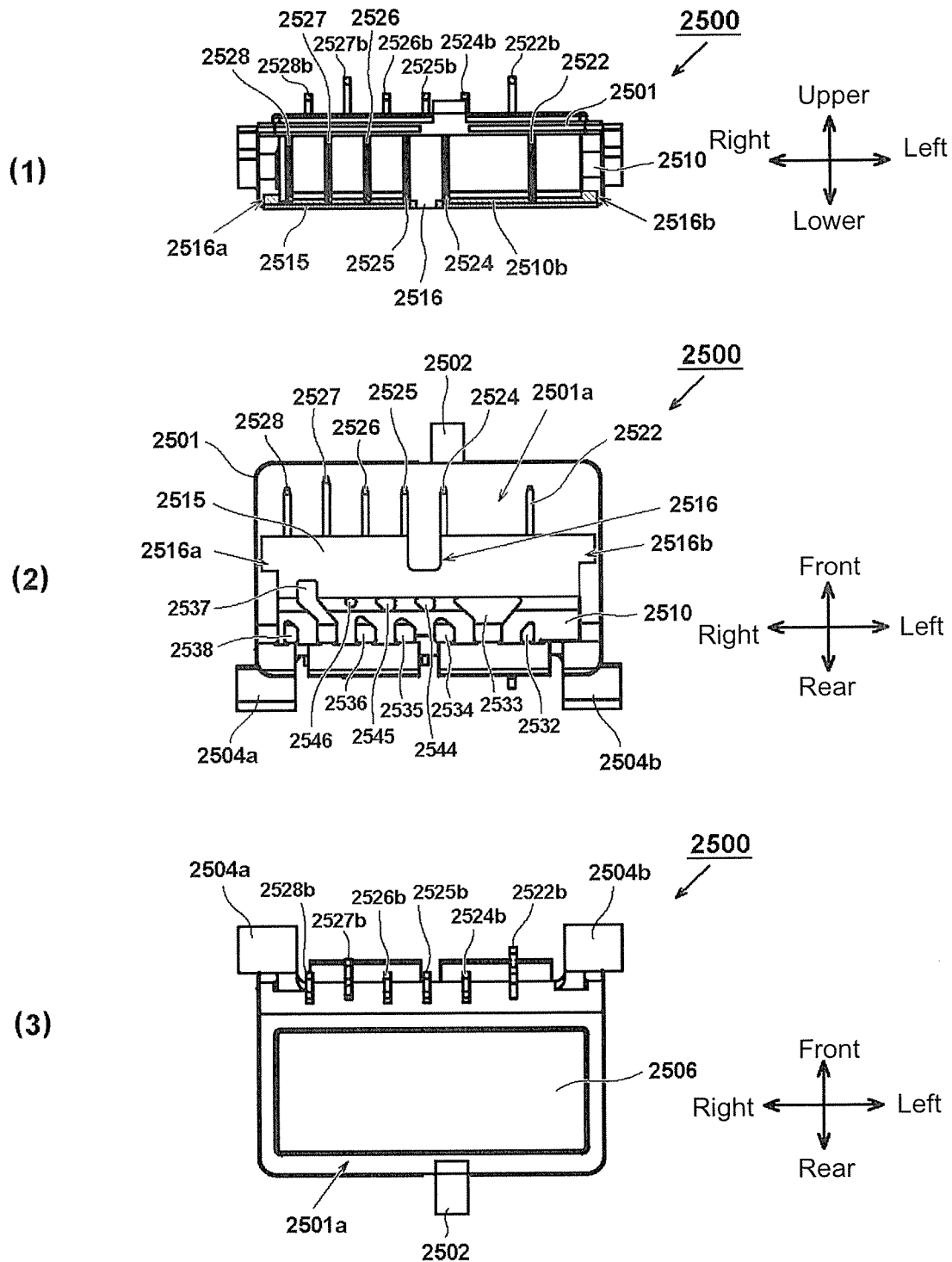

FIG. 79 is a diagram illustrating the terminal holder 2500 of FIG. 78. (1) of FIG. 79 and (3) of FIG. 79 are perspective views. (2) of FIG. 79 is a front view.

Figure 80:
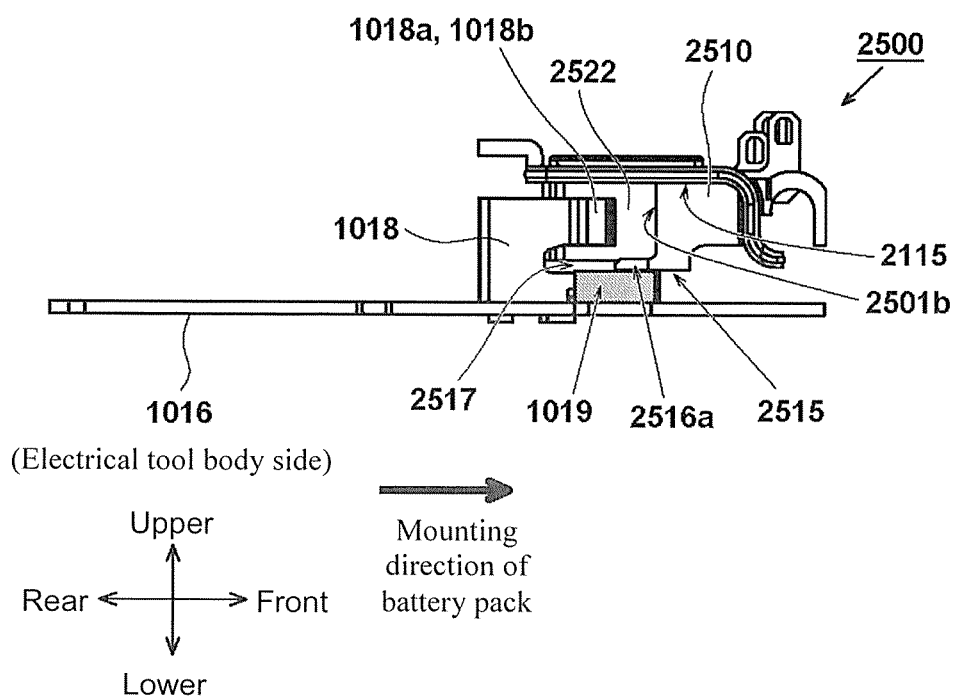

FIG. 80 is a partial side view illustrating a state where the terminal holder 2500 of FIG. 78 is connected to the above-mentioned battery pack 1015.

Figure 81:
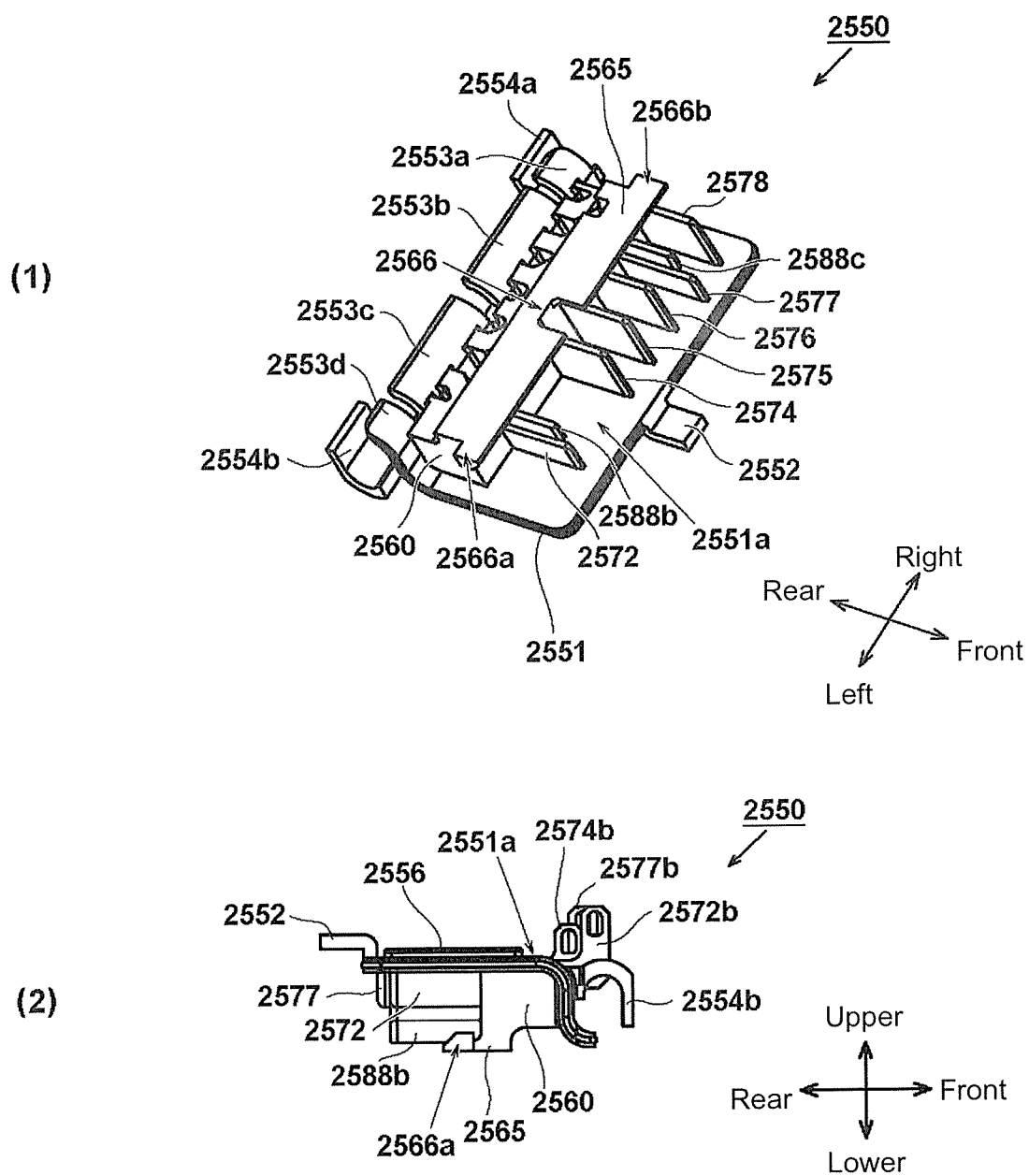

FIG. 81 is a diagram illustrating a shape of a terminal holder 2550 used for 36V of the twelfth embodiment of the invention. (1) of FIG. 81 is a perspective view viewed from the lower side. (2) of FIG. 81 is a left side view.

Figure 82:
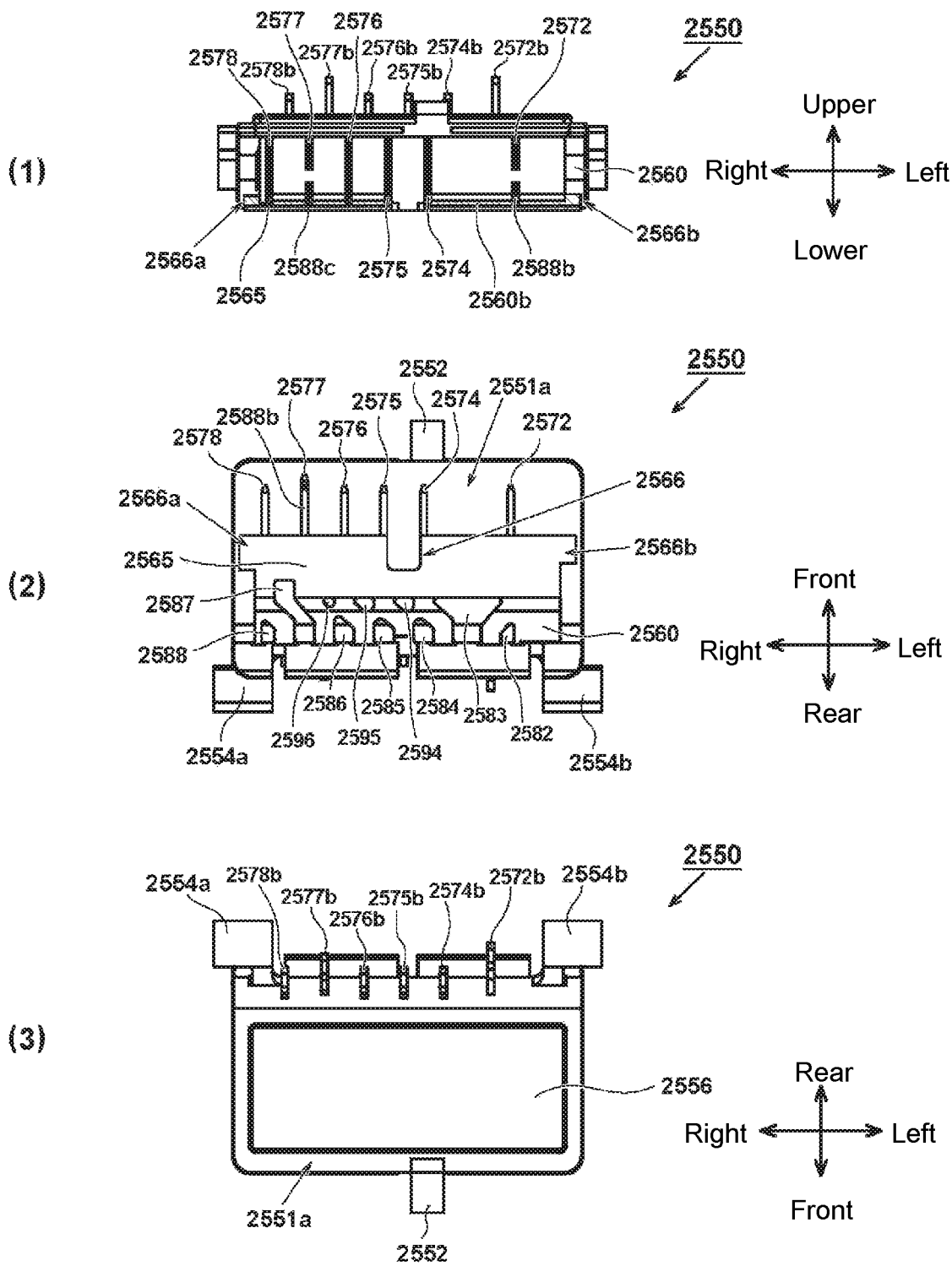

FIG. 82 is a diagram illustrating the terminal holder 2550 of FIG. 81. (1) of FIG. 82 is a front view. (2) of FIG. 82 is a bottom view. (3) of FIG. 82 is a top view.

Figure 83:
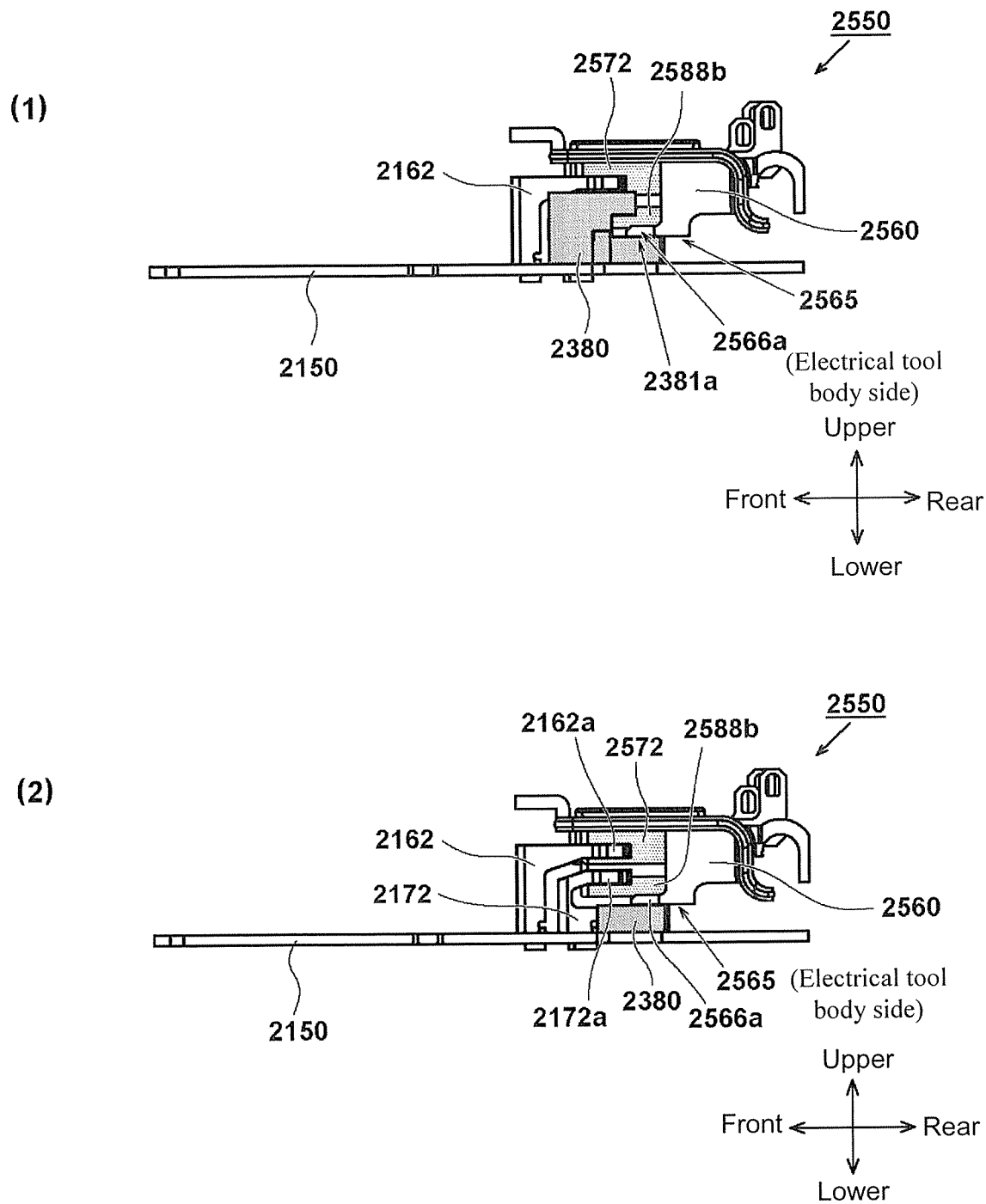

(1) of FIG. 83 is a side view of the terminal holder 2550 of FIG. 81, and (2) of FIG. 83 is a side view in which a side wall portion of the substrate cover 2180 is omitted as compared to (1) of FIG. 83.

Figure 84:
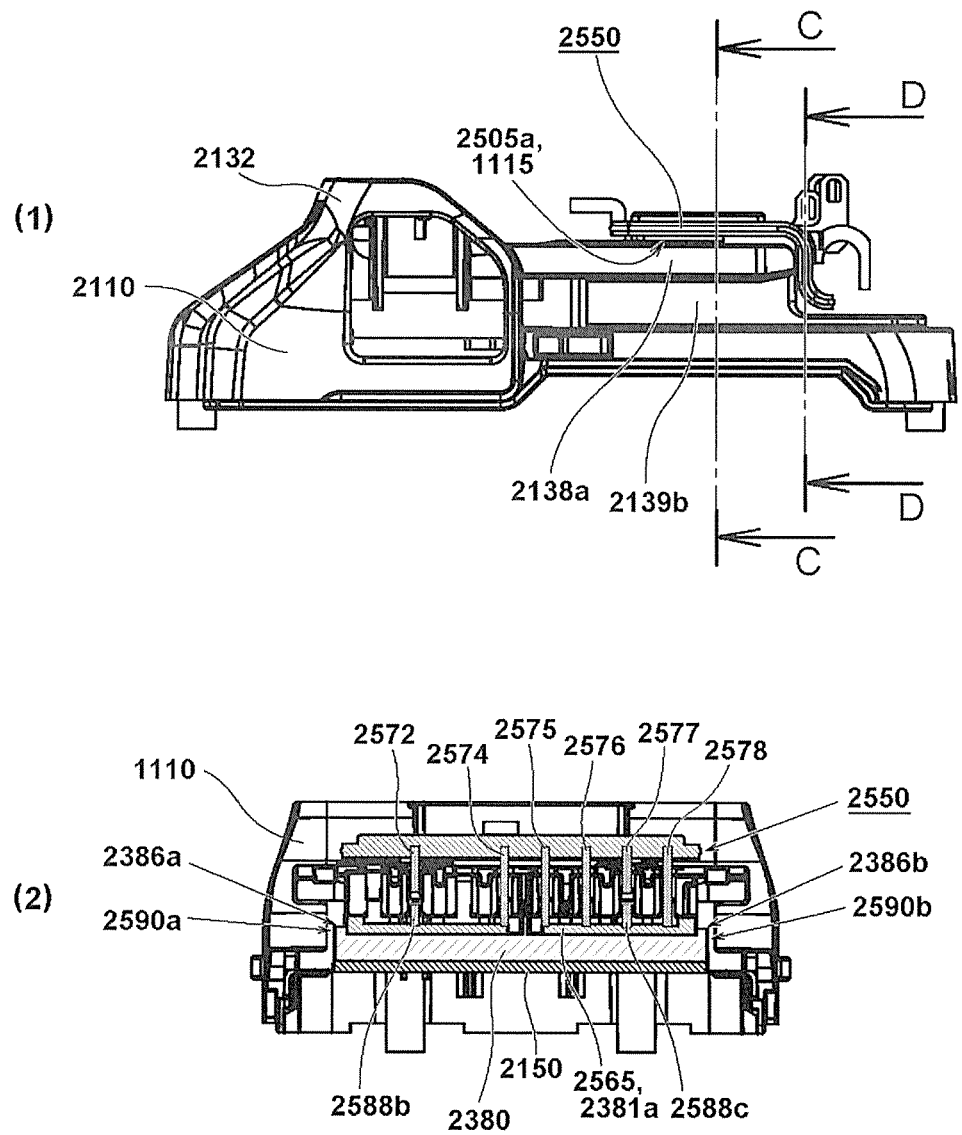

(1) of FIG. 84 is a right side view illustrating a state where the terminal holder 2550 is mounted in the battery pack 2100, and (2) of FIG. 84 is a cross-sectional diagram of line C-C in (1) of FIG. 84.

Figure 85:
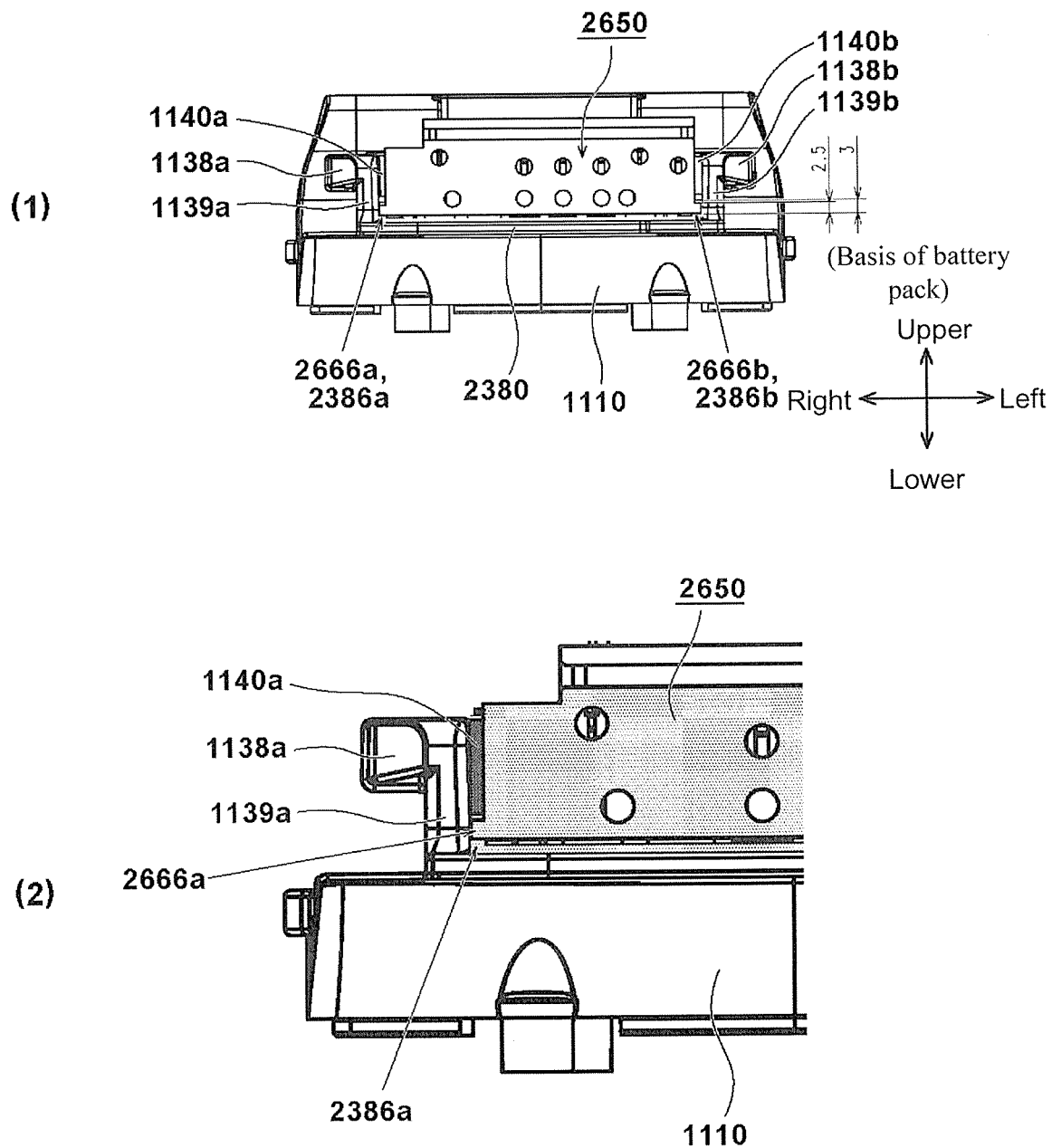

FIG. 85 is a diagram illustrating a terminal part 2650 of a modification example of the twelfth embodiment. (1) of FIG. 85 is a cross-sectional diagram corresponding to a portion of line D-D in FIG. 84. (2) of FIG. 85 is a partially enlarged view of (1) of FIG. 85.

Figure 86:
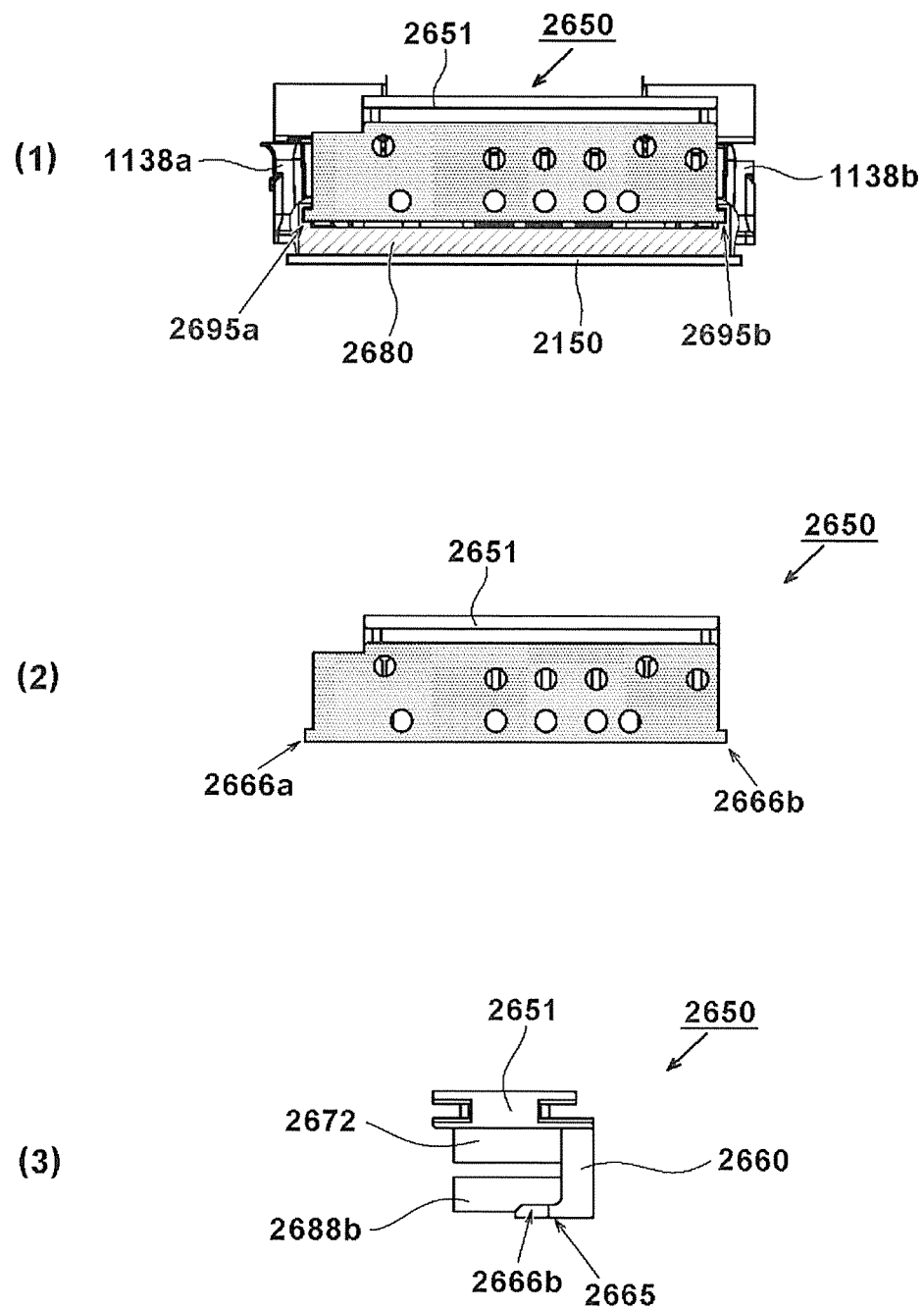

FIG. 86 is a diagram illustrating a modification example of fixing the terminal part 2650 of FIG. 85 to a substrate cover 2680. (1) of FIG. 86 is a cross-sectional diagram corresponding to the portion of line D-D in FIG. 84. (2) of FIG. 86 is a diagram of the terminal part 2650 of (1) of FIG. 86 alone. (3) of FIG. 86 is a left side view of the terminal part 2650.

Figure 87:
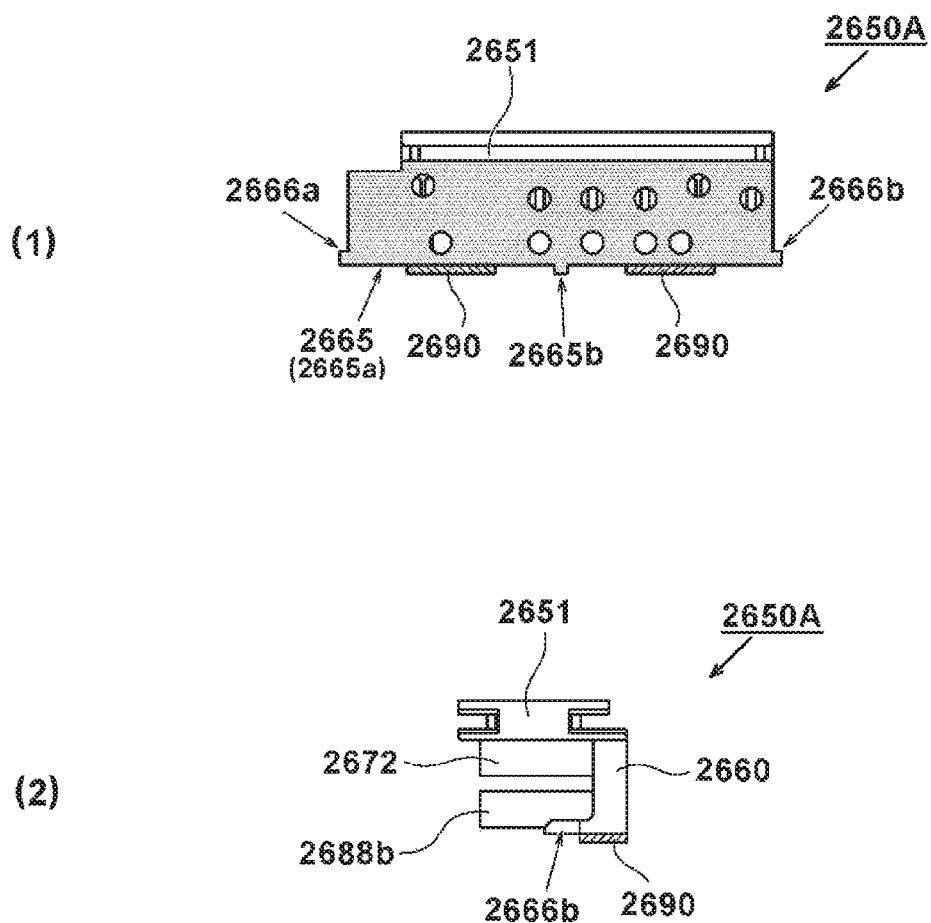

(1) of FIG. 87 is a modification example of the terminal part 2650 of FIG. 85, and (2) of FIG. 87 is a left side view of the terminal part 2650.

Figure 88:
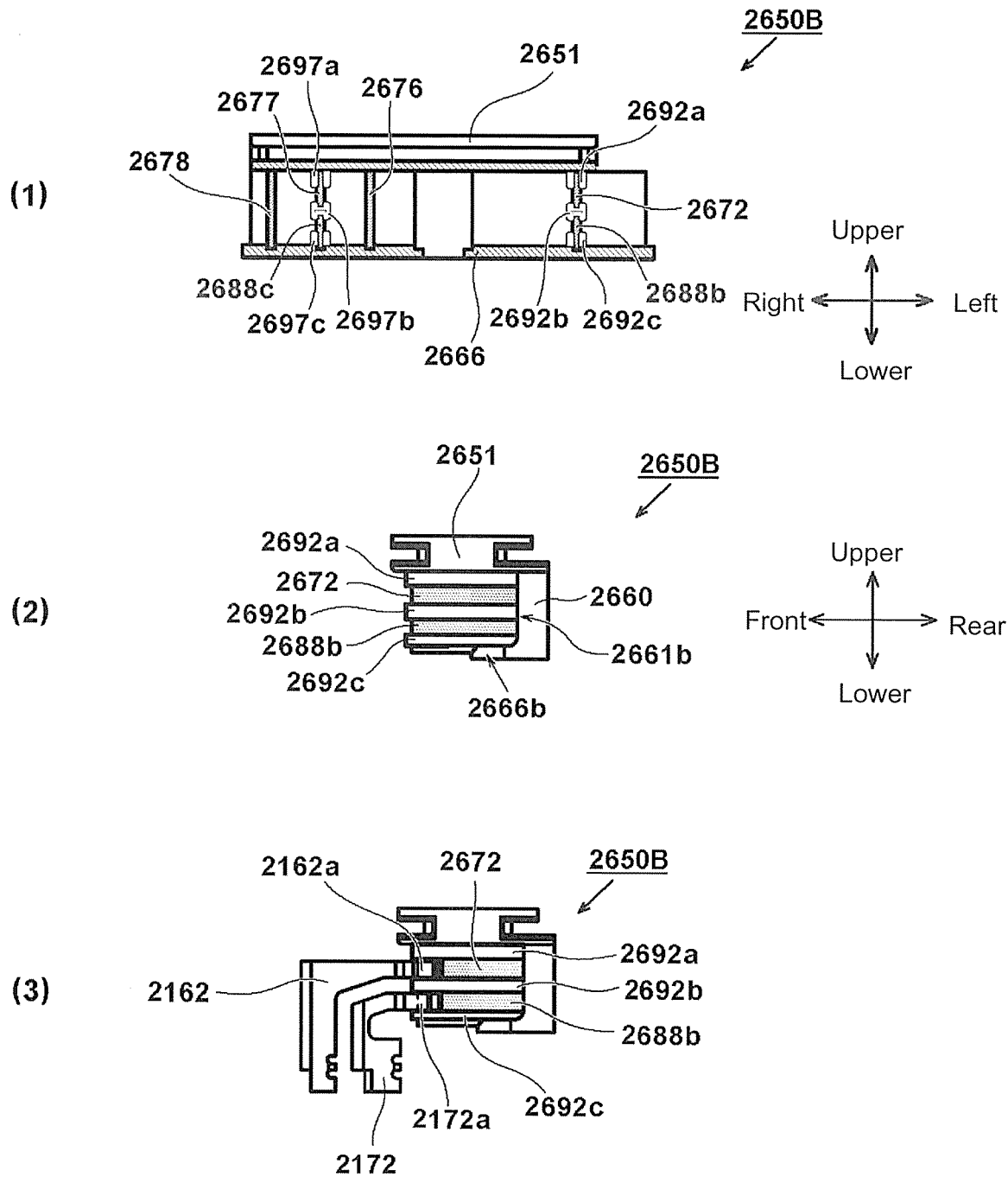

FIG. 88 is a diagram illustrating a terminal part 2650B of another modification example of the twelfth embodiment. (1) of FIG. 88 is a front view. (2) of FIG. 88 is a left side view. (3) of FIG. 88 is a left side view of the terminal part 2650B in a state of engagement with a connection terminal on the side of the battery pack 2100.

Figure 89:
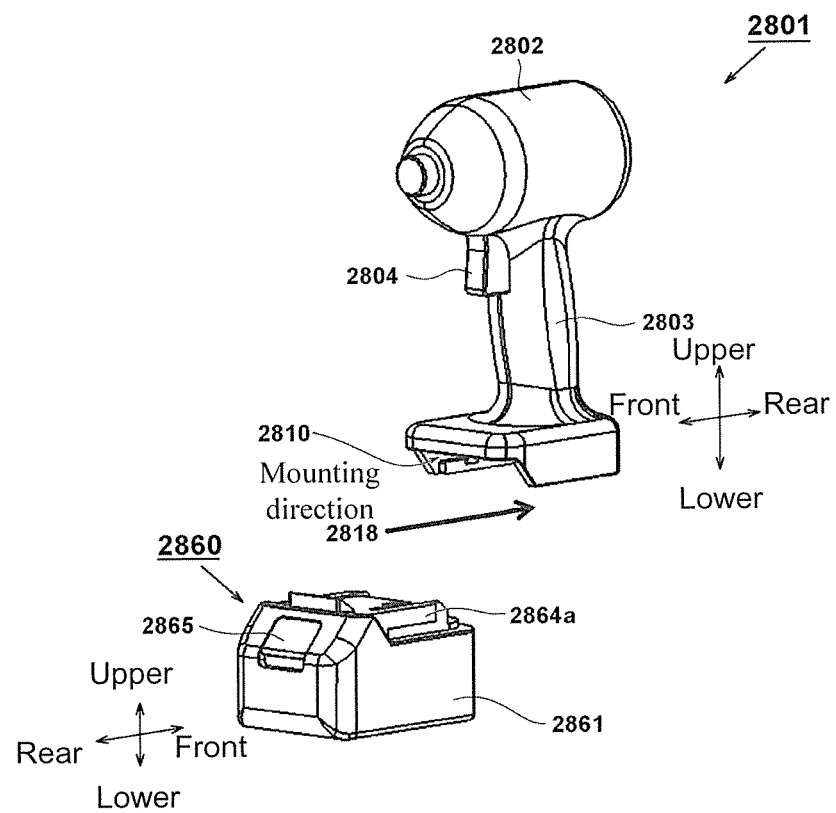

FIG. 89 is a perspective view for illustrating mounting of a battery pack 2860 of an electrical tool of a thirteenth embodiment.

Figure 90:
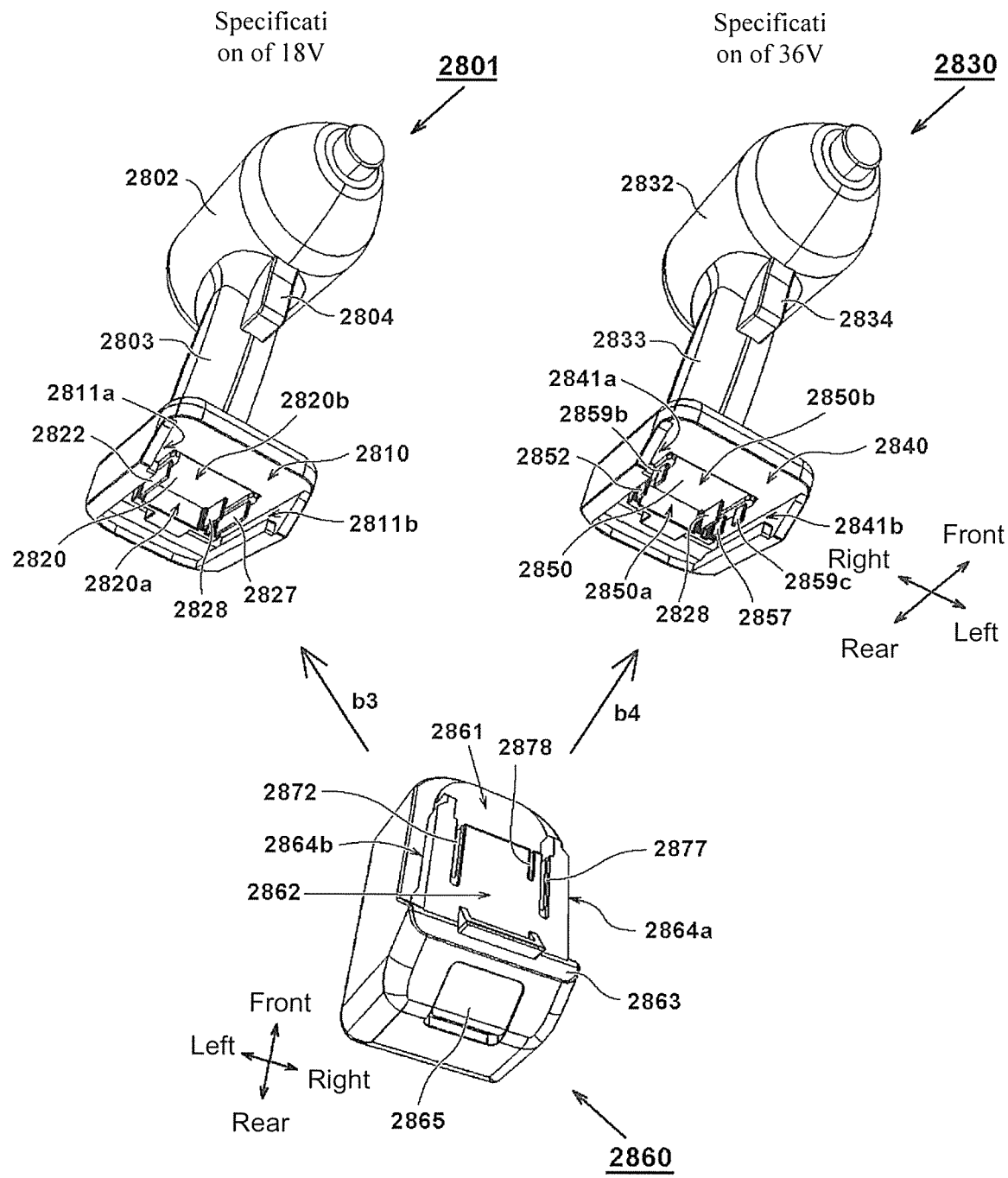

FIG. 90 is a diagram for illustrating mounting of a battery pack of the thirteenth embodiment to an electrical tool.

Figure 91:
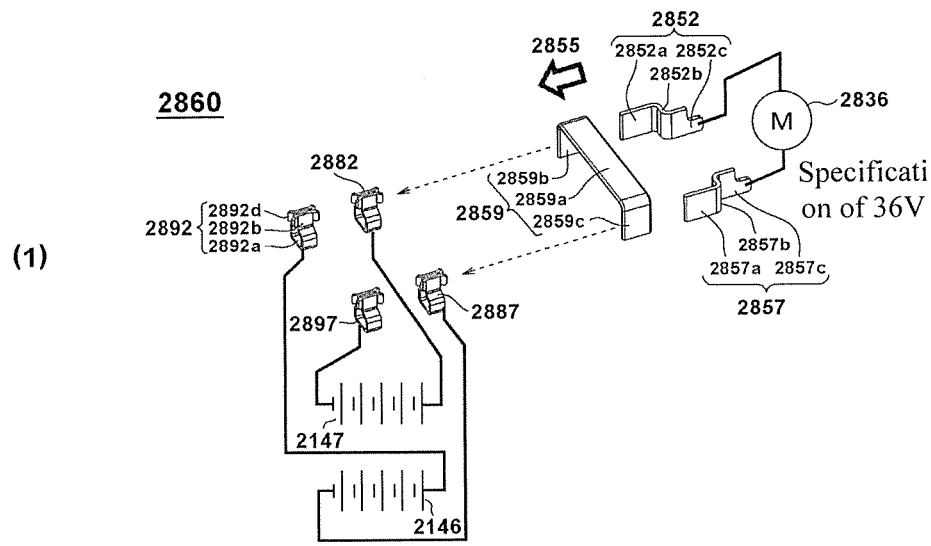
Figure 91:
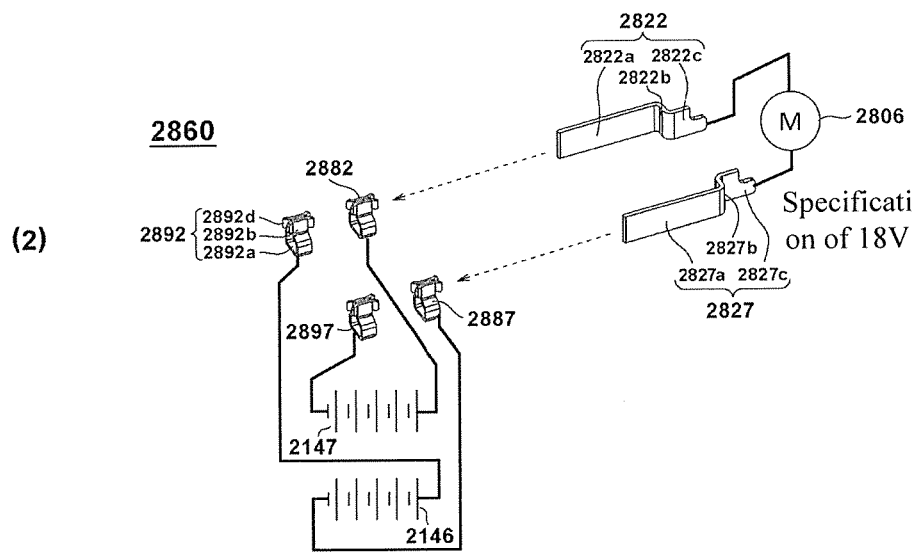

FIG. 91 is a perspective view illustrating a connection state of power terminals to an electrical tool body. (1) of FIG. 91 illustrates a state where the battery pack 2860 is mounted to an electrical tool body 2801 used for 18V. (2) of FIG. 91 illustrates a state where the battery pack 2860 is mounted to an electrical tool body 2830 used for 36V.

Figure 92:
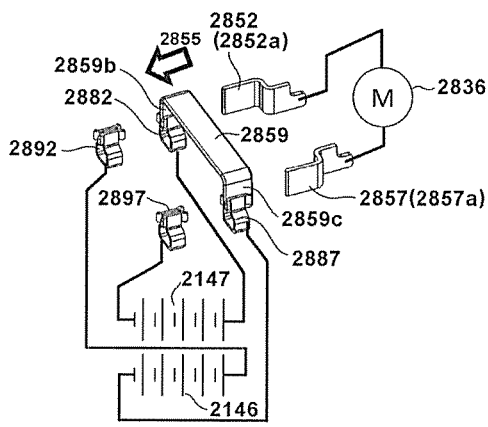
Figure 92:
Figure 92:
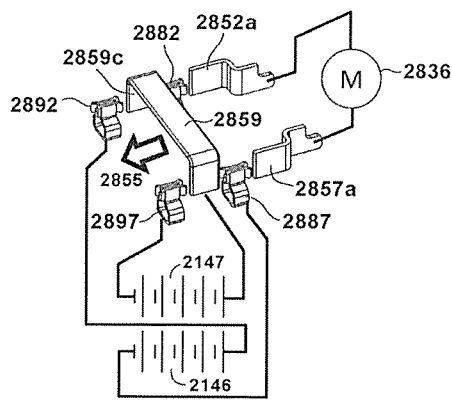
Figure 92:
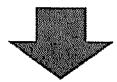
Figure 92:
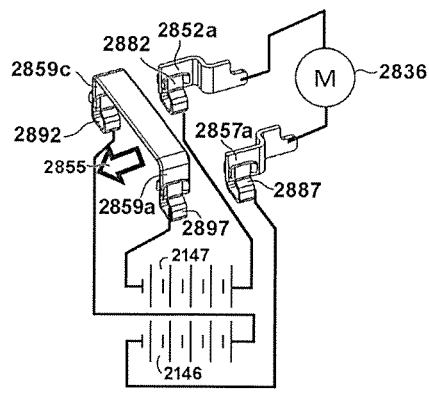

FIG. 92 is a diagram for illustrating a situation where the battery pack 2860 is mounted to the electrical tool body 2830 of a specification of 36V.

Figure 93:
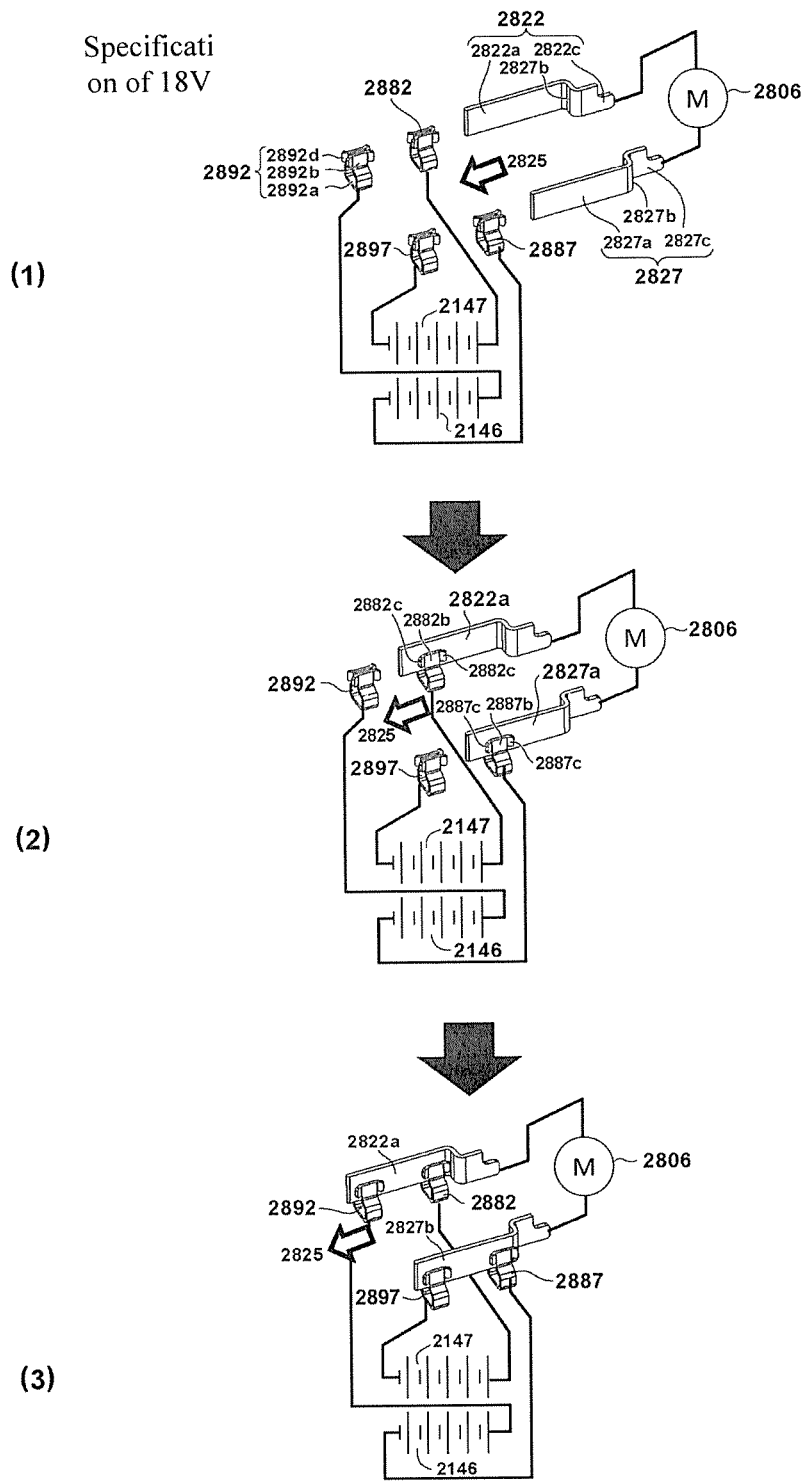

FIG. 93 is a diagram for illustrating a situation where the battery pack 2860 is mounted to the electrical tool body 2801 of a specification of 18V.

Figure 94:
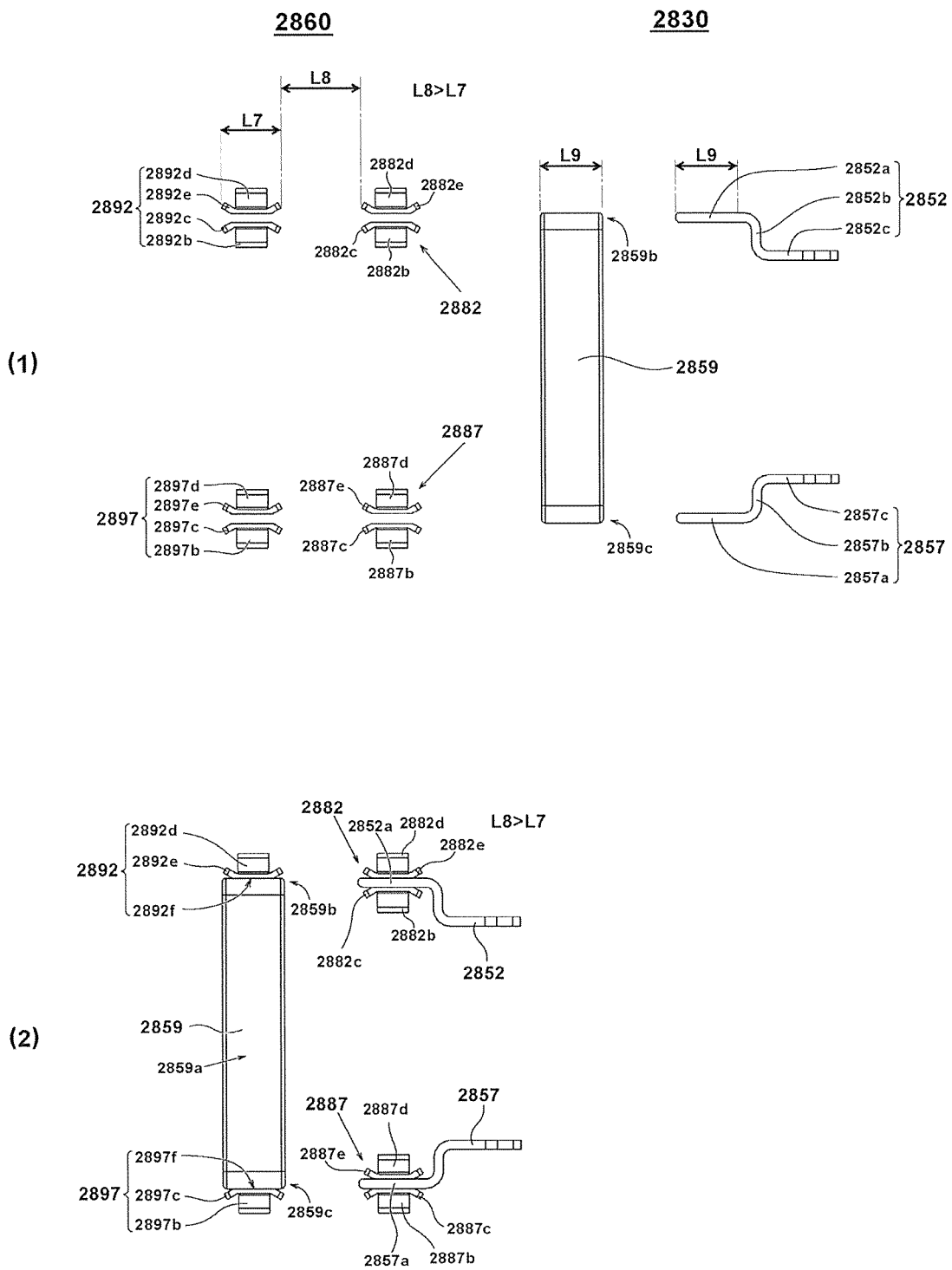

FIG. 94 is a top view illustrating terminal arrangement on the side of the battery pack 2860 and terminal shapes and arrangement of the electrical tool body 2830.

DESCRIPTION OF THE EMBODIMENTS

Embodiment 1

A first embodiment of the invention will be described below with reference to the drawings. Moreover, in the drawings below, the same parts will be labeled with the same numerals and repeated descriptions will be omitted. In addition, in the specification, description will be made by setting the front-rear direction and the upper-lower direction of an electrical tool body or the mounting direction of a battery pack, and the front-rear direction and the upper-lower direction of the battery pack when viewed alone as the directions shown in the drawings. Specifically, for ease of description, the mounting direction of the battery pack will be described based on the case where the battery pack is moved without moving the electrical tool body or the electrical device body.

Figure 1:
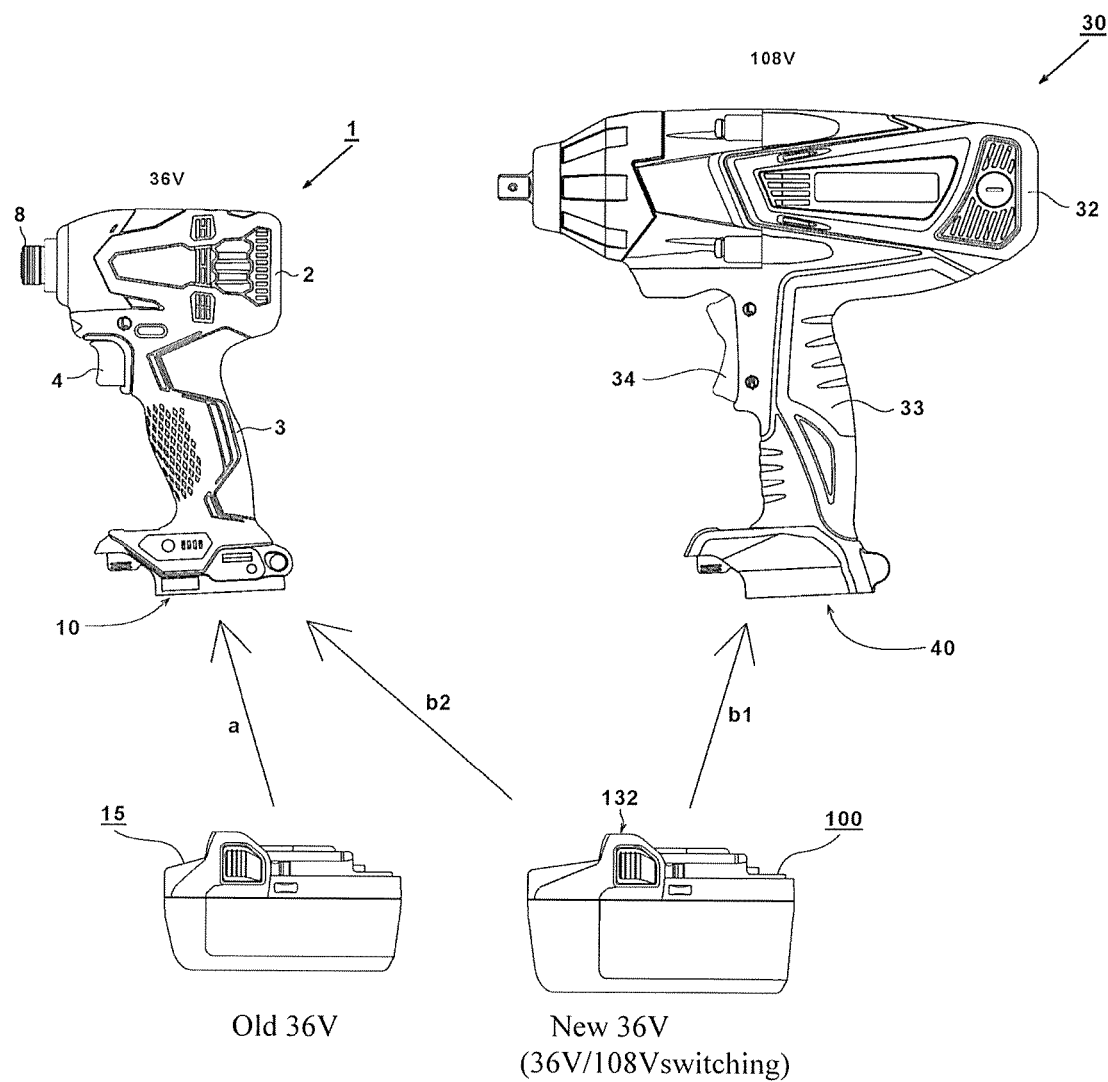
FIG. 1 is a diagram for illustrating mounting of a battery pack of the invention to an electrical tool.

FIG. 1 is a diagram for illustrating mounting of a battery pack of the present embodiment to an electrical tool. As a form of an electrical device, the electrical tool is a tool that includes a battery pack and fixes a bolt, a nut, a screw, etc. through a front end tool as a bit (i.e., an impact tool). An electrical tool body 30 is a tool that performs a fixing operation on a bolt or a nut (not shown) by applying a rotational force or an impact force in the axial direction to a front end tool such as a socket wrench (not shown). Such electrical tool bodies 1, 30 include housings 2, 32 as cases that form the contour. Handle parts 3, 33 are formed in the housings 2, 32. An operator performs the operation with one hand only, or by holding the electrical tool bodies 1, 30 with one hand while supporting the electrical tool bodies 1, 30 with the other hand. The electrical tool bodies 1, 30 use the direct current supplied by a battery pack 15 or 100 as the power source to drive a motor (not shown) housed inside the housings 2, 32. Trigger-shaped operation switches 4, 34 are disposed near a portion of the handle parts 3, 33 on which the index finger of the operator is rested when the operator holds the handle parts 3, 33. Battery pack mounting parts 10, 40 are formed on the lower side of the handle parts 3, 33 for mounting the battery packs 15, 100.

The electrical tool body 1 is an electrical device using the battery pack 15 rated at 36V. Therefore, as indicated by the assembly of arrow a, the battery pack 15 may be mounted to the battery pack mounting part 10 of the electrical device (electrical tool body 1) corresponding to 36V. On the other hand, the electrical tool body 30 requires a high voltage rated at 108V, which is as high as the commercial voltage. As indicated by arrow b1, the battery pack 100 capable of outputting 108V is mounted to the battery pack mounting part 40. Thirty Li-ion battery cells rated at 3.6V are housed inside the battery pack 100 capable of outputting a high voltage. As described above, the exclusively used battery packs 15, 100 corresponding to the rated voltages are generally mounted in the electrical tool bodies 1, 30. However, in the present embodiment, the battery pack 100 is formed to output in a low voltage even when corresponding to multiple voltages. Thereby, as indicated by arrow b2, the battery pack 100 may also be mounted to the electrical tool body 1 corresponding to 36V. To mount the battery pack 100 to the electrical tool bodies 1, 30 of different voltages as indicated by arrows b1, b2, it is important to configure the battery pack mounting parts 10, 40 to have substantially identical shapes and to be able to switch the voltage of the battery pack 100. Moreover, it is important to have a configuration in the following manner. In a case where the voltage set for the battery pack 100 does not correspond to the voltage of the mounted electrical device or electrical tool, the battery pack 100 cannot be mounted.

Figure 2:
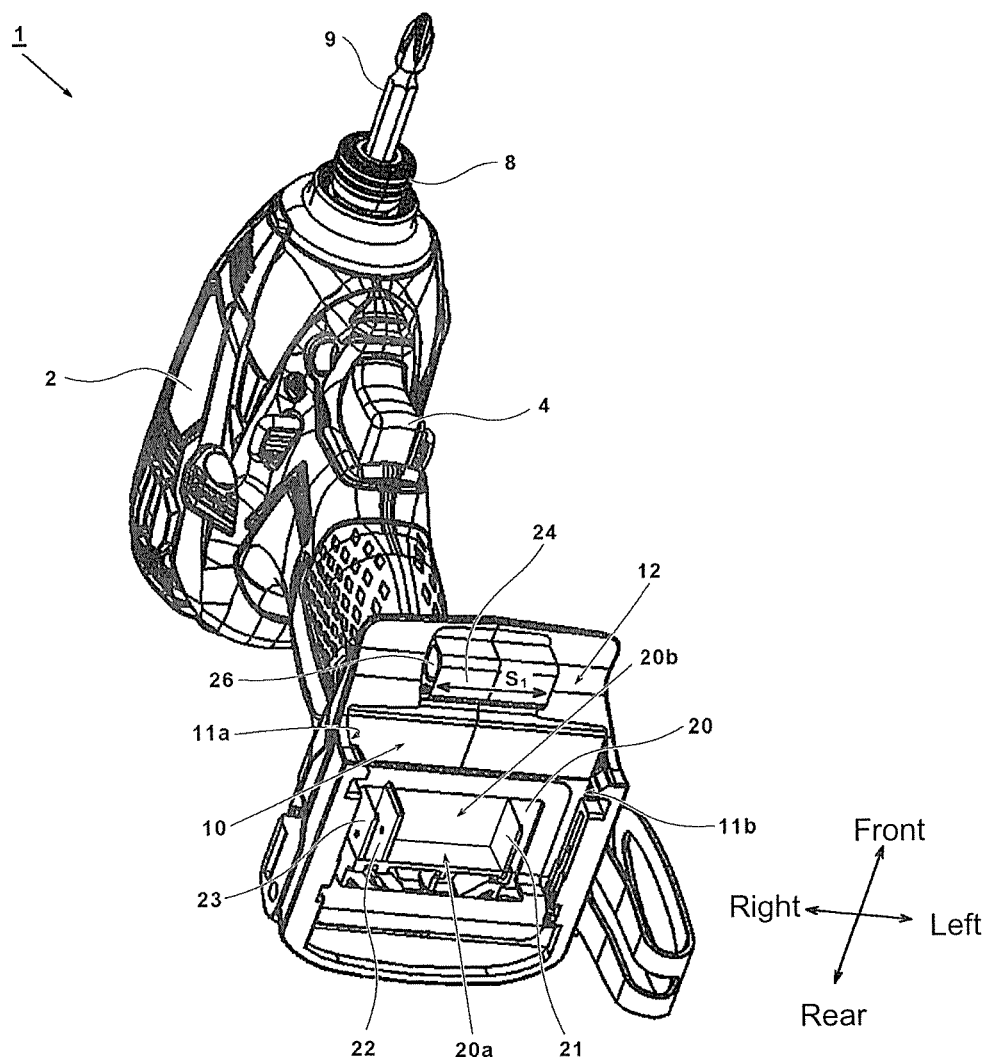
FIG. 2 is a perspective view illustrating a shape of a battery pack mounting part 10 of an electrical tool body 1 of FIG. 1.

FIG. 2 is a perspective view illustrating a shape of the battery pack mounting part 10 of the electrical tool body 1. The battery pack mounting part 10 matching the mounted battery pack is formed in all electrical device (not limited to the electrical tool only) using the battery pack and is formed to be unable to mount unsuitable battery packs. In the battery pack mounting part 10, rail grooves 11a, 11b extending in parallel along the front-rear direction are formed on inner wall portions on the left and right sides, and a terminal part 20 is disposed therebetween. The terminal part 20 is integrally made of a non-conductive material such as a synthetic resin, and three terminals made of metal, i.e., a positive input terminal 21, a negative input terminal 22, and an LD terminal 23 (abnormal signal terminal), are securely fixed therein by fusion casting. The LD terminal 23 (abnormal signal terminal) functions as a signal terminal for outputting or inputting information or signals. The terminal part 20 is not only formed with a vertical plane 20a as an abutting plane in the mounting direction (front-rear direction), but is also formed with a horizontal plane 20b (the upper surface when viewed from the terminals 21 to 23). The horizontal plane 20b becomes the plane that slides with respect to an upper step surface 115 (to be described below with reference to FIG. 7) at the time of mounting of the battery pack 100. A curved part 12 abutted with a raised part 132 of the battery pack 100 is formed on the front side of the horizontal plane 20b. A protrusion 24 is formed near the left-right center of the curved part 12. The protrusion 24 is a base for screw fixing the housing of the electrical tool body 1 that is formed of two portions divided in the left-right direction and is fixed in the left-right direction via the screw 26 and the nut. Moreover, the protrusion 24 also functions as a stop member that restricts the battery pack 100 from relatively moving toward the mounting direction. A width $S_1$ of the protrusion 24 in the left-right direction is a width corresponding to a stopper (to be described below) formed on the side of the battery pack 100.

Figure 3:
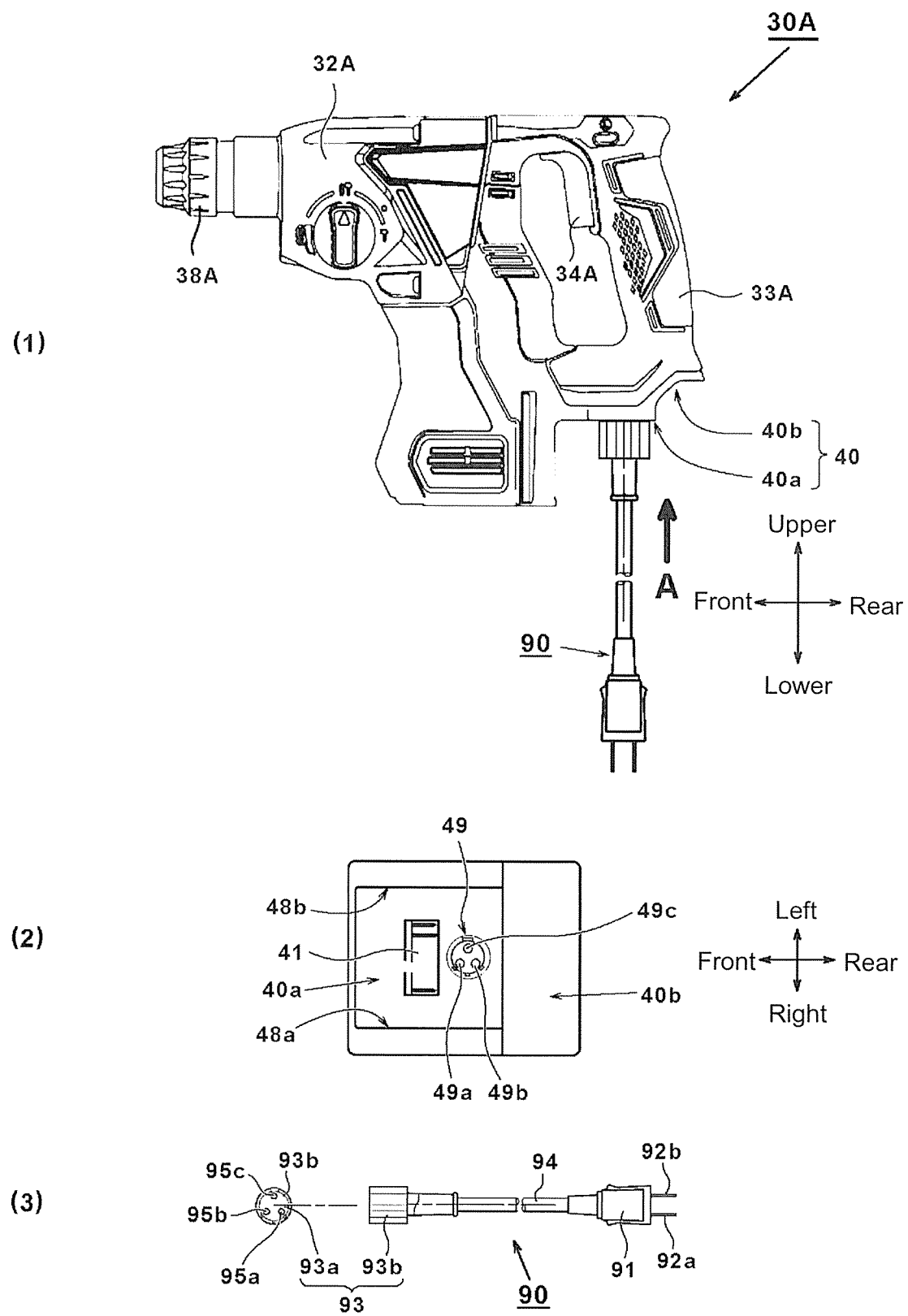
FIG. 3 is a diagram illustrating an electrical tool body 30A. (1) of FIG. 3 is a side view in a state with power supply from a power cord 90. (2) of FIG. 3 is a bottom view of a battery pack mounting part 40. (3) of FIG. 3 is a diagram illustrating shapes of the power cord 90 and a connector part 93.

FIG. 3 is a diagram illustrating another electrical tool body 30A corresponding to 108V. FIG. 3(1) is a side view in a state with power supply from a power cord 90. FIG. 3(2) is a bottom view of the battery pack mounting part 40. FIG. 3(3) is a diagram illustrating shapes of the power cord 90 and a connector part 93. The motor used in the electrical tool body 30A is a brushless motor having an equivalent specification to AC 100V, e.g., a brushless DC motor driven by an inverter circuit (to be described below with reference to FIG. 4). Accordingly, DC 108V output from the battery pack 100 is input to the inverter circuit, or a commercial power source such as AC 100V (60 Hz) is rectified by a rectification circuit (to be described below) and is then input to the inverter circuit. By raising the output voltage of the battery pack 100 to as high as the commercial voltage in this manner, the high output AC/DC electrical tool body 30A that can be operated with the battery pack and the commercial voltage can be realized. The power cord 90 mounted to the electrical tool body 30A includes two terminals 92a, 92b held on the side of a connection cord 94 and includes a plug part 91 for mounting to a socket of the commercial power source. A connector part 93 connected to the electrical tool body 30A is formed on the other side. In the present embodiment, the portion connected to the connector part 93 is disposed in the battery pack mounting part 40 from which the battery pack 100 is removed. In other words, in a case where the power cord 90 is connected to the electrical tool body 30A, it is required to remove the battery pack 100 from the electrical tool body 30A. Conversely, in a case where the battery pack 100 is mounted to the electrical tool body 30A, it is required to remove the power cord 90.

FIG. 3(2) is a diagram of the battery pack mounting part 40 of the electrical tool body 30A viewed from below and viewed in the direction of arrow A of FIG. 3(1). The figure illustrates the state after the battery pack 100 and the power cord 90 are both removed. In the battery pack mounting part 40, the battery pack 100 is slid from the rear side to the front side (from right to left in the figure) to mount the battery pack 100. Therefore, in a mounting surface 40a, an opening portion is formed on the upstream side of the mounting direction, and two rail grooves 48a, 48b are formed on the two lateral sides. Moreover, a recessed part 40b recessed toward the upper direction is formed even closer to the upstream side (rear side portion) than the opening portion. A terminal part 41 connected to positive electrode terminals or negative electrode terminals of the battery pack 100 is disposed near an approximate center of the portion sandwiched by the rail grooves 48a, 48b on the mounting surface 40a. In the present embodiment, an AC socket 49 is disposed at a portion slightly behind the terminal part 41. Pin-shaped first terminal 49a, second terminal 49b, and third terminal 49c are formed in a circumferential direction in the AC socket 49.

FIG. 3(3) is a diagram illustrating shapes of the power cord 90 and the connector part 93. On the left side is a diagram of the connector part 93 viewed from outside in the length direction. On the right side is a side view illustrating an overall shape of the power cord 90 including the connector part 93. A male screw thread is formed on the outer circumferential surface of a connector body 93a. On the outer circumferential side of the male screw thread, a cylindrical fixing screw 93b is maintained in a state where it can be rotated relatively and the movement amount in the axial direction is limited. The contour of the connector part 93 is circular. In the inner circumferential portion, three female terminals are disposed to be arranged in the circumferential direction: a first terminal 95a, a second terminal 95b, and a third terminal 95c. Here, to provide the commercial power source, it is possible to wire the first terminal 49a and second terminal 49b only. The third terminal 49c may be in an unwired state in the electrical tool body 30A or may be used as a grounding line. The fixing screw 93b holds the power cord 90 such that the power cord 90 does not fall off the electrical tool body 30A. A female screw thread portion on the inner circumferential side of the fixing screw 93b is screwed with a male screw thread portion formed on the outer circumferential surface of the AC socket 49. As such, after the connector body 93a is inserted into the AC socket 49, the fixing screw 93b is screwed in such that it is screwed with the male screw thread on the side of the AC socket 49. Thereby, the power cord 90 is fixed and does not fall off the electrical tool body 30A.

Figure 4:
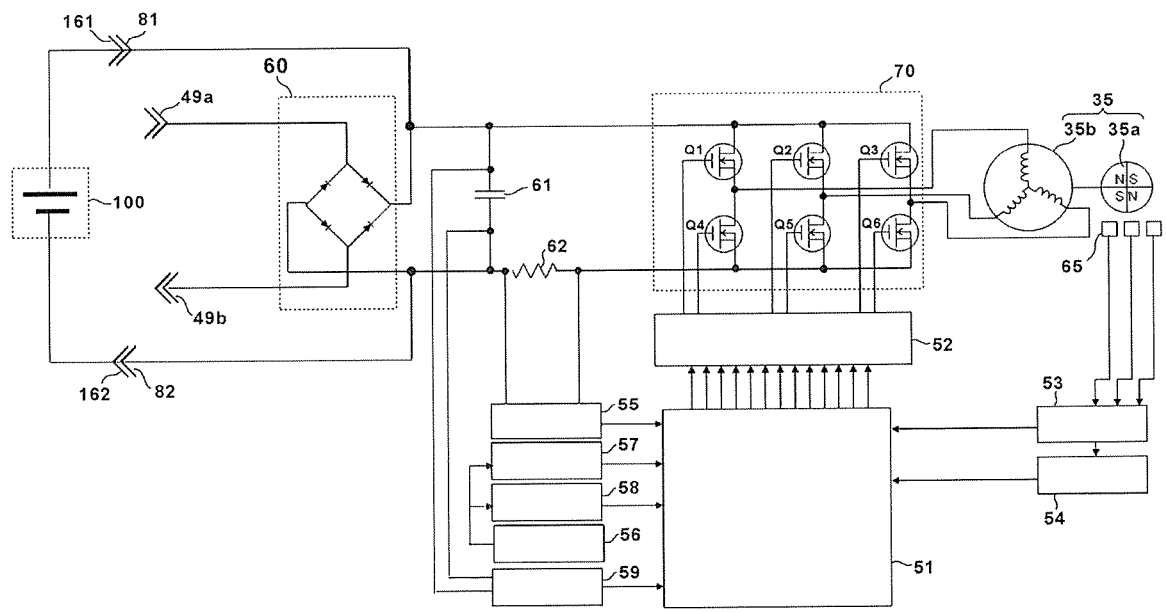
FIG. 4 is a block diagram illustrating constitution of a driving control system of a motor 35.

Next, constitution and function of a driving control system of a motor 35 will be described based on FIG. 4. FIG. 4 is a block diagram illustrating constitution of the driving control system of the motor 35. In the electrical tool of the present embodiment, an excitation current is generated by the inverter circuit 70 by using the DC supplied by the battery pack 100. The excitation current is switched while being flowed in predetermined coils of the motor 35 to thereby rotate the brushless motor 35. The input from the battery pack 100 is input via a positive input terminal 81 connected to a positive electrode terminal 161 of the battery pack 100 and a negative input terminal 82 connected to a negative electrode terminal 162 of the battery pack 100. The motor 35 is, for example, of an inner-rotor type and includes: a rotor 35a, formed to include a plurality of sets (two sets in the present embodiment) of permanent magnets including an N-pole and a S-pole; a stator 35b, including three-phase stator windings U, V, W formed by star connection; and three rotational position detection elements (Hall elements) 65, disposed at a predetermined interval (e.g., at the interval of 60°) in the circumferential direction to detect the rotational position of the rotor 35a. Such output is converted into a pulse train by a rotational position detection circuit 53 and is output to a calculation part 51. A rotational speed detection circuit 54 detects the rotational speed of the motor 35 by using the output of the rotational position detection circuit 53 and outputs it to the calculation part 51. The calculation part 51 determines the direction and time of power passage toward the stator windings U, V, W by using such outputs.

A control signal output circuit 52 generates a driving signal for switching predetermined switching elements Q1 to Q6 according to the instruction of the calculation part 51 based on the output signals of an applied voltage setting circuit 58 and the rotational position detection circuit 53, and outputs the driving signal to the inverter circuit 70. The inverter circuit 70 includes the six switching elements Q1 to Q6, which are insulated gate bipolar transistors (IGBT), connected in the form of three-phase bridges. The gates of the switching elements Q1 to Q6 are connected to the control signal output circuit 52, and the emitters or the collectors are connected to the stator windings U, V, W connected by star wiring. Thereby, the six switching elements Q1 to Q6 perform switching operations through switching element driving signals (driving signals H1 to H6) input from the control signal output circuit 52 to apply the DC voltage of the battery pack 100 applied to the inverter circuit 70 to the stator windings U, V, W in the form of three-phase (U phase, V phase, and W phase) voltages $V_U$, $V_V$, $V_W$.

The calculation part 51 sets through a switch operation detection circuit 57 whether to operate a trigger 34A (or the operation switches 4, 34 of FIG. 1) for operating an operation switch 56, alters the pulse width (duty ratio) of the pulse-width modulation (PWM) signal based on the signal from the applied voltage setting circuit 58 that varies according to the size of the operation amount (stroke), and drives the gates of the six switching elements Q1 to Q6 through the control signal output circuit 52. Through the driving control, the power supply amount to the motor 35 is adjusted, and starting/stopping and the rotational speed of the motor 35 are controlled. Here, the PWM signal is provided to any one of the positive power side switching elements Q1 to Q3 and the negative power side switching elements Q4 to Q6 of the inverter circuit 70, and the switching elements Q1 to Q3 or the switching elements Q4 to Q6 are switched rapidly to thereby control the power amount supplied from the DC voltage of the battery pack 100 to the stator windings U, V, W.

Although not shown, the calculation part 51 is formed to include a micro computer for outputting a driving signal based on processing programs and data. The calculation part 51 is formed to include a read only memory (ROM) for storing processing programs or control data, a random access memory (RAM) for temporarily storing data, a timer, etc. As the voltage of the input power source, two end voltages of a capacitor 61 are detected by a voltage detection circuit 59 and are output to the calculation part 51.

The power source of the electrical tool body 30A may not only be supplied by using the battery pack 100 but may also be supplied by using the power cord 90. The first terminal 49a and the second terminal 49b of the AC socket 49 for AC input disposed in the electrical tool body 30A are connected to the input side of a diode bridge 60. The diode bridge 60 is a rectification circuit that performs full-wave rectification by using four rectification diodes to cause the current to flow to any one only to convert the AC voltage into the DC voltage. The output of the diode bridge 60 is connected to the inverter circuit 70. The output of the diode bridge 60 is a pulsating flow. Therefore, a smoothing circuit may intervene between the diode bridge 60 and the inverter circuit 70. The size of the current flowing in the inverter circuit 70 may be measured by a current detection circuit 55 by using a shunt resistor 62. Its value is fed back to the calculation part 51 for adjustment to apply the set driving power is to the motor 35.

Figure 5:
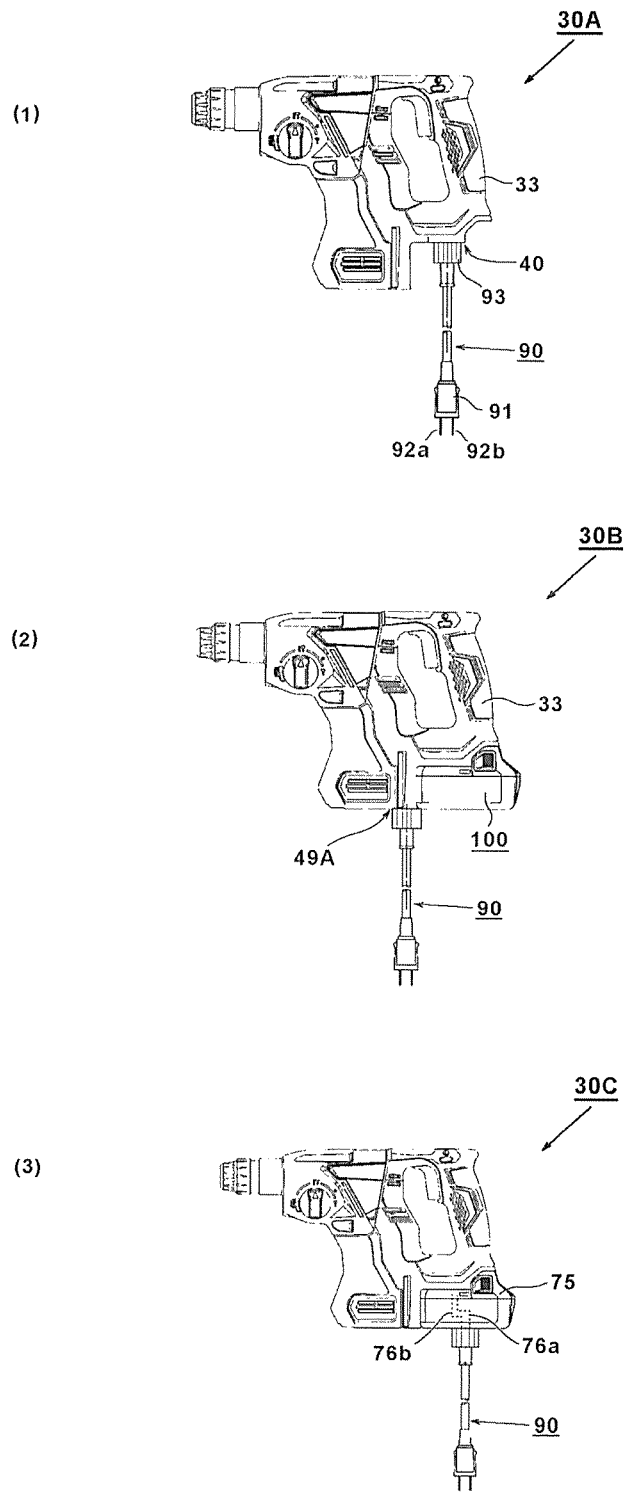
FIG. 5 is diagram for illustrating connection of the power cord 90 to an electrical tool body 30. (1) of FIG. 5 is a connection example of the electrical tool body 30A shown in FIG. 3 and FIG. 4. (2) of FIG. 5 and (3) of FIG. 5 are diagrams illustrating a connection example of a modification example thereof.

FIG. 5 is diagram for illustrating connection of the power cord 90 to the electrical tool body 30. FIG. 5(1) is a connection example of the electrical tool body 30A. FIG. 5(2) and FIG. 5(3) are diagrams illustrating a connection example of a modification example thereof. FIG. 5(2) and FIG. 5(3) are diagrams illustrating electrical tool bodies 30B, 30C of the modification example of the present embodiment. In the form of the present embodiment shown in FIG. 5(1), the AC socket 49 (see FIG. 3) is disposed in the battery pack mounting part 40. Therefore, when the battery pack 100 is mounted, the power cord 90 cannot be mounted. Moreover, when the power cord 90 is mounted, it is required to remove the battery pack 100. As such, the AC socket 49 for the power cord 90 is disposed at a position that cannot be reached when the battery pack 100 is mounted. Therefore, the power supply from the battery pack 100 and the power supply from the power cord 90 can be unerroneously separated in an exact manner. Moreover, the electrical tool body 30 is installed with a brushless motor of a rated input voltage at 100V or higher. Therefore, it may be driven by the commercial AC power source and may also be driven by the battery pack 100, thereby realizing an AC/DC electrical tool.

The power cord 90 is formed to have a length sufficient for the operator to operate in a state of holding the handle part 33 of the electrical tool body 30A with one hand. However, in a temporary operation in a case of insufficient length of the power cord 90, once the power cord 90 is removed and the battery pack 100 is mounted, the operation can be performed equally without concern that the output of the electrical tool body 30A is reduced. Moreover, the method of connection of the power cord 90 to the electrical tool body 30A in the form shown in FIG. 5(1) exhibits the following advantage. When the operation is performed through the AC power source, it is required to remove the battery pack 100. Therefore, the weight of the electrical tool body 30A is reduced. Furthermore, when the operation is switched from the power cord 90 to the battery pack 100, the battery pack 100 cannot be mounted if the power cord 90 is not removed, which can exactly prevent negligence of not removing the power cord 90. In addition, when the battery pack 100 is mounted, the AC socket 49 is not exposed outside. Therefore, the concern of exposing the AC socket 49 to dust, water, etc. can be significantly reduced, and the arrangement of a cover for covering the AC socket 49 can also be omitted.

FIG. 5(2) shows the electrical tool body 30B of the modification example of the electrical tool body 30A of FIG. 5(1). Here, an AC socket 49A is formed at a position in the lower surface of the housing of the electrical tool body 30B closer to the front side than the battery pack 100. With such configuration, the power cord 90 may be connected in a state where the battery pack 100 is mounted. In the present embodiment, the output voltage of the battery pack 100 is 108V at the time of DC connection, and the commercial AC power is 100V to 200V. Therefore, the electrical tool body 30B may be driven by arbitrarily using any of the two. Specifically, in a case where the two power sources are available, the use of the commercial AC power supplied from the power cord 90 prevents discharge of the battery pack 100 and is thus more desirable. Therefore, an input automatic switching member is disposed in the electrical tool body 30B of FIG. 5(2), such that the commercial AC power side can be used in the case where the battery pack 100 and the commercial AC power are both available.

FIG. 6(1) is a circuit block diagram of a driving control system of the electrical tool body 30B shown in FIG. 5(2). The figure is basically identical to the circuit shown in FIG. 4, but a switching element 66 formed of semiconductor (e.g., an IGBT) intervenes in the positive electrode side input line from the battery pack 100. A gate signal of the switching element 66 is connected to a control signal line 66a from the calculation part 51, and connection or disconnection between the source/drain terminals of the switching element 66 is controlled by the calculation part 51. Moreover, a battery voltage detection circuit 67 is disposed to monitor the voltage of the battery pack 100, and a commercial power supply detection circuit 68 is disposed to monitor the presence/absence (or the voltage) of the AC voltage. Respective outputs are input to the calculation part 51. The calculation part 51 switches off the gate signal of the switching element 66 when a commercial power supply 99 is in an available state to thereby disconnect the input circuit from the battery pack 100. On the other hand, if the commercial power supply 99 is in an unavailable state, the calculation part 51 switches on the gate signal of the switching element 66 to thereby bring the input circuit from the battery pack 100 in the connected state. With such circuit configuration, in the electrical tool body 30B, if the battery pack 100 is connected, the DC 108V (rated) is supplied. In this state, if the power cord 90 is connected to the AC socket, the supply is automatically switched to the AC power source. If the power cord 90 is removed, the battery pack 100 is automatically switched to for driving. Therefore, the electrical tool body 30B of excellent user convenience can be realized. Moreover, it is not necessary to worry about the removal/mounting of the battery pack 100 and the connection state of the power cord 90, especially when one is connected while the other one is not removed by negligence. Therefore, the mounting and removal of the battery pack 100 also becomes easy.

Referring back to FIG. 5, FIG. 5(3) shows the electrical tool body 30C of another modification example of the present embodiment. The electrical tool body 30C is identical to FIG. 5(1) and FIG. 5(2) in that it can be driven by both the battery pack 100 of DC 108V and the AC of the power cord 90, but differs in that the power cord 90 is connected via a connection adapter 75. Here, the connection adapter 75 is a so-called dummy case used to connect the two output lines from the power cord 90 to the positive input terminal 81 and the negative input terminal 82 for the battery pack 100. Battery cells are not housed inside the connection adapter 75. An AC socket having the same shape as the AC socket 49 shown in FIG. 3(2) is disposed on the lower surface of the connection adapter 75. A first terminal 49*a* of the AC socket 49 is connected to the positive input terminal 81 via a power line 76*a*, and the second terminal 49*b* is connected to the negative input terminal 82 via a power line 76*b*. Moreover, in this case, a change is made to the input path of the battery pack 100 in the block diagram shown in FIG. 4, such that it is also connected to the inverter circuit 70 via the diode bridge 60 when the battery pack 100 is used. FIG. 6(2) shows such circuit.

Here, the positive electrode terminal 161 and the negative electrode terminal 162 of the connection adapter 75 are mounted in the input terminals 81, 82 of the diode bridge 60. The battery pack 100 is DC 108V. Therefore, connection via the diode bridge 60 also causes no problem. In addition, even though the positive electrode terminal 161 and the negative electrode terminal 162 of the connection adapter 75 are mounted, the AC can also be rectified through the diode bridge 60. Therefore, the inverter circuit 70 may similarly be operated to drive the motor 35. In the present embodiment, the brushless DC motor is set to be driven by the DC input of DC 108V and the inverter circuit 70, but the type of the motor used is not limited to the brushless motor and may also be another motor, e.g., an AC rectifier motor, driven by about AC 100V to 120V. With such configuration, the electrical tool using the AC rectifier may also be driven by the battery pack 100, and the AC/DC electrical tool can be easily realized.

Next, referring to FIG. 7 to FIG. 9, the battery pack 100 capable of switching the output circuit to 36V and 108V will be described. FIG. 7 is a perspective view illustrating an appearance/shape of the battery pack 100. The case body of the battery pack 100 includes a lower case 101 and an upper case 110 divided in the upper-lower direction and fixed by four screws (not shown). The upper case 110 is formed with a mounting part formed with two rails 138*a*, 138*b* for mounting to the battery pack mounting part 40. The rails 138*a*, 138*b* are formed in a direction parallel to the mounting direction of the battery pack 100 and are parallel to the left and right side surfaces of the upper case 110. The rails 138*a*, 138*b* are formed to correspond to the rail grooves 48*a*, 48*b* (see FIG. 3(2)) formed in the battery pack mounting part 40 of the electrical tool body 30. In a state where the rails 138*a*, 138*b* and the rail grooves 48*a*, 48*b* are engaged with each other, a latch mechanism operation is performed to fix the battery pack 100 to the electrical tool body 30. A planar lower step surface 111 is formed on the front side of the upper case 110, and an upper step surface 115 formed to be higher than the lower step surface 111 is formed near the center. The connection portion of the lower step surface 111 and the upper step surface 115 forms a stepped part 112 having a stepped shape. A slot group arrangement area 120 (see FIG. 7(2)) is formed from the stepped part 112 to the front side region of the upper step surface 115. A plurality of slots (121 to 124) extending from the stepped part 112 on the front side to the rear side in the slot group arrangement area 120. Here, the positive electrode terminal insertion slot 121 is disposed on the side close to the left side rail 138*b*, and the negative electrode terminal insertion slot 122 is formed on the side close to the right side rail 138*a*. The low voltage switching member insertion slot 123 and the high voltage switching member insertion slot 124 are formed in the portion sandwiched between the positive electrode terminal insertion slot 121 and the negative electrode terminal insertion slot 122. A positive electrode terminal and a negative electrode terminal (not shown in the figure) made of metal are disposed inside the positive electrode terminal insertion slot 121 and the negative electrode terminal insertion slot 122. Moreover, a voltage switching member (to be described below) is disposed in a portion (the internal space of the upper case 110) overlapping the positions of the low voltage switching member insertion slot 123 and the high voltage switching member insertion slot 124. Moreover, FIG. 7 shows that there are only four slots (121 to 124) in the slot group arrangement area 120 and does not show slots other than the four slots. However, it is also possible to form slots for accommodating other connection terminals. In addition, as mentioned above, terminals or voltage switching members (e.g., switching terminals) are disposed in the internal space of the upper case 110 on which the slot group arrangement area 120 is located. Therefore, the slot group arrangement area 120 forms the terminal arrangement area.

A raised part 132 formed in a raised manner is formed on the rear side of the upper step surface 115. The contour of the raised part 132 is raised to closer to the upper side than the upper step surface 115, and a pit-shaped stopper 131 is formed near its center. The stopper 131 forms the abutting surface when the battery pack 100 is mounted to the protrusion 24 (see FIG. 2) of the battery pack mounting part 10. If insertion is performed until the protrusion 24 on the side of the electrical tool body 1 abuts the stopper 131, the plurality of terminals 21 to 23 (see FIG. 2) disposed on the electrical tool body 1 and the terminal group disposed on the battery pack 100 contact each other and are brought into a conducted state. A slit 134 is disposed on the inner side of the stopper 131 to function as a cooling wind inlet communicating with the inside of the battery pack 100. Moreover, a locking part of a latch 141 of the battery pack 100 protrudes toward the outer side of the vertical direction from the lower portion of the rails 138*a*, 138*b* due to the effect of a spring and is engaged with a concave part (not shown) formed in the rail grooves 48*a*, 48*b* of the electrical tool body 30 to thereby prevent falloff of the battery pack 100. Here, in a state where the battery pack 100 is mounted to the electrical tool body 1, the slit 134 is covered such that it cannot be perceived from the outside. The slit 134 is a wind window used to compulsorily flow cooling air into the battery pack 100 when the battery pack 100 is connected to a charger (not shown) for charging. When mounted to the electrical tool body 30, the cooling wind inlet 134 is brought into a closed state.

In FIG. 7(1), the terminal part 20A located on the side of the electrical tool body 1 driven by 36V is formed by fixing the positive input terminal 21 and the negative input terminal 22 made of metal to the terminal mounting part made of synthetic resin. Here, a switching protrusion 24A is further formed to switch the output of the battery pack 100 to the low voltage side. The switching protrusion 24A is a switching element integrally formed with the base portion of the terminal part 20A and is made of synthetic resin. The switching protrusion 24A itself only functions to move the rotational terminal base 171 (see FIG. 9) and does not function as a terminal for transmitting power or signals. Therefore, it is not required to be made of a conductive material and it may be integrally formed with the base portion of the terminal part by using the same insulating material.

FIG. 7(2) illustrates a state of mounting of a terminal part 80 on the side of the electrical tool body 30 driven by 108V. The terminal part 80 is formed by fixing the positive input terminal 81 and the negative input terminal 82 made of metal to the base portion made of synthetic resin. Here, a switching protrusion 84 is further formed to switch the output of the battery pack 100 to the high voltage side. The switching protrusion 84 is a member integrally formed with the base portion of the terminal part 80 and is made of synthetic resin. According to the present embodiment, the appearance/shape of the battery pack 100 is identical in 36V output and 108V output. Without being aware of the setting of the output voltage of the battery pack 100, the operator can select (switch to) the output voltage that best suits the mounted electrical device body through the switching protrusion 24A or the switching protrusion 84 as the operator simply mounts it to the electrical device body for 36V or the electrical device body for 108V.

FIG. 8 is a perspective view illustrating the appearance of a cell pack 150. The cell pack 150 is accommodated inside the battery pack 100 and is formed by stacking and aggregating a plurality of cells 151 into one pack. FIG. 8(1) is a perspective view. FIG. 8(2) is a side view viewed from an axial direction of the cell 151. Here, it is formed by stacking thirty cells 151 in total, which are of the so-called 14500-size with a diameter of 14 mm and a length of 50 mm and include secondary batteries that can undergo multiple charges and discharges. Each ten cells 151 are set as a unit, and three cell units 156 to 158 are formed. In each of the cell units 156 to 158, the cells 151 are stacked such that the axis A1 is parallel to each other and are disposed such that orientations of the adjacent cells 151 are alternately opposite to each other. A metal thin plate 159 connects the positive electrode terminal and the negative electrode terminal of the adjacent cells 151 to form a ten-cell series connection. The cylindrical portion on the outermost side of the stacked cells 151 is covered by a separator 152 made of synthetic resin functioning as an insulator. Thereby, the cells 151 are maintained such that they do not move with respect to the separator 152. In a case where the Li-ion batteries are used as the cells 151 (the rated output of one cell is 3.6), each of the cell units 156 to 158 can obtain an output rated at 36V. Therefore, the output guided from the battery pack 100 in a state where the + output (positive output; positive electrode terminals) and the − output (negative output; negative electrode terminals) of the cell units 156 to 158 are connected to each other in parallel may be used as a large capacitance power source of 36V. On the other hand, if the + output and the − output of the cell units 156 to 158 are set to be connected to each other in series, they may be used as a high voltage power source of 108V.

If thirty 14500-size cells 151 are stacked, the length in the axial direction becomes 50 mm, the width direction perpendicular to the axial direction becomes 124.8 mm, and the height direction perpendicular to the axial direction becomes 57.3 mm. Moreover, the weight of one single cell 151 is about 23 g. Therefore, the total weight of the cells 151 becomes 690 g. Regarding the volume, the volume occupied by the cells 151 is 230,907 mm3, the volume occupied by the separator 152 is 67,392 mm3, and the total volume becomes 298,299 mm3. Therefore, the total weight of the battery pack 100 may be limited to be less than 800 g or 21 b (pound). Currently, the Li-ion battery generally used in the battery pack of an electrical tool is the so-called 18650-size battery. The 18650-size means that the diameter is 18 mm, the length is 65 mm, and the volume is slightly over twice of the 14500-size cell. The weight (i.e., 46 g) is twice of the 14500-size cell. If thirty 18650-size cells are stacked to obtain DC 108V, the weight of the cells alone becomes 1380 g, which causes the weight of the battery pack itself to increase. Therefore, the size and weight become impractical in the electrical tool which the operator operates while holding with one hand.

According to the experiment of the inventors, it is known that, to allow the operator to operate with one hand in a comfortable manner, the upper limit on the total weight of the electrical tool mounted with the battery pack is within 2 kg or 5 l b. Therefore, in a case where thirty 18650-size cells are used to obtain the 108V output, it is difficult to realize a portable electrical tool that can be operated with one hand. In the present embodiment, by stacking 14500-size Li-ion batteries having the same size as the N-size dry cells, the electrical tool that maintains portability while having a high voltage can be realized. The battery pack 100 according to the present embodiment exactly ensures an output voltage of 100V or higher equivalent to the AC power source, and limits the cell weight of the cell pack 150 to 0.69 kg. A current of about 15 A may be obtained from the Li-ion battery. Therefore, the power-to-weight ratio of the battery pack may be reset as values of 100V×15 A/0.69 kg=2173 W/kg or more and 100V/0.69 kg=144 V/kg or more.

FIG. 9(1) is a diagram illustrating a state when the battery pack 100 is mounted on an electrical tool body or an electrical device body rated at 36V. The battery pack 100 is formed to include a voltage switching mechanism 170 for switching between series connection and parallel connection of the output of the cell units 156 to 158. As the element for switching the output voltage of the battery pack 100 (i.e., the voltage switching element), the voltage switching mechanism 170 is formed to include a rotational terminal base 171 pivotally supported by a swinging shaft 172 fixed on a substrate 160. It is disposed in the terminal arrangement area, which is disposed with power source connection terminals, in the mounting direction of the battery pack 100. The rotational terminal base 171 is a member as follows. A plurality of rectangular bar-shaped connection terminals 173a to 173d are disposed in members extending in two directions from the swinging shaft 172 to cause a plurality of contacts located on the inner peripheral side and contacts located on the outer peripheral side of the connection terminals 173a to 173d to be short-circuited or open-circuited. The rotational terminal base 171 functions as an operation part for operating the changeover switch for switching the output voltage of the battery pack 100. The rotational terminal base 171 is made of synthetic resin, and two of the connection terminals 173a to 173d made of metal are fused at an interval respectively on one side and the other side of the swinging shaft 172. On the side close to the negative electrode terminal 162, the connection terminals 173a and 173b are disposed to expose the surface on the side opposite to the substrate 160. On the side close to the positive electrode terminal 161, the connection terminals 173c and 173d are disposed to expose the surface on the side opposite to the substrate 160.

The substrate 160 is used to fix the positive electrode terminal 161 and the negative electrode terminal 162 and is used to dispose a plurality of electrodes (contacts) 176a to 176j for establishing or changing the electrical connection paths from the terminals to the cell units 156 to 158. The plurality of contacts 176a to 176j are disposed in a region in the upper portion of the substrate 160 that partially overlaps the rotation region of the rotational terminal base 171. By contacting the connection terminals 173a to 173d exposed from the lower surface of the rotational terminal base 171 with any one of the contacts 176a to 176j, the electrical connection path from the positive electrode terminal 161 to the negative electrode terminal 162 is changed. The plurality of contacts 176a to 176j and the connection terminals 173a to 173d function as the changeover switch operated through the operation part for switching the output voltage of the battery pack 100. In the electrical tool body 1 for 36V, the switching protrusion 24A is formed in the terminal part 20A. The switching protrusion 24A functions as a switching element or a connection element abutting the operation part for switching the output voltage and is inserted into the third slot 123 or 124 located between the first slot 121 (for insertion of the positive input terminal) and the second slot 122 (for insertion of the negative input terminal). If the battery pack 100 is mounted to the electrical tool body, the switching protrusion 24A pushes the rotational terminal base 171 at the position of arrow 25. Thereby, the rotational terminal base 171 rotates counterclockwise (when viewed from the top) to the position shown in FIG. 9(1). In this state, it is understood that the connection terminal 173a causes the electrodes (contacts) 176d and 176b to be short-circuited, and the connection terminal 173b causes the electrodes (contacts) 176e and 176c to be short-circuited. Similarly, it is understood that the connection terminal 173c causes the contacts 176i and 176g to be short-circuited, and the connection terminal 173d causes the contacts 176j and 176h to be short-circuited.

FIG. 9(2) illustrates a connection situation in the state where the rotational terminal base 171 is rotated counterclockwise (when viewed from the top) by the switching protrusion 24A as shown in FIG. 9(1). The +side output of the cell unit 156 is directly connected to the positive electrode terminal 161. The +side output of the cell unit 157 is connected to the contact 176b. The +output of the cell unit 158 is connected to the contact 176g. The −side output of the cell unit 156 is connected to the contact 176e. The −side output of the cell unit 157 is connected to the contact 176j. The −side output of the cell unit 158 is directly connected to the negative electrode terminal 162. In this state, the contacts 176d and 176b, the contacts 176e and 176c, the contacts 176i and 176g, and the contacts 176j and 176h are brought into the connected state. As a result, the cell units 156 to 158 are brought into the parallel connection state and output a DC rated at 36V between the positive electrode terminal 161 and the negative electrode terminal 162.

FIG. 10(1) is a diagram illustrating a state when the battery pack 100 is mounted to an electrical tool body or an electrical device body rated at 108V. In the electrical tool rated at 108V, the switching protrusion 84 is formed in the terminal part 80, and a protrusion is not formed at the position of the switching protrusion 24A of the terminal part 20 as in the device of 36V. The switching protrusion 84 functions as a switching element or a connection element abutting the operation part for switching the output voltage and is inserted into the third slot 124 located between the first slot 121 (for insertion of the positive input terminal) and the second slot 122 (for insertion of the negative input terminal). In this state, if the battery pack 100 is mounted to the electrical tool body or the electrical device body, the positive input terminal 81 and the positive electrode terminal 161 are brought into contact, and the negative input terminal 82 and the negative electrode terminal 162 are brought into contact. Meanwhile, by contacting the switching protrusion 84 with an arm portion of the rotational terminal base 171 as indicated by arrow 84a, the rotational terminal base 171 rotates clockwise (when viewed from the top). The connection relationships between the connection terminals 173a to 173d of the rotational terminal base 171 and the contacts 176a to 176j are switched through the rotation. FIG. 10(2) illustrates a connection state after switching. Here, by switching the position of the rotational terminal base 171 from FIG. 9(2) to FIG. 10(2), the contacts 176d and 176a, the contacts 176e and 176b, the contacts 176i and 176f, and the contacts 176j and 176g are brought into the connected state. As a result, the cell units 156 to 158 are brought into the series connection state and output a DC rated at 108V from the positive electrode terminal 161 and the negative electrode terminal 162. Moreover, a detent mechanism or a latch mechanism may be disposed in the swinging shaft 172 of the rotational terminal base 171, which functions as the swinging element, such that the swinging element does not swing if a predetermined or greater rotation torque is not applied to the swinging element by the switching protrusion 24A or the switching protrusion 84. In addition, the contacts 176a and 176f are electrodes that are not wired to any one position. Therefore, they may be removed to increase the contact interval between the contacts 176b and 176c and between the contacts 176g and 176h to thereby reduce the short-circuiting risk between the adjacent contacts during switching.

According to the present embodiment, even in the cordless electrical tool, a high voltage equivalent to that in the electrical tool driven by the commercial power supply may be obtained from the battery pack 100, and the high output portable electrical tool or electrical device can thereby be realized. Moreover, even if the number of cells is increased to increase the voltage, since thirty 14500-size (rather than 18650-size) Li cells are used, the tool is small and light while having a high output, thereby increasing the power-to-weight ratio. Furthermore, in the battery pack 100 of the present embodiment, by switching the connection of the cell units 156 to 158 through the voltage switching element (voltage switching mechanism 170) that is disposed inside the battery pack 100 for switching between parallel connection and series connection, output switching between 36V and 108V can be performed. Therefore, the generally used electrical tools or electrical devices rated at 36V can be operated. In addition, in the battery pack 100 of the present embodiment, the voltage switching mechanism 170 functioning as the voltage switching element is disposed at the position approximately at the same height as the positions at which the positive electrode terminal 161 and the negative electrode terminal 162 functioning as the power source terminals are disposed. Therefore, the dimension in the upper-lower direction of the battery pack 100 can be compactly formed.

Embodiment 2

Next, FIG. 11 to FIG. 14 are incorporated to describe the second embodiment of the invention. Like the first embodiment, the second embodiment similarly provides a battery pack 200 capable of switching output voltage into two stages of voltage, namely 36V on low voltage side of and 108V on high voltage side. FIG. 11 is a perspective view illustrating shapes of a battery pack 200 of a second embodiment and a terminal part connected thereto FIG. 11(1) illustrates a state at the time of connection to an electrical device rated at 36V. FIG. 11(2) illustrates a state at the time of connection to an electrical device rated at 108V. The appearance and shape of the battery pack 200 is basically the same as the shape of the battery pack 100 in the first embodiment shown in FIG. 1 to FIG. 8 except for one part (the shape in the vicinity of configuration region of slot group).

In the battery pack 200, a cover that is formed by combining a lower case 201 and an upper case 210 accommodates 30 pieces of cells 151 including lithium ion battery in the size of 14500. If it is possible for the cover to have a larger size, it is possible to use the cell in the size of 18650; other cells in different shapes and sizes may also be used. A mounting mechanism which is disposed toward an electrical tool body 1 or the side of an electrical tool body 30 is formed in the upper case 210 of the battery pack 200, and the construction or shape of the mounting mechanism is substantially the same as the shape of the battery pack 100 in the first embodiment shown in FIG. 7. A lower step surface 211 which is configured to guide a terminal part of the electrical machine side and an upper step surface 215 disposed thereon are formed in the upper case 210, and a plurality of terminal insertion slots (slot) are formed in the stepped part 212 which is formed as the boundary between the lower step surface 211 and the upper step surface 215. Rail parts 238*a* and 238*b* that are fitted with the electrical device body, i.e., rail groove, are formed at the edge part on left/right sides of the upper step surface 215. Here, five terminal insertion slots are shown in the left-right direction, but the number of terminal insertion slot may be a random number and can be further increased. A raised part 240 is formed on the upper side of the upper step surface 215, a latch part 214 is disposed on left/right sides of the raised part 240. The raised part 240 and a latch claw 241*a* are moved along with each other.

FIG. 11(1) illustrates a state at the time of connection to an electrical device body rated at 36V and the electrical tool body 1. The terminal part 270 disposed at the side of the electrical device body 1 has a small width in the left-right direction. The battery pack 200 is moved in the manner that a positive input terminal 271 and a negative input terminal 272 are inserted into two terminal insertion slots 222 and 224 close to the center. The positive input terminal 271 and the negative input terminal 272 are connected to a switching terminal of the battery pack 200 to be described below, serving as a switching element that switches the output voltage of the battery pack 200 into low voltage or serving as a connection element to perform function, and also serving as low voltage connection element connected with a plurality of cell units in parallel to perform function. FIG. 11(2) illustrates a state at the time of connection to an electrical device body rated at 108V and an electrical tool body 30. A terminal part 280 of the electrical tool body 30 has a wider width in the left-right direction relative to the terminal part 270, and a region therebetween becomes a terminal configuration region. In the terminal configuration region, a positive input terminal 281 and a negative input terminal 282 that are disposed close to left/right ends are provided, and a connection element 283 is formed in the position substantially close to the center in the left-right direction. If the battery pack 200 is disposed on the electrical tool body 30, the positive input terminal 281 and the negative input terminal 282 are inserted into the terminal insertion slots 221 and 225, and the connection element 283 is inserted into the terminal insertion slot 223.

FIG. 12 is a connection circuit diagram of the battery pack 200. Three cell units 156 to 158 are accommodated in the battery pack 200. The cell units 156 to 158 are formed in the form of cell pack 150 shown in FIG. 8 and retained by a separator 152, and respectively in series connection with 10 pieces of cells 151 of lithium ion battery in the size of 14500. Additionally, it should be indicated that 10 cells in FIG. 12 are gathered and shown as one battery. In the terminal insertion slots (slot) 221 to 225 configured to be inserted into the input terminal at the side of terminal parts 270, 280, one to four connection terminals are disposed in parallel in the insertion direction of the terminal parts 270, 280. The connection terminal group provided herein are configured as voltage switching element which switches parallel connection and series connection of the battery pack 200. The set that is constructed by the terminal insertion slot 222 and the terminal insertion slot 224 corresponds to the terminal part 270 for 36V. A switch terminal group (terminal group 232 and terminal group 234) configured to output low voltage is provided herein. The positive input terminal 271 is disposed in the manner of being in contact with each of the terminals of the terminal group 232. The negative input terminal 272 is disposed in the manner of being in contact with each of the terminals in the terminal group 234.

The set that is constructed by the terminal insertion slot 221 and terminal insertion slot 225 corresponds to the terminal part 280 for 108V. A switch terminal group (terminal 231 and terminal 235) for outputting high voltage is provided herein. The positive input terminal 281 is disposed in the manner of being in contact with a terminal 231. The negative input terminal 282 is disposed in the manner of being in contact with a terminal 235. The terminal 231 serves as positive electrode terminal to perform function. The terminal 235 serves as the negative electrode terminal to perform function. A connection element 283 configured to switch output voltage is provided in the center part between the right/left sides of the terminal part 280. The connection element 283 that serves as voltage switching element for switching parallel connection and series connection is inserted into the terminal insertion slot 223. The connection element 283 has a conduction part 283*a* at the front end side (the side close to the battery pack 200 in the drawing) and a conduction part 283*c* on the rear end side, and an insulator 283*b* is provided between the conduction part 283*a* and the conduction part 283*c*, such that the conduction part 283*a* and the conduction part 283*c* are electrically non-conducted. The conduction part 283*a* and the conduction part 283*c* are provided for purpose of allowing a short that makes the predetermined terminals in the terminal group 233 to become short-circuited require no wiring from the conduction part 283*a* and the conduction part 283*c* at the side of the electrical device body. Therefore, the connection element 283 may be manufactured by casting a metal plate that is used for forming the conduction part 283*a* and the conduction part 283*c* in a connection element stage which is integrally formed with the terminal part 280 by non-conductor, or may be manufactured by attaching a metal plate to the outer peripheral surface of the connection element stage formed by non-conductor or by performing conducting process such as metal plating process to the outer peripheral surface. In this manner, a short that allows a plurality of cell units to be connected in series is formed additionally in the terminal part 280. The conduction part 283*a* of the connection terminal 283 is connected to the switching terminal of the battery pack 200 as described below, serving as switching element that switches output voltage of the battery pack 200 into high voltage or serving as a connection element to perform function, and also serving as an integral connection element for high voltage in series connection with a plurality of cell units 156 and 157 to perform function. Likewise, the conduction part 283*c* of the connection terminal 283 is connected to the switching terminal of the battery pack 200, serving as switching element that switches the output voltage of the battery pack 200 into high voltage or serving as a connection element to perform function, and serving as an integral connection element for high voltage in series connection with a plurality of cell units 157 and 158 to perform function.

FIG. 13 is a diagram illustrating shapes of terminals 231 to 235, FIG. 13(1) is a top view. FIG. 13(2) is a side view of a terminal group 232 (viewed in the direction of arrow B of FIG. 13(1)). The terminal group 232 has terminals 232*a*, 232*b* and 232*c*. The terminals 232*a*, 232*b* and 232*c* serve as switching element which switches the output voltage of the battery pack 200 connected to low voltage electrical device body 1 into low voltage to perform function, and also serve as parallel terminal in parallel connection with a plurality of cell units to perform function. The terminal group 232 is disposed adjacent to each other and constructed to serve as a plurality of parallel terminals of the parallel terminal group. The terminal group 234 has terminals 234*a*, 234*b* and 234*c*. The terminals 234*a*, 234*b* and 234*c* serve as switching element that switches the output voltage of the battery pack 200 connected to the low voltage electrical device body 1 into low voltage to perform function, and also serve as parallel terminal in parallel connection with a plurality cell units to perform function. The terminal group 234 is disposed adjacent to each other and constructed to serve as a plurality of parallel terminals of parallel terminal group. The terminal group 233 has terminals 233*a*, 233*b*, 233*c* and 233*d*. The terminals 233*a*, 233*b*, 233*c* and 233*d* serve as switching element that switches the output voltage of the battery pack 200 connected to the high voltage electrical device body 30 into low voltage to perform function, and also serve as parallel terminal in series connection with a plurality of cell units 156-158. The terminal group 233 is disposed adjacent to each other and constructed to serve as a plurality of series terminals of the series terminal group. Herein, the terminals 231 and 235 as well as terminals 232*a*, 233*a* and 234*a* have the same shape as conventional terminal that is commonly used and are formed in the manner as described below: a flat plate is bended to form a U-shape, and the lateral surface on both sides near the open end part becomes a shape concaved inward to form a protrusion, such that the narrowest part formed by the protrusion part is brought into contact with two surfaces of the plate-shape terminal at the side of the terminal part. In the terminals 231, 235, 232*a*, 233*a* and 234*a*, the fitted metal terminal at the side of the terminal part does not penetrate through the rear side, and thus the rear side is formed as a closed shape. On the other hand, other terminal groups, namely, terminals 232*b*, 232*c*, 233*b* to 233*d*, 234*b* and 234*c* are fitted together in the state of making the contacted metal terminal at the side of the terminal part penetrates through from the front portion to the rear portion. Therefore, the opening part is not only formed at the front side but also formed at the rear side. The side view of FIG. 13(2) shows a specific shape thereof. The position (arrow 236*a*) near the rear portion on the upper end of the terminal 232*a* is closed, but the terminals 232*b* and 232*c* are formed in the shape that is open at both of the front side and the rear side (see the position near arrows 236*b* and 236*c*). Therefore, if the terminal part 270 shown in the figure is inserted along the direction of arrow 265, the positive input terminal 271 is in contact with three terminals 232*a* to 232*c* simultaneously, thereby respectively reaching the electrically conducted state. The connecting state of the negative input terminal 272 and the three terminals 234*a* to 234*c* is also the same. In this manner, it is possible to make a plurality of terminals in one terminal insertion slot to be disposed in parallel in the direction (parallel direction) same as the mounting direction, and the electrode plate of the terminal part is used to set the connecting state of the unit cells 156-158 in the battery pack 200 to be one of parallel connection state and series connection state.

FIG. 14 is a diagram illustrating a state where the battery pack 200 is mounted to terminal parts 270, 280. FIG. 14(1) shows a 36V output state. FIG. 14(2) shows a 108V output state. FIG. 14(1) shows that terminal part 270 has positive input terminal 271 and negative input terminal 272 when 36V is output. The positive input terminal 271 is in contact with terminals 232*a*, 232*b* and 232*c*, and thus being conducted with the terminals. The terminal 232*a* is connected to the +terminal (positive electrode) of the cell unit 156, the terminal 232*b* is connected to the +terminal of the cell unit 157, and terminal 232*c* is connected to the +terminal of the cell unit 158. Accordingly, the positive input terminal 271 is connected to the +terminal of three cell units 156-158. Likewise, the negative input terminal 272 is in contact with the terminals 234*a*, 234*b* and 234*c*, and thus being conducted with the terminals. The terminal 234*a* is connected to the −terminal (negative electrode) of the cell unit 156, the terminal 234*b* is connected to the −terminal of the cell unit 158, and the terminal 234*c* is connected to the −terminal of the cell unit 158. Accordingly, the negative input terminal 272 is connected to the −terminal of three cell units 156-158. Additionally, the terminal group 233 is not connected to anything and thus the terminals 233*a* to 233*d* are in an open state. As a result, the cell units 156-158 are connected in parallel, that is, direct current rated at 36V is output to the positive input terminal 271 and the negative input terminal 272.

FIG. 14(2) shows a state where the battery pack 200 is mounted on the terminal part 280. The output of the terminal part 280 at 108V has a positive input terminal 281, a negative input terminal 282 and a connection element 283. The positive input terminal 281 is only in contact with the terminal 231 connected with +terminal of the cell unit 156. Likewise, the negative input terminal 282 is only in contact with the terminal 235 connected with the −terminal of the cell unit 158. Additionally, the connection element 283 (connection terminal) is inserted in the manner of being in contact with four terminal group (series terminal elements 233*a* to 233*d*). With the connection element 283, a terminal 233*a* and a terminal 233*b* are short-circuited through a conduction part 283*a* (see FIG. 12), and a terminal 233*c* and a terminal 233*d* are short-circuited through a conduction part 283*c* (see FIG. 12). Herein, the terminal 233*b* and the terminal 233*c* are maintained in a non-conducted state through an insulator 283*b* (see FIG. 12) that is formed in the connection element 283. The terminal 233a is connected to the −terminal of the cell unit 156, and the terminal 233b is connected to the +terminal of the cell unit 157. Accordingly, the series connection state between the cell units 156 and 157 can be established. Likewise, the terminal 233c is connected to the −terminal of the cell unit 157, the terminal 233d is connected to the +terminal of the cell unit 158. Accordingly, the series connection state between the cell units 157 and 158 can be established. As a result of such conduction state, the cell units 156 to 158 are connected in series, thus outputting direct current rated at 108V to the terminal 231 at positive electrode and the terminal 235 at negative electrode. Additionally, each of the terminals in the terminal group 232 and the terminal group 234 are in open state.

Based on the above, the second embodiment has terminal groups configured for switching voltage, and the switching terminal groups are constructed by disposing terminals extended from each of the cell units of the plurality of different cell units to be adjacent to each other, thereby realizing the battery pack 200 capable of corresponding to a plurality of power source. In particular, the slot 223 has a series terminal group (series terminal elements 233a to 233d). The series terminal group is connected to the positive electrode or the negative electrode of the plurality of unit cells, and configured to connect the plurality of cell units in series, thereby realizing the battery pack 200 that can switch voltage between 36V and 108V. At this time, the terminal part 270 or 280 at the side of the electrical device body such as electrical tool body is set to have the shape as shown in the drawings, and a slot (221 or 222) to be inserted by the positive input terminal and a slot (224 and 255) to be inserted by the negative input terminal are respectively provided with a third slot (223) to be inserted by the switching element (connection element 283) configured to switch output voltage; therefore, the output voltage from the side of the battery pack 200 can be automatically switched simply by mounting the battery pack 200. Accordingly, there is no need for the worker to pay close attention to the switching operation of battery voltage, and there is no risk of damage to the side of electrical device body due to false setting of voltage. Therefore, when the battery pack 200 is removed, the three cell units 156 to 158 are in an open state (non-connection state), and thus a state that is the most suitable for safekeeping or transport can be achieved. In the battery pack 200 of the second embodiment, the terminal group 232, the terminal group 234 and the connection element 283 serving as voltage switching element as well as the terminal 231, the terminal 235, the terminal group 232 and the terminal group 234 serving as power terminal are disposed at positions substantially at the same height in the upper-lower direction, and thus the battery pack 200 with a compact size in the upper-lower direction can be formed. Moreover, terminals 233a, 233b, 233c and 233d serving as series terminals are disposed at a position substantially at the same height as the terminal 231 serving as positive electrode terminal and the terminal 235 serving as negative electrode terminal, and thus the battery pack 200 with a compact size in the upper-lower direction can be formed. Moreover, the terminals 233a and 233b serving as series terminal are configured adjacent to each other to serve as series terminal group. The conduction part 283a serves as connection terminal for high voltage that is integrally connected with the series terminal group, and thus the electrical device body can serve as a simple structure. Likewise, terminals 233c and 233d serving as series terminal are disposed adjacent to each other to serve as series terminal group. The conduction part 283c serves as connection terminal for high voltage that is integrally connected with the series terminal group, and thus the electrical device body can serve as a simple structure. Accordingly, the plurality of series terminal groups are arranged in parallel in the left-right direction and straight direction, and the plurality of integral connection terminals for high voltage are arranged in parallel in the left-right direction and straight direction. In this manner, the battery pack and the electrical device body with a compact size in the left-right direction can be formed.

The structure of the battery pack 200 realized in the second embodiment is not limited to the voltage switching battery pack, but also can be effectively applied to a battery pack that has fixed voltage. FIG. 15 shows the structure of such battery pack. FIG. 15 is a circuit diagram illustrating a battery pack 200A exclusively used for 108V. Herein, the structure is the same as the structure of FIG. 14(2) where terminal groups 232 and 234 are removed, and the terminal insertion slots 222 and 224 (see FIG. 11) formed in the insertion position of the terminal groups 232 and 234 are closed. The electrical device body for 108V uses the terminal part 280 having the positive input terminal 281, the negative input terminal 282 and the connection element 283. The structure of the terminal part 280 is the same as the structure shown in FIG. 12, and the connection element 283 has a conduction part 283a at the front side and a conduction part 283c at the rear side, and the conduction parts 283a and 283c are non-electrically connected through an insulator 283b. In this manner, when the terminal part 280 is connected, a plurality of terminal groups are used to establish the series connection state of the cell units 156 to 158. Therefore, when the battery pack 200A is not disposed in the electrical device, the three cell units 156 to 158 are in non-connection state and thus the state which is the most suitable for safekeeping or transport can be achieved.

FIG. 15(2) illustrates a circuit diagram of a battery pack 200B in another modification example. In FIG. 15(2), the connection element 283 in FIG. 15(1) is divided into two in the left-right direction as a first connection terminal 285 and a second connection terminal 286. Along with the division, the terminals 233a to 233d are separately arranged laterally. The first connection terminal 285 is a metal plate configured to make the terminal 233b connected to the +terminal side of the cell unit 157 and the terminal 233a connected to the −terminal side of the cell unit 156 become short-circuited. Likewise, the second connection terminal 286 is a metal plate configured to make the terminal 233c connected to the −terminal side of the cell unit 157 and the terminal 233d connected to the +terminal side of the cell unit 158 to become short-circuited. The modification example can also achieve the same effect as FIG. 15(1) while reducing the space for arranging terminals 233a and 233b as well as 233c and 233d, and thus is advantageous for mounting the current battery pack. Additionally, in modification example of FIG. 15(2), if six rows of terminal insertion slots are arranged laterally, it is possible to dispose terminal groups 232 and 234 (see FIG. 13) for outputting 36V in the configuration of FIG. 15(2), thereby realizing the battery pack with shortened terminal length in the front-rear direction.

Embodiment 3

Next, FIG. 16 to FIG. 20 are incorporated to describe the third embodiment. In a battery pack 300 of the third embodiment, as compared with the first embodiment and the second embodiment, the similarity is that the output voltage of the battery pack can be switched into two stages of voltages, namely, low voltage side and high voltage side. However, in the third embodiment, the voltage is not switched at a ratio of three times such as 36V and 108V, but switched at a ratio of two times such as 18V and 36V. FIG. 16 is a schematic perspective view illustrating shapes of a battery pack 300 of a third embodiment of the invention and terminal parts 370, 380 mounted therein. The electrical device which may be disposed in the battery pack 300 is a device rated at 18V with a terminal part 370 and a device rated at 36V with a terminal part 380. A positive input terminal 371 and a negative input terminal 372 serving as a first power input terminal set (power terminal at the side of device) are formed in the terminal part 370. A positive input terminal 381 and a negative input terminal 382 serving as a second power input terminal set (power terminal at the side of device) are formed in the terminal part 380. The terminal parts 370 and 380 are disposed in a battery pack mounting part at the side of the electrical body. The positive input terminal 371 and 381 as well as negative input terminals 372 and 382 are formed of metallic plate-shaped element. A stage part configured to secure the terminals is formed of a molded article of a non-conductor such as synthetic resin. The positive input terminals 371 and 381 as well as the negative input terminals 381 and 382 respectively serve as switching element for switching output voltage of the battery pack 300 abutted against an operating part of the battery pack 300 or a connection element to perform function.

The illustration here shows a schematic view of the battery pack 300, and a plurality of slits 321 to 324 are formed from a stepped part 312 between a lower step surface 311 and an upper step surface 315 to the rear side. The upper shape of the battery pack 300 including the slits 321 to 324 is formed to be substantially the same as the shape of the battery pack 100 in FIG. 7. Herein, descriptions regarding the raised part or a latch part are omitted. The terminal part 370 for 18V is constructed with a small width in the left-right direction, and the terminal part 380 for 36V is constructed with a wider width in the left-right direction. According to the difference in the widths of the terminal parts 370 and 380, the positive input terminal 371 and the negative input terminal 372 are formed with narrow interval, and the positive input terminal 381 and the negative input terminal 382 are formed with a wide interval. The region occupied by the terminal set (371 and 372) for low voltage is set as a range that is included in the region occupied by the terminal set (381 and 382) for high voltage. The positive input terminal 371 and the negative input terminal 372 are respectively inserted into the slit 322 and the slit 323. The positive input terminal 381 and the negative input terminal 382 are respectively inserted into the slit 321 and the slit 324. The positions of the terminals and the slits are appropriately guided through a rail groove formed in the battery pack mounting part at the side of the electrical tool body and a rail part (which is omitted in the drawing) formed in the battery pack 300. In this manner, two types of patterns are disposed in the slit inserted by a clamper (positive input terminals 371, 381 and negative input terminals 381, 382) at the side of the electrical device body to mount the 18V and 36V products of the clamper of the terminal part having different widths, and thus output switching can be performed. The worker can obtain appropriate output voltage from the battery pack 300 by simply mounting the battery pack 300 on the electrical device body such as an electrical tool for 18V or an electrical device body for 36V.

FIG. 17 is a diagram illustrating the inside of the battery pack 300 of FIG. 16, and in particular, constituting components of a voltage switching mechanism (voltage switching element) 320 disposed in the vicinity (terminal disposing region) of positions of slits 321 to 324 on the rear side of a stepped part 312. The voltage switching mechanism 320 is a changeover switch part, having two movable guide members 330 and 340 casted with metallic terminal member and made of synthetic resin, and such members are subjected to a force by a force-applying part such as a spring 348 in the manner that they are separated in a direction intersecting a mounting direction toward the electrical device body relative to the battery pack 300. The movable guide members 330 and 340 serve as operating parts that are abutted against the switching element for switching the output voltage of the battery pack 300 and perform operation. Four contact terminals (351 to 354) are formed in the vicinity of left and right sides of the movable guide members 330 and 340 and at the rear side in the vicinity of the center. Terminal mounting parts 331 and 341 to be inserted by the positive input terminal 371 and the negative input terminal 372 are formed in the movable guide members 330 and 340. The illustration on the left side of FIG. 17(1) illustrates the positions of the movable guide members 330 and 340 in the state that the battery pack 300 is not mounted on the electrical device body. In such state, the positive input terminal 371 and the negative input terminal 372 can be directly inserted into the terminal mounting parts 331 and 341. On the other hand, as shown in the illustration on the left side of FIG. 17(2), when the condition for mounting the terminal parts 380 is different, if the battery pack 300 is relatively moved relative to the positive input terminal 381 and the negative input terminal 382 serving as connection element of the terminal part 380, the positive input terminal 381 is brought into contact with an inclined part 332 of the movable guide member 330, and the negative input terminal 382 is brought into contact with an inclined part 342 of the moveable guide member 340. The reason is that, with the effect of spring 348, the parallel surfaces 333 and 343 of the movable guide members 330 and 340 stay still at a position of an interval that is wider than the interval between the positive input terminal 381 and the negative input terminal 382.

If the positive input terminal 381 and the inclined part 332 are brought into contact with each other while the negative input terminal 382 and the inclined part 342 are also brought into contact with each other, and the terminal part 380 is simultaneously pushed in as shown by arrow 349, that is, the positive input terminal 381 and the negative input terminal 382 are respectively inserted into the slits 321 and 324 (see FIG. 16), the movable guide members 330 and 340 compress the spring 348 while moving inward along a direction (direction toward each other) of arrows 336 and 346. Additionally, in the descriptions of the present embodiment, the concept of the arrow 349 which shows how the terminal part 380 approaches the battery pack 300 simply means that the distance between the terminal part 380 and the battery pack 300 is shortened, and the direction is simply shown for the purpose of convenience, which includes the condition of making the side of the battery pack 300 move to the side of the fixed electrical device body, and the condition of making the side of the electrical device body to move to the side of the battery pack 300. In the present embodiment, in terms of ease of comprehension, the relative movement is exemplified as that the terminal part 380 is moved to the side of the battery pack 300 as shown by arrow 349, but no matter which side is moved, the state after mounting is all the same.

If the movable guide members 330 and 340 are moved along the direction of arrows 336 and 346 while allowing the terminal part 380 to insert simultaneously, the spring 348 is further compressed and the movable guide members 330 and 340 further approach each other. Therefore, the positive input terminal 381 enters between the parallel surface 333 on the outer side (right side) of the movable guide member 330 and a first +terminal ($1^{st}$ positive electrode terminal) 351. Likewise, the negative input terminal 382 enters between the parallel surface 343 on the outer side (left side) of the movable guide member 340 and the second −terminal ($2^{nd}$ negative electrode terminal) 354. If moved to the predetermined position in the direction of arrow 349 under such state, the mounting of the battery pack 300 is completed. With movement of the movable guide members 330 and 340, the positions of intermediate terminals 335 and 345 are also moved simultaneously, and the closest point is conducted by changing from the "non-contact" state to the "contact" state. Furthermore, the contact state between the movable guide members 330, 340 and the terminals 351 to 354 is changed; as a result, direct current rated at 36V is output to the terminal part 380. The intermediate terminals 335 and 345 as well as the contact terminals (351 to 354) serve as switching element that switches the output voltage of the battery pack 300 and is operated by operating part.

FIG. 18 is a diagram for illustrating the voltage switching mechanism 320 using movable guide members 330, 340 and terminals 351 to 354. FIG. 18(1) is a diagram illustrating a housing position of the voltage switching mechanism 320 in the battery pack 300. In FIG. 18(1), the voltage switching mechanism 320 is received at a position that is closer to the rear side than the stepped part 312 formed by the lower step surface 311 and the upper step surface 315 of the battery pack and overlaps the configuration position of the plurality of slits 321 to 324 (see FIG. 16) when viewed from the top. The movable guide members 330 and 340 are moveable components that are moved on a terminal substrate 360 (see FIG. 18(3)) along the left-right direction. The four contact terminals (351 to 354) are non-movable components that are fixed on the terminal substrate 360 without moving.

FIG. 18(2) is an exploded view viewed from the upper surface of the voltage switching mechanism 320, and the illustration is shown in a separated manner with distance to clearly show the construction of each component. In FIG. 18(2), the movable guide member 330 has a basic shape that is formed by connecting a rectangular component with a triangular component when viewed from the top, and the portion with basic shape is made of synthetic resin such as plastic. An intermediate terminal 335 formed of metal is casted in the synthetic resin, and thus firmly secured. Two contact elements 335c and 335d are formed on the rear side of the intermediate terminal 335, and a contact element 335a is formed in the manner of extending between the terminal mounting part 331 to extend toward the front side and bended outward from the inside to form a protrusion in order to be in contact with the positive input terminal 371 of the terminal part 370. A contact element 335b in contact with the contact element 345b of the intermediate terminal 345 on the side of another movable guide member 340 is formed in the inner portion (which is the left side of the movable guide member 330 in the drawing). The movable guide member 340 and the intermediate terminal 345 casted therein as well as the movable guide member 340 and the intermediate terminal 335 are formed bilaterally symmetrical. Two contact elements 345c and 345d are formed on the rear side of the intermediate terminal 345, and a contact element 345a is formed therein in the manner of extending between the terminal mounting part 341 to extend toward the front side and bended outward from the inside to form a protrusion in order to be in contact with the negative input terminal 372 of the terminal part 370. A contact element 345b that is in contact with the contact element 335b of another intermediate terminal 335 is formed in the inner portion (which is right side of the movable guide member 340). The contact elements 335 and 345a are terminal set for low voltage for outputting low voltage and construct the first power terminal. A spring 348 (omitted in FIG. 18(2)) is casted between the movable guide members 330 and 340, at the molding time point, the movable guide members 330 and 340 are connected with an elastomer. The spring 348 is a metallic compressing spring.

Four terminals 351 to 354 are provided on the rear side of the intermediate terminals 335 and 345. The second +terminal ($2^{nd}$ positive electrode terminal) 352 connected to the +terminal (positive electrode terminal) of the first cell unit and the first −terminal ($1^{st}$ negative electrode terminal) 353 connected to the −terminal (negative electrode terminal) of the first cell unit are disposed close to the center along the left-right direction. Contact elements 352a and 352b are formed in the second +terminal 352 in the manner of bending toward the front side as a protrusion and parallel with each other in the left-right direction. Contact elements 353a and 353b are formed in the first −terminal 353 in the manner of bending toward the front side as a protrusion and parallel with each other in the left-right direction. The contact element 335c is selectively brought into contact with any one of the contact elements 352a and 352b, and the contact element 345c is brought into contact with any one of the contact elements 353a and 353b.

The first +terminal ($1^{st}$ positive electrode terminal) 351 is disposed on the right side of the intermediate terminal 335, the second −terminal ($2^{nd}$ negative electrode terminal) 354 is disposed on the left side of the intermediate terminal 345. The first −terminal 351 is a component that is bended to substantially form an L-shape when viewed from the top. A contact element 351a is formed in one end portion on the front side in the manner of being bended inward from the outside as a protrusion in order to be in contact with the positive input terminal 381 (see FIG. 17) of the terminal part 380. A contact element 351b is formed in another end portion at the rear side in the manner of being bended toward the front side as a protrusion in order to be in contact with the contact element 335d of the intermediate terminal 335. The second −terminal 354 is formed in the shape bilaterally symmetrical to the shape of the first +terminal 351. A contact element 354b is formed in one end portion on the front side in the manner of being bended as a protrusion in order to be in contact with the negative input terminal 382 (see FIG. 17) of the terminal part 380. A contact element 354b is formed in another end portion on the rear side in the manner of being bended as a protrusion in order to be in contact with the contact element 345d of the intermediate terminal 345. The contact elements 351a and 354a are terminal set for high voltage configured for outputting high voltage and construct the second power terminal.

FIG. 18(3) is a cross-sectional diagram of FIG. 18(1) taken along line C-C. The upper side of the movable guide member 330 is covered by the upper case 310 of the battery pack 300, and the lower side thereof is retained through relative sliding in the left-right direction through the terminal substrate 360. A guide rail 361 is formed on the upper surface of the terminal substrate 360 in the manner of protruding toward the upper side as a protrusion and extending linearly along the left-right direction. Additionally, a guide rail 316 is formed in the inner side wall of the upper step surface 315 of the upper case 310 in the manner of extending linearly along the left-right direction. On the other hand, a guide groove part 334a is formed continuously on the upper side surface of the movable guide member 330 along the left-right direction, and a guide groove part 334b is formed continuously on the lower side surface along the left-right direction. Additionally, it should be indicated that the guide groove part 334a of the movable guide member 330 and the guide groove part 344a disposed on the side of the movable guide member 340 are not shown in other drawings except for FIG. 18(3).

In this manner, the guide groove part 334b is guided by the guide rail 361, and the guide groove part 334a is guided by the guide rail 316, such that the movable guide member 330 is movable along a direction intersecting the mounting direction of the battery pack 300. The guide groove part and the guide rail are similarly formed on the side of the movable guide member 340 and guided in the same manner, such that the movable guide member 340 can be relatively slid smoothly along the direction (left-right direction) intersecting the mounting direction of the battery pack 300, and is not moved along the direction (front-rear direction) same as the mounting direction. The intermediate terminal 335 is fixed on the movable guide member 330 and configured to be substantially non-contact with the terminal substrate 360. A pin part 352c for fixing the second +terminal 352 is fitted with the inner portion of the terminal substrate 360, and the pin used for connection penetrates through the terminal substrate 360 to be soldered. Furthermore, the pin part 352c can be soldered without separating the pin part 352c from the pin.

Based on above, with the third embodiment, the voltage switching elements (330, 340) are a plurality of movable guide members that are movable along the direction intersecting the mounting direction of the battery pack 300 in the terminal configuration region provided with power terminal (positive electrode terminal and negative electrode terminal) on the upper surface of the terminal substrate 360. The voltage switching elements (330, 340) can be used to switch between parallel connection and series connection of the plurality of cell units, thereby realizing the battery pack 300 having an automatic voltage switching mechanism. Additionally, in the present embodiment, the moving direction of the movable guide member 330 is set to be orthogonal with the mounting direction of the battery pack 300 but not limited to the crossing angle of 90°, and the movable guide member 330 can also be moved at an angle more or less than 90° in an inclined and intersecting manner. In this manner, in the third embodiment, the movable guide members 330 and 340 are disposed in the configuration region (a region where slits 321-324 are provided) of the terminals 351 to 354, 335 and 345 along the mounting direction of the battery pack 300, and thus voltage can be switched without increasing the size of the battery pack.

Next, FIG. 19 is incorporated to describe the connection state of the cell unit achieved by the voltage switching mechanism 320 when in connection with the electrical device body rated at 18V. FIG. 19(1) is a diagram illustrating a state before the terminal part 370 is mounted on the battery pack 300. FIG. 19(2) is a diagram illustrating a state after the mounting, and the wiring state of the four terminals 351 to 354 toward the cell units 356 and 357 are illustrated in the form of circuit diagram. Two cell unit 356 and 357 are accommodated in the battery pack 300. The cell units 356 and 357 are respectively an aggregate formed by a cell 151 with five pieces of lithium ion batteries connected in series, and the output thereof is rated at 18V. The +output (positive output) of the cell unit (first cell unit) 356 is wired to the first +terminal 351 through lead, the +output (negative output) is wired to the first −terminal 353 through lead. Likewise, the +output of the cell unit (second cell unit) 357 is wired to the second +terminal 352 through lead, the −output is wired to the second −terminal 354 through lead.

In the condition that the terminal part 370 is not mounted, the movable guide members 330 and 340 are subjected to force through the spring 348 in the manner of facing away from each other. In this state, the contact elements 335b and 345b facing away from each other are in a non-contact state. If the terminal part 370 is mounted from the state shown in FIG. 19(1), then as shown in FIG. 19(2), the positive input terminal 371 of the terminal part 370 is accommodated in the terminal mounting part 331 through the slit 322 (see FIG. 16); as a result, the contact element 335a and the positive input terminal 371 are in contact with each other. Likewise, the negative input terminal 372 is accommodated in the terminal mounting part 341 through the slit 323 (see FIG. 16); as a result, the contact element 345a and the negative input terminal 372 are in contact with each other. However, the movable guide members 330 and 340 are not moved in the direction the same as the direction of arrow 349 and the orthogonal direction (left-right direction or upper-lower direction). Therefore, the contact relationship between the intermediate terminals 335, 345 and the four terminals 351 to 354 are not changed. In this state, the contact elements 335d and 351b are in contact with each other, the contact elements 335c and 352a are in contact with each other, the contact elements 345c and 353a are in contact with each other, and the contact elements 345d and 354b are in contact with each other. As a result of the contact between the contact elements, a connection path from the positive input terminal 371 to the +output (positive output, positive electrode terminal) of the cell units 356 and 357 can be established, and a connection path from the negative input terminal 372 to the −output (negative output, negative electrode terminal) of the cell units 356 and 357 can be established. The two cell unit 356 and 357 are connected in parallel and then their output, that is, the direct current rated at 18V is output from the battery pack 300.

FIG. 20(1) is a diagram illustrating a state before the terminal part 380 is mounted to the battery pack 300. FIG. 20(2) is a diagram illustrating a state after the mounting, and the wiring state of the four terminals 351 to 354 toward the cell units 356 and 357 are illustrated in the form of circuit diagram. As shown in FIG. 20(1), in the condition that the terminal part 380 is not mounted, the movable guide members 330 and 340 are subjected to force in the manner of facing away from each other. In such state, the contact elements 335b and 345b facing away from each other are in a non-contact state. If the terminal part 380 is mounted from the state shown in FIG. 20(1), the positive input terminal 381 is in contact with an inclined part 332 through the slit 321 (see FIG. 16). If the terminal part 380 (or the battery pack 300 is moved toward the terminal part 380) in the contact state, the inclined part 332 is moved in the manner of retreating toward the inner side of the positive input terminal 381, such that the movable guide member 330 compresses the spring 348 along the direction of arrow 336 while moving simultaneously. Likewise, if the negative input terminal 382 is in contact with the inclined part 342 through the slit 324 (see FIG. 16) while being pushed in simultaneously, the inclined part 342 is moved in the manner or retreating toward the inner side of the negative input terminal 382, such that the movable guide member 340 compresses the spring 348 along the direction of arrow 346 while moving simultaneously. If the movable guide member 330 is moved toward the inner side, the positive input terminal 381 enters between the parallel surface 333 closer to the side part than the inclined part 332 and the first +terminal 351, and retained in the state (i.e., the state shown in FIG. 20(2)) through the force applied by the spring 348. The positive input terminal 381 and the contact element 351*a* of the first +terminal 351 are in good contact. Similarly, if the movable guide member 340 is moved toward the inner side, the negative input terminal 382 enters between the parallel surface 343 closer to the side portion than the inclined part 342 and the second −terminal 354, and retained in the state (i.e., the state shown in FIG. 20(2)); the negative input terminal 382 and the contact element 354*a* of the second −terminal 354 are in good contact.

If the movable guide member 330 and 340 are moved toward the inner side, the contact relationship between other contact elements is changed. First of all, with the configuration that the contact element 335*b* of the intermediate terminal 335 is in contact with the contact element 345*b* of the intermediate terminal 345, the intermediate terminals 335 and 345 become conducted. Additionally, the contact element that is in contact with the contact element 335*c* of the intermediate terminal 335 is switched from the contact element 352*a* as shown in FIG. 20(1) into the contact element 352*b* as shown in FIG. 20(2); the connection state of the contact element 335*d* of the intermediate terminal 335 and the contact element 351*b* of the first +terminal 351 is cancelled. Likewise, the contact element that is in contact with the contact element 345*c* of the intermediate terminal 345 is switched from the contact element 353*a* shown in FIG. 20(1) into the contact element 353*b* as shown in FIG. 20(2); the connection state of the contact element 345*d* of the intermediate terminal 345 and the contact element 354*b* of the second −terminal 354 is cancelled. As a result of switching the contact states of the contact elements, the connection path of +output (positive output, positive electrode terminal) from the positive input terminal 381 to the cell unit 356 can be established, the connection path from the −output (negative output, negative electrode terminal) of the cell unit 356 to the +output of the cell unit 357 can be established, and the connection path from the −output of the cell unit 357 to the negative input terminal 382 can be established. The connection is a series connection between two cell units 356 and 357, thereby outputting the direct current rated at 36V from the battery pack 300. Additionally, the movable guide members 330 and 340 of the voltage switching mechanism 320 is subjected to force through the spring 348, and thus the state of FIG. 20(2) is returned to the state of FIG. 20(1) when the terminal part 380 is removed. Accordingly, the series connection state of the cell units 356 and 357 is automatically cancelled and returned to the parallel connection state.

As described above, by realizing the voltage switching mechanism 320 that uses movable guide members 330 and 340, the worker can obtain the output voltage that is the most suitable for the electrical device body by simply mounting the battery pack 300 on any one of the electrical device body rated at 18V or the electrical device body rated at 36V. Additionally, as long as the voltage is switched at a ratio of two times, the switching operation can be performed with other voltages; for example, it is also possible to realize the third embodiment in the battery pack that performs switching between 54V/108V. Furthermore, it is possible to use three movable guide members to realize the switching mechanism which switches the voltage at a ratio of three times. In the battery pack 300 of the third embodiment, the voltage switching mechanism 320 serving as voltage switching element, the contact element 335*a* and the contact element 345*a* serving as power terminal are disposed at about the same height in the upper-lower direction, such that the battery pack 300 with compact size in the upper-lower direction can be constructed.

Embodiment 4

Next, FIG. 21 and FIG. 22 are incorporated to describe the fourth embodiment. FIG. 21 is a top view of a battery pack 600 of a fourth embodiment of the invention. The appearance and shape of the battery pack 600 is substantially the same as the battery pack 100 in FIG. 7, and the shape of the rail part as well as the shapes of a lower step surface 611 and an upper step surface 615 are identical. A plurality of slot parts are disposed on the upper step surface 615, and the configuration region of the slot part becomes a terminal configuration region. Herein, as slot part, besides the positive electrode terminal slot 621, the negative electrode terminal slot 622, a series/parallel switching element slot 623 serving as third slot is also provided. The positive electrode terminal slot 621 is a slot configured to accommodate the positive electrode output terminal 661 (positive electrode terminal), the negative electrode terminal slot 622 is a slot configured to accommodate the negative electrode output terminal 662 (negative electrode terminal). A series/parallel switching element slot 623 is provided in a portion clamped by the positive electrode terminal slot 621 and the negative electrode terminal slot 622. Herein, the empty slot that is not allocated with any terminal in the conventional battery pack is allocated as a series/parallel switching element slot 623.

In the inner part of the series/parallel switching element slot 623, a parallel connector pair 663 including two parallel connectors 663*a* and 663*b* and a series connector 664 are provided from the entrance side (front side). The parallel connector 663*a* is constructed by a connector pair that includes a connector (conductor) connected to the output (positive electrode) of the cell unit 356 and a connector (conductor) connected to the +output (positive electrode) of the cell unit 357. Similarly, the parallel connector 663*b* is constructed by a connector pair (conductor pair) including a connector (conductor) connected to the −output (negative electrode) of the cell unit 356 and a connector (conductor) connected to the −output (negative electrode) of the cell unit 357. In other words, the parallel connectors 663*a* and 663*b* include a pair of connectors respectively connected to the same electrode (+output or −output) of each of the unit cells and disposed adjacent to each other. The parallel connectors 663*a* and 663*b* are constructed by a conductor pair separated from each other in the left-right direction. In normal state, the conductor pair is in contact state as shown in the drawing. The connector (conductor) that is connected to the +output (positive electrode) of the cell unit 356 that construct the parallel connector 663*a* and the connector (conductor) connected to the +output (positive electrode) of the cell unit 357 that construct the parallel connector 663*a* respectively serve as switching terminals that switch the output voltage of the battery pack 600 into low voltage. Moreover, the connector (conductor) that is connected to the −output (negative electrode) of the cell unit 356 that constructs the parallel connector 663*b* and the connector (conductor) connected to the −output (negative electrode) of the cell unit 357 that constructs the parallel connector 663*b* respectively serve as switching terminals that switch the output voltage of the battery pack 600 into low voltage. The series connector 664 is constructed by a conductor pair separated in the left-right direction. In normal state, the conductor pair on left and right sides is in separated in a non-contact state as shown in the drawing. The series connector 664 is constructed by a connector pair (conductor pair) including a connector (conductor) connected to the +output (positive electrode) of the cell unit 356 and a connector (conductor) connected to the −output (negative electrode) of the cell unit 357. In other words, the series connector 664 includes a pair of contact elements respectively connected to opposite electrodes (+output and −output) of each of the cell units and disposed adjacent to each other. Additionally, in order for the series connector 664 to get the distance between the terminals of the separated conductor pair, it is also possible to set a position relationship between distances in the mounting direction of the battery pack 600. The connector (conductor) that is connected to the +output (positive electrode) of the cell unit 356 that constructs the series connector 664 and the connector (conductor) connected to the −output (negative electrode) of the cell unit 357 that constructs the series connector 664 respectively serve as switching terminals that switch the output voltage of the battery pack 600 into high voltage, and serve as a series terminal that connect a plurality of cell units 356 and cell units 357 together in series.

A length in the mounting direction of the positive electrode terminal slot 621 and the negative electrode terminal slot 622 as well as other slots is $L_S$. Relative to the length of the slots, a length $L_{S1}$ in the mounting direction of the series/parallel switching element slot 623 is as about twice longer. The reason is that three sets of conductor pairs, namely parallel connectors 663a, 663b and the series connector 664 are arranged in series/parallel in the mounting direction. Herein, the positive electrode output terminal 661 and the negative electrode output terminal 662 (which are generally referred to as power terminals) are separated from each other in an intersecting direction relative to the mounting direction. The parallel connector pair 663 and the series connector 664 serving as voltage switching element are provided in a region (which is specifically a region from the stepped part 612 to the length $L_{S1}$ or a length $L_{S2}$ in the mounting direction (described below in FIG. 24), and more specifically a region having a length of $L_S$) where the power terminals are provided. In other words, voltage switching elements are provided in a region where slot part is provided.

FIG. 22 is a diagram illustrating a connection circuit of a cell unit when the battery pack 600 is connected to an electrical device body. FIG. 22(1) illustrates a state of being connected to an electrical device body for low voltage (e.g., 18V). FIG. 22(2) illustrates a state of being connected to an electrical device body for high voltage (e.g., 36V). In the electrical device body for 18V, the shape of the terminal part 650 is the same as those used conventionally, that is, having positive input terminal 651 and negative input terminal 652. In the terminal part 650, it is possible to provide an input terminal (e.g., LD terminal) different from those shown in the drawings, the descriptions herein are only related to the characteristics of the fourth embodiment, and other descriptions related to the input terminal are omitted. An LD terminal 23 serves as a signal terminal for inputting or outputting information or signal.

The circuit diagram at the lower side of FIG. 22(1) shows a state where the battery pack 600 is mounted on the electrical device body such that the terminal part 650 and the output terminal of the battery pack 600 are connected. Cell units 356 and 357 formed by a cell of five lithium ion batteries connected in series are provided in the inner portion of battery pack 600. In the state shown in FIG. 22(1), the +output and −output of the cell units 356 and 357 are connected to the positive electrode output terminal 661 and the negative electrode output terminal 662 in the state of parallel connection. That is, the +terminal of the cell unit 357 constructed through series connection of five cells is connected to the positive electrode output terminal 661. The −terminal is connected to the negative electrode output terminal 662 through the parallel connector 663b. On the other hand, the +terminal of the cell unit 356 constructed through series connection of five cells is connected to the positive electrode output terminal 661 through the parallel connector 663a, and the −terminal is connected to the negative electrode output terminal 662. Herein, the series connector 664 that connects the +terminal of the cell unit 356 and the −terminal of the cell unit 357 is formed as a series terminal group including a plurality of contact terminals (terminals on the right side and terminals on the left side in the drawing) in order to connect the plurality of cell unit 356 and 357 in series. The contact terminals on the left and right sides are in an open state (non-conducted state) in the initial state (i.e., the state where battery pack 600 is removed).

The illustration on the upper side of FIG. 22(2) is shows the shape of the terminal of a terminal part 680 of the electrical device body for 36V. Herein, besides the positive input terminal 681 and the negative input terminal 682 having the same shape as those used conventionally, a series/parallel switching terminal 683 is also provided. The series/parallel switching terminal 683 is provided in a terminal configuration region where a power terminal (positive electrode output terminal 661 and negative electrode output terminal 662) is provided in the mounting direction of the battery pack, which becomes a connection element that switches between parallel connection and series connection. The series/parallel switching terminal 683 is provided with two functions. When the battery pack 600 is mounted, the front end portion that is first abutted against the voltage switching element (parallel connector pair 663, series connector 664) is formed as a conduction terminal 683b formed of a conductor, and the rear end portion is formed with a disconnection terminal 683a formed of a non-conductor. The terminal part 680 is formed as a stage part with integral synthetic resin, and the positive input terminal 681 and the negative input terminal 682 formed in plate-shape with metal are casted in the base portion. The series/parallel switching terminal 683 has a switching terminal group, the disconnection terminal 683a and the terminal part 680 are integrally formed of non-conductive material, and a portion of the front end thereof is formed with a metallic conduction terminal 683b through casting. Herein, the purpose of disposing the disconnection terminal 683a is to disconnect the conduction state of the parallel connector 663a and disconnect the conduction state of the parallel connector 663b by entering between the parallel connectors 663a and 663b that are in contact state (conducted state) where the battery pack 600 is not mounted. The disconnection terminal 683a is connected to parallel connectors 663a and 663b of the battery pack 600 constructed by a plurality of switching terminals and serves as a switching element that switches the output voltage of the battery pack 600 into low voltage. On the contrary, the conduction terminal 683b serves as a short. The short enters between the series connectors (series connection elements) 664 in the non-contact state (disconnection state) where the battery pack 600 is not mounted so as to make each of the series connectors 664 become short-circuited, thereby establishing the conduction state of the series connector 664. The conduction terminal 683b serves as a switching terminal, i.e., series connector (series connection element) 664 connected to the battery pack 600 constructed by a plurality of switching terminals, serves as a switching terminal which switches the output voltage of the battery pack 600 into high voltage, and also serves as integral connection terminal for high voltage which connects the plurality of cell units 356 and cell units 357 in series. Therefore, the conduction terminal 683*b* can work as a simple metal plate without being wired to the substrate at the side of the electric tool body. In this manner, the switching terminal extended from each of the cell units of the plurality of different cell units are disposed adjacent to each other to serve as the series/parallel switching terminal 683 serving as voltage switching element.

The circuit diagram at the lower side of FIG. 22(2) illustrates a state where the battery pack 600 is mounted on the electrical device body such that the terminal part 680 and the output terminal of the battery pack 600 are connected. In the state of FIG. 22(2), the series connection circuit facing the positive electrode output terminal 661 and the negative electrode output terminal 662 in the connection state where the +output of the cell unit 356 and the −output of the cell unit 357 are connected is established. The +terminal of the cell unit 357 constructed by five pieces of cells connected in series is connected to the positive electrode output terminal 661, the −terminal is connected to the +terminal of the cell unit 356 through the connection of the series connector 664 that becomes short-circuited by being inserted by the conduction terminal 683*b*. The −terminal of the cell unit 356 is connected to the negative electrode output terminal 662. Herein, the parallel connector 663*a* and 663*b* that are formed as parallel connector pair 663 are spaced apart by the disconnection terminal 683*a* between two connection points and thus turning into conduction state. As shown in FIG. 22(1), the parallel connection state of the cell units 356 and 357 is cancelled; on the other hand, the series connection state is established.

As described above, according to the fourth embodiment, by changing the shape of the terminal parts 650 and 680 at the side of the electric tool body, and using a third slot 623 to be inserted by the switching element (series/parallel switching terminal 683) for switching output voltage other than the first slot 621 to be inserted by the positive input terminal 681 and the second slot 622 to be inserted by the negative input terminal 682, the output voltage of the battery pack 600 can be appropriately switched. Meanwhile, when the commonly used 18V is output, the shape is formed to be the same as the shape of the terminal part 650 of the conventional electric tool, such that the battery pack 600 in the embodiment can be mounted on the electric tool body or electrical device body for 18V sold on the market to be used in the same manner. On the other hand, for the electric tool body or electrical device body which needs to be set at rated 36V, if formed as in the same shape as the terminal part 680 as shown in FIG. 22(2), the direct current rated at 36V can be obtained from eh battery pack 600 by simply mounting the battery pack 600. Herein, since there is no complicated switch mechanism, an automatic voltage switching battery pack that maintains low manufacturing cost with good durability can be realized. Additionally, by mounting the switching terminal group (663*a*, 663*b*, 664) serving as voltage switching element in the third slot 623 in the region where power terminal (positive electrode output terminal 661 and negative electrode output terminal 662) are provided in the mounting direction, the voltage can be easily switched by simply mounting the battery pack on the electrical device body. In particular, since the voltage switching element is disposed between the power terminal in the direction intersecting the mounting direction, the size of the battery pack is not increased, and thus can be disposed in existing electrical device body. In the fourth embodiment, the voltage switching element and the power terminal are disposed at about the same height in the upper-lower direction and thus a battery pack with compact size in the upper-lower direction can be constructed. Furthermore, the connector (conductor) connected to the +output (positive electrode) of the cell unit 356 which constructs the series connector 664 and the connector (conductor) connected to −output (negative electrode) of the cell unit 357 which constructs the series connector 664 respectively serve as series terminal which connects a plurality of cell units 356 and cell units 357 in series, but the series terminals are disposed at about the same height in the upper-lower direction relative to the positive electrode terminal, i.e., positive electrode output terminal 661 and the negative electrode terminal, i.e., negative electrode output terminal 662, and thus the battery pack with compact size in the upper-lower direction can be constructed.

FIG. 23 is a diagram illustrating a shape of a mounted battery pack cover 640 in a state where the battery pack 600 is not mounted to an electrical device body. The battery pack cover 640 is, for example, made up of non-conductive material such as vinyl chloride resin or other plastic material, and is mounted in the manner of covering the lower step surface 611, the stepped part 612 and the upper step surface 615 of the battery pack 600. The battery pack cover 640 is constructed by connecting upper step part 643 serving as a first planar part and the lower step part 641 serving as a second planar part through a vertical surface 642, and is formed with a crank-like shape when viewed from a lateral cross-sectional perspective. Three vertical ribs 646 to 648 are formed in the manner of crossing the upper step part 643 of the battery pack cover 640 and the vertical surface 642. The vertical ribs 646 to 648 are formed at the positions which are about the same as the positive input terminals 651 and 681, negative input terminals 652 and 682, series/parallel switching terminal with the same size. Specifically, the plate thickness at the lower portion of the front side of the vertical ribs 646 to 648 is slightly thinner for ease of configuration. By mounting the battery pack cover 640 on the battery pack 600, the cell unit 356 and the cell unit 357 are completely electrically independent from each other. For example, when the cell unit 356 and the cell unit 357 respectively have power capacity of 54 Wh (=voltage 18V× capacitance 3.0 Ah), in the absence of battery pack cover 640, the cell unit 356 and the cell unit 357 are connected in parallel to have power capacity of 108 Wh (=voltage 18V× 2×capacitance 3.0 AH). Typically, for lithium ion battery pack, when the power capacity exceeds 100 Wh, it becomes an object that is prohibited for transport. However, by disposing the battery pack cover 640 and thus being regarded as two batteries with power capacity of 54 Wh, it is no longer an object prohibited for transport and thus can be processed through normal transport, thereby significantly reducing the packing material and transporting cost.

At the outer periphery and in the vicinity of the central line of longitudinal direction of the battery pack cover 640, the edge 644 and the rib 645 extended in a thickness direction (upper-lower direction) are formed integrally to increase rigidity. When the vertical ribs 646 to 648 are mounted on the battery pack cover 640, the vertical rib 646 is inserted into the positive electrode terminal slot 621 and fitted with the positive input terminal 651. The vertical rib 647 is inserted into the negative electrode terminal slot 622 and fitted with the negative input terminal 652. The vertical rib 648 is inserted into the series/parallel switching element slot 623 and fitted with the parallel connectors 663a and 663b as well as the series connector 664. The battery pack cover 640 uses the elasticity of the positive input terminal 651, the negative input terminal 652 and the parallel connectors 663a and 663b to be retained without falling from the battery pack 600.

Based on the above, in the battery pack 600 shown in FIG. 21 to FIG. 23, the parallel connector pair 663 including two sets of parallel connectors 663a and 633b as well as the series connector 664 including a contact in an open state are arranged in parallel in the inner part of the series/parallel switching element slot 623 in a mounting direction. In this manner, as shown in FIG. 21, the length $L_{S1}$ of the series/parallel switching element slot 623 in the mounting direction is longer than the length $L_S$ of other slots. If the region that is equivalent to the length $L_{S1}$ of the series/parallel switching element slot 623 become longer, the problem regarding a lack of space for mounting of battery pack 600 might occur. In such condition, it might not be necessary to arrange all of the series connector 664 and parallel connectors 663a and 633b in one slot (series/parallel switching element slot 623) but separately distributed is two slots. FIG. 24 and FIG. 25 are top views of construction of a battery pack 600A (modification example of the fourth embodiment).

FIG. 24 is a top view of a battery pack 600A of a modification example of a fourth embodiment of the invention. The change is made to the appearance and shape of a first slot 623A and a second slot 624A of the battery pack 600A for switching series connection and parallel connection. A plurality of slot parts are disposed on the upper step surface 615, but the slot part for transmitting signal is changed to ensure the second slot 624A for switching series connection and parallel connection. In the first slot 623A, a parallel connector 673a disposed at the side of opening (entrance side of mounting direction) close to the side of the lower step surface 611 is provided, and a series connector 674 is disposed at the depth side such that the adjacent terminal pairs are arranged in series. On the other hand, in the second slot 624A, a parallel connector 673b is partially disposed in the depth part away from the lower step surface 611. The series connector 674, the parallel connectors 673a and 673b are respectively constructed by a set of conductor pairs separated in the left-right direction. In the state where the battery pack 600A is not mounted, the conductor pair on the left and right sides of the parallel connectors 673a and 673b are in a contact state, and the conductor pair on the left and right sides of the series connector 674 are spaced apart in a non-contact state. With such configuration, the length of the first slot 623A and the second slot 624A viewed from the mounting direction may be set as $L_{S2}$, and thus being shorter relative to the length $L_{S1}$ of the series/parallel switching element slot 623 as shown in FIG. 21, which is advantageous for mounting. Additionally, at the opening side of the second slot 624A, although it is not shown, a connection element configured for signal connection in the known art may be used such as an output V terminal of a display battery, and thus interchangeability of electric tool for connecting with 18V is not damaged. The connection element for signal connection serves as signal terminal for inputting or outputting information or signal.

FIG. 25 illustrates a connection circuit at the time when a battery pack 600A in the modification example of the fourth embodiment is connected to the cell unit of the electrical device body. FIG. 25(1) shows a state of connecting to an electrical device body for low voltage (e.g., 18V).

FIG. 25(2) shows a state of connecting to an electrical device body for high voltage (e.g., 36V). As compared with the configuration shown in FIG. 22, the shape of the terminal part 650 of electric device for low voltage (e.g., 18V) is the same, but the shape of the terminal part 680A of electric device for high voltage (e.g., 36V) is different. In the terminal part 680 shown in FIG. 22, the series/parallel switching terminal 683 is constructed as one string, but in the terminal part 680 shown in a modification example, serving as series/parallel switching terminal, the first series/parallel switching terminal 693 and the second series/parallel switching terminal 694 are disposed separately. In the first series/parallel switching terminal 693, the conduction terminal 693b that is formed by conductor is formed at the front end portion that is first abutted against the parallel connector 673b when mounting the battery pack 600A, and disconnection terminal 693a formed by non-conductor is formed at the rear end portion. On the other hand, the overall second series/parallel switching terminal 694 is fabricated in the form of a disconnection terminal serving as non-conductor. Here, the terminal part 680A is formed as a stage part through the integral synthetic resin, the positive input terminal 681 the negative input terminal 682 with a plate shape formed of metal is casted herein. The disconnection terminal 693a of the series/parallel switching terminal 693 as well as the series/parallel switching terminal 694 and the stage part will work by being integrally formed of synthetic resin.

The circuit diagram shown at the lower side of FIG. 25 shows a state where the battery pack 600A is mounted on the electrical device body such that the terminal part 650 and the terminal part 680A are connected with the output terminal group of the battery pack 600A. In the state shown in FIG. 25(2), the +output of the cell unit 356 and the −output of cell unit 357 are connected to the positive electrode output terminal 661 and the negative electrode output terminal 662 in series connection state. The +terminal of the cell unit 357 constructed by five pieces of cells connected in series is connected to the positive electrode output terminal 661, by being inserted by the conduction terminal 693b, the −terminal becomes a series connector 674 in short-circuited state and connected to the +terminal of the cell unit 356. The −terminal of the cell unit 356 is connected to the negative electrode output terminal 662. Herein, the parallel connectors 673a and 673b forming the parallel connector pair 673 are spaced apart by the disconnection terminal 693a and the second series/parallel switching terminal (disconnection terminal) 694 between two respective contact and thus in a non-conduction state; therefore, the parallel connection state between the cell units 356 and 357 as shown in FIG. 25(1) is cancelled. Herein, the position of the parallel connector 673a is adjacent to the series connector 674 when viewed from the mounting direction instead of being adjacent to the parallel connector 673b, which serves the purpose of arranging the conventional terminal for transmitting signal at the entrance side of the parallel connector 673a. Additionally, it is possible to gather the parallel connectors 673a and 673b at the side of the first series/parallel switching terminal 693, and arrange the series connector 674 at the side of the second series/parallel switching terminal 694. However, if the first series/parallel switching terminal 693 is damaged and detached from the terminal part 680A, by being only connected to series connector 674 with the function of the second series/parallel switching terminal 694, it is likely that short-circuit phenomenon might occur. Therefore, the configuration as shown in the present drawing is more advantageous.

As described above, the advantage of the modification examples shown in FIG. 24 and FIG. 25 might restrict the length of the first series/parallel switching terminal 693 in the longitudinal direction, and similarly restrict the length of the first slot 623A. From the root part side of the second series/parallel switching terminal 694, it is possible to use the casted metallic terminal to maintain the conventional terminal for transmitting signal. Additionally, there is completely no need to modify the terminal part 650 of the electrical device body for low voltage (18V); therefore, the battery pack of the invention can be directly applied to conventional electrical device body. Moreover, in the fourth embodiment, to be used for low voltage and high voltage, a battery pack that is formed with the use of five cells formed as one cell unit and outputs 18V and 36V serves as an example for description, but the output voltage can be set randomly, other combination can be realized as long as the output voltage difference is set at the ratio of two times, such as a battery pack that is formed with the use of 15 pieces of cells formed as one cell unit and switches between 54V (low voltage side) and 108V (high voltage side).

Embodiment 5

Next, FIG. 26 to FIG. 28 are incorporated to describe the fifth embodiment of the invention. Like in the fourth embodiment, a battery pack 700 of the fifth embodiment can also automatically switch between 18V and 36V according to the shape of the terminal at the side of the electric tool body. That is, when being disposed on the electric tool body or the electrical device body, the battery pack 700 automatically switch the output voltage corresponding to the rated voltage at the side of the body. FIG. 26 is a perspective view illustrating an appearance/shape of a battery pack 700. The shape of the battery pack 700 and the conventional battery pack 15 (see FIG. 1) rated at 18V are interchangeable. A plurality of slot parts are formed in a step-like projection part at the boundary between the lower step surface 111 and the upper step surface 115 of the battery pack 700. The inner side of the slot parts become a terminal configuration region and provided with a plurality of output terminals or signal terminals. The slot part has notch in both of the direction parallel with the mounting direction and the upper-lower direction, such that the slot part can be inserted into the terminal of the electric tool body from the lower step surface 111. Additionally, an opening part 709 with continuous opening in the lateral direction is formed in the rear portion of the lower step surface 111 at the lower side of the slot part. In the plurality of slots formed in the region on the front side of the upper step surface 115, the first slot 701 accommodates the terminal pair for transmitting the +output at the side of battery pack. The second slot 704 accommodates the terminal pair for transmitting the −output at the side of battery pack. The third slot 707 accommodates the series connection terminal pair, which makes the −output from a cell unit and the −output from another cell unit to be disposed adjacent to each other in a non-contact state, thereby switching the output voltage of the battery pack 700. Additionally, in the battery pack 700, the slot of the following terminals is formed: LD terminal, configured to output the over-discharge protection signal formed by the battery protection circuit (not shown) included in the battery pack 700; $L_S$ terminal, configured to output the temperature information of the battery formed by sensing element (not shown) disposed to be in contact with the cell; V terminal, configured to input the control signal from a charging device; T terminal, configured to output the signal serving as recognition information of the battery pack 700 to the electric tool body or the charging device; C+terminal, serving as +terminal for charging. The terminals disposed in the slots serve the same function as the conventional battery pack 15 (see FIG. 1). The LD terminal, the LS terminal, the T terminal serve as signal terminals for inputting or outputting information or signal.

FIG. 26(2) is a circuit diagram in the battery pack 700. The inner part of the battery pack 700 accommodates cell units 356 and 357 formed by two sets of cells with five pieces of 14500 or 18650 lithium ion batteries connected in series. The +output of the cell unit 356 is connected to positive electrode terminal 712, and the +output of the cell unit 357 is connected to the positive electrode terminal 713. The positive electrode terminals 712, 713 forming the parallel positive electrode terminal pair are adjacent to each other and secured on the terminal substrate 711 in the manner of being secured in the slot 701. The positive electrode terminals 712 and 713 serve as positive electrode terminals and also serve as switching terminal which switches the output voltage of the battery pack 700 into low voltage, and also serve as parallel terminal that connects a plurality of cell units in parallel. Additionally, the plurality of positive electrode terminals 712 and 713 serving as parallel terminal are disposed adjacent to each other and serve as parallel terminal group. Likewise, the −output of the cell unit 357 is connected to the negative electrode terminal 715, and the −output of the cell unit 356 is connected to the negative electrode terminal 716. The negative electrode terminals 715 and 716 serve as negative electrode terminal, also serve as switching terminal which switches the output voltage of the battery pack 700 into low voltage, and also serve as parallel terminal that connects a plurality of unit cells in parallel. Furthermore, the plurality of negative electrode terminals 715, and 716 serving as parallel terminal are disposed adjacent to each other and serve as another parallel terminal group. The negative electrode terminals 715 and 716 that form the parallel negative electrode terminal pair are adjacent to each other and secured on the terminal substrate 714 in the manner of being secured in the slot 704. Accordingly, in the present embodiment, the +output from the cell unit 357 and the −output from the cell unit 356 serve as series connection terminal pair through the connected series connection terminal 718 and the connected series connection terminal 719 and are disposed in the slot 707. The series connection terminals 718 and 719 serve as switching terminal for switching output voltage of the battery pack 700 into high voltage, and also serve as series terminal that connects a plurality of cell units 356, 357 in series. Additionally, the plurality of series connection terminals 718 and 719 that serve as series terminals are disposed adjacent to each other to serve as series terminal group. The positive electrode terminals 712 and 713 as well as the negative electrode terminals 715 and 716 are adjacent to each other in the manner of being extended from each of the cell units of the plurality of different cell units 356 and 357 and separated from each other, thereby serving as voltage switching element that switches between the parallel connection and series connection of the cell units 356 and 357.

When the battery pack 700 is not mounted on the electric tool body or the charger, as shown in the circuit diagram of FIG. 26(2), the positive electrode terminals 712 and 713 are in non-contact state, the negative electrode terminals 715 and 716 are in non-contact state, and the series connection terminal 718 and the series connection terminal 719 are in non-contact state. The series connection terminals 718 and 719 are used in pairs, and secured on the terminal substrate 717 in the manner of being adjacent to each other. Furthermore, the terminal substrates 711, 714 and 717 may be an integral substrate, and may also serve as a protection circuit substrate provided with battery protection circuit. The positive electrode terminals 712 and 713, the negative electrode terminals 715 and 716, and the series connection terminals 718 and 719 construct a switching terminal group, and the positive electrode terminals 712 and 713 construct a positive electrode terminal pair or a parallel positive electrode terminal group (parallel terminal group). The negative electrode terminals 715 and 716 construct a negative electrode terminal pair or a parallel negative electrode terminal group. The series connection terminals 718 and 719 construct a series connection terminal group (series terminal group).

FIG. 27 is a diagram illustrating a state where a battery pack 700 is connected to a conventional electric tool body rated at 18V. FIG. 27(1) is a circuit diagram at the time of connection. Herein, the positive input terminal 721 at the side of the electric tool body is in contact with the positive electrode terminals 712 and 713, and the negative input terminals 722 is in contact with the negative electrode terminals 715 and 716, thereby forming the parallel connection circuit of the cell units 356 and 357. The positive input terminals 721 and the negative input terminal 722 serve as switching element that switches the output voltage of the battery pack 700 into low voltage or a connection element, and also serve as switching element for low voltage that connects a plurality of cell units in parallel. FIG. 27(3) is a side view of positive electrode terminals 712 and 713, and has the shape of the positive input terminal 721 of the terminal part 720 at the side of the electric tool body rated at 18V. FIG. 27(2) is a top view of positive electrode terminals 712, 713. Herein, the positive input terminal 721 of the terminal part 720 is formed with the same shape as conventional electric tool in the form of a metal plate having a height H. A contact region where the positive electrode terminals 712 and 713 are in contact with the positive input terminal 721 is formed by an elongate plate-shaped member having a height H/2 in the upper-lower direction. One side (the side opposite to the opening part of slot) of the positive electrode terminal 712 away from the positive input terminal 721 is extended upward from the terminal substrate 711, and is extended from the upper side of the positive electrode terminal 713 to the side (opening part of slot) of the positive input terminal 721. On the other hand, the positive electrode terminal 713 has a shape with decreased thickness that is formed by cutting the upper portion of the conventional positive electrode terminal, the positive electrode terminals 712 and 713 are spaced part without being in contact with each other. The positive input terminal 721 is formed by a metal plate that is casted in the terminal part 720 made up of synthetic resin on the side of the electric tool body.

The positive electrode terminal 712 is formed to have the shape described as follows: a flat plate is bent into a U-shape and folded at the opening end portion. The folded portion is in contact with and blocks the open end portion. Likewise, the positive electrode terminal 713 is also formed to have the shape described as follows: a flat plate is bent into a U-shape and folded at the open end portion. The folded part is in contact with and the blocks the open end portion. The front-rear length of the positive electrode terminal 713 is constructed to be shorter and close to half of the positive electrode terminal 712, but the shape of the front side portion L when viewed from the top is identical with the corresponding part of the positive electrode terminal 712. In this manner, the plurality of positive electrode terminals are disposed adjacent to each other in the first slot 701 and form a positive electrode terminal group. Meanwhile, when the battery pack 700 is mounted on the battery pack mounting part of the electric tool body, the positive input terminal 721 is pressed and fitted in the manner of opening the open end part of the positive electrode terminals 712 and 713, such that a partial region at the upper side of the positive input terminal 721 is in contact with the positive electrode terminal 712, and a partial region at the lower side is in contact with the positive electrode terminal 713. As a result, the positive electrode terminals 712 and 713 become short-circuited state through the positive input terminal 721. In FIG. 27(2) and FIG. 27(3), the terminal structure in the negative electrode terminals 715 and 716 also has the same shape. That is, the negative electrode terminal 715 and the positive electrode terminal 712 have the same shape, the negative electrode terminal 716 and the positive electrode terminal 713 have the same shape, and the negative input terminal 722 and the positive input terminal 721 have the same shape. The plurality of negative electrode terminals are disposed adjacent to each other in the second slot 704 to form a negative electrode terminal group. In this manner, by disposing the battery pack 700 in the terminal part 720 at the side of the electric tool body, the positive input terminal 721 and the negative input terminal 722 are respectively connected to positive electrode terminal pair and negative electrode terminal pair. The cell unit 356 and the cell unit 357 are connected in parallel and the output thereof is rated at 18V.

FIG. 27(4) is a front view of the shape of the terminal part 720 at the side of the electric tool body. FIG. 27(5) is a perspective view of the terminal part 720. The terminal part 720 is fabricated integrally by using non-conductive material such as synthetic resin, and three pieces of metallic terminals are firmly secured by the means of casting, namely, the positive input terminal 721, the negative input terminal 722 and the LD terminal 723. As shown in FIG. 27(5), the LD terminal 723 is constructed with a bigger size than the positive input terminal 721 and the negative input terminal 722 in order to stably retain the battery pack 700 disposed thereon. The terminal part 720 is not only provided with a vertical plane 720b serving as abutting surface in the mounting direction, but also provided with a horizontal plane (upper surface viewed from terminals 721 to 723) 720a, the horizontal plane 720a is a plane that is relatively slid opposite to the upper step surface 115 when the battery pack 720 is mounted.

FIG. 28 is a diagram illustrating a state where the battery pack 700 is connected to a novel electric tool body rated at 36V. FIG. 28(1) is a circuit diagram at the time of connection. Herein, the positive input terminal 731 at the side of the electric tool body rated at 36V is only in contact with the positive electrode terminal 712 but not in contact with the positive electrode terminal 713. Likewise, the negative input terminal 732 is only in contact with the negative electrode terminal 715 but not in contact with the negative electrode terminal 716. On the other hand, by inserting a metallic conduction terminal (short) 734 additionally disposed in the terminal part 730 between the series connection terminals 718 and 719, the series connection terminals 718 and 719 that are disposed in non-contact state are short-circuited. In this manner, the result of using a short to connect the series connection terminals 718 and 719 is that, the −output of the cell unit 356 is connected to the +output of cell unit 357. Accordingly, as one could see from the circuit diagram shown in FIG. 28(1), the positive input terminal 731 and the negative input terminal 732 are connected with series output of the cell units 356 and 357. The conduction terminal (short) 734 serves as switching element that switches the output voltage of the battery pack 700 into high voltage, and also serves as a connection element for high voltage that connects the plurality of cell units 356 and 357 in series. In FIG. 28(2) and FIG. 28(3), the terminal shape at the side of the battery pack 700, i.e., the shape of the positive electrode terminals 712 and 713, the shape of the negative electrode terminals 715 and 716 in the same form and the terminal shape shown in FIG. 27 are not changed in comparison. However, the terminal shape of terminal part 730 is designed to be different. On the right side of FIG. 28(3), in the positive input terminal 731 of the terminal part 730, the metallic part corresponding to the positive electrode terminal 712 is exposed, but the part corresponding to the positive electrode terminal 713 is replaced by insulating terminal material or an insulating material is used to cover a portion of the positive electrode terminal 713, thereby forming the plate-shaped insulating terminal 735. As a result, the positive input terminal 731 is only conducted with the positive electrode terminal 712 but not conducted with the positive electrode terminal 713, and thus the positive input terminal 731 at the side of the electric tool body is connected to the +output of the cell unit 356, and the +output of the cell unit 357 becomes a non-connection state (in FIG. 28(1), the non-connection state is shown with dashed line). The negative input terminal 732 at the side of the electric tool body is formed to have the terminal shape that is completely the same as the positive input terminal 731 as shown in FIG. 28(4) and FIG. 28(5). An insulating terminal 736 is disposed in the lower portion of the negative input terminal 732, such that when the terminal part 730 is disposed on the battery pack 700, the negative input terminal 732 and the negative electrode terminal 716 are not conducted. In this manner, the negative input terminal 732 at the side of the electric tool body is connected to the −output of the cell unit 357, but the −output of the cell unit 356 is in a non-connection state.

FIG. 28(4) is a front view of a shape of the terminal part 730 at the side of electric tool body. FIG. 28(5) is a perspective view of the terminal part 730. As compared with the terminal part 720 in FIG. 27, the terminal part 730 is characterized in that the positive input terminal 731 and the negative input terminal 732 are formed to have a thinner width in the upper-lower direction in the manner of being only in contact with the positive electrode terminal 712 and the negative electrode terminal 715 respectively disposed thereon. Additionally, the insulating terminal 735 made up of synthetic resin is formed in the portion closer to the lower side than the positive input terminal 731, and the insulating terminal 736 made up of synthetic resin is formed in the portion closer to the lower side than the negative input terminal 732. The insulating terminals 735 and 736 may be integrally formed respectively through the terminal part 730 with the rear side connected to the vertical plane 730b. Herein, the thickness of the plate-shaped insulating terminals 735 and 736 is formed to be thicker than the positive input terminal 731 and the negative input terminal 732. In this manner, when the synthetic resin portion of the terminal part 730 including the insulating terminals 735 and 736 is molded, the lower portion of the metallic positive input terminal 731 and the negative input terminal 732 can be casted in the synthetic resin to achieve an insulation state.

A conduction terminal 734 is additionally formed in the terminal part 730. The conduction terminal 734 is disposed at a random position. Herein, since the empty slot portion (slot 707 in FIG. 26) in the conventional battery pack for 18V is used to dispose the series connection terminals 718 and 719, the conduction terminal 734 is located next to the positive input terminal 731. The conduction terminal 734 is a metallic plate. A portion of the positive input terminal 731, the negative input terminal 732 and the LD terminal 733 has wiring connection parts 731a, 732a and 733a for putting wiring in the electrical device body. Relatively, the wiring connection part is not required for the conduction terminal 734 for the reason that the conduction terminal 734 is only configured to make the series connection terminals 718 and 719 become short-circuited. Additionally, the configuration may be designed by using the conduction terminal 734 to perform signal transmission, and the wiring connection part may be formed in such circumstances. As viewed from FIG. 28(4), the wiring connection parts 731a, 732a and 733a are disposed in the manner of leaning further to the inner side than the positions of the positive input terminal 731, the negative input terminal 732 and the LD terminal 733, and the reason for such configuration is that, the metallic plate for forming the positive input terminal 731, the negative input terminal 732 and the LD terminal 733 is bent into a crane-like shape having step difference, and the bent portion is casted by using synthetic resin.

In the fifth embodiment, by only changing the shape of the terminal part at the side of the electric tool body into the shape (terminal part 720) shown in FIG. 27 or the shape (terminal part 730) shown in FIG. 28, it is easy to change the output voltage from the battery pack 700 from 18V into 36V. Moreover, there is no need to use movable element such as switching member in the battery pack 700, thereby realizing a battery pack with simple structure and high durability. Furthermore, the positive electrode terminals 712 and 713, the negative electrode terminals 715 and 716 and the series connection terminals 718 and 719 may be mounted in the current slot part of the battery pack for 18V; therefore, the voltage switching battery pack can be realized in a size interchangeable with the conventional one. Based on the above, FIG. 27 and FIG. 28 are incorporated to describe the structure of the fifth embodiment, but such structure, especially the terminal shape may be modified into any forms. In the fifth embodiment, the voltage switching element and the power terminal are disposed at about the same height in the upper-lower direction, and thus the battery pack with a compact size in the upper-lower direction can be formed. Additionally, the series connection terminals 718 and 719 serving as series terminal are disposed at the about the same height as the positive electrode terminals 712 and 713 as well as the negative electrode terminals 715 and 716 in the upper-lower direction, and thus the battery pack with a compact size in the upper-lower direction can be formed.

FIG. 29 is a diagram showing a modification example 1 which only changes the terminal part of the electric tool body for 36V. In FIG. 29, only the shape of the terminal part 750 is different, which is set as a configuration in which the disconnection terminal as shown in FIG. 28 is not disposed at the lower side of the positive input terminal 751, and positive electrode terminal 713 is not in contact with anything in the mounting process of the battery pack. As shown in FIG. 29(3) and FIG. 29(4), the lower side of the negative input terminal 752 is also a configuration in which the disconnection terminal is not disposed. The shape of the conduction terminal 754 and the LD terminal 753 have the same shape as FIG. 28. The terminal part 750 described above can also achieve the same effect as FIG. 28.

FIG. 30 is a diagram showing a modification example 2 which only changes the terminal part of the electric tool body for 36V. The basic configuration of FIG. 30 is the same as FIG. 29. The positive electrode terminals 712 and 713 are configured in parallel without being in contact with each other in a direction, which is upper-lower direction herein, intersecting the insertion direction of the battery pack 700. The positive input terminal 771 is formed in the terminal part 770 for 36V, the positive input terminal 771 has a width that is appropriate for being only in contact with the positive electrode terminal 712 in the upper-lower direction, and the insulating plate 775 that is extended along a horizontal direction is formed in the manner of being in contact with the lower edge part of the positive input terminal 771. The insulating plate 775 enters between the interval 777 in the upper-lower direction of the positive electrode terminal 712 and the positive electrode terminal 713 in the mounting process of the battery pack 700, thereby achieving the effect of substantially completely preventing the possibility of short-circuit phenomenon caused by dust or foreign matter that enters between the positive electrode terminal 712 and the positive electrode terminal 713 when the electric tool is operated, thereby retaining good insulation state between the positive electrode terminal 712 and the positive electrode terminal 713. As shown in FIG. 30(3), viewing from the direction parallel with the insertion direction of the battery pack, an insulating plate 776 with a predetermined width is formed in a horizontal direction in the negative input terminal 772. The shapes of the conduction terminal 774 and the LD terminal 773 are not changed. Viewing from FIG. 30(4), the insulating plates 775 and 776 at the lower side of the positive input terminal 771 and the negative input terminal 772 are connected to the vertical plane 770b of the terminal part 770. The ideal width of the insulating plates 775 and 776 in the left-right direction is a width that is extended to the vicinity of the boundary between the adjacent slit, but may be smaller than said width. Herein, a portion of the insulating plates 775 and 776 may be formed integrally with the terminal part 770; in such circumstances, the positive input terminal 771 and the negative input terminal 772 are secured through cast molding.

FIG. 31 is a diagram showing a modification example 3 which changes the shape of a terminal at the side of a battery pack for 36V and the terminal part 790 at the side of the electric tool body. The positive electrode terminals 782 and 783 are disposed on the terminal substrate 781 in parallel along the direction identical with the insertion direction of the battery pack 700 and retained in non-contact state. The upper portions 782a and 783a of the positive electrode terminals 782 and 783 are separated from each other in the mounting direction as shown in the top view of FIG. 31(1). The inserted positive input terminal 721 is formed in the shape that allows it to pass through from the inlet side 787a to the outlet side 787b. The lower portions 782b and 783b of the positive electrode terminals 782 and 783 are formed as a U-shape through left-right connection, such that the manufacturing process can be easily performed through the pressing process of one metallic plate.

There is no need to change the shapes of the positive input terminal 721 and the negative input terminal 722 inserted into the positive electrode terminal pair (782, 783) and the negative electrode terminal pair having the same shape in the electric tool body rated at 18V relative to the shape shown in FIG. 27 as shown in FIG. 31(2) and FIG. 31(3). On the other hand, in the electric tool body rated at 36V, it is required to change the shape of the terminal part 790. In the terminal part 790, the insulating plate 795 and the positive input terminal 791 are arranged in parallel in the insertion direction of the battery pack. That is, as compared with the terminal part 720 for rated 18V, the exposing area of the positive input terminal 791 is reduced to be about half of the positive input terminal 721, such that when 36V is output, the positive input terminal 791 is only in contact with the positive electrode terminal 782, and the positive electrode terminal 783 is non-conducted. The side of the negative input terminal 792 is constructed in the same manner as the positive input terminal 791. As shown in FIG. 31(4) and FIG. 31(5), an insulating plate 796 is formed adjacent to the negative input terminal 792. The insulating plates 795 and 796 may be formed integrally along with the stage portion of the terminal part 790 through injection molding of synthetic resin. As described above, in the modification example 3, a voltage switching battery pack interchangeable with conventional electric tool body of 18V can be realized.

FIG. 32 is a diagram showing a modification example 4 which only changes the terminal part 800 of the electric tool body for 36V. The embodiment shows the shape that is formed after the insulating plate 795 exemplified in FIG. 31 is removed. The length of the positive input terminal 801 in the mounting direction is set to be slightly shorter than half of the positive input terminal 721 (see FIG. 27) for 18V. The length of the negative input terminal 802 in the mounting direction is similarly set to be slightly shorter than half of the negative input terminal 722 for 18V. When viewed from the rear side as shown in FIG. 32(3), the shape of the terminal part 800 is not only the same as the terminal for 18V besides having the conduction terminal 804, but also explicit according to the perspective view of FIG. 32(4). The positive input terminal 801 and the negative input terminal 802 are shorter in the front-rear direction as compared with other terminals (803, 804).

FIG. 33 is a diagram showing a modification example 5 which changes the shapes of the positive electrode terminal pair and the negative electrode terminal pair at the side of the battery pack. The positive electrode terminals 812 and 813 have the shape of only a single side that is formed by removing the positive electrode terminals 712 and 713 shown in FIG. 27. The positive electrode terminal 812 is formed with the shape of only the right half portion, and the positive electrode terminal 813 is formed with the shape of only the left half portion. In the side view shown in FIG. 33(2), since being separated in the upper-lower direction, in the state that the positive input terminals 721 or 731 is not inserted, the positive electrode terminals 812 and 813 are not likely to be in contact with each other. Although it is not shown in the drawing, the shape at the side of the negative electrode terminal and the shape of terminal pair for series connection can be formed in the same manner. The shape of the terminal part 720 for 18V mounted in the terminal is the same as that shown in FIG. 27, the shape of the terminal part 730 for 36V is the same as that shown in FIG. 28. In the modification example 5, it is possible to reduce the weight of the positive electrode terminal, the negative electrode terminal, the series connection terminal pair and thus realizing lightweight battery pack.

FIG. 34 is a diagram showing a modification example 6 which only changes the terminal part 750 for 36V relative to the modification example 5 in FIG. 33. The shape of the terminal part 750 is the same as that shown in FIG. 29, and the width of the positive input terminal 751 and the negative input terminal 752 in the upper-lower direction is reduced. In this manner, when the terminal part 750 for 36V is brought into contact, the series output of the cell unit 356 and the cell unit 357 can be obtained from the battery pack.

FIG. 35 is a diagram showing a modification example 7 which only changes the terminal part 770 for 36V relative to modification example 5 in FIG. 33. The shape of the terminal part 770 is the same as that shown in FIG. 30, and the width of the positive input terminal 771 in the upper-lower direction is reduced. Also, an insulating plate 775 extended along the horizontal direction is formed in the manner of being in contact with the lower edge portion of the positive input terminal 771. The construction at the side of the negative input terminal 772 side is the same as the structure shown in FIG. 30.

Based on the above, in the fifth embodiment, in the battery pack capable of switching output voltage, by disposing a plurality of divided positive electrode terminal pairs and negative electrode terminal pairs without using the switching mechanism having a plurality of movable components, and using two cell units 356 and 357 to form series connection terminal pair in series connection state, it is possible to realize a battery pack that can easily switch voltage by simply selecting the shape at the side of the terminal part of the electrical device body for 18V or 36V. Additionally, there is no need to install complicated switch mechanism in the battery pack, and thus the number of component can be decreased, assembly can be improved, and minimization of battery pack can be achieved while interchangeability is maintained.

The first to the fifth embodiments may be modified in any manner. The above embodiments correspond to the condition of voltage switching between 18V and 36V, but the switching may be performed at another ratio.

Embodiment 6

FIG. 36 is a diagram for illustrating mounting of a battery pack of the sixth embodiment of the invention toward an electric tool. An electric tool serving as a form of electric device has a battery pack, and a front end tool and an operating device is driven by a rotational driving force of a motor. Implementation of a variety of electric tools are included, but the electric tool bodies 1001 and 1030 shown in FIG. 36 are referred to as compact tools. The electric tool bodies 1001 and 1030 are tools that perform securing operation through applying rotational force or axial impact force with use of front end tools such as drill or socket wrench that are not shown in the drawings. Such electric tool bodies 1001 and 1030 have housings 1002 and 1032 serving as outer frame for forming outer shape. Handle parts 1003 and 1033 are formed in the housings 1002 and 1032. Operation switches 1004 and 1034 with a trigger shape are disposed in the vicinity of a portion of the handle parts 1003 and 1033 that is abutted against the user's finger when the handle parts 1003 and 1033 are grabbed. The battery pack mounting parts 1010 and 1040 for mounting the battery packs 1015 and 1100 are formed under the handle parts 1003 and 1033.

The electric tool body 1001 is a conventional electric device that uses battery pack 1015 rated at 18V. The battery pack 1015 is a conventional battery pack, and may be disposed in the battery pack mounting part 1010 corresponding to the electric device (electric tool body 1001) for 18V as shown in the combination of arrow a. The inner part of the battery pack 1015 accommodates only one set of cell unit formed by five pieces of cells of lithium ion battery rated at 3.6V connected in series, or accommodates two sets of such cell units and connected in parallel. Voltage 18V refers to relatively low voltage, which is referred to as low voltage hereinafter. Likewise, sometimes the electric tool body 1001 or electrical device body rated at voltage 18V is referred to as low voltage electric tool body or low voltage electrical device body respectively. Similarly, sometimes the battery pack 1015 with nominal voltage 18V is referred to as low voltage battery pack.

The electric tool body 1030 is an electrical device body rated at voltage 36V, and as shown by arrow b1, the battery back 1100 capable of outputting 36V is mounted in the battery pack mounting part 1040. Voltage 36V refers to relatively high voltage, which is referred to as high voltage hereinafter. Likewise, sometimes the electric tool body 1030 or electrical device body rated at voltage 36V is referred to as high voltage electric tool body or high voltage electrical device body respectively. The inner part of the battery pack 1100 accommodates two sets of cell units formed by five pieces of cells of 3.6V lithium ion battery connected in series, by changing the connecting method of two sets of cell units, it is possible to perform switching between 18V output and 36 output. In the sixth embodiment, the battery pack 1100 is constructed as corresponding to two kinds of voltage and capable of performing output of low voltage and high voltage, such that the battery pack 1100 is mounted on the electric tool body 1001 corresponding to 18V as indicated by arrow b2, and may be mounted on the electric tool body 1030 corresponding to 36V as indicated by arrow b1. Accordingly, the battery pack 1100 capable of outputting low voltage and high voltage is sometimes referred to as variable voltage battery pack hereinafter. In order to mount the battery pack 1100 on the electric tool bodies 1001 and 1030 corresponding to different voltages as indicated by arrows b1 and b2, it is important to make the shape of rail part or terminal part of the battery pack mounting parts 1010 and 1040 to be substantially the same, and the output voltage of battery pack 1100 should be switchable. At this time, it is important to make the output voltage of the battery pack 1100 to exactly correspond to the rated voltage of the electrical device body or electric tool body on which the battery pack is mounted so the voltage is not set erroneously.

FIG. 37 is a perspective view illustrating a shape of a battery pack mounting part 1010 of an electric tool body 1001. Herein, the electric tool body 1001 shown in the drawing is an impact driver, a handle part that is extended downward from the body portion of the housing 1002 is provided, and the battery pack mounting part 1010 is formed at the lower side of the handle part. A trigger switch 1004 is formed in the handle part. An anvil (not shown) serving as output axis is provided at the front side of the housing 1002, and a front end tool holder 1008 for mounting a front end tool 1009 is disposed at the front end of the anvil. Herein, four pluses of driver bit serving as front end tool 1009 are provided. Not limited to electric tool, the battery pack mounting part 1010 corresponding to the shape of the mounted battery pack is formed in all of the electric devices using the battery pack, and thus constructing a battery pack that cannot be equipped with unsuitable battery pack mounting part 1010. In the battery pack mounting part 1010, rail grooves 1011a and 1011b extended in parallel along a front-rear direction are formed in the inner wall portion on left and right sides, and a terminal part 1020 is disposed therebetween. The terminal part 1020 is formed integrally by non-conductor material such as synthetic resin, and a plurality of metallic terminals are casted therein, such as positive input terminal 1022, negative input terminal 1027, LD terminal (abnormal signal terminal) 1028. The LD terminal (abnormal signal terminal) 1028 serves as signal terminal for inputting or outputting information or signal. The terminal part 1020 is formed with a vertical plane 1020a and a horizontal plane 1020b serving as abutting plane along the mounting direction (front-rear direction). The horizontal plane 1020b becomes a plane that is adjacent to and opposite to the upper step surface 1115 (described below in FIG. 38) in the mounting process of the battery pack 1100. The front side of the horizontal plane 1020b is formed with a curved part 1012 abutted against the raised part 1132 (described below in FIG. 38) of the battery pack 1100, and a protrusion 1014 is formed in the vicinity of the center between the right and left sides of the curved part 1012. The protrusion 1014 also serves as a screw-fastening base of the housing of the electric tool body 1001 formed by being divided into two portions in the left-right direction, and also serves as a stopper that limits the battery pack 1100 from moving relatively along the mounting direction.

FIG. 38 is a perspective view of a battery pack 1100 of the sixth embodiment of the invention. The battery pack 1100 is installable or detachable relative to the battery pack mounting parts 1010 and 1040 (see FIG. 36), and can automatically switching between output of low voltage (18V) and high voltage (36V) according to the terminal shape at the side of electric tool body 1001 or 1030. Since being interchangeable with conventional battery pack 1015 (see FIG. 36) rated at 18V, the shape of the mounting portion of the battery pack 1100 is formed in the same shape as conventional battery pack 1015. The frame of the battery pack 1100 is formed by a lower case 1101 and an upper case 1110 dividable along the upper-lower direction. The lower case 1101 and the upper case 1110 are non-conducted component and, for example, made of synthetic resin, and secured onto each other via four pieces of screws. In order to be mounted on the battery pack mounting part 1010, the upper case 1110 is formed with a mounting mechanism constructed by two rails 1138a and 1138b. The rails 1138a and 1138b are formed in the manner of being parallel with the mounting direction of the battery pack 1100 and protruded from the left-right side surfaces of the upper case 1110. The front side end portion of the rails 1138a and 1138b is formed as an open end, the rear side end portion of the rails is formed as a closed end connected to the front side wall surface of the raised part 1132. The rails 1138a and 1138b are formed with a shape that corresponds to the rail grooves 1011a and 1011b (see FIG. 37) formed in the battery pack mounting part 1010 of the electric tool body 1001. In the condition that the rails 1138a and 1138b as well as the rail grooves 1011a and 1011b are fitted with each other, the locking part 1142a (stopping portion on the right side, not visible in FIG. 38) and 1142b serving as claw of latch are used for locking, thereby securing the battery pack 1100 on the electric tool body 1001. When the battery pack 1100 is removed from the electric tool body 1001, by pressing the latch 1141 on the right and left sides, the locking parts 1142a and 1142b are moved toward the inner side, and the locking state is cancelled. In such state, it is possible to make the battery pack 1100 to move toward the opposite side of the mounting direction.

A flat lower step surface 1111 is formed on the front side of the upper case 1110, an upper step surface 1115 that is higher than the lower step surface 1111 is formed in the vicinity of the center. The lower step surface 1111 and the upper step surface 1115 are formed with step-like shape. Such connection portion is formed as a stepped part 1114 serving as vertical surface. The front side portion ranging from the stepped part 1114 to the upper step surface 115 becomes slot group arrangement area 1120. The slot group arrangement area 1120 is formed with a plurality of slots 1121 to 1128 extended toward the rear side from the stepped part 1114 at the front. The slots 1121 to 1128 are a portion that is cut in a predetermined length along the mounting direction of the battery pack, and the inner portion of the cut portion becomes a terminal arrangement region, and provided with a plurality of connection terminals (described below in FIG. 39) that can be fitted with the electric tool bodies 1001 and 1030 or the terminal at the side of device of external charging device (not shown). In order for the slots 1121 to 1128 to be inserted into the terminal at the side of the electric tool body from the lower step surface 1111, a notch is formed not only on the upper surface parallel with the mounting direction but also formed on the vertical surface. Additionally, an opening part 1113 with continuous opening in the lateral direction is formed at the lower side of the slots 1121 to 1128 and between the lower step surface 1111.

In the slots 1121 to 1128, the slot 1121 at the side of the rail 1138a close to the right side of the battery pack 1100 is formed as an insertion port of a positive electrode terminal (C+terminal) for charging, and slot 1122 is formed as an insertion port of positive electrode terminal (+terminal) for discharging. Moreover, the slot 1127 at the side of the rail 1138b close to the left side of the battery pack 1100 is formed as an insertion port of negative electrode terminal (−terminal). In the battery pack 1100, typically the positive electrode side and the negative electrode side of the power terminal are sufficiently separated from each other, viewing from an imaginary vertical surface in the center between the left and right sides, a positive electrode terminal is disposed at a position that is sufficiently separated on the right side, and a negative electrode terminal is disposed on at a position that is sufficiently separated on the left side. The plurality of signal terminals for transmitting signals to the battery pack 1100 and the electric tool bodies 1001 and 1030 or external charging device (not shown) are disposed between the positive electrode terminal and the negative electrode terminal. Herein, the four slots 1123 to 1126 for signal terminal are disposed between the power terminal group. The slot 1123 is a back-up terminal insertion port, and no terminal is provided in the sixth embodiment. The slot 1124 is configured to output the signal serving as recognition information of the battery pack 1100 to the electric tool body or the insertion port for T terminal of charging device. The slot 1125 is an insertion port for V terminal that inputs control signal from the external charging device (not shown). The slot 1126 is an insertion port for LS terminal that outputs temperature information of the battery formed by the thermal sensitive resistor (sensing element) (not shown) that is disposed in contact with the cell. On the left side of the slot 1127 serving as insertion port of the negative electrode terminal (−terminal), a slot 1128 for LD terminal that outputs abnormal stop signal formed by battery protection circuit included in the battery pack 1100 is provided.

The rear side of the upper step surface 1115 is formed with a raised part 1132 formed in a raised manner. The shape of the raised part 1132 is raised to a side upper than the upper step surface 1115, and a stopper 1131 having concaves is formed in the vicinity of the center. The stopper 1131 becomes an abutting surface of the protrusion 1014 (see FIG. 37) when the battery pack 1100 is mounted on the battery pack mounting part 1010. If the protrusion 1014 that is inserted into the side of the electric tool body 1001 is abutted against the stopper 1131, the plurality of terminals (terminal at the side of device) disposed on the electric tool body 1001 and the plurality of connection terminals (described below in FIG. 39) disposed on the battery pack 1100 are brought into contact and become conducted. Additionally, the locking part 1142a (the locking part on the right side, not visible in FIG. 38) of the latch 1141 of the battery pack 1100 is protruded outward in the vertical direction in the lower portion of the rails 1138a and 1138b through the effect of spring, and locked with a recess (not shown) formed in the rail grooves 1011a and 1011b of the electric tool body 1030, thereby preventing the battery pack 1100 from falling. The inner side of the stopper 1131 is provided with a slit 1134 that is connected with the inner portion of the battery pack 1100 and serves as cooling wind inlet. Additionally, in the state where the battery pack 1100 is mounted on the electric tool body 1001, the slit 1134 is covered in the manner of being invisible from the outside and thus becoming a closed state. The slit 1134 is a window that forces the air for cooling to be flown into the inner portion of the battery pack 1100 when the battery pack 1100 is connected to the charging device (not shown) for charging, and the cooling wind introduced into the battery pack 110 is discharged to the outside from the slit 1104 that is disposed at the front wall of the lower case 1101 and serves as air discharging window.

FIG. 39 is a perspective view of a state after an upper case 1110 of the battery pack 1100 of FIG. 38 is removed. Ten pieces of battery cells are accommodated in the inner space of the lower case 1101, and the front side wall surface of the lower case 1101 is formed with two screw holes 1103a and 1103b to be screw-fastened with the upper case 1110, screws (not shown) are inserted through the screw holes 1103a and 1103b from the bottom to the top. Although not visible in the drawing, two screw holes are formed on the rear side wall surface of the lower case 1101. The plurality of battery cells (not shown) are fixed on a separator 1145 in the manner of be stacked as two layers, each layer consists of five pieces of battery cells. The separator 1145 is made of synthetic resin, and is formed in the manner of only opening on the right and left sides in two end portions of the battery cell. In the separator 1145, the axis of each of the battery cells is accumulated in parallel respectively, and is disposed to make the adjacent cell to face an alternately opposite direction, the positive electrode terminal and the negative electrode terminal of adjacent batter cells are connected through the metallic connection tab, such that the five pieces of battery cells are connected in series. Herein, the five pieces of battery cells connected in series in the upper layer are used to form the upper cell unit 1146 (described below in FIG. 41), and the lower cell unit 1147 (described below in FIG. 41) is formed with use of the five pieces of battery cells connected in series disposed at the lower side. Additionally, the upper and lower sides of the cell unit described herein do not refer to that the battery cell is located in the upper layer or lower layer of the lower case 1101; instead, the cell unit that is located on the ground side when two cell units are connected in series is referred to as "lower cell unit" and the cell unit that is located at high voltage side at the time of series connection is referred to as "upper cell unit".

Regarding the battery cell, the lithium ion battery cell (not shown) that can be charged/discharged for multiple times having a diameter of 18 mm and a length of 65 mm with the dimension of 18650 is used. In the sixth embodiment, in order to switch the output voltage from the battery pack 1100, it is set that the forms of series connection voltage (output at high voltage side) and parallel connection voltage (output at low voltage side) of a plurality of cell units can be selected. Therefore, based on the concept in the sixth embodiment, it will implementable as long as there is equivalent number of piece of the cell included in each of the cell units, and the number of cell unit is random. However, by setting the number of cell unit to be even number such as two or four, the battery cell to be put in use is not limited to the dimension of 18650, and may be a battery cell having a dimension of 21700, or a battery cell with other dimension. Additionally, the shape of the battery cell is not limited to cylindrical shape, and may also be rectangular shape, laminated shape, or other shapes. The type of battery cell is not limited to lithium ion battery, a random type of secondary battery such as nickel-hydrogen battery cell, lithium ion polymer battery cell, and nickel-cadmium battery cell may also be adopted. Two electrodes are disposed on both ends of the longitudinal direction of the battery cell. One of the two electrodes is positive electrode and the other one is negative electrode, but the position for disposing the electrode is not limited to the both end sides. A random electrode configuration can be implemented as long as cell unit can be easily formed in the battery pack.

A circuit substrate 1150 is provided on the upper side of the separator 1145 that holds the battery cell. The circuit substrate 1150 secures a plurality of connection terminals (1161, 1162, 1164 to 1168, 1171, 1172, 1177) through soldering process, and performs electric connection between circuit pattern and connection terminal. Various electronic elements (not shown) such as a battery protection integrated circuit (IC) or a micro-computer, a positive temperature coefficient (PTC) a thermal sensitive resistor, a resistor, a capacitor, a fuse, a light emitting diode are provided on the circuit substrate 1150. The circuit substrate 1150 is secured on the upper side of the separator 1145 formed of non-conductor such as synthetic resin in the manner of extending along the horizontal direction. The material of the circuit substrate 1150 is referred to as printed substrate. The printed substrate is obtained by wiring conductor printed pattern such as copper foil on the substrate immersed with insulating resin relative to material, and a single-layered substrate, a double-sided substrate, or a multi-layered substrate may be adopted. The present embodiment adopts the double-sided substrate, and thus having the upper surface (surface, and the surface on the upper side when viewed from FIG. 39) and the lower surface (rear surface) of the circuit substrate 1150. A plurality of connection terminals (1161, 1162, 1164 to 1168, 1171, 1172, 1177) are disposed at the position slightly closer to the front side than the center in the front-rear direction of the circuit substrate 1150. Herein, the plurality of connection terminals are substantially disposed in a parallel in the lateral direction.

Each of the connection terminals is as shown in FIG. 38, which are illustrated in a carved manner on the upper step surface of the upper case 1110, the following elements are sequentially disposed in parallel from the right side to the left side of the circuit substrate 1150: C+terminal (1161, 1171: positive electrode terminal for charging), +terminal (1162, 1172: positive electrode terminal for discharging), T terminal 1164, V terminal 1165, LS terminal 1166, −terminal (1167, 1177: negative electrode terminal) and LD terminal 1168. Herein, two separated terminal components are used to construct a connection terminal for power supply line from the battery pack, namely, power terminal. That is, the C+terminal (positive electrode terminal for charging) includes positive electrode terminal 1161 and the lower positive electrode terminal 1171. The positive electrode terminal pair (1161 and 1171) is disposed at a position corresponding to a single slot 1121. An arm part set of the upper positive electrode terminal 1161 is provided at the upper side of the inner side portion of the slot 1121, and an arm part set of the lower positive electrode terminal 1171 is disposed at the lower side of the arm part set of the upper positive electrode terminal 1161. Likewise, the +terminal (positive electrode terminal for discharging) carved in the upper case 1110 includes upper positive electrode terminal 1162 and lower positive electrode terminal 1172. Such positive electrode terminal pair (1162 and 1172) is disposed at the position corresponding to the single slot 1122. An arm part set of the upper positive electrode terminal 1162 is disposed at the upper side of the slot 1122, and an arm part set of the lower positive electrode terminal 1172 is disposed at the lower side of the arm set part of the upper positive electrode terminal 1162. The −terminal (negative electrode terminal) carved in the upper case 1110 includes an upper negative electrode terminal 1167 and a lower negative electrode terminal 1177. Such negative electrode terminal pair (1167, 117) is disposed at a position corresponding to the single slot 1127, an arm part set of the upper negative electrode terminal 1167 is disposed at the upper side of the slot 1127, and an arm set of the lower negative electrode terminal 1177 is disposed at the lower side of the arm part set of the upper negative electrode terminal 1167. The upper positive electrode terminal 1162 and the lower positive electrode terminal 1172 respectively serve as positive electrode terminal, and serve as switching terminal that switches the output voltage of the battery pack 1100 into low voltage as described below, and also serve as parallel terminal that connects a plurality of cell units 1146 and 1147 in parallel. The plurality of parallel terminals, namely upper positive electrode terminal 1162 and lower positive electrode terminal 1172, are disposed adjacent to each other and construct parallel electrode terminal. Likewise, the upper negative electrode terminal 1167 and the lower negative electrode terminal 1177 respectively serve as negative electrode terminal and serve as switching terminal that switches the output voltage of the battery pack 1100 into low voltage, and also serve as parallel terminal that connects a plurality of cell units 1146 1147 in parallel. The plurality of parallel terminals, namely upper negative electrode terminal 1167 and the lower negative electrode terminal 1177, are disposed adjacent to each other and construct a parallel terminal group. As described below, the lower positive electrode terminal 1172 and the lower negative electrode terminal 1177 respectively serve as parallel terminal that connects a plurality of cell units 1146 and 1147 in parallel. Accordingly, the upper positive electrode terminal 1162, the lower positive electrode terminal 1172, the upper positive electrode terminal 1162 and the lower positive electrode terminal 1172 serve as voltage switching terminals that switch the output voltage of the battery pack 1100.

The connection terminals (1161, 1162, 1164 to 1168) are disposed at positions corresponding to the slots 1121 to 1128 shown in FIG. 38. Therefore, the fitting portion of the connection terminals is disposed in the manner of opening toward the upper side and the front side from the circuit substrate 1150. However, like conventional battery pack 1015 (see FIG. 36), the portion between the upper positive electrode terminal 1162 and the T terminal 1164 becomes an empty space that is not in use in the battery pack 1100 of the embodiment.

The positive electrode terminal pair (1161 and 1171) for charging are constructed in the manner of leaning further to the front side than the adjacent positive electrode terminal pair (1162, 1172). Such configuration is designed due to limitation of space so as to avoid the moving range of the latch mechanism (not shown) that closely follows the positive electrode terminal pair (1161, 1171). Therefore, if there is no limit to the space, the positive electrode terminal pair (1161,1171) may be disposed in parallel at the front end position of the positive electrode terminal pair (1162, 1172) and the negative electrode terminal pair (1167, 1177).

The positive electrode terminal (1161, 1162, 1171, 1172) and the negative electrode terminal (1167, 1177) are disposed at positions that are significantly separated from each other in the left-right direction, and three signal terminals (T terminal 1164, V terminal 1165, LS terminal 1166) are provided therebetween. In the embodiment, the upper positive electrode terminal 1162 and the upper negative electrode terminal 1167, the lower positive electrode terminal 1172 and the lower negative electrode terminal 1177 are used to realize voltage switching element that switches between parallel connection and series connection. Additionally, a total of two sets arm parts that are respectively disposed on the left and right sides of the upper side and on the left and right sides of the lower sides and extended along the horizontal direction are provided to serve as signal terminal; details regarding the shape are provided below in FIG. 44. Moreover, the signal terminal (1164 to 1166, 1168) may be realized by directly using conventional signal terminal component having one arm part in the upper-lower direction. However, in the present embodiment, in order to be the same as the fitting state between the positive electrode terminal (1161, 1162, 1171, 1172) and the negative electrode terminal (1167, 1177) and the terminal at the side of the device, the signal terminal component (described below in FIG. 44) having two upper and lower arm parts is also used at the side of the signal terminal.

The left side of the negative electrode terminal pair (1167, 1177) is provided with another signal terminal, namely LD terminal 1168. The LD terminal 1168 is formed as two sets of arm parts on the upper side and the lower side. However, the LD terminal 1168 is different from other signal terminals (T terminal 1164, V terminal 1165, LS terminal 1166) in size, which is caused by spatial restriction. Since the latch mechanism that is not shown arrives at the position closely follows the LD terminal 1168, the LED terminal 1168 is formed to be smaller than other signal terminals in order to avoid the latch mechanism. All of the signal terminals (1164 to 1166, 1168) allows the foot portion thereof to pass through the mounting hole 1151 formed in the circuit substrate 1150 from the surface to the rear surface, and fixed on the rear surface side through soldering. In the present embodiment, the securing method of the three signal terminals (1164 to 1166) have special characteristic; details in this regard are incorporated below in FIG. 44 and FIG. 45. As described above, by providing electronic element (not shown) on the circuit substrate 1150 and securing a plurality of connection terminals through soldering, the circuit substrate 1150 is fixed on the separator 1145 through screw-fastening or adhesion.

Four light-emitting diodes (LED) (not shown) are disposed in the vicinity of the rear part of the circuit substrate 1150. Prisms 1191 to 1194 with elongate rectangular shape in the upper-lower direction are provided on the upper side of the LED. In prisms 1191 to 1194, the bottom surface is disposed in the manner of being opposite to the illuminating surface of the LED (light-emitting diode, not shown) that is irradiated upward, and the upper surface that is cut in an inclined manner is disposed by being exposed to the outside from the slit (not shown) formed in the upper case 1110. The prisms 1191 to 1194 are disposed to diffuse the light to be irradiated to the outside of the upper case 1110. The four LED that are not shown are configured to display remaining capacity of the battery pack 1100. When worker presses the switch 1190, the LED in a number corresponding to the voltage of the battery cell are illuminated within a specific time period. An operation rod (not shown) configured to operate the switch 1190 is disposed on the outer surface portion of the upper case 1100 operated by the worker. The lower case 1101 is formed with the shape that is substantially rectangular with an opening at the upper surface, and is constructed by the bottom surface, the front wall 1101*a* extended along the vertical direction relative to the bottom surface, the rear wall 1101*b*, the right side wall 1101*c* and the left side wall 1101*d*. A slit 1104 is substantially disposed in the center of the front wall 1101*a*. The slit 1104 serves as outlet. The outlet is configured to discharge the cooling wind sent from the charging device side in the inner space of the battery pack 1100 when the charging device is used for charging.

Next, FIG. 40 is incorporated to describe the shape of components (1200, 1220) used in power terminal. FIG. 40(1) is a perspective view of a single component of an upper terminal component 1200 and a lower terminal component 1220. The upper terminal component 1200 is a universal part used for upper positive electrode terminals 1161 and 1162 as well as the upper negative electrode terminal 1167. The lower terminal component 1220 is a universal part used for lower positive electrode terminal 1171 and 1172 and the lower negative electrode terminal 1177. The upper terminal part 1200 and the lower terminal part 1220 are formed by pressing a flat plate including conductive metal and bending it into a U-shape after cutting. The upper terminal part 1200 is bent in the manner that the U-shaped bottom surface, i.e., bridging part 1202, becomes the upper side. In the lower terminal part 1220, the bridging part 1222 is bent to become the rear side. The reason of bending the bridging parts 1202 and 1222 into U-shape in an intersecting manner with substantially right angle is that the bridging portion 1222 at the front side cannot fully ensure the area of the side wall surface in the front-rear direction. Therefore, if the bridging portion is disposed on the upper side, the size of the bridging portion becomes smaller. In the lower terminal part 1220 of the present embodiment, the bridging part 1222 becomes the vertical surface direction, thereby shortening the length required for configuration in the front-rear direction and fully ensuring the size of the bridging part, in particular the length in the upper-lower direction; accordingly, the rigidity of the lower terminal part 1220 can be increased. On the other hand, in the upper terminal part 1200, arm parts 1205 and 1206 having a length crossing the lower terminal part 1220 may be formed, and the bridging portion 1202 serving as the surface extending in the same direction as the front-rear direction extended from the arm parts 1205 and 1026 can be formed, thereby increasing the mounting rigidity of the arm parts 1205 and 1026.

The upper terminal part 1200 has right side surface 1203 and left side surface 1204 formed in parallel in the manner of being bent into U-shape, and the bridge part 1202 serving as upper surface to connect the above. At the front side of the right side surface 1203 and the left side surface 1204, arm parts 1205 and 1206 that are clamped inward in the terminal at the side of device from left and right sides are respectively provided. The front edge part of the left side surface 1204 is formed in the manner of extending linearly from the lower side along the vertical direction to the position close to upper end, and extended toward the front side from the vicinity close to the arrow 1024*d* at upper end in the manner of drawing a circular of large radius of curvature. The shape of the right side surface 1203 and the surface of the left side surface 1204 are formed in a symmetrical manner. The arm part 1205 is disposed in the manner of extending toward the front side from the upper front side of the right side surface 1203. The arm part 1206 is disposed in the manner of extending toward the front side from the upper front side of the left side surface 1204. In this manner, the arm parts 1205 and 1206 are formed in the manner of extending toward the front side from the upper side portion of the front edge portion of the base body part 1201, namely along the direction parallel with the mounting direction of the battery pack 1100. Viewed from the left-right direction, the arm parts 1205 and 1206 face each other, and the smallest interval, i.e., the fitting part fitted with the device connection terminal is pressed in the manner of being close to a position where contact is nearly occurred, thus providing elasticity. Herein, the pressing process refers to molding process performed by using pressing machine, through which high pressure is applied to press metal plate and the like relative to mold, thereby implementing cutting operation such as cutting, impacting, hole-opening, and implementing curving process or rolling process depending on the need, thereby forming the required shape through cutting and molding. In the present embodiment, the upper terminal part 1200 and the lower terminal part 1220 are formed by a flat plate having a thickness of about 0.5 mm to 0.8 mm. With such configuration, the upper positive electrode terminals 1161, 1162, 1171, 1172 and upper negative electrode terminals 1167 and 1177 have high mechanical strength, and the fitting pressure for fitting with the terminal at the side of device is higher. Additionally, thermal treatment or plating treatment may be implemented after pressing process.

The lower terminal part 1220 is manufactured in the same manner, having a base body part 1221. The base body part 1221 includes a right side surface 1223, a left side surface 1224 that are formed in parallel by being bent into U-shape as well as the bridge part 1222 connecting the above surfaces. Arm part 1225 and 1226 are formed toward the front side from the vicinity of the elongated upper portion of the right side surface 1223 and the left side surface 1224. The arm parts 1225 and 1226 are formed with a shape clamped inward into the terminal at the side of device from the right and left sides. A distance S between the upper end position of the upper arm part (1205, 1206) and the lower end position of the lower art part set (1225, 1226) is constructed to have about the same width as the power terminal disposed in the conventional battery pack for 18V. On the other hand, the upper arm part set (1205, 1206) and the lower arm part set (1225, 1226) are spaced apart by a predetermined distance S1 in the upper-lower direction. A notch part 1231 that is significantly cut from the front side is formed at the lower side of the lower arm set (1225, 1226). The rear side of the lower terminal part 1220 and the right side surface 1203 and the left side surface 1204 of the upper terminal part 1200 spaced apart by the predetermined interval 1211 are secured in parallel in the front-rear direction without being in contact with each other. In this manner, the plurality of power terminals (1161, 1162, 1167, 1171, 1172, 1177) are located at the position above the separator 1145 and configured in the manner of being parallel with each other in the left-right direction. The terminal serving as voltage switching element is disposed at about the same height as the conventional power terminal in the upper-lower direction. Additionally, the lower positive electrode terminal 1172 and a portion of the lower negative electrode terminal 1177 serving as series terminal, a portion of the upper positive electrode terminal 1162 serving as positive electrode terminal and a portion of the upper negative electrode terminal 1167 serving as negative electrode terminal are at located at the same height in the upper-lower direction. Accordingly, the series terminal is disposed at about the same height as the positive electrode terminal and the negative electrode terminal in the upper-lower direction, thereby constructing the battery pack with a compact size in the upper-lower direction.

FIG. 40(2) is a perspective view of a single part of the upper terminal part 1200. Herein, the illustration is made by adding shadow line on the region of bridge part 1202 and leg parts 1207 and 1208 so as to clearly define the range. The base body part 1201 described herein refers to a portion exposed from the surface of the mounted circuit substrate 1150 to the upper side, and the portion excluding the arm part 1205 and 1206. The base body part 1201 of the upper terminal part 1200 includes a right side surface 1203, a left side surface 1204 and a bridge part 1202. Leg parts 1207 and 1208 are connected at a position closer to the lower part than the lower edge portion of the base body part 1201. The leg parts 1207 and 1208 are inserted into mounting hole (through hole) 1151 of the circuit substrate 1150 such that the leg parts 1207 and 1208 are protruded from the mounting surface (surface) of the circuit substrate 1150 to the surface (rear surface) opposite to the mounting surface. In the rear surface, the leg parts 1207 and 1208 are soldered on the circuit substrate 1150. Additionally, the arm parts 1205 and 1206 and the battery cell or electronic element equipped in the circuit substrate 1150 are electrically connected through soldering. Herein, the height H of the leg parts 1207 and 1208 is formed to be larger than the thickness of the circuit substrate 1150 and twice smaller than the thickness of the circuit substrate 1150. Additionally, a convex part 1204b protruded toward the rear side is formed in the lower portion on the rear side of the left side surface 1204. Although not visible in FIG. 40, the same convex part is formed in the lower portion on the rear side of the right side surface 1203. A portion that is extended in a protruded manner along the horizontal direction is formed in front of the lower portion of the right side surface 1203 and the left side surface 1204, and the bent part 1203a, 1204a that are formed with the convex part is bent inward. Cutout parts 1203c, 1204c, 1207a and 1208a are formed on the upper side and lower side of the curved part of the bent part 1203a and 1204a in order to perform the bending easily. Bent parts 1203a and 1204a as well as convex parts 1203b and 1204b are formed in the manner to be jointed with the upper surface near the mounting hole of the circuit substrate 1150 for positioning the upper terminal part 1200 in the upper-lower direction.

The base body part 1201 is substantially in an upside-down L-shape in side view. Planar parts 1205a and 1206a formed on the rear portion of the arm parts 1205 and 1206 are extended from the vicinity of the connection part at the rear side in the same plane as the side surface 1203 and the left side surface 1204. The interval between the planar parts 1205a and 1206a in the left-right direction are fixed and parallel. The curved part 1205b and 1206b formed in front of the planar parts 1205a and 1206a are bent inward viewed from the left-right direction. Planar parts 1205c and 1206c are further formed at the front side of the curved parts 1205b and 1206b. The planar part 1205c and planar part 1206c on the opposite side are formed with the shape that has a big interval the rear side and has a shape that becomes gradually thinner toward the front side, and are planes extended along the vertical direction respectively. Fitting parts 1205d and 1206d with a larger radius of curvature $R_1$ and bent outward in an expanding manner are formed at the front end part of the planar parts 1205c and 1206c. The curved portion in the inner side of the fitting parts 1205d and 1206d are in contact with the terminal of electric tool bodies 1001 and 1030. In this manner, the upper terminal part 1200 and the connection terminal at the side of the electric tool bodies 1001 and 1030 are electrically connected. The inner side of the fitting parts 1205d and 1206d is formed with a shape having minor interval 1209 in the state that the battery pack 1100 is removed from the electric tool bodies 1001 and 1030. The front side of the fitting parts 1205d and 1206d is connected to the guide parts 1205e and 1206e that is formed with the interval which becomes dramatically large toward the front end, thereby guiding the terminal at the side of electric tool bodies 1001 and 1030. The surface at the inner side of the guide parts 1205e and 1206e is formed as planar shape herein, but may also be formed as a curved shape. The curved part 1205b to the guide part 1205e and curved part 1206b to the guide part 1206e are formed with a fixed height in the upper-lower direction. On the other hand, the planar parts 1205a and 1206a that become lower toward the rear side are formed with the notch parts 1205f and 1206f facing the lower direction. The reason of forming the notch parts 1205f and 1206f is to easily bend the arm parts 1205 and 1206 during pressing process; and in order to adjust the clamp load (or fitting pressure) of the set of fitting parts 1205d and 1206d. Configured in this manner, the upper terminal part 1200 that is easy to use with excellent durability can be realized. Additionally, in the arm parts 1205 and 1206, it is preferable to increase the height direction of fitting parts 1205d and 1206d as much as possible, but the height of curved parts 1205b, 1206b, the planar parts 1205c, 1206c, the guide part 1205e, 1206e in the upper-lower direction is not necessarily fixed, which may be changed along the front-rear direction.

FIG. 40(3) is a perspective view of a single part of lower terminal part 1220. Herein, the illustration is made by adding shadow line to the region bridge part 1222 and leg parts 1227 and 1228 so as clearly define the range. The illustration shows that the lower terminal part 1220 is different from the upper terminal part 1200 in the direction along which they are bent into U-shape. Herein, the base body part 1221 is substantially formed as an upright L-shape when viewed from the side. Arm parts 1225 and 1226 are connected further closer to the front side than the upper front side of the right side surface 1223 and the left side surface 1224. Planar parts 1225a and 1226a are formed in the vicinity of the connection portion of the arm parts 1225, 1226 and the base body part 1221. The planar parts 1225a, 1226a and the right side surface 1223 and left side surface are on the same plane and parallel with the opposite plane. Curved parts 1225b and 1226b that are bent inward when viewed from the left-right direction are formed in front of the planar parts 1225a and 1226a. Planar parts 1225c and 1226c are further formed at the front side of the curved parts 1225b and 1226b. The planar part 1225c and the planar part 1226c on the opposite side are formed with a shape with big interval at the rear side and gradually becomes narrower toward the front side. The fitting parts 1225d and 1226d bent with greater radius of curvature are formed at the front end portion of the planar part 1225c and 1226c. The curved surface at the inner side of the planar parts 1225c and 1226c are electrically conducted by being in contact with the terminal of the electric tool bodies 1001 and 1030. The inner side of the fitting parts 1225d and 1226d is formed in a shape with minor interval in the state where the battery pack 1100 is removed from the electric tool bodies 1001 and 1030. Guide parts 1225e and 1226e are formed at the front side of the fitting parts 1225d and 1226d. The guide parts 1225e and 1226e are formed in the manner that the interval becomes dramatically large toward the front end, and configured to guide the terminal at the side of electric tool bodies 1001 and 1030. The plane inside the guide parts 1225e and 1226e may be formed as planar shape and may be formed as curved shape. The planar part 1225a to the guide part 1225e and the planar part 1226a to the guide part 1226e are formed with fixed height in the upper-lower direction. However, it is possible to be like the arm parts 1205 and 1206 of the upper terminal part 1200 with variable height in the upper-lower direction except for the fitting parts 1225d and 1226d. With such configuration, in the present embodiment, the lower terminal part 1220 easy to use with having excellent durability can be attained.

The notch part 1231 (see FIG. 40(1)) that is cut as U-shape when viewed from the side from the front side to the rear side is formed at the lower side of the arm parts 1225, 1226 of the lower terminal part 1220. The reason for forming the notch part 1231 is to provide a substrate cover 1180 (described below in FIG. 46) configured to divide the upper terminal part 1200 and the lower terminal part 1220. Leg parts 1227 and 1228 are connected to the lower side of the base body part 1221. The leg parts 1227 and 1228 are inserted into the mounting hole of the circuit substrate 1150 such that the leg part 1227 and 1228 are protruded to the opposite surface (rear surface) from the mounting surface (surface) of the circuit substrate 1150, and the protruded portion is soldered. Additionally, the electric connection state from the arm parts 1225, 1226 toward the battery cell or electronic element equipped in the circuit substrate 1150 can be established through soldering. Herein, the set constructed by leg parts 1227 and 1228 is independently wired in the state of not generating short-circuit with the set constructed by the leg parts 1207 and 1208 of the upper terminal part 1200. The size or shape of the leg parts 1227, 1228 is substantially the same as the leg parts 1207 and 1208, and bent parts 1223a and 1224a are formed at the front side. Cutout parts 1223c, 1224c, 1227a, 1228a are formed on the upper side and lower side of the curved part of the bent parts 1223a and 1224a. The reason for forming the cutout parts is to perform bending process with good accuracy in the pressing process; thus, the cutout parts are not necessarily required.

Next, FIG. 41 is incorporated to describe the shape of the terminal part 1020 on the side of the electric tool bodies 1001 and 1030 and the connection state of the connection terminal of the battery pack 1100 when the battery pack 1100 is mounted on the electric tool bodies 1001, 1030. Herein, illustration is made to show the positive electrode terminal (upper positive electrode terminal 1162, lower positive electrode terminal 1172) and negative electrode terminal (upper negative electrode terminal 1167 and lower negative electrode terminal 1177) in the connection terminal of the battery pack 100 for discharging. LD terminals 1028, 1058 are provided in the terminal parts 1020 and 1050 of the electric tool bodies 1001, 1030, which is not shown in the drawing. FIG. 41(1) is a diagram showing the state where the battery pack 1100 is mounted on the electric tool body 1030 for 36V. As described above, 10 pieces of battery cells are accommodated in the battery pack 1100, wherein five of the pieces construct the upper cell unit 1146, and the remaining five pieces construct the lower cell unit 1147. Herein, as compared with the terminal part 1020 of the conventional electric tool body 1001, the terminal parts 1052a and 1057a of the positive input terminal 1052 and the negative input terminal 1057 are smaller. That is, by only contacting with the upper positive electrode terminal 1162 and upper negative electrode terminal 1167 disposed on the upper side, the width is formed to be smaller in the upper-lower direction. The positive electrode output terminal of the upper cell unit 1146 is connected to the upper positive electrode terminal 1162, the negative electrode output terminal is connected to the lower negative electrode terminal 1177. On the other hand, the positive electrode output terminal of the lower cell unit 1147 is connected to the lower positive electrode terminal 1172, and the negative electrode output terminal is connected to the upper negative electrode terminal 1167. That is, two sets of positive electrode terminals and negative electrode terminals are independently configured. On terminal set (upper positive electrode terminal 1162 and lower negative electrode terminal 1177) disposed in the left-right direction and interesting vertically is connected to the upper cell unit 1146. Another terminal set (lower positive electrode terminal 1172 and upper negative electrode terminal 1167) is connected to the lower cell unit 1147. The upper positive electrode terminal 1161 and the lower positive electrode terminal 1172 are not electrically connected and thus the battery pack 1100 is electrically independent when not being mounted in the electrical device body (where the battery pack 1100 is removed). Likewise, the upper negative electrode terminal 1167 and the lower negative electrode terminal 1177 are not electrically connected in the inside of the battery pack 1100. Therefore, the battery pack 1100 is in the state of being electrically independent when not being mounted on the electrical device body (where the battery pack 1100 is removed).

As shown in FIG. 41(1), a positive input terminal 1052 and a negative input terminal 1057 for subjected to power are provided in the terminal part of the electric tool body 1030 rated at 36V. In the mounting process, the following position relationship is established: the positive input terminal 1052 is only fitted with the upper positive electrode terminal 1162, and the negative input terminal 1057 is only fitted with the upper negative electrode terminal 1167. On the other hand, a short bar 1059 is disposed in the terminal part of the electric tool body 1030 and configured to connect the lower positive electrode terminal 1172 and the lower negative electrode terminal 1177 to make them short-circuited. The short bar 1059 is short or a conductive terminal including a metallic conductive element, and serves as switching element that switches the output voltage from the battery pack 1100 into high voltage, and serves as connection element for high voltage that connects a plurality of cell units 1146, 1147 in series. One end side of the metallic component of the short bar 1059 bent into n-shape becomes a terminal part 1059b fitted with the lower positive electrode terminal 1172, and another end side thereof becomes the terminal part 1059c fitted with the lower negative electrode terminal 1177. The terminal part 1059b and the terminal part 1059c are connected through the connection part 1059a. The short bar 1059 is secured in the manner that the short bar 1059 and other terminals at the side of device such as the positive input terminal 1052 or the negative input terminal 1057 are casted together in the base 1051 (described below in FIG. 42) made up of synthetic resin. The short bar 1059 only serves to make the lower positive electrode terminal 1172 and the lower negative electrode terminal 1177 to become short-circuited, and thus there is no need to perform wiring toward the control circuit of the electric tool body.

The positive input terminal 1052 includes: terminal part 1052a, which is a portion fitted with the upper positive electrode terminal 1162 and formed with a flat-plate shape; a wiring part 1052c, configured to solder the lead of the wire on the circuit substrate side at the side of the electric tool body 1030; and a connection part 1052b, configured to connect the terminal part 1052a and the wiring part 1052, and serves as a portion casted in the base 1051 made of synthetic resin. Herein, the wiring part 1052c is disposed at a position that is further closer to the inner side as compared with left-right position of the terminal part 1052a, such design serves the purpose of adjusting the interval of the wiring part 1052c and allows the connection part 1052b to be stably retained on the base 1051 through casting. Therefore, the right and left corners in front of the terminal part 1052a are obliquely chamfered, and thus constructed in the manner that the terminal part 1052a can easily enter between the arm part 1162a and the arm part 1162b. The negative input terminal 1057 may be formed as a part compatible with the positive input terminal 1052, and configured in the manner of being rotated for 180 degrees about the vertical axis, and thus not only serving as negative input terminal 1057 but also serving as the positive input terminal 1052. Therefore, the negative input terminal 1057 also includes terminal part 1057a, wiring part 1057c and a connection part 1057b that connects the above elements. The front corner (the rear corner in the condition that the part is used as the positive input terminal 1052) of the terminal part 1057a is also obliquely chamfered, such that the terminal part 1057a can easily enter between the arm part 1167a and the arm part 1167b.

In FIG. 41(1), when the battery pack 1100 is mounted, if the battery pack 1100 is relatively moved along the insertion direction relative to the electric tool body 1030, the positive input terminal 1052 and the terminal part 1059b are inserted inside through the same slot 1122 (first slot, see FIG. 38), and respectively fitted with the upper positive electrode terminal 1162 and the lower positive electrode terminal 1172. At this time, the positive input terminal 1052 is pressed in between the arm part 1162a and 1162b of the upper positive electrode terminal 1162 in the manner of opening the fitting part of the upper positive electrode terminal 1162. Additionally, the negative input terminal 1057 and the terminal part 1059c are inserted inside through the same slot 1127 (second slot, see FIG. 38), and respectively fitted with the upper negative electrode terminal 1167 and the lower negative electrode terminal 1177. At this time, the negative input terminal 1057 is pressed in between the arm parts 1167a and 1167b of the upper negative electrode terminal 1167 in the manner of opening the fitting part of the upper negative electrode terminal 1167. Accordingly, the terminal parts 1059b and 1059c of the short bar 1059 are pressed in through the manner of opening the arm parts 1172a and 1172b of the lower positive electrode terminal 1172 and the arm parts 1177a and 1177b of the lower negative electrode terminal 1177. The front corners of the terminal parts 1052a, 1054a to 1058a, 1059b, 1059c are obliquely chamfered as indicted by arrows 1052d, 1054d to 1059d, 1059e, and thus are able to be smoothly inserted into the arm part of the connection terminal at the side of the battery pack 1100. In the state that battery pack 1100 is connected to the electric tool body 1030, the positive electrode terminal (1162) and the positive input terminal 1052 are connected through the first slot (slot 1122), and the negative electrode terminal (1167) and the negative input terminal (1057) are connected through the second slot (slot 1127), such voltage switching elements and switching element are locked through the first slot and the second slot. Additionally, in the state that the battery pack is connected to the electrical device body, the voltage switching elements such as positive electrode terminal, positive input terminal, negative electrode terminal, negative input terminal and switch element formed by short bar 1059 are disposed at about the same height in the upper-lower direction.

The plate thickness of the terminal part 1052a, the terminal part 1057a, the terminal part 1059b, and the terminal part 1059c is larger than initial gap (the gap at the time when battery pack 1100 is not mounted) of the fitting part of each of the arm parts. Therefore, a predetermined fitting pressure is subject to each of the fitting point of the terminal part 1052a, the terminal part 1057a, the terminal part 1059b, 1059c and the upper positive electrode terminal 1162, the lower positive electrode terminal 1172, the upper negative electrode terminal 1167 and the lower negative electrode terminal 1177. Such connection leads to the result that the terminal (terminal part 1052a, terminal part 1057a, terminal part 1059b and 1059c) at the side of device of the electric tool body 1030 and the power terminal (upper positive electrode terminal 1162, lower positive electrode terminal 1172, upper negative electrode terminal 1167, lower negative electrode terminal 1177) of the battery pack are in good contact in the state of being electrically contacted with small resistance. In this manner, the electric tool body 1030 has a third terminal (1052a) that is inserted into the single slot (1122) to be connected with only the first terminal (1162) among the first terminal and the second terminal (1162, 1172) and a fourth terminal (1059b) that is inserted into the single slot (1122) to be only connected to the second terminal (1172). If the battery pack 1100 is connected to the electric tool body 1030, in the single slot (1122), the first terminal and the third terminal (1162 and 1052a) are connected and become the first level, the second terminal and the fourth terminal (1172 and 1059b) are connected and become a second level different from the first level. The side of the negative electrode terminal pair (1167, 1177) also becomes the same connection state. Therefore, by realizing the connection state shown in FIG. 41(1), the output of the series connection of the upper cell unit 1146 and the lower cell unit 1147 is the output is from the battery pack 1100 rated at 36V.

On the other hand, when the battery pack 1100 is mounted on the conventional electric tool body 1001 for 18V, the connection relationship in FIG. 41(2) is established. When the battery pack 1100 is mounted on the electric tool body 1001, the positive input terminal 1022 is fitted and pressed in through the manner of opening the two opening end portions of the upper positive electrode terminal 1162 and the lower positive electrode terminal 1172. A partial region on the upper side of the positive input terminal 1022 is in contact with the upper positive electrode terminal 1162, and a portion of the lower region is in contact with the lower positive electrode terminal 1172. In this manner, the positive input terminal 1022 is connected in the manner of crossing upper positive electrode terminal 1162 and the lower positive electrode terminal 1172, thereby being fitted with the arm parts 1162a and 1162b simultaneously while being fitted to the arm parts 1172a and 1172b. Similarly, the negative input terminal 1027 is fitted and pressed in through the manner of opening the two open end portions of the upper negative electrode terminal 1167 and the lower negative electrode terminal 1177, a partial region on the upper side of the negative input terminal 1027 is in contact with the upper negative electrode terminal 1167, a portion of the lower region is in contact with the lower negative electrode terminal 1177. In this manner, the negative input terminal 1027 is connected in the manner of crossing the upper negative electrode terminal 1167 and the lower negative electrode terminal 1177 while being simultaneously fitted with the arm parts 1167a, 1167b and simultaneously fitted with the arm parts 1177a and 1177b. As a result, the upper positive electrode terminal 1162 and the lower positive electrode terminal 1172 become short-circuited, and the upper negative electrode terminal 1167 and the lower negative electrode terminal 1177 become short-circuited, outputting the parallel connection of the upper cell unit 1146 and the lower cell unit 1147 to the electric tool body 1001, i.e., rated 18V. Accordingly, the positive input terminal 1022 and the negative input terminal 1027 serve as low voltage switching element that switches the output voltage of the battery pack 1100 into low voltage, and also serve as low voltage connection element that connects a plurality of cell units 1146 and 1147 in parallel. The positive input terminal 1022 and the negative input terminal 1027 serving as connection element has a metal plate with certain thickness. Therefore, it is important that the fitting pressure formed by the arm part of the upper positive electrode terminal 1162 and the upper negative electrode terminal 1167 is set to the same as the fitting pressure formed by the arm part of the lower positive electrode terminal 1172 and the lower negative electrode terminal 1177. Additionally, in order to make the fitting pressure to be fixed, the thickness of the positive input terminal 1052, the negative input terminal 1057, the terminal part 1059b and 1059c of short bar 1059 of the electric tool body 1030 for 36V are set to be the same as the thickness of the positive input terminal 1022 and the negative input terminal 1027 of conventional electric tool body 1001 for 18V.

As described above, in the present embodiment, by configuring the battery pack 1100 in the electric tool body 1001 for 18V or electric tool body 1030 for 36V, it is possible to automatically switch the output of battery pack 1100, thereby realizing the battery pack 1100 corresponding to a variety of voltages with great convenience in use. Therefore, the voltage switching is not performed at the side of the battery pack 1100, but automatically performed according to the shape of the terminal part at the side of the electric tool bodies 1001 and 1030, and thus there is no risk of setting voltage erroneously. Additionally, there is no need to set an exclusive mechanical switch-like voltage switching mechanism in the battery pack 1100, such that a battery pack with simple structure, low malfunction rate and long service life can be attained. The short bar 1059 that makes the lower positive electrode terminal 1172 and the lower negative electrode terminal 1177 to be short-circuited may be mounted along with the existing terminal part 1020 of the battery pack for 18V in the same space, and thus a voltage switching battery pack having the size interchangeable with conventional one can be attained. Furthermore, when an external charging device is used for charging, the connection method shown in FIG. 41(2) may be used for charging; therefore, there is no need to prepare charging devices for charging at high voltage/low voltage. Additionally, in the condition of using the external charging device (not shown) to charge the battery pack 1100, the charging device that is the same as the conventional battery pack for 18V can be used for charging. In such circumstances, the terminal part of the charging device has the same shape as that shown in FIG. 41(2), but serves as replacement for the positive electrode terminal (1162,1172) for discharging such that the positive electrode terminal (upper positive electrode terminal 1161, lower positive electrode terminal 1171) for charging is connected to the positive electrode terminal of the charging device (not shown). At this time, the connection condition is substantially the same as the connection relationship shown in FIG. 41(2). In this manner, the charging device for 18V is used for charging under the state that the upper cell unit 1146 and the lower cell unit 1147 are connected in parallel. Therefore, when the battery pack 1100 of the present embodiment is being charged, it is not required to prepare a new charging device.

FIG. 42(1) is a perspective view of a terminal part 1050 of the electric tool body 1030 in the sixth embodiment. The terminal part 1050 is fabricated by casting four metallic connection terminals 1054 to 1056 and 1058 other than the positive input terminal 1052, the negative input terminal 1057, and the short bar 1059 shown in FIG. 41(1) into the base 1051 made of synthetic resin. The shape of the connection terminals 1054 to 1056 is formed by forming the connection parts 1052b and 1057b of the positive input terminal 1052 and the negative input terminal 1057 shown in FIG. 41(1) in a linear shape, one side of which is provided with the terminal parts 1054a to 1056a fitted with the connection terminal on the side of the battery pack 1100, and another side of which is formed with wiring parts 1054c to 1056c formed with a hole in order to solder lead, and formed with connection parts 1054b to 1056b connected between the terminal part and the wiring part and casted in the synthetic resin. The base 1051 performs casting to all of the upper side portion and all of the rear side portion of the terminal parts 1052a, 1054a to 1058a, thereby firmly retaining the terminal parts 1052a, 1054a to 1056a, 1058a. Additionally, regarding the terminal parts 1054a to 1056a and 1058a, a portion behind the lower side portion of the above is casted. FIG. 41(1) shows the short bar 1059 with the shape, and the connection part 1059a (see FIG. 41) extend along the left-right direction are all casted in the base 1051, the front portion of the terminal parts 1059b and 1059c are exposed from the base 1051 to the front side. Moreover, the lower portion behind the portion of the terminal part 1059b and 1059c exposed to the outside is casted in the base 1051, such that the terminal parts 1059b and 1059c are firmly retained in the manner of not moving in the left-right direction. In this manner, a plurality of plate-shaped terminals at the side of device are disposed in parallel in the terminal part 1050. Herein, the terminal parts 1052a and terminal part 1059b are disposed in the manner that they are spaced apart by a predetermined gap 1053a in the upper-lower direction. Likewise, the terminal part 1057a and the terminal part 1059c are disposed in the manner of being spaced apart by a predetermined gap 1053b in the upper-lower direction.

FIG. 42(2) is a diagram showing a state of connection between terminal part 1050 and power terminal (1162, 1172, 1167, 1177) of the battery pack 1100. The upper positive electrode terminal 1162 has two arm part 1162a and 1162b (equivalent to arm parts 1205 and 1206 in FIG. 40(1)). The lower positive electrode terminal 1172 of positive electrode has two arm parts 1172a and 1172b (equivalent to arm parts 1225, 1226 shown in FIG. 40(1)). The arm parts 1162a and 1162b of the upper positive electrode terminal 1162 are connected in the manner of being clamped in from left and right sides to form the plate-shaped terminal part 1052a. When joining is performed, the arm parts 1162a and 1162b are bent separately in the left-right directions, using the restoring force caused by spring effect to provide a determined clamping load (fitting pressure) to the terminal part 1052a. As a result, the arm parts 1162a and 1162b and the terminal parts 1052a are in good surface contact or line contact, thus realizing good conductivity with small contact resistance. Likewise, the arm parts 1167a and 1167b of the upper negative electrode terminal 1167 is fitted in the manner of being clamped in from the left and right sides to form the plate-shaped terminal part 1057a.

The arm parts 1172a and 1172b of the lower positive electrode terminal 1172 are fitted together in the manner of being clamped in from the left and right sides to form the terminal part 1059b. When the fitting operation is performed, the arm parts 1172a and 1172b are bent separately in the left-right direction, and the restoring force caused by spring effect provides predetermined clamping load (fitting pressure) to the terminal part 1059b. As a result, the arm parts 1172a and 1172b and the terminal part 1059a are in good surface contact or line contact, thereby eliminating the contact resistance and realizing good conductivity. Similarly, arm parts 1177a and 1177b of the lower negative electrode terminal 1177 are fitted together in the manner of being clamped into from the left and right sides to form the plate-shaped terminal part 1059c.

In the present embodiment, it is important to maintain non-contact state between the connection part between the terminal part 1052a and the upper positive electrode terminal 1162 as well as the connection part between the terminal part 1059b and the lower positive electrode terminal 1172, thereby maintaining electrical insulation state. Moreover, it is important to maintain non-contact state between the connection part between the terminal part 1057a and the upper negative electrode terminal 1167 as well as the connection part between the terminal part 1059c and the lower negative electrode terminal 1177, thereby maintaining electrical insulation state. With such configuration, even if various vibration or impact generated by use of the electric tool causes the battery pack 1100 and the electric tool body 1030 to be vibrated with different resonance frequency, it is possible to prevent short-circuit from being generated between the upper positive electrode terminal 1162 and the lower positive electrode terminal 1172, and prevent short-circuit from being generated between the upper negative electrode terminal 1167 and the lower negative electrode terminal 1177. Additionally, in FIG. 42(2), the illustration showing the connection terminal fitted at the side of the battery pack of the terminal parts 1054a to 1056a and 1058a is omitted, but in the condition of being connected to the power terminal at positive electrode side (upper positive electrode terminal 1162 and lower positive electrode terminal 1172) and the power terminal at negative side (upper negative electrode terminal 1167 and lower negative electrode terminal 1177), the signal terminal (T terminal 1164, V terminal 1165, LS terminal 1166, LD terminal 1168 shown in FIG. 39) is similarly fitted with the terminal parts 1054a to 1056a and 1058a.

FIG. 43(1) is a perspective view of a terminal part 1020 of the above-mentioned electrical tool body 1001. FIG. 43(2) is a diagram illustrating connection of the terminal part 1020 and the power terminals of the battery pack 1100. The terminal part 1020 is fabricated by casting six metallic terminals 1022, 1024 to 1028 in the base 1021 made of synthetic resin. The shape of the terminals 1022 and 1024 to 1028 is as shown as a portion of the terminals 1022 and 1027 shown in FIG. 41 before casting, one side of which is formed with terminal parts 1022a and 1024a to 1028a fitted with the connection terminal at the side of the battery pack 1100, and another side of which is formed with a wiring part having a hole for soldering lead, and formed with a connection part that connects the terminal part and the wiring part and is casted in the synthetic resin of the base 1021. The base 1021 performs casting to all of the upper lateral part, all of the rear lateral part and a portion behind the lower lateral part of the terminal parts 1022a, 1024a to 1028a, thereby firmly retaining the terminal parts 1022a and 1024a to 1028a. The front corner of the terminal part 1022a and 1024a to 1028a are obliquely chamfered as indicated by arrows 1022d, 1024d to 1028d so as to be smoothly inserted in between the arm parts of the connection terminal at the side of the battery pack 1100. The shape of the terminal part 1020 is formed as a slot 1021c extended along the left-right direction at the front side of the base 1021, a slot 1021b extended along the left-right directions is formed similarly at the rear side. Such slots 1021b and 1021c are clamped by the opening portion of the housing in the terminal part 1020.

FIG. 43(2) is a diagram illustrating connection of the terminal part 1020 and the power terminals (1162, 1172, 1167, 1177) of the battery pack 1100. Herein, the illustration of signal terminals (T terminal 1164, V terminal 1165, LS terminal 1166, LD terminal 1168) at the side of the battery pack 1100 is omitted. The arm parts 1162a and 1162b of the upper positive electrode terminal 1162 are fitted together in the manner of being clamped in from the left and right sides to form the upper region of the plate-shape terminal part 1022a. When such fitting operation is performed, the arm parts 1162a and 1162b are bent separately in the left-right direction, and restoring force generated by spring effect provides predetermined clamping load (fitting pressure) to the terminal part 1022a. Additionally, the arm parts 1172a and 1172b of the lower positive electrode terminal 1172 are fitted together in the manner of being clamped in from the left and right sides to from the lower portion of the plate-shape terminal part 1022a. Each of the arm parts of the negative electrode terminal 1167 and the lower negative electrode terminal 1177 of the power terminal are fitted in the same manner. Accordingly, relative to one piece of terminal part 1022a, four arm parts 1162a, 1162b, 1172a and 1172b are in contact with each other. Similarly, on the negative electrode side, the arm parts 1167a and 1167b of the upper negative electrode terminal 1167 are fitted together in the manner of being clamped in from the left and right sides to form the upper region of the plate-shape terminal part 1027a. The arm parts 1177a and 1177b of the lower negative electrode terminal 1177 are fitted together in the manner of being clamped in from the left and right sides to form the lower portion of the terminal part 1027a. In this manner, the four parts 1162a, 1162b, 1172a and 1172b are in contact with each other relative to one piece of terminal part 1022a. Likewise, the four arm parts 1167a, 1167b, 1177a and 1177b are in contact with each other relative to terminal part 1027a. Therefore, it is possible to achieve good surface contact or line contact, thereby eliminating the contact resistance and realizing good conductivity.

Thereafter, FIG. 44 is incorporated to describe the shape of the component, namely signal terminal part 1240, used for three terminals (1164 to 1166). The signal terminal part 1240 is fabricated by pressing one piece of metal plate, and an arm set (arm part base 1245 and 1246) is provided at a position extending from the base body part 1241 toward the front side. The base body part 1241 is formed by bending the metallic plate to form the bridge part 1242 with U-shaped bottom portion into the vertical surface at the rear side. The arm part base 1245 is separated into upper and lower arm part set (1251, 1253). The arm part base 1246 is separated into upper and lower arm part set (1252, 1254) through the notch groove 1244b extended along the horizontal direction. The metallic plate for pressing operation may be a plate having a thickness of 0.3 mm and is thinner than the plate thickness 0.5 mm of the upper terminal part 1200 and lower terminal part 1220 used in the power terminal. The upper and lower arm part sets are formed with the same shape, and the length in the front-rear direction as well as the width in the upper-lower direction are equal to each other. A fitting part (1251d and 1253d and so on) are respectively formed in the upper arm part set (arm part 1251 and 1252) and lower arm part set (arm part 1253 and 1254). Provided as fitting part, the bending shapes in the upper side and lower side are equal to each other, and the arm part on the right and left sides have symmetrical shape. On the other hand, the mounting position of the let parts 1249 and 1250 are significantly staggered in the front-rear direction. The shapes of the lower portion of the base body part 1241 on the right and left sides are different, and the shape of the right side surface 1243 is asymmetrical to the shape of the left side surface 1244. The leg part 1249 is dramatically staggered as compared with the front side of the position of the previously mentioned leg part 1250, such that the leg parts 1249 and 1250 are spaced apart by a larger distance in the front-rear direction. Accordingly, the leg part 1249 and the leg part 1250 are not adjacent to each other in a parallel manner in the left-right direction but disposed in a staggered manner. Therefore, an extension part 1243*a* dramatically extended toward the front is formed in the vicinity of the lower side of the right side surface 1243, and a leg part 1249 is formed in the manner of extending downward from the front end portion. A through hole (not shown) of the leg part 1249 and the leg part 1250 formed on the circuit substrate 1250 respectively passes through from the surface to the rear surface side, and protruded to the rear surface side and secured on the circuit substrate 1150 through soldering, such that the upper arm part set (part 1251 and 1252) and lower arm part set (arm part 1253 and 1254) are electrically connected to the electronic element equipped in the circuit substrate 1150.

The bent part 1243*b* that is configured to limit the amount of insertion of mounting hole 1151 (see FIG. 39) toward the circuit substrate 1150 and bent to the left direction is provided above the leg part 1249. To make it easy to perform bending operation, cutout parts 1243*c* and 1249*a* formed in semi-circle shape is formed on the upper and lower sides of the curved part of the bent part 1243*b*. Stepped parts 1250*a* and 1250*b* on the front side and rear side of the leg part 1250 are formed in the positioning of the leg part 1250 toward the circuit substrate 1150. The stepped part 1250*a* is formed in the manner of making the lower portion of the left side surface 1244 to extend toward the front side. The stepped part 1250*b* is formed by using the lower side portion of the bridge part 1242 formed in U-shape. In this manner, the stepped parts 1250*a* and 1250*b* are abutted against the surface of the circuit substrate 1150, thereby determining the mounting position of the leg part 1250 in the upper-lower direction. The mounting positions of the leg parts 1249 and 1250 in the front-rear direction are set according to the position of the mounting hole 1151 (see FIG. 39) of the circuit substrate 1150.

FIG. 44(2) is an illustration showing a single part of a signal terminal part 1240 viewed from the lower front side. It is shown that the arm part set (arm parts 1251 and 1253) separated into upper and lower parts by the notch groove 1245*b* extended along the horizontal direction is formed at the front side of the arm part base 1245. Additionally, as compared with the leg part 1250 on the left side, the leg part 1249 on the right side is disposed dramatically staggered toward the front side. As a result, even if the four arm parts 1251, 1252, 1253 and 1254 are subjected to force relative to the upper direction or lower direction, it is possible to stably retain the signal terminal part 1240 on the circuit substrate. The external force applied to the arm parts 1251, 1252, 1253 and 1254 is applied in the manner of pushing the arm part set to the rear side when the battery pack 1100 is mounted on the electric tool bodies 1001 and 1030, and such force makes the signal terminal part 1240 to fall backward. On the contrary, the force becomes the force that pushes the arm part to the front side when the battery pack 1100 is removed from the electric tool bodies 1001 and 1030, and such force makes the signal terminal part 1240 to lean forward. In this manner, it is possible to make the positions of the leg parts 1249, 1250 to be staggered in the front-rear direction, thereby effectively corresponding to the external force that is applied when the battery pack 1100 is mounted or removed, such that the mounting rigidity of the signal terminal part 1240 can be significantly reinforced, and thus the durability of the battery pack 1100 can be enhanced. Furthermore, the arm part set is divided into upper and lower layers. Therefore, even if the electric tool is subjected to various vibration or external force in the operating process, it is possible to maintain a good contact state of the terminal at the side of the electric tool body through the four contact regions of the arm part. On the other hand, the number of the required mounting hole of the circuit substrate 1150 in manufacturing the signal terminal part 1240 or the number of soldering portion are the same as those used in conventional technique, such that manufacturing cost can be controlled.

The signal terminal part 1240 in the present embodiment not only increases rigidity but also achieves other effects. Conventional signal terminal part (not shown) is soldered at two positions, thereby electrically/mechanically mounted on the leg part of the circuit substrate. The leg part is disposed in parallel in the horizontal direction, and thus the position between the leg parts are narrow and the soldered portions are connected in most cases, and it is not possible to allow the pattern for signal to perform wiring between the right and left leg parts. In the battery pack 1100 of the present embodiment, one leg part 1249 of the signal terminal part 1240 is disposed on the front side, and the other leg part 1250 is disposed on the rear side such that the two leg parts are separated from each other. In this manner, the distance between each of the leg parts of the signal terminal part 1240 becomes wider, making it easy to performing wiring for a plurality of wirings or a big pattern flowing through major current. Such signal terminal part 1240 achieves high function relative to the battery pack 1100 of the present embodiment, i.e., the conventional battery pack, and thus achieving preferable effect in minimization of voltage ratio. In particular, if voltage switching function is realized on basis of high voltage, the electronic element provided on the circuit substrate 1150 is increased. Therefore, it is necessary to make pattern wiring to be more efficient and increase the thickness of wiring that flows through major current. In the present embodiment, a circuit substrate 1150 that is larger than conventional circuit substrate is used, such that the electronic element is not only disposed at the rear side of the connection terminal group but also disposed in the front region of the connection terminal. At this time, wiring pattern is also disposed at the lower side of the signal terminal part 1240. FIG. 45 is incorporated to describe the configuration thereof.

FIG. 45 is a diagram illustrating fixing of a plurality of signal terminal parts 1240 to a circuit substrate 1150. FIG. 45(1) is a diagram viewed from the front side. FIG. 45(2) is a diagram of the signal terminal part 1240 viewed from the left side. The signal terminal part 1240 is a universal component, serving as the T terminal 1164, V terminal 1165, LS terminal 1166 and secured in the circuit substrate in parallel along the left-right direction. The signal terminal part 1240 is formed with a notch part in the manner that an interval S2 is formed in the vicinity of the center of the arm part, and thus forming the shape of the upper arm part set (1251, 1252) and the lower arm part in two layers. In the state that the terminal at the side of the device is not disposed, the portions of the upper arm part set (1251, 1252) and the lower arm part set (1253, 1254) that are closest to each other is disposed in the manner of forming a minor gap or being abutted against each other. The mounting hole (see FIG. 39) of each of the let parts 1249, 1250 passes through the circuit substrate 1150 and protruded to the lower side, and secured on the lower side (rear surface) of the circuit substrate 1150 through solder 1256.

In the side view shown in FIG. 45(2), the front leg part 1249 and the rear leg part 1250 are formed in the manner of being spaced apart by a distance S3. The distance S3 may be formed as an interval (distance in the left-right direction) larger than the interval between the leg part 1249 and 1250. By forming the gap as indicated by arrow 1257, the gap makes it easier to perform wiring to the circuit pattern. FIG. 45(3) is a bottom view of the circuit substrate 1150 viewed from the lower side of FIG. 45(1). A through hole is formed in the center of the rear surface of the circuit substrate 1150 in order to solder the signal terminal part 1240. Lands 1153$a$ to 1155$a$, 1153$b$ to 1155$b$ that are substantially rectangular for soldering and formed of copper foil are formed on the periphery of the through hole. The wiring pattern from lands 1153$a$ to 1155$a$ and 1153$b$ to 1155$b$ toward the upper cell unit 1146 or lower cell unit 1147 for connection is disposed on the top side of the circuit substrate 1150, which is invisible in FIG. 45(3). The lands 1153$a$ to 1155$a$ for leg part on the left side and the lands 1153$b$ to 1155$b$ for the leg part on the right side are disposed in a staggered manner. As a result, a plurality of patterns 1157 to 1159 may be disposed between the lands 1153$a$ to 1155$a$ and the lands 1153$b$ to 1155$b$ as shown in the drawing. Herein, the wiring patterns 1157 to 1159 are illustrated in the number of three respectively, which may also be a thick wiring or a combination of a number of pieces. The wiring pattern are disposed between leg parts 1249 and 1250 in a staggered manner in the front-rear direction. Therefore, in the state that the adjacent signal terminals 1164 and 1165 as well as 1165 and 1116 are spaced apart by the gap in the conventional manner, it is possible to dispose a plurality of wiring patterns 1157 to 1159 connecting the rear side and front side of the signal terminals 1164 to 1166. Additionally, as another method for increasing the number of wiring pattern for connecting the rear side and the front side of the signal terminals 1164 to 1166, it is possible to use the cutout part 1243$c$ represented by dashed line shown in FIG. 45(2). A cutout part 1243$c$ that cuts upward in the manner represented by dashed line is formed in the portion where the lower side of the right side surface 1243 is jointed with the circuit substrate 1150. In this manner, the portion indicated by the arrow 1257 becomes a gap for spacing the circuit substrate 1150 apart. Circuit pattern can be similarly formed between the gap and the circuit substrate 1150 as the wiring patterns 1157 to 1159 shown in FIG. 45(3). In this manner, the plurality of wiring patterns configured for connecting the rear side and the front side of the signal terminals 1164 to 1166 not only can be disposed on the rear side 1150$b$ of the circuit substrate but also can be disposed on the top side 1150$a$, thereby enhancing the operation efficiency of the circuit substrate 1150.

FIG. 46 is a diagram illustrating shapes of a connection terminal group (1161 to 1162, 1164 to 1168) and a substrate cover 1180 disposed around it. FIG. 46(1) is a perspective view, and FIG. 46(2) is a front view. Herein, the illustration of circuit substrate 1150 is omitted for ease of comprehension. In actual product, after the plurality of connection terminal groups (1161 to 1162, 1164 to 1168, 1171, 1172, 1177) are secured on the circuit substrate 1150 through soldering, the substrate cover 1180 is mounted around the connection terminal. The power terminals (1161, 1162, 1167) are formed in the manner of higher than the signal terminals (1164 to 1166, 1168) by a distance H at the above. The substrate cover 1180 is formed of a non-conductor such as a molded article of synthetic resin, thereby covering the component around the leg part of the adjacent connection terminal. A connection part 1181 is formed at the front side, which has a planar upper surface 1181$a$, a plurality of partition walls 1182, 1183 and 1184 to 1189, partition walls 1182, 1183, 1184 to 1189 are connected at the rear side of the connection part 1181. The partition walls 1182, 1183 and 1184 to 1189 is disposed to be closer to the rear side than the planar part 1181$a$, i.e., the left-right portion of the connection terminal group, thereby making it difficult for the connection terminals to become electrically short-circuited. Additionally, the upper surface 1181$a$ of the connection part 1181 and the upper step surface 1115 (see FIG. 38) of the upper case 1110 are formed as the same surface, such that the terminal part at the side of the body can be easily moved relatively from the upper step surface 1115 to the connection part 1118. Moreover, a covering part 1184 that blocks the opening of the region (slot 1123 in FIG. 38) that is not in used is disposed in the substrate cover 1180, such that dirt or dust cannot easily enter the housing of the battery pack 110 from the slot 1123.

The substrate cover 1180 is mainly formed by the connection part 1181 which has the horizontal upper surface 1181$a$ in the lateral direction and a plurality of partition walls extended above. In the partition wall, the partition walls 1185, 1186 and 1189 disposed between the signal terminals are formed as lower wall part having a height H2, and the upper position thereof is a position that is lower than the signal terminals (1164-1166) or the arm part at the lower side of the LD terminal 1168. Relatively, the partition walls 1182, 1183, 1184, 1187 and 1188 adjacent to the power terminal become the high wall part having a height H3 from the upper surface 1181$a$, and the upper position thereof is formed in the manner of being closer to the upper side than the upper position of the lower terminal part and located at the lower side of the arm part of the upper terminal part.

In the connection terminal group, the power terminals are disposed in parallel in the front-rear direction at the leg part of the upper positive electrode terminals 1161 and 1162 as well as the lower positive electrode terminals 1171 and 1172 as shown in FIG. 40 to FIG. 43, and each of the arm part sets is disposed in parallel in the upper-lower direction. Likewise, the leg parts of the upper negative electrode terminal 1167 and the lower negative electrode terminal 1177 are disposed in parallel in the front-rear direction, and each of the arm part sets thereof is disposed in parallel in the upper-lower direction. When the battery pack 1100 is disposed on the electrical device body rated at 18V, the level of the upper positive electrode terminals 1161 and 1162, the arm part of the upper negative electrode terminal 1167 becomes to be the same as the level of the lower positive electrode terminals 1171, 1172 and the lower negative electrode terminal 1177; therefore, there is no difficulty for the upper terminal part and the lower terminal part to be in contact with each other. However, when the battery pack 1100 is mounted on the electrical device body rated at 36V, the levels of the upper positive electrode terminal 1161, 1162 and the upper negative electrode terminal 1167 as well as the level of the lower positive electrode terminals 1171, 1172 and the lower negative electrode terminal 1177 are different. Therefore, it is important not to generate the short-circuit state caused by the contact between the upper and lower arm parts. Additionally, it is possible to form shape that makes it difficult to generate short circuit caused by insertion of foreign matter. Therefore, the substrate cover 1180 in the present embodiment is formed in the partition wall in the manner of extending upward from the connection part 1181, as for the partition walls 1182, 1183, 1184, 1187 and 1188, the upper end position is formed with a large portion on the top side in the manner of at a height H3. Meanwhile, not only a wall part that is extended upward along the vertical direction is provided, a horizontal wall part that is extended along the left-right direction from the upper end position of the vertical part is also provided.

FIG. 46(3) is a partially enlarged view of the substrate cover 1180 of FIG. 46(2), and the illustration of connection terminal is removed from the figure. The partition wall 1182 has vertical wall part 1182*a* and the horizontal wall part 1182*b*, and the cross-sectional shape thereof is an L-shape. The horizontal wall part 1182*b* is formed with a shape that is extended along the horizontal direction from the vicinity of the upper end of the horizontal wall part 1182*b* into the space between the arm parts of the power terminals (upper positive electrode terminals 1161 and lower positive electrode terminal 1171). Moreover, the horizontal wall part 1183 has the cross-sectional shape with T-shape, and is formed by horizontal wall part 1183*b* and 1183*c* that are extended along two directions from the vertical wall part 1183*a* and the upper end portion of the vertical wall part 1183*a*. The horizontal wall part 1183*b* is extended toward the side adjacent to the horizontal wall part 1182*b*, and formed to have the length in the space reaching the space between the arm parts of the upper positive electrode terminal 1161 and the lower positive electrode terminal 1171. Likewise, the horizontal wall part 1183*c* is extended toward the side close to the adjacent horizontal wall part 1184*b*, and formed with the length in the space of which the front end reaches the space between the arm parts of the upper positive electrode terminal 1162 and the lower positive electrode terminal 1172. The condition where the horizontal wall parts 1182*b*, 1183*b* and 1183*c* are extended into the space between the arm parts is obvious by viewing the positive electrode terminal group FIG. 46(2) from the front side. For example, the position of the right side surface of the upper positive electrode terminal 1161 is at the same position as the position of the right side surface of the lower positive electrode terminal 1171. However, the left end position 1182*c* of the horizontal wall part 1182*b* is extended in the manner of being closer to the left side than the right side surface position of the upper positive electrode terminal 1161 and the lower positive electrode terminal 1171 to become the length of entering the lower side part of the arm part 1161*a* of the upper positive electrode terminal 1161. Additionally, the horizontal wall part 1182*b* is located on the upper side of the arm part 1171*a* of the lower positive electrode terminal 1171.

The length of the vertical wall part 1182*a* and the horizontal wall part 1182*b* in the front-rear direction is longer than the length of the lower positive electrode terminal 1171 in the front-rear direction, and the front end position thereof and the front end of the arm part of the lower positive electrode terminal 1171 are substantially at the same position, the rear end position is closer to the rear side than the rear end position of the lower positive electrode terminal 1171. In this manner, the vertical wall part 1182*a* covers the overall right side surface of the lower positive electrode terminal 1171 and the overall left side surface while covering the upper side portion except for the portion near the center (the part indicated as distance S5) between the left and right sides. Herein, only the shape of a part of the vertical wall part 1182*a* and horizontal wall part 1182*b* of the lower positive electrode terminal 1171 are described, as for the lower positive electrode terminal 1172, the overall right side surface and the overall left side as well as the partition wall 1184 on the upper part except for the middle part are also provided. Therefore, even if external force is applied to the lower positive electrode terminals 1171 and 1172 to bend them, it is possible to effectively maintain the force by the substrate cover 1180, thereby significantly reducing the possibility of unexpected occurrence of short circuit generated by the lower terminal part and the upper terminal part for supplying power.

Regarding the negative electrode terminal sides (1167, 1177), based on the same consideration as that is taken for the terminal at the side of positive electrode (1161, 1162, 1171, 1172), large partition walls 1187 and 1188 are disposed on left and right sides of the negative electrode terminal. The partition wall 1187 has the same shape as the partition wall 1182, and is formed by vertical wall part 1187*a* and the horizontal wall part 1187*b*, and the cross-section shape thereof is L-shape. The horizontal wall part 1187*b* is formed in the manner of extending from the upper end portion of the vertical wall part 1187*a* to the negative electrode terminal. The partition wall 1188 and the partition wall 1187 are formed bilaterally symmetrical to each other and thus including the vertical wall part 1188*a* and the horizontal wall part 1188*b*. Although the vertical wall part 1187*a* and the horizontal wall part 1188*b* are formed with a size that allows the front end portion thereof to enter to the space between the arm part set of the upper negative electrode terminal 1167 and the arm part set of the lower negative electrode terminal 1177, the predetermined space S5 does not block the terminal at the side of the electric tool bodies 1001 and 1030 from entering. The partition walls 1187 and 1188 are formed in the manner of covering the periphery of the negative electrode terminals (1167, 1177) serving as power terminal, and thus even if a strong external pressure is applied to the upper negative electrode terminal 1167 or the lower negative electrode terminal 1177 to make them move (bend) in the front-rear direction, it is possible to significantly reduce the possibility of short-circuit in the presence of the horizontal wall part 1187*b* and the horizontal wall part 1188*b*.

The partition walls 1185 and 1186 between the terminal groups (1164 to 1166) only have lower height H2 in the upper direction, which means that only signal with small power is flown in the signal terminal group (1164 to 1166), and thus the risk of occurrence of short circuit is significantly smaller than the side of power terminal. Additionally, the signal terminal group (1164 to 1166) are one component each, and the upper arm part and the lower arm part have the same level, thus there is little concern for the risk of occurrence of short circuit. The partition wall 1184 includes vertical wall parts 1184*a* and 1184*d*, and a closing plate 1184*c* is connected therebetween. The closing plate 1184*c* is a flat plate extended along the vertical direction and the left-right direction, and serves the function of closing the empty space (inner space of the empty slot 1123 in FIG. 38) between the upper positive electrode terminal 1162 and the T terminal 1164. A horizontal wall part 1184*b* extended toward the positive electrode terminal side is formed near the upper end of the vertical wall part 1184*a*.

The connection part 1181 secures the wall parts in the manner of connecting the front top surfaces of the vertical wall parts 1182*a*, 1183*a*, 1184*a*, 1184*d*, 1185*a*, 1186*a*, 1187*a* and 1188*a* between the connection terminals. The wall part of the upper surface 1181*a* of the connection part 1181 is in a state of being suspended from the circuit substrate 1150. The inner part of the upper surface 1181*a* is provided with a space, and vertical wall parts 1184*a*, 1185*a* and 1187*a* are disposed at the rear side. Herein, although being blocked by front wall surface 1181*b* and invisible, the vertical wall part 1182*a*, 1183*a*, 1184*d* and 1188*a* are also formed in the same manner of extending to the lower side to be in contact with the circuit substrate 1150. As described below in FIG. 48, the inner part of the connection part 1181 is filled with liquid-state hardening resin covering the upper top surface of the circuit substrate 1150 in order to be cured. By curing the hardening resin, the vicinity of the lower end of the plurality of vertical wall parts 1182*a*, 1183*a*, 1184*a*, 1184*d*, 1185*a*, 1186*a*, 1187*a* and 1188*a* and the circuit substrate 1150 are firmly secured. Three notch parts 1181*c* to 1181*e* are formed in the front wall surface 1181*b* of the connection part 1181. The notch parts 1181*c* to 1181*e* are formed in order to make the liquid-state resin described below in FIG. 48 to be uniformly applied throughout the rear portion and the front portion of the circuit substrate 1150. The viscosity of the liquid-state resin is relatively low, and thus the resin is flow in the front-rear direction through the notch parts 1181*c* to 1181*e* (details are incorporated below).

FIG. 47 is an illustration only showing the upper case 1110 in FIG. 38, which serves to describe the shape of the upper step surface 1115 of the upper case 1110. FIG. 47(1) is a perspective view of the upper case 1110. FIG. 47(2) is an arrow view viewing from the direction arrow B in FIG. 47(1). In FIG. 47(1), the step-like portion is illustrated with shadow line to clearly define the range. As described in FIG. 46, the power terminals (1161, 1162, 1167) are formed in the manner of higher than the signal terminals (1164 to 1166, 1168) by a distance H in the upper direction, which means that the power terminal is formed of a plate thicker than the signal terminal. Therefore, with conventional upper case having the upper step surface shape, the upper end portion of the power terminals (1161, 1162, 1167) interferes the inner wall of the upper step surface. Accordingly, in the present embodiment, in order to obtain the gap in the upper portion of the power terminal (1161, 1162, 1167), the upper step surface 1115 of the upper case 1110 is formed in the manner of partially moved upward at the position of the inner side wall surface viewed from the upper-lower direction. It is also possible to form the upper step surface 1115 of the upper case 1110 as a recess which is only concave upward at the position of the inner wall surface. However, if the upper step surface 1115 is formed with the shape as described above, the thickness of a portion of the upper step surface 1115 of the upper case 1110 would be insufficient, and there is risk that the strength is partially reduced. Therefore, the convex parts 1115*a* and convex part 1115*b* are formed in the present embodiment. The convex parts 1115*a* and convex part 1115*b* are formed by making the upper portion in the outer side surface of the upper step surface 1115 and near the position of the power terminals (1161, 1162, 1167) to be protruded outward. Thus, a portion of the wall surface of the upper step surface 1115 is formed in the manner of moving upward, such that the accommodating space in the inner part can be expanded, thereby preventing the strength of wall surface from being reduced. In the present embodiment, the height H4 of the protruded outer surface of the upper step surface 1115 is smaller than the height H5 of the recessed inner wall surface. Therefore, in the upper step surface 1115, it is possible to restrict the size of the convex parts 1115*a* and 1115*b* to be smaller so that the convex parts 1115*a* and 1115*b* can be limited in the range that allows the conventional electric tool body 1001 to be mounted therein without difficulty. Additionally, the step is formed with the configuration that the upper step surface 1115 is not on the same plane and formed as a partial step part and by making the shadow line part become higher, such that the strength thereof can be equal to or more than the conventional upper housing having the same plane shape.

Next, FIG. 48 is incorporated to describe the resin coating method toward the circuit substrate 1150. FIG. 48 is a perspective view of the circuit substrate 1150. Although the related illustration is omitted herein, main region 1156*a* and sub region 1156*b* equipped with electronic component is formed on the upper surface (top surface) of the circuit substrate 1150. The main region 1156*a* is closer to the rear side than the connection terminal, which is equipped with protection management IC (described below) including micro-computer. The sub region 1156*b* is a region closer to the front side than the connection terminal. Herein, the hardening resin is used to cover all of the equipped electronic components. The hardening resin refers to those, e.g., urethane resin, that is cured from the liquid-state. In order to uniformly apply the liquid-state urethane resin on the upper surface of the circuit substrate 1150, initially an adhesive resin 1155 serving as a levee that prevents the liquid-state resin from flowing out is attached to the outer edge of the element group equipped on circuit substrate 1150. The adhesive resin 1155 is an adhesive that is withdrawn in cylindrical shape from a tube-like container through a small outlet, and is continuously applied along the outer periphery of the region throughout which the urethane resin is to be applied. At this time, it is important to make the adhesive to be seamlessly attached along the outer periphery portion, and form one end portion and another end portion to be jointed with the substrate cover 1180. In this manner, the adhesive region 1155 serving as outer frame is substantially attached around the outer periphery part that allows the resin to flow in, and the liquid-state urethane resin is flown into the upper surface of the circuit substrate 1150.

The amount of the urethane resin that flows in is set to be an amount that is sufficient to fill the range enclosed by the resin 1155. At this time, the adhesive resin 1155*a*1-1155*c*1 is used to cover the periphery of the part that is not to be covered by the resin, such that the resin that is flown to the outer side does not reach the range enclosed by the adhesive resin 1155*a*1-1155*c*1. Additionally, if the position into which the urethane resin is to flow in is set as the position indicated by the arrow 1156*a* in the main region, and the resin does not flow in the range enclosed by the adhesive resin 1155*a*1. Moreover, for the substrate cover 1180 which is in the state of being suspended from the wall surface of the connection part 1181 of the upper surface 1181*a*, the rear side wall surface at the lower portion is in an open state, the front side becomes wall surface, and by forming notch parts 1181*c* to 1181*e* in a portion of the wall surface, the resin can be appropriately flown into the sub region 1156*b* from the main region 1156*a*. In this manner, after the resin covers all of the region equipped with all elements of the circuit substrate 1150, the resin is cured, as a result, on the surface side of the circuit substrate 1150, the resin covers the target range with the uniform height seamlessly, such that it is possible to protect the equipped electronic component from being affected by water or dust. Additionally, in the condition where the double-sided substrate serves as the circuit substrate 1150, it is possible to use resin to cover the rear surface side in the same order. Additionally, by using the adhesive rein 1155 to fill the portion to be filled by the resin, for example, the soldering part near the screw hole or lead wire can be coated with resin coating following completion of the step of screw-fastening and soldering.

Based on the above, FIG. 36 to FIG. 48 are incorporated to describe the sixth embodiment, but the battery pack 1100 described in the sixth embodiment can be modified in various manners. FIG. 49 is an illustration showing the shape of the upper terminal part 1260 and the lower terminal part 1280 in the first modification example of the sixth embodiment. FIG. 49(1) is a perspective view, FIG. 49(2) is a left-side view, and FIG. 49(3) is a front view. The upper terminal part 1260 and the lower terminal part 1280 respectively have two arm part sets (1265 and 1266, 1285 and 1286) in the left-right direction, and the two arm part sets are aligned in the upper-lower direction, which is the same as the sixth embodiment. The configuration that the leg part set 1267 and 1268 of the upper terminal part 1260 is aligned with the leg part set (1287, 1288) of the lower terminal part 1280 in the front-rear direction is the same as the configuration described in the sixth embodiment. At the lower portion at the rear side of the right side surface 1263 and the left side surface 1264, as indicated by arrows 1262a and 1282a in FIG. 49(2), the bridge parts 1262 and 1282 are protruded in the manner of being bent backward. Therefore, the projection part is configured for positioning the upper terminal part 1260 and lower terminal part 1280 in the upper-lower direction when are mounted on the circuit substrate 1150. Bent parts 1263a, 1264a, 1283a and 1284a (1263a is invisible in FIG. 49) are formed by being bent as extended portion inward in the form of protrusion, and such shape is the same as the configuration shown in the sixth embodiment shown in FIG. 40.

The bending direction of the U-shaped upper terminal part 1260 is different from the direction shown in FIG. 40. Herein, the configuration is formed as the U-shape that is bent as the bottom part, that is, the bridge part 1262 is formed in the manner of becoming a vertical surface. The bending shape of the lower terminal part 1280 is the same as the bending direction of the U-shape of the lower terminal part 1220 shown in FIG. 40. The bridge part 1282 becomes a vertical surface. The bridge part 1262 與 1282 are disposed in parallel in a manner of being spaced apart by a substantially predetermined interval in the front-rear direction, and the surface relative to the circuit substrate 1150 is disposed in the manner of extending substantially along the vertical direction. The upper terminal part 1260 and the lower terminal part 1280 are fabricated through pressing the metallic plate, which is the same as the sixth embodiment, but the thickness of the plate is further increased.

The right side surface 1263 and the left side surface 1264 are substantially in rectangular shape extending along the vertical direction, and arm parts 1265, 1266 are formed near the upper end in the manner of extending toward the front side. The width (length in the upper-lower direction) of the arm parts 1265 and 1266 near the rear side root portion, i.e., near the chain line B2 is large, and the width toward the front is gradually decreased and closer to the front side than the imaginary line B1, and the width is fixed. The fitting parts 1265d and 1266d have curved shape with a predetermined radius of curvature $R_1$ when being bent inward from the top view, which is the same as the sixth embodiment shown in FIG. 40. Accordingly, the arm parts 1265, 1266 are formed in the manner of extending from the upper front side of the U-shape base body part to the front, and the arm parts 1265 and 1266 are formed with elasticity in a non-contact state.

The lower terminal part 1280 has right side surface 1283, left side surface 1284 and a bridge part 1282 that connects the right side surface 1283, left side surface 1284 that are bent into U-shape and arranged in parallel. The arm parts 1285, 1286 are disposed in the manner of extending from the elongated upper portion of the right side surface 1283 and the left side surface 1284 toward the oblique upper side of the front. The width of the arm parts 1285 and 1286 in the upper-lower direction is substantially fixed in the front-rear direction, and is formed in the manner of being closer to the imaginary line B1 and extending along the horizontal direction, and being inclined toward the rear side than the imaginary line B1. A notch part 1291 that is dramatically cut from the front side is formed at the lower side of the arm part set (1285, 1286) of the lower terminal part 1280. As a result, the length of the arm parts 1265, 1266 (i.e., length in the front-rear direction and the front side of B2) of the upper terminal part 1260 is longer than the length (which is the length in the front-rear direction and at the front side of the position of arrow 1291) of the arm parts 1285, 1286 of the lower terminal part 1280. Even if the arm set parts have different lengths in the front-rear direction, preferably the fitting pressure of the fitting part of the upper terminal part 1260 is the same as the fitting pressure of the lower terminal part 1280, and the reason is that, if the fitting pressure is not the same, it is likely to generate minor heat due the change of contact resistance of the plate-shape terminal at the side of the device on the side of the electric tool bodies 1001, 1030, or it is likely to cause different degree of worn-out condition due to long-term use. In the modification example, in order to reach the balance of the fitting pressure of the upper terminal part 1260 and the lower terminal part 1280, it is set that the initial intervals are different in the state that the battery pack is not mounted. That is, in the state (removed state) that the battery pack 1100 is not mounted on the electric tool body 1001 or 1030, the minimum interval between the arm parts 1265, 1266 on the right and left sides is different from the interval between the arm parts 1285, 1286. Herein, the interval between the arm part 1265 and 1266 of the upper terminal part 1260 is 0.2 mm, relative to which the minimum interval between the arm parts 1285 and 1286 of the lower terminal part 1280 is set as 0.5 mm.

In order to make the fitting pressure uniform, the shape of the upper terminal part 1260 and the lower terminal part 1280 is designed in a specific manner. That is, as shown in FIG. 49(2), for the inner corner in the upper terminal part 1260 which should be designed as a substantially a right angle as indicated by dashes line 1264b, the design herein is made by making the contour of the dashed-line 1264b to extend toward the direction of arrow 1264e to form the shape of the reinforcing surface 1264c which is an isosceles triangle when viewed from the side. As a result, the contour of the inner corner is inclined as shown by arrow 1264d, with modification to the shape, the mounting rigidity of the arm parts 1265 and 1266 of the upper terminal part is increased. To coordinate with the modified shape of the inner corner of the upper terminal part 1260, the shape of the outer corner of the lower terminal part 1280 is cut along the direction of the arrow 1284e, thereby forming the shape of cutout part 1284c which has an isosceles triangular shape when viewed from the side. As a result, the contour of the outer corner is as indicated by arrow 1284d, the rigidity of the arm part 1285 and 1286 of the lower terminal part is reduced. As for the contour part indicated by arrow 1264d and arrow 1284d, the contours are determined in the manner of being substantially parallel when viewed from the side and spaced part by a predetermined interval. Additionally, if the cutout part 1284*c* is formed, the length of the bridge part 1282 in the upper-lower direction is shortened. However, since the lower terminal part 1280 is small, the lower terminal part 1280 still has sufficient strength as compared with upper terminal part 1260. With such configuration, a reinforcing surface 1264*c* is added to upper terminal part 1260 to change the shape of inner corner as well as forming a cutout part 1284*c* on the lower terminal part 1280, the strength can be adjusted to change the shape of the outer corner, thereby achieving the balance of the strength of the two, such that the fitting pressure of the arm parts 1265 and 1266, 1285 and 1286 to terminal at the side of the body is substantially the same.

FIG. 49(3) is an illustration showing the upper terminal part 1260 and the lower terminal part 1280 from the front view. The height or mounting position of the arm parts 1265 and 1266 in the upper-lower direction and the height or mounting position of the arm parts 1285 and 1286 are in the same shape and the same position relationship as the arm part goop of the upper terminal part 1200 and the lower terminal part 1220 in the sixth embodiment shown in FIG. 40. However, the thickness of the metal plate used in the modification example is different from the previous one, a plate having a thicker thickness than the terminal part of the sixth embodiment shown in FIG. 40 is used for fabrication. Furthermore, in the state that the battery pack 1100 is not mounted, the minimum interval between the upper and lower arm part sets is different. That is, as compared with the interval between the upper arm parts 1265 and 1266 in the left-right direction, the interval between the lower arm parts 1285 and 1286 in the left-right direction is larger, which is because that the length of the mounting direction (front-rear direction) of the arm parts 1265, 1266 and arm parts 1285, 1286 disposed in parallel in the upper-lower direction is in reverse proportional relationship. The longer arm parts 1265 and 1266 are opposite to each other by a small interval in the initial state. On the contrary, the shorter arm parts 1285 and 1286 are opposite to each other with a larger interval arranged therebetween.

Based on the above, in the first modification example, the upper terminal part 1260 and the lower terminal part 1280 having plate thickness of 0.8 mm serve as power terminal. Regarding the signal terminal part, since only minor current flows therethrough, the signal terminal part can be fabricated in the same manner as the previously described battery pack 1015 using a metal plate having a thickness of about 0.3 mm. In the present modification example, the rigidity of the power terminal through which big current flows is further improved. Therefore, a good fitting condition can be maintained not only in the operation process but also in long-term use. Additionally, with regard to that the fitting pressure of the upper and lower arm part set are set to be substantially the same, the invention provides no limitation to adjustment of the interval of fitting part and modification to the shape near the mounting root part, it is also possible to achieve the same effect through adjustment of plate thickness, selection of material for terminal part and so on.

FIG. 50 is a perspective view of the upper terminal part 1260 and the lower terminal part 1280A in the second modification example of the sixth embodiment. In the second modification example, relative to the first modification example shown in FIG. 49, the upper terminal part 1260 remains the same, but the plate thickness of the lower terminal part 1280 and the initial gap of the arm part are set to be different. That is, the plate thickness of the lower terminal part 1280A is changed by reducing the thickness 0.8 mm of the lower terminal part 1280 to be 0.6 mm, and the interval between the fitting parts 1285*d* and 1286*d* is reduced from 0.5 mm of the lower terminal part 1280 to be 0.2 mm as shown in FIG. 49. The interval between the fitting parts 1265*d* and 1266*d* of the upper terminal part 1260 is set to be the same as 0.2 mm as in the first modification example. By adjusting the plate thickness and interval of the elastic arm parts 1285, 1286, it is possible to make the fitting pressured generated by the fitting part 1265*d* and 1266*d* of the upper terminal part 1260 to be substantially the same. Herein, the shape of the fitting parts 1265*d* and 1266*d* is formed as a semi-cylindrical surface, and the center axis of the cylindrical surface is in the vertical direction. The wall surface inside the fitting parts 1265*d*, 1266*d* becomes a cylindrical surface having a radius of curvature $R_1$. The wall surface inside the fitting parts 1285*d* and 1286*d* of the lower terminal part 1280 is also formed as a cylindrical surface having a radius of curvature $R_1$. The cylindrical-shape fitting surface of the fitting parts 1265*d* and 1286*d* as well as fitting parts 1285*d* and 1286*d* may be formed with the same radius of curvature $R_1$ such that the linear-shape or rectangular shape contact portion are formed in substantially identical size or shape. Through such design, the size of the contact portion or contact region is set to be uniform, and thus the clamping pressure (fitting pressure) is substantially the same so that electric contact resistance is substantially the same and thus a preferable effect can be achieved.

FIG. 51 is a perspective view of the upper terminal part 1200A and the lower terminal part 1200 in the third modification example of the sixth embodiment. FIG. 51(1) is an illustration showing a state where the terminal part is connected to a terminal at the side of body of the electric tool body 1030A rated at 36V. In the third modification example, only the shape of the upper terminal part 1200A, especially the shape of arm parts 1205A, 1206A are different from the sixth embodiment, the configuration of the base body part and the let part of the upper terminal part 1200A are the same as that described in the sixth embodiment. The upper terminal part 1200A serve as upper positive electrode terminal 1161, 1162 and the upper negative electrode terminal 1167. In the upper terminal part 1200A, the arm parts 1205A and 1206A are extended tremendously toward the front side, such that the positions of the fitting parts of the arm part 1205A and 1206A are closer to the front side than the positions of the fitting parts of the arm part 1225, 1226. The shape of the opposite fitting part is a cylindrical surface having an identical radius of curvature $R_1$, and the shape of the fitting part of the arm parts 1205A and 1206A is the same as the shape of the fitting part of the arm parts 1225 and 1226. In the condition where the arm parts 1205A and 1206A are prolonged, the positive input terminal 1072A of the electric tool body at the side of 36V of which the shape is correspondingly changed is shorter than the former one. The size or plate thickness of the short bar 1079 serving as short member is the same as the short bar 1059 shown in FIG. 41. However, a notch 1079*d* having a semi-circle shape is formed at the upper portion of the terminal part 1079*b* of the short bar 1079. In the condition where the positive input terminal 1072A of the terminal at the side of the device and terminal part 1079*b* are relatively moved because of certain reason in arc-shaped manner or horizontal direction as indicated by arrow 1045*a*, the notch 1079*d* is configured to prevent the terminal part 1079*b* from being in contact with the upper arm parts 1205A, 1206A. As the notch 1079*d* is formed in this manner on the terminal part 1079*b* of the short bar 1079, when the battery pack 1100 is mounted and the electric tool is operated, even if relative position difference is caused by the different resonance frequency generated by the electric tool body 1030 and the battery pack 1100, the possibility of short-circuit occurred to the upper terminal part 1200A and the lower terminal part 1220 can be significantly reduced.

FIG. 51(2) is an illustration showing the state of connection to the terminal at the side of body of conventional electric tool body 1001. When being mounted at the side of the electric tool body 1001 rated at 18V, the positive input terminal 1022 is connected in the manner of crossing the upper positive electrode terminal 1162 and the lower positive electrode terminal 1172, two sets of arm parts 1205A, 1026A and arm parts 1225, 1226 are fitted together. At this time, the contact position of fitting part of the arm parts 1205A, 1206A facing the positive input terminal 1022 leans farther to the front side than the contact position of the fitting part of the arm parts 1225, 1226 facing the positive input terminal 1022. However, the thickness of the positive input terminal 1022 nearby each of the contact positions is uniform. Therefore, if the size of the contact portion or contact region are all the same in the arm parts 1205A and 1206A as in the fitting part of the arm parts 1225 and 1226, a good conduction state can be achieved and the movement of contact position does not cause any effect.

FIG. 52 is a perspective view illustrating the upper terminal part 1200 and a lower terminal part 1220A of a fourth modification example of the sixth embodiment. FIG. 52(1) is a diagram illustrating a state where the terminal part is connected to body side terminals of an electrical tool body 1030B. In the fourth modification example, the only difference is that the shape of the arm parts 1225A and 1226A of the lower terminal part 1220A is different from that in the sixth embodiment, and other configurations are the same as that provided in the sixth embodiment. Herein, the arm parts 1225A and 1226A are extended toward the front side, such that the position of the fitting part of the arm parts 1225A and 1226A at the lower side leans farther toward the front side than the position of the fitting part of the arm parts 1205, 1206 at the upper side. Correspondingly, the rear end position of the short bar 1079 leans farther toward the front side than the former one. Accordingly, a notch 1072*d* having a semi-circular shape is formed at the lower portion of the positive input terminal 1072B. For the notch part 1072*d*, in the condition where the positive input terminal 1072B of the device side terminal and the terminal part 1079*b* are moved as indicted by arrow 1045*b* for certain reason, the possibility of contact between the positive input terminal 1072B and the arm parts 1225A and 1226A can be greatly reduced by configuration of the notch part 1072*d*.

FIG. 52(2) is an illustration showing a state of connection to a body side terminal of conventional electric tool body 1001. The two sets of arm parts 1205, 1206 and the arm parts 1225A, 1226A are fitted with the positive input terminal 1022 at the side of the electric tool body 1001. Herein, the position of the contact portion of the arm parts 1205 and 1206 and the position of the contact portion of the arm parts 1225A, 1226A are spaced apart by a distance L in the front-rear direction. However, the size of the contact portion or contact region is the same in the arm parts 1205, 1206 as in the fitting portion of the arm parts 1225A and 1226A; therefore, the present embodiment can achieve good conduction state as the sixth embodiment.

FIG. 53 is a perspective view showing a shape of a terminal part at the side of the electric tool body 1030A in the fifth modification example of the sixth embodiment. In the fifth modification example, the position of the positive electrode terminal and the negative electrode terminal, and the position of the short bar in the sixth embodiment are set to be up-side down. Herein, the upper positive electrode terminal 1162 and the upper negative electrode terminal 1167 are made to be short-circuited through the short bar 1089. The short bar 1089 may adopt the same component as the short bar 1059 (see FIG. 41) in the sixth embodiment, and may be formed in the manner of being casted in the base made of synthetic resin of the terminal part of the electric tool body. The positive input terminal 1082 includes terminal part 1082*a*, connection part 1082*b* and wiring terminal part 1082*c*, which is the same as the positive input terminal 1052 (see FIG. 41) in the sixth embodiment. However, since the configuration position of the wiring terminal part 1082*c* needs to on the rear surface side of the terminal part but not the top surface, the shapes of the connection part 1082*b* and the wiring terminal part 1082*c* are modified. Similarly, the position of the wiring terminal part 1087*c* of the negative input terminal 1087 is also different, in corresponding to the condition that the positions of the positive input terminal 1082 and the negative input terminal 1087 in the terminal part are staggered, the connection state of the upper cell unit 1146 and the lower cell unit 1147 are also changed. That is, the lower positive electrode terminal 1172 and the upper negative electrode terminal 1167 are connected to the upper cell unit 1146, and the upper positive electrode terminal 1162 and the lower negative electrode terminal 1177 are connected to the lower cell unit 1147.

Even if the position of the short bar 1089 is changed as described above, it is possible to realize the battery pack equipped with automatic voltage switching mechanism in the present embodiment. By being applied to the construction, the mounting position of the wiring terminal parts 1082*c* and 1087*c* can be guided to the rear side instead of the upper side (see FIG. 42) of the terminal part, and thus the degree of freedom for designing the terminal part at the side of the electric tool body is increased. Additionally, regarding the function of the short bar 1089, it will work as long as the short bar 1089 is provided with terminal part 1089*b* and the terminal part 1089*c* and they are made to be short-circuited. Therefore, it is not required to use a metal plate to be connected to the connection part 1089*a*, other method that can be used to form the electrical connection relationship through conductive element can also be adopted, such as through lead connection, performing connection through fuse element and other random method.

Embodiment 7

FIG. 54 is a perspective view illustrating a battery pack 1400 of the seventh embodiment of the invention. In the battery pack 1400, a plurality of connection terminals engaged with the terminals of a charging device or a tool body for electrical conduction are disposed. The connection terminals disposed herein are respectively formed by two connection terminal components separated in the upper-lower direction. In addition, the shapes of the connection terminal components have characteristics. The appearance of the battery pack 1400 is substantially the same as that of the battery pack 1100 shown in the sixth embodiment. The only differences in the appearance are that there is no stepped part (see 1115*a*, 1115*b* in FIG. 47) that locally bulges in an upper step surface 1415, and that a recessed part (see 1111*a* of FIG. 47) is not formed at the corner portion on the front-left side of a lower step surface 1141. A plurality of slots 1420 are disposed in the stepped part of the connection portion between the upper step surface 1415 and the lower step surface 1411, and the width or size of the slot 1420 is substantially equal to that of the battery pack 1100 of the sixth embodiment. On the rear side of the upper step surface, a raised part 1432 is formed. On the left and right sides of the raised part 1432, latches 1441 are formed.

Ten battery cells 1446 are accommodated inside the lower case 1401. Here, the upper cell unit and the lower cell unit formed by each serially connecting five battery cells are disposed, and an output rated at 18V is output as the output of the cell units in parallel connection. In other words, the battery pack 1400 is a voltage fixed type. In each of the connection terminals, a terminal is formed by two terminal parts, i.e., a terminal part at the upper side and a terminal part at the lower side. In other words, the positive electrode terminal for charging is formed by an upper positive electrode terminal 1461 and a lower positive electrode terminal 1471, and these electrode terminals are short circuited. The positive electrode terminal for discharging is formed by an upper positive electrode terminal 1462 and a lower positive electrode terminal 1472, and these electrode terminals are short circuited. In addition, the set formed by the upper positive electrode terminal 1461 and the lower positive electrode terminal 1471 and the set formed by the upper positive electrode terminal 1462 and the lower positive electrode terminal 1472 are connected via a self-control protector (not shown).

The negative electrode terminal includes an upper negative electrode terminal 1467 and a lower negative electrode terminal 1477, and these electrode terminals are connected. In this way, one connection terminal is configured by being separated into two connection terminal components. Therefore, the number and the total area of contact portions with respect to the device side terminals at the electrical tool body 1001 side become greater, and issues such as generation of heat due to loose contact which occurs easily due to vibration during operation of the electrical tool are less likely to occur, and the connection terminal can be used stably for a long period of time. A longer life span of the battery pack 1400 thus can be achieved.

Among the connection terminals, signal terminals for transmitting signals, i.e., the T terminal set (an upper T terminal 1464 and a lower T terminal 1474), the V terminal set (an upper V terminal 1465 and a lower V terminal 1475), an LS terminal group (an upper LS terminal 1466 and a lower LS terminal 1476), an LD terminal group (an upper LD terminal 1468 and a lower LD terminal 1478) are also each formed by two terminals. Besides, the upper and lower terminals are connected to have the same potential. The T terminal set, the V terminal set, and the LD terminal group serve as signal terminals for inputting or outputting information or signals. The upper side connection terminals (1461 to 1462, 1464 to 1468) and the lower side connection terminals (1471 to 1472, 1474 to 1478) are fixed to the circuit substrate 1450. In this circuit substrate, an IC for protecting battery cells is installed, but a microcomputer or a light emitting diode for displaying the battery level is not disposed.

FIG. 55 is a partially enlarged view of a connection terminal of FIG. 54. From a side view, the upper terminal part (1465 to 1468) and the lower terminal part (1476 to 1478) are substantially in an L shape. The leg parts of the upper and lower terminal parts are fixed to the circuit substrate 1450 side by side in the mounting direction. This fixing method is the same as the method of the sixth embodiment shown in FIGS. 39 and 40, where the leg parts penetrate through the mounting holes of the circuit substrate 1450 and are soldered from the back side of the circuit substrate 1450. In the upper terminal part (1465 to 1468) and the lower terminal part (1476 to 1478), fitting parts that are bent into a substantially V shape by narrowing a portion of the interval between the arm parts on the two sides are respectively formed. The fitting part in the conventional battery pack is disposed by arranging the substantially V-shaped crest portion to be orthogonal to the inserting direction of the device side terminal. Namely, in the conventional terminal part, the edge line of the substantially V-shaped crest portion (e.g., the vertex portion of the inner front side in the portion of the fitting part 1478c that is shown) is configured to extend in the upper-lower direction. However, in the seventh embodiment, the extending direction of the edge line is not the upper-lower direction but is inclined. Therefore, the length of the contact portion of the plate-shaped body side terminal with the terminal part, i.e., with the fitting part, can be increased.

FIG. 56(1) is a perspective view illustrating the upper terminal part 1480. However, the figure omits the leg part of the upper terminal part 1480 and only illustrates the portion at the upper side of the circuit substrate 1450. The upper terminal part 1480 is formed by pressing a conductive metal plate to cut and bend the conductive metal plate to form a U shape, and then forming a predetermined curved shape in the arm part. Here, a right side surface 1483 and a left side surface 1484 are formed by bending so that the surface at the bottom part, i.e., the bridge part 1482, of the U shape becomes the rear side, and extending the left and right sides of the bridge part 1482 in the vertical direction. The right side surface 1483 and the left side surface 1484 are formed in plane symmetry in the left-right direction. In addition, the right side surface 1483 and the left side surface 1484 are parallel surfaces with a predefined interval. From the front edges of the upper portions of the right side surface 1483 and the left side surface 1484 toward the front side, left and right arm parts 1485 and 1486 are formed. Base parts of the arm parts 1485 and 1486, i.e., planar part 1485a and 1486a, are parallel surfaces at the same positions with the right side surface 1483 and the left side surface 1484 in the left-right direction. On the front sides of the planar parts 1485a and 1486a, curved parts 1485b and 1486b curved inward are formed. The curved parts 1485b and 1486b are planar-like, but the large bent parts facing outward are disposed with the edge line of the mountain being inclined.

On the front sides of the curved parts 1485b and 1486b, fitting parts 1485c and 1486c that are bent convexly and in a substantially V shape are formed. The fitting parts 1485c and 1486c are parts that are concave toward the inner side. When the battery pack 1100 is being installed, the summit portions on the inner sides of the fitting parts 1485c and 1486c are portions contacting the device side terminal and slide relatively. Therefore, in spite of being in a substantially V shape, the top end portion (the summit portion) is also configured with a larger radius of curvature $R_1$ or a smaller radius of curvature. With the configuration, the relative sliding resistance between the device side terminal and the fitting parts 1485c and 1486c is reduced during relative sliding, and the contact area with the fitting parts 1485c and 1486c is increased to reduce the electrical contact resistance when the device side terminal and the fitting parts 1485c and 1486c do not slide relatively but are in contact. Guide parts 1485d and 1486d are connected to the front sides of the fitting parts 1485c and 1486c. The guide parts 1485d and 1486d serve to guide the plate-shaped device side terminal to be inserted between the fitting parts 1485c and 1486c. The guide parts 1485c and 1486c are substantially planar, and are formed in a shape of gradually becoming wider in the left-right direction toward the front side. Therefore, a front end part 1485e and a front end part 1486e of the arm parts 1485 and 1486 are formed in the shapes of being located below the arm parts 1485 and 1486. In the front end parts 1485e and 1486e, the corner portions are formed smoothly in a manner of depicting a small radius of curvature.

FIG. 56(2) is a diagram for illustrating the position relation of the contact part for the device side terminal in the fitting parts 1485c and 1486c. Here, only the portion of the arm part 1486 on the left side is shown, but the arm part 1485 on the right is plane-symmetrical and has the same shape. A width W of the arm part 1486 in the height direction is fixed in the front-rear direction, but the contact portion of the fitting part 1486c is arranged at the location indicated by the bold line. The contact portion indicated by the bold line is arranged to be a line-shaped contact part or a rectangular contact region having a small width. Compared to the length (=W) when the fitting part 1486c is formed on a vertical line, the contact length of the contact portion indicated by the bold line is W/cos θ times thereof. In this way, the length direction of the contact part or the contact region of the fitting part 1486c is disposed to be inclined with respect to the mounting direction of the device side terminal in the contact surface with the device side terminal. Therefore, the contact part or the contact region can be increased, and the contact area with the device side terminal at the electrical tool body side can thus be increased. As a result, the contact resistance between the device side terminal and the fitting part 1486c can be reduced, and the heat generated at the terminal due to the increased contact resistance can be effectively suppressed. Besides, the occurrence of electric arc with respect to the device side terminal can also be suppressed. Therefore, the arm parts 1485 and 1486 can be prevented from being damaged or melted. Besides, regarding the upper positive electrode terminals 1461 and 1462 and the lower positive electrode terminals 1471 and 1472 as power terminals, these terminals may also be configured as being respectively connected with the positive electrode terminals of the upper cell unit 1146 and the lower cell unit 1147, like in the sixth embodiment. Therefore, like the sixth embodiment, these terminals are also compatible with a battery pack capable of switching between the low voltage side and the high voltage side. In such case, the shapes of the arm parts and the fitting parts of the seventh embodiment can be applied to the fitting parts of the upper terminal part 1200 (see FIG. 40) and the lower terminal part 1220 (see FIG. 40) as described in the sixth embodiment.

Regarding the terminals for transmitting signals (the upper terminal parts 1464 to 1466 and 1468 and the lower terminal parts 1474 to 1476 in FIG. 54(2)), these terminals are also formed by fitting parts in upper and lower layers, and are formed to have the same potentials and configured have the same signals flowing through. However, the terminals may also be configured as follows: the upper parts and the lower parts of the signal terminals are formed to have different potentials, and the device side terminals at the electrical tool body side are also formed separately. In this way, a greater number of signals can be transmitted. Besides, regarding the terminals for transmitting signals, it is of little necessity to use a terminal part completely separated in the upper-lower direction. Therefore, the terminal part may also be formed as being connected in the upper-lower direction. In the following, the shape of a terminal part 1500 connected in the upper-lower direction is described with reference to FIG. 57.

FIG. 57 is a perspective view illustrating the shape of the terminal part 1500. However, the figure omits the leg part of the terminal part 1500 and only illustrates the portion at the upper side of the circuit substrate 1450. In the terminal part 1500, a notch groove 1508 separating an arm part 1505 in the upper-lower direction is formed at a portion approximately at the midpoint of the front side of the arm part 1505, so as to form an arm part piece 1506 at the upper side and an arm part piece 1510 at the lower side. Similarly, a notch groove 1512 separating an arm part 1509 in the upper-lower direction is formed at a portion approximately at the midpoint of the front side of the arm part 1509 on the left side, thereby forming an arm part piece 1507 at the upper side and an arm part piece 1511 at the lower side. In this way, by separating the arm part pieces 1506 and 1507 at the upper side and the arm part pieces 1510 and 1511 at the lower side with the notch grooves 1508 and 1512, the configuration where one terminal part 1500 has two arm part sets is realized, and a signal terminal capable of maintaining in a favorable fitting state can be realized. In the terminal set (1506, 1507) at the upper side and the terminal set (1510, 1511) at the lower side, fitting parts (1506c, 1507c) and fitting parts (1510c, 1511c) for fitting the plate-shaped body side connection terminal are respectively formed (but the fitting part 1510c is not visible in FIG. 57). The length directions of the contact parts or the contact regions of the fitting parts (1506c, 1507c) at the upper side are disposed to be inclined. Similarly, the length directions of the contact parts or the contact regions of the fitting parts (1510c, 1511c) at the lower side are disposed to be inclined. The length directions of the contact parts or the contact regions of the fitting parts at the upper side and the lower side are disposed into a row. Besides, the fitting parts at the upper side and the lower side may also be arranged at the same positions when viewed in the front-rear direction, so that the length directions of the contact parts or the contact regions of the fitting parts at the upper side and the lower side are not disposed into a row. Besides, the inclinations of the length directions of the fitting parts at the upper side and the lower side may also have varied orientations and are oriented in opposite directions. For example, the shape of the arm part set (1506, 1507) at the upper side may also be modified into a shape reversed upside down from the shape of the terminal set (1510, 1511) at the lower side. In other words, the arm part sets may have shapes in plane symmetry with respect to the horizontal plane. By forming the length directions of the contact regions of the fitting parts as inclined directions instead of vertical directions, the lengths of the fitting parts can be increased as compared to the conventional example where the fitting parts are orthogonal to the mounting direction. Therefore, the contact resistance can be reduced.

According to the above, the shapes of the connection terminals (1408, 1500) used in the voltage fixed type battery pack are described in the seventh embodiment. However, the configuration where these terminal shapes are applied to the voltage switchable type battery pack as in the sixth embodiment is also possible. For example, the configuration of the fitting part of the terminal part 1500 shown in FIG. 57 may also be applied in the signal terminal part 1240 shown in FIG. 44.

Embodiment 8

FIG. 58 is an exploded perspective view illustrating the battery pack 2100 of Embodiment 8. The case body of the battery pack 2100 is formed by the upper case 1110 and the lower case 1101 separable in the upper-lower direction. An internal space of the lower case 1101 accommodates ten battery cells. Two screw holes 1103a and 1103b for screwing with the upper case 1110 are formed on the front side wall surface of the lower case 1101. Screws not shown herein are inserted to penetrate through the screw holes 1103*a* and 1103*b* in the upward direction from below. Two screw holes 1103*c* (not shown in the figure) and 1103*d* are also formed on the rear side wall surface of the lower case 1101. A plurality of battery cells (not shown) are fixed by a separator 2445 formed of a non-conductor, such as a synthetic resin, in a state that the battery cells are stacked in two layers, each layer having five battery cells. The separator 2445 holds the battery cells, so that only the left and right sides that are two ends of the battery cells are opened.

A circuit substrate 2150 is fixed to the upper side of the separator 2445. On the circuit substrate 2150, a plurality of connection terminals (2161, 2162, 2164 to 2168, 2171, 2172, 2177) are fixed by soldering. In addition, these connection terminals are electrically connected with a circuit pattern not shown herein. Various electronic components (not shown here), such as a battery protecting IC or a microcomputer, a PTC thermistor, a resistor, a capacitor, a fuse, a light emitting diode, etc., are also installed on the circuit substrate 2150. Regarding the material of the circuit substrate 2150, it is referred to as a printed substrate formed by printing a pattern wiring with a conductor, such as a copper foil, on a substrate impregnated with a resin that is insulating with respect to a material, and a single-layered substrate, a double-sided substrate, or a multi-layered substrate may be adopted. In the present embodiment, a double-sided substrate is adopted, and the wiring patterns are formed on the upper surface (the top surface, and the surface on the upper side that can be seen in FIG. 58) and the lower surface (the back surface) of the circuit substrate 2150. A connection terminal group arrangement area 2160 is disposed on a side slightly closer to the front than the center in the front-rear direction of the circuit substrate 2150. In the connection terminal group arrangement area 2160, the connection terminals (2161, 2162, 2164 to 2168, 2171, 2172, 2177) are fixed side by side in the lateral direction.

The positive electrode terminals (2161, 2162, 2171, 2172) and the negative electrode terminals (2167, 2177) are disposed at positions greatly separated in the left-right direction, and three signal terminals (the T terminal 2164, the V terminal 2165, and the LS terminal 2166) are disposed between the positive electrode terminals (2161, 2162, 2171, 2172) and the negative electrode terminals (2167, 2177). The three signal terminals (the T terminal 2164, the V terminal 2165, and the LS terminal 2166) serve as signal terminals for inputting or outputting information or signals. In the present embodiment, although a component provided with a total of two sets of arm parts extending along the horizontal direction (one set is disposed at the left and the right of the upper side, and the other set is disposed at the left and the right of the lower side) is used as the component for power terminals, the specific shape is the same as the structure described with reference to FIG. 49. With respect to the signal terminals (2164 to 2166, 2168), it is also possible to use one signal terminal part having an arm part in the upper-lower direction, as conventionally used. However, in the present embodiment, in order to make it equal to the fitting states of the positive electrode terminals (2161, 2162, 2171, 2172) and the negative electrode terminals (2167, 2177) with the device side terminals, a signal terminal part having two arm parts on the upper side and the lower side (see FIG. 44) is also used at the signal terminal side.

The LD terminal 2168 is disposed on the left side of the negative electrode terminal pair (2167, 2177). The LD terminal 2168 serves as a signal terminal for outputting information or signals relating to the battery pack 2100. The LD terminal 2168 is also formed to have two arm part sets on the upper side and the lower side. The respective leg parts of all the signal terminals (2164 to 2166, 2168) penetrate from the top surface to the back surface via a plurality of mounting holes 2151 formed in the circuit substrate 2150 and are fixed at the back side by soldering. In the present embodiment, the method for fixing the three signal terminals (2164 to 2166) is as shown in FIGS. 44 and 45. As described above, after the electronic components not shown herein are installed to the circuit substrate 2150 and the connection terminals are fixed by soldering, a substrate cover 2180 to be described afterwards with reference to FIG. 68 is disposed, the surface of the circuit substrate 2150 is cured by a resin, and then the circuit substrate 2150 is fixed to the separator 2445 by using screws not shown herein. Besides, the substrate cover 2180 is not illustrated in FIG. 58.

The lower case 1101 is in the shape of a substantially rectangular parallelepiped with an opened upper surface, and is formed by a bottom surface and the front wall 1101*a*, the rear wall 1101*b*, the right side wall 1101*c*, and the left side wall 1101*d* extending along the vertical direction relative to the bottom surface. The internal space of the lower case 1101 is formed in a shape suitable for accommodating the separator 2445. A large number of fixing ribs 1102 are formed on the inner side of the bottom surface to stably hold the separator 2445, or a large number of ribs 1105 are formed to be continuous along the vertical direction to reinforce the wall surface. The slit 1104 is disposed substantially at the center of the front wall 1101*a*. The slit 1134 of the upper case 1110 serves as an inlet. When the battery pack 2100 is being charged by the charging device, the inlet allows cooling air from the charging device side to flow into the internal space of the battery pack 2100, and the slit 1104 of the lower case 1101 serves as an outlet of the cooling air.

The output from the battery cell side is connected to the circuit substrate 2150 via drawer tabs 2461*a*, 2466*a*, 2471*a*, and 2476*a* that are for connection. The drawer tabs 2461*a*, 2466*a*, 2471*a*, and 2476*a* extend upward in a plate shape. Besides, the ends 2494*b* and 2496*b* to 2499*b* of the lead wires from the intermediate connection point of the battery cells in series connection are disposed to extend upward, and are soldered to the circuit substrate. Moreover, intermediate drawer tabs 2462*a* and 2463*a* from the intermediate connection point of the battery cells in series connection are disposed to extend upward for connection with the circuit substrate 2150. Screw bosses 2447*a* and 2447*b* for fixing the circuit substrate 2150 are formed on the upper side of the separator 2445.

Then, FIG. 59 as an exploded perspective view is used to illustrate stacking and a wiring method of the battery cells using the separator 2445. In the separator 2445, ten battery cells 2146*a* to 2146*e* and 2147*a* to 2147*e* are stacked in upper and lower layers, each layer having five battery cells. FIG. 59 illustrates a state where the battery cells 2146*a* to 2146*e* and 2147*a* to 2147*e* are withdrawn from the separator 2445. However, when being assembled, the battery cells 2146*a* to 2146*e* and 2147*a* to 2147*e* are inserted into cylindrical spaces 2446 of the separator 2445, and the terminals exposed on the left side and the right side of the separator are connected with each other via connection plates 2462 to 2465 and 2472 to 2475, and the drawer plates 2461, 2466, 2471, and 2476 are connected with the battery cells. Then, insulating sheets 2482*a* and 2482*b* for insulation are attached onto the connection plates 2462 to 2465 and 2472 to 2475 or the drawer plates 2461, 2466, 2471, and 2476.

The axes of the respective battery cells are stacked to be respectively parallel to each other, and the adjacent cells are disposed to be alternately reversed in direction, such that the positive electrode terminals and the negative electrode terminals of the adjacent battery cells are connected by using the connection plates 2462 to 2465 and 2472 to 2475 made of metal. The terminals on two sides of the battery cells and the connection plates 2462 to 2465 and 2472 to 2475 are fixed by spot soldering at multiple locations. Here, the five battery cells connected in series and disposed at the upper layer form an upper cell unit 2146 (to be described afterwards with reference to FIG. 61), and the five battery cells connected in series and disposed at the lower side form a lower cell unit 2147 (to be described afterwards with reference to FIG. 61). Besides, the terms "upper side" and "lower side" used herein to describe the cell units do not refer to the physical locations (the upper layer or the lower layer) of the battery cells in the lower case 1101. Instead, the cell unit located at the ground side when the two cell units are connected in series is referred to as the "lower cell unit", and the cell unit located at the high voltage side when the cell units are connected in series is referred to as the "upper cell unit", and the electrical potential is adopted as the criterion. In the battery pack of the present embodiment, the upper cell unit 2146 is disposed at the upper layer, and the lower cell unit 2147 is disposed at the lower layer. However, the present embodiment is not limited to the configuration. The orientations in which the battery cells are configured may also be distinguished based on the front side and the rear side, instead of the upper layer and the lower layer.

Regarding the battery cells 2146*a* to 2146*e* and 2147*a* to 2147*e*, Li-ion battery cells, which have a diameter of 18 mm and a length of 65 mm (called an 18650 size) and are capable of charging and discharging multiple times, are adopted. In the present embodiment, to make the output voltage of the battery pack 2100 switchable, it is possible to choose between the form for a series connection voltage (the high voltage side output) and the form for a parallel connection voltage (the low voltage side output) of the cell units. Therefore, according to the concept of the invention, the number of cell units in series connection may be arbitrarily determined, as long as the numbers of cells in the respective cell units are equal. The battery cells in use are not limited to the 18650 size. Battery cells in the so-called 14500 size, 21700 size, or other sizes may also be used. Besides, the shape of the battery cells is not limited to be cylindrical, and may also be rectangular, laminated, or have other shapes. The type of the battery cells is not limited to Li-ion batteries. Any types of secondary batteries, such as Ni-MH battery cells, Li-ion polymer battery cells, Ni—Cd battery cells, etc., may also be used. Two electrodes are disposed at two ends of the battery cell in the length direction. One of the two electrodes is a positive electrode, and the other is a negative electrode. However, the positions where the electrodes are disposed are not limited to the two ends. The electrodes may be arbitrarily configured as long as a cell unit can be formed easily in the battery pack.

The positive electrode of the upper cell unit 2146 is connected with the circuit substrate 2150 through the drawer plate 2461 formed with the drawer tab 2461*a*, and the negative electrode of the upper cell unit 2146 is connected with the circuit substrate 2150 through the drawer plate 2466 formed with the drawer tab 2466*a*. Similarly, the positive electrode of the lower cell unit 2147 is connected with the circuit substrate 2150 through the drawer plate 2471 formed with the drawer tab 2471*a*, and the negative electrode of the lower cell unit 2147 is connected with the circuit substrate 2150 through the drawer plate 2476 formed with the drawer tab 2476*a*. Tab holders 2450 to 2452 and 2455 to 2457 are formed on the upper surface of the separator 2455 for holding the tabs of the drawer plates 2461, 2466, 2471, and 2476 in a shape formed by bending thin metal plates. The tab holders 2450 to 2452 and 2455 to 2457 are tab holding parts formed for holding the drawer tabs 2461*a*, 2462*a*, 2463*a*, 2466*a*, 2471 *a*, and 2476*a* bent into an L shape, and are integrally formed as concave parts having seat surfaces, back surfaces, and two side surfaces during molding of the separator 2445, and the drawer tabs 2461*a*, 2462*a*, 2463*a*, 2466*a*, 2471*a*, and 2476*a* are respectively fit into the concave parts. The two screw bosses 2447*a* and 2447*b* for fixing the circuit substrate 2150 by screwing are formed on the upper portion of the separator 2445. The drawer plates 2461 and 2471 and the right sides of the connection plates 2463, 2465, 2473, and 2475 are covered by the insulating sheet 2482*a*, and the drawer plates 2466 and 2476 and the left sides of the connection plates 2462, 2464, 2472, and 2474 are covered by the insulating sheet 2482*b*. The insulating sheet 2482*a* is a non-conductive material, and the inner portion of the insulating sheet 2482*a* is coated with a sealing material.

Then, the shapes of the two power terminal sets are described with reference to FIG. 60. FIG. 60 is a partial diagram of the circuit substrate 2150 shown in FIG. 58, and only illustrates the positive electrode terminal pair (the upper positive electrode terminal 2162 and the lower positive electrode terminal 2172) and the negative electrode terminal pair (the upper negative electrode terminal 2167 and the lower negative electrode terminal 2177) fixed to the circuit substrate 2150. The positive electrode terminals for outputting are electrically independent terminals, and are configured, such that the upper positive electrode terminal 2162 and the lower positive electrode terminal 2172 as a positive electrode terminal group in parallel connection are disposed side by side in the front-rear direction when viewed at the mounting position of the circuit substrate 2150. The positive electrode terminals are terminals (2162, 2172) disposed close to each other, and serve as a switching terminal group to be used for switching voltages. Each of the upper positive electrode terminal 2162 and the lower positive electrode terminal 2172 has an arm part set (the arm parts 2162*a* and 2162*b*, the arm parts 2172*a* and 2172*b*, respectively) extending toward the front side. Here, the arm parts 2162*a* and 2162*b* and the arm parts 2172*a* and 2172*b* are located at positions separated in the upper-lower direction, and are formed in a shape that the positions of the fitting parts of these arm parts in the front-rear direction are substantially the same. The positive electrode terminal pair (2162, 2172) are disposed in the single slot 1122. The negative electrode terminal pair has the same shape as the positive electrode terminal pair. When viewed at the leg parts, the negative electrode terminal pair is also formed by the upper negative electrode terminal 2167 and the lower negative electrode terminal 2177 as a negative electrode terminal group in parallel connection disposed to be adjacent in the front-rear direction. The negative electrode terminal pair (2167 and 2177) is disposed inside the single slot 1127. The negative electrode terminals are terminals (2167, 2177) disposed close to each other, and serve as a switching terminal group for positive electrodes and a switching terminal group for negative electrodes to be used for switching voltages. Accordingly, the positive electrode terminal pair (the upper positive electrode terminal 2162 and the lower positive electrode terminal 2172) serves as a positive electrode terminal pair in parallel connection, and also serves as the switching terminal group for positive electrodes. The negative electrode terminal pair (the upper negative electrode terminal 2167 and the lower negative electrode terminal 2177) serves as negative electrode terminal pair in parallel connection, and also serves as the switching terminal group for negative electrodes. Then, a voltage switching element is formed by the positive electrode terminal pair (the upper positive electrode terminal 2162 and the lower positive electrode terminal 2172) and the negative electrode terminal pair (the upper negative electrode terminal 2167 and the lower negative electrode terminal 2177). Inside the slot 1127, the arm part set of the upper negative electrode terminal 2167 is disposed on the upper side, and the arm part set of the lower negative electrode terminal 2177 is disposed on the lower side of the arm part set of the upper negative electrode terminal 2167. Besides, although not shown in FIG. 60, the positive electrode terminal pair (the upper positive electrode terminal 2161 and the lower positive electrode terminal 2171, see FIG. 58) for charging are disposed at the right side of the positive electrode terminal pair (the upper positive electrode terminal 2162 and the lower positive electrode terminal 2172) for discharging. The shapes of the positive electrode terminal pair (2161, 2171) for charging are the same as the shapes of the upper positive electrode terminal 2162 and the lower positive electrode terminal 2172.

Then, with reference to FIG. 61, the shape of terminal parts 2020 at the sides of the electrical tool body 1001 and 1030 when the battery pack 2100 is mounted to the electrical tool bodies 1001 and 1030 shown in FIG. 36 and the state of connection with the connection terminals of the battery pack 2100 are described. FIG. 61(1) is a diagram for illustrating a state where the battery pack 2100 is mounted to the electrical tool body 1030 for 36V. In the circuit substrate 2150, the upper positive electrode terminal 2162 and the lower positive electrode terminal 2172 as the positive electrode terminal pair (the positive electrode terminal group) are disposed side by side in the mounting direction of the battery pack 2100 when viewed at the mounting parts (leg parts). Similarly, the upper negative electrode terminal 2167 and the lower negative electrode terminal 2177 are disposed side by side in the mounting direction of the battery pack 2100 when viewed at the mounting parts (leg parts). As described above, ten battery cells are accommodated inside the battery pack 2100. Five of the battery cells form the upper cell unit 2146, and the remaining five battery cells form the lower cell unit 2147. In the electrical tool body 1030, the upper positive electrode terminal 2162 is fit with the upper negative electrode terminal 2167 to operate the drive part 1035. At this time, the short bar disposed at the electrical tool body 1030 forms an electrical connection circuit indicated by the dotted line 2059, and the upper cell unit 2146 and the lower cell unit 2147 are therefore in a series connection state. In other words, the negative electrode of the upper cell unit 2146 is connected with the positive electrode of the lower cell unit 2147. The positive electrode of the upper cell unit 2146 is connected as a positive electrode output of the battery pack 2100, and the negative electrode of the lower cell unit 2147 is connected as a negative electrode output. Accordingly, the output of the upper cell unit 2146 and the lower cell unit 2147 in series connection, i.e., the rated 36V, is output.

FIG. 61(2) is a diagram for illustrating a state where the battery pack 2100 is mounted to the electrical tool body 1001 for 18V. In the electrical tool body 1001 for 18V, a positive input terminal (to be described afterwards with reference to FIG. 63) in the size for simultaneously fitting the upper positive electrode terminal 2162 and the lower positive electrode terminal 2172 is disposed. Similarly, a negative input terminal (to be described afterwards with reference to FIG. 63) in the size for simultaneously fitting the upper negative electrode terminal 2167 and the lower negative electrode terminal 2177 is disposed. In other words, a parallel connection state as follows is formed: a positive electrode output is rendered in a state where the positive electrodes of the upper cell unit 2146 and the lower cell unit 2147 are connected with each other, and a negative electrode output is rendered in a state where the negative electrodes of the upper cell unit 2146 and the lower cell unit 2147 are connected with each other. As a result, an output rated at 18V is made automatically when the battery pack 2100 is connected to the electrical tool body 1001. By changing the connection relationship with the switching terminal groups (2162, 2167, 2172,2177) of the battery pack 2100 for switching voltages, the output voltage obtained from the battery pack 2100 can be switched.

FIG. 62(1) is a perspective view of a terminal part 2050 of the electrical tool body 1030 of the present embodiment. FIG. 62(2) is a perspective view of a short bar 2059 alone. FIG. 62(3) is a diagram illustrating a connection method of the terminal part 2050 and the power terminals of the battery pack 2100. A terminal part 2052*a* of a positive input terminal 2052 and a terminal part 2057*a* of a negative input terminal 2057 for power reception are formed to be smaller and disposed at the upper side in the terminal part of the electrical tool body 1030 rated at 36V to serve as power input terminals. When being mounted, the terminal part 2052*a* of the positive input terminal 2052 is only fit with the upper positive electrode terminal 2162, and the terminal part 2057*a* of the negative input terminal 2057 is only fit with the upper negative electrode terminal 2167. Besides, the short bar 2059 (2059*a*, 2059*b*) for short circuiting the lower positive electrode terminal 2172 and the lower negative electrode terminal 2177 is disposed in the terminal part of the electrical tool body 1030. As shown in FIG. 62(2), the short bar 2059 is a short circuit element composed of a conductive component made of metal, and is a component bent to form a "⊐" shape. The terminal part 2059*b* is formed at one end of the connection part 2059*a* of the short bar 2059. The terminal part 2059*b* is disposed at the lower side of the terminal part 2052*a*. A terminal part 2059*c* is formed at the other end of the connection part 2059*a* of the short bar 2059. The terminal part 2059*c* is disposed at the lower side of the terminal part 2057*a*. The terminal part 2059*b* is fit with the lower positive electrode terminal 2172, and the terminal part 2059*c* is fit with the lower negative electrode terminal 2177. The short bar 2059 is fixed by being cast, together with other device side terminals such as the positive input terminal 2052 or the negative input terminal 2057, etc., in a base 2051 made of resin (see FIG. 49). At this time, the short bar 2059 does not contact other metal terminals (2052, 2054 to 2058). Besides, the short bar 2059 only serves to short circuit the lower positive electrode terminal 2172 and the lower negative electrode terminal 2177. Therefore, it does not require wiring with the control circuit of the electrical tool body or the like.

The positive input terminal 2052 includes the following: the terminal part 2052*a*, which is a part fit with the upper negative electrode terminal 2162 and formed in a flat plate shape; a wiring part 2052*c*, which is for soldering a lead wire for connection with the circuit substrate side at the side of the electrical tool body 1030; and a connection part (not shown in the figure), which is for connection between the terminal part 2052*a* and the wiring part 2052*c*, and is cast in the base 2051 made of a synthetic resin. The negative input terminal 2057 is like the positive input terminal 2052, and the height of the terminal part 2057a of the negative input terminal 2057 is set to be about half or smaller than half of the height of other terminal parts (2054a to 2056a, 2058a). Other terminal parts (2054a to 2056a, 2058a) are terminals for transmitting signals, and are connected with the control circuit substrate at the side of the electrical tool body 1030 through wiring parts 2054c to 2056c and 2058c via a lead wire (not shown). On the front side and the rear side of the base 2051 made of a synthetic resin in the terminal part 2050, concave parts 2051b and 2051c are disposed to be sandwiched by the housing.

In FIG. 62(3), when the battery pack 2100 is mounted, if the battery pack 2100 is moved relative to the electrical tool body 1030 along the inserting direction, the positive electrode terminal 2052 and the terminal part 2059b are inserted inside via the same slot 1122 (see FIG. 38), and are respectively fit with the upper positive electrode terminal 2162 and the lower positive electrode terminal 2172. At this time, the positive input terminal 2052 is pressed between the arm parts 2162a and 2662b of the upper positive electrode terminal 2162 by pushing the fitting parts of the upper positive electrode terminal 2162 apart, and the terminal part 2059b of the short bar 2059 is pressed between the arm parts 2172a and 2172b of the lower positive electrode terminal 2172 by pushing the arm parts 2172a and 2172b apart. Similarly, the negative input terminal 2057 and the terminal part 2059c are inserted inside via the same slot 1127 (see FIG. 38), and are respectively fit with the upper negative electrode terminal 2167 and the lower negative electrode terminal 2177. At this time, the terminal part 2057a of the negative input terminal 2057 is pressed between the arm parts 2167a and 2167b by pushing the fitting parts apart. Moreover, the terminal part 2059c of the short bar 2059 is pressed between the arm parts by pushing the arm parts 2177a and 2177b of the lower negative electrode terminal 2177 apart. In the state where the battery pack 2100 is connected to the electrical tool body 1030 in this way, the positive electrode terminal (2162) is connected with the positive input terminal (2052) via the first slot (the slot 1122), and the negative electrode terminal (2167) is connected with the negative input terminal (2057) via the second slot (the slot 1127), and these voltage switching elements are engaged with the short bar 2059 as a switching element via the first slot and the second slot. Besides, in a state where the battery pack is connected with the electrical device body, the positive electrode terminal, the positive input terminal, the negative electrode terminal, the negative input terminal, the voltage switching element, and the switching element are disposed at positions at substantially the same height in the upper-lower direction.

The plate thicknesses of the terminal parts 2052a, 2057a, 2059b, and 2059c are slightly greater than the initial gaps (gaps when the battery pack 2100 is not mounted) of the fitting parts of the respective arm parts. Therefore, a predetermined fitting pressure is acted at the respective fitting points between the terminal parts 2052a, 2057a, 2059b, and 2059c and the upper positive electrode terminal 2162, the lower positive electrode terminal 2172, the upper negative electrode terminal 2167, and the lower negative electrode terminal 2177. The result of such connection is as follows: the device side terminals (the terminal parts 2052a, 2057a, 2059b, and 2059c) of the electrical tool body 1030 and the power terminals (the upper positive electrode terminal 2162, the lower positive electrode terminal 2172, the upper negative electrode terminal 2167, and the lower negative electrode terminal 2177) of the battery pack contact each other desirably in a state with a reduced electrical contact resistance. As such, the electrical tool body 1030 has the third terminal (2050a) inserted into the single slot (1122) of the battery pack 2100 (see FIG. 58) and only connected with the first terminal (2162) of the first terminal and the second terminal (2162, 2172) and the fourth terminal (2059b) inserted into the single slot (1122) and only connected with the second terminal (2172). If the battery pack 2100 is connected with the electrical tool body 1030, the first terminal and the third terminal (2162 and 2052a) are connected with each other in the single slot (1122) and render the first potential, and the second terminal and the fourth terminal (2172 and 2059b) are connected with each other and render the second potential different from the first potential. Since the same connection state is also rendered at the side of the negative electrode terminal pair (2167, 2177), by realizing the connection configuration shown in FIG. 62(3), the battery pack 2100 outputs the output of the upper cell unit 2146 and the lower cell unit 2147 in series connection, i.e., the output rated at 36V.

On the other hand, when the battery pack 2100 is mounted to the electrical tool body 1001 conventionally used for 18V, the connection relation rendered is as shown in FIG. 63. When the battery pack 2100 is mounted to the electrical tool body 1001, the terminal part 2022a of the positive input terminal 2022 for parallel connection is press-fitted to push apart both of the opening ends of the upper positive electrode terminal 2162 and the lower positive electrode terminal 2172, and a partial region at the upper side of the terminal part 2022a of the positive input terminal 2022 contacts the upper positive electrode terminal 2162 and a partial region at the lower side contacts the lower positive electrode terminal 2172. In this way, the positive input terminal 2022 is connected so as to stride across the upper positive electrode terminal 2162 and the lower positive electrode terminal 2172. The terminal part 2022a is simultaneously fit with the arm parts 2162a and 2162b of the upper positive electrode terminal 2162 and the arm parts 2172a and 2172b of the lower positive electrode terminal 2172, and the two positive electrode terminals (2162 and 2172) are thus in a short circuit state. Similarly, the negative input terminal 2027 for parallel connection is connected with the upper negative electrode terminal 2167 by striding across the lower negative electrode terminal 2177. The terminal part 2027a is press-fitted to push apart both of the opening ends of the upper negative electrode terminal 2167 and the lower negative electrode terminal 2177, and a partial region at the upper side of the terminal part 2027a of the negative input terminal 2027 contacts the upper negative electrode terminal 2167, and a partial region at the lower side contacts the lower negative electrode terminal 2177. Thus, the terminal part 2027a is simultaneously fit with the arm parts 2167a and 2167b of the upper negative electrode terminal 2167 and the arm parts 2177a and 2177b of the lower negative electrode terminal 2177, and the two negative electrode terminals (2167 and 2177) are thus in a short circuit state. The output of the upper cell unit 2146 and the lower cell unit 2147 in parallel connection, i.e., the output rated at 18V, is output to the electrical tool body 1001. The terminal part 2022a of the positive input terminal 2022 and the terminal part 2027a of the negative input terminal 2027 are composed of metal plates with a certain thickness. Thus, it is important to keep the fitting pressure of the arm parts of the upper positive electrode terminal 2162 and the upper negative electrode terminal 2167 the same as the fitting pressure of the arm parts of the lower positive electrode terminal 2172 and the lower negative electrode terminal 2177.

As described above, in the battery pack 2100 of the present embodiment, the voltage switching element for switching between parallel connection and series connection is realized by the upper positive electrode terminal 2162 and the upper negative electrode terminal 2167 as well as the lower positive electrode terminal 2172 and the lower negative electrode terminal 2177. Therefore, by mounting the battery pack 2100 to the electrical tool body 1001 for 18V or the electrical tool body 1030 for 36V, the output of the battery pack 2100 can be switched automatically. With the configuration, the battery pack 2100 compatible with multiple voltages and convenient to use can be realized. Since the voltage switching is not carried out at the side of the battery pack 2100, but is automatically carried out according to the shape of the terminal part at the side of the electrical tool body 1001 or the electrical tool body 1030, erroneous voltage setting is not a concern at all. Besides, a specialized voltage switching mechanism, such as a mechanical switch, is not required at the side of the battery pack 2100. Therefore, a battery pack having a simpler structure, a lower possibility of malfunctioning, and a longer lifetime is realized. The short bar 2059 short circuiting the lower positive electrode terminal 2172 and the lower negative electrode terminal 2177 may be mounted in the same space with the existing terminal part 2020 of the battery pack for 18V. Therefore, the voltage switchable battery pack can be realized in a size interchangeable with the conventional one. When charged with an external charging device, the battery pack may be charged by adopting the connection shown in FIG. 63(2). Therefore, it does not require charging devices for charging at high/low voltages.

In the case of charging the battery pack 2100 with an external charging device (not shown), the battery pack 2100 may be charged with the same charging device as that for the conventional battery pack for 18V. The terminal of the charging device in such case has the same shape as that shown in FIG. 63(1), but the positive electrode terminals (the upper positive electrode terminal 2161 and the lower positive electrode terminal 2171) for charging are connected with the positive electrode terminals of the charging device (not shown) in replacement of the positive electrode terminals (2162, 2172) for discharging. The connection at this time is also substantially the same as the connection relation shown in FIG. 63(2). As such, the battery pack is charged with the charging device for 18V in the state where the upper cell unit 2146 and the lower cell unit 2147 are in parallel connection. Therefore, the advantage that no new charging device is required for charging the battery pack 2100 of the present embodiment is demonstrated.

FIG. 64 is a side view of the separator 2445 after the components shown in FIG. 59 are assembled. FIG. 64(1) is a right side view. FIG. 64(2) is a left side view. Here, for the ease of description, regarding the connection terminal group, only two sets of the positive electrode terminals (2162, 2172) and the negative electrode terminals (2167, 2177) for discharging are shown, and other connection terminals (2161, 2164 to 2166, 2168, 2171) are not illustrated in the figure. The upper cell unit 2146 is formed by the battery cells 2146a to 2146e disposed at the upper layer side and is connected with the circuit substrate 2150 via the drawer tab 2461a extending upward from the drawer plate 2461 at the positive electrode side and the drawer tab 2466a extending upward from the drawer plate 2466 at the negative electrode side. Slit-shaped through holes (not shown) are formed in the circuit substrate 2150, and the through holes are arranged to penetrate from the lower side to the upper side, so that the upper portions of the drawer tabs 2461a and 2466a are exposed to the upper side from the surface of the circuit substrate 2150. By soldering the portions, the circuit substrate 2150 is electrically connected with the drawer tabs 2461a and 2466a. Similarly, the lower cell unit 2147 is formed by the battery cells 2147a to 2147e disposed at the lower layer side, and is connected with the circuit substrate 2150 via the drawer tabs 2471a and 2476a for connection extending upward from the drawer plates 2471 and 2476 disposed at two ends. Slit-shaped through holes (not shown) are formed in the circuit substrate 2150, and the through holes are arranged to penetrate from the lower side to the upper side, so that the upper portions of the drawer tabs 2471a and 2467a are exposed to the upper side from the surface of the circuit substrate 2150. By soldering the portions, the circuit substrate 2150 is electrically connected with the drawer tabs 2471a and 2476a.

The intermediate drawer tab 2463a extending upward is disposed in the connection plate 2463 shown in FIG. 64(1), and the intermediate drawer tab 2462a extending upward is disposed in the connection plate 2462 shown in FIG. 64(2). The intermediate drawer tabs 2462a and 2463a are bent thin metal plates. Plate-shaped components are arranged to extend upward from the connection plates 2462 and 2463 disposed at the upper layer side, and are bent inwardly along the circuit substrate 2150 and further bent upward to form the intermediate drawer tabs 2462a and 2463a. Slit-shaped through holes (not shown) are formed in the circuit substrate 2150, and the through holes are arranged to penetrate through from the lower side to the upper side. Accordingly, the upper portions of the intermediate drawer tabs 2462a and 2463a are exposed to the upper side from the surface of the circuit substrate 2150. The intermediate drawer tabs 2462a and 2463a are fixed to the circuit substrate 2150 by soldering. The widths (distances in the front-rear direction) of the intermediate drawer tabs 2462a and 2463a are formed to be smaller than the width (length in the front-rear direction) of the drawer tab 2461a or the drawer tab 2466a. This is because the drawer tabs 2461a, 2466a, 2471a, and 2476a are terminals for outputting electrical power, i.e., terminals through which large current flows, while the intermediate drawer tabs 2462a and 2463a are terminals connected for measuring an intermediate potential, i.e., terminals through which only small current flows. The intermediate drawer tabs may also be formed in other connection plates 2464 and 2465 disposed at the upper layer side. However, due to the wiring pattern formed herein, the connection terminals 2464a and 2465a are disposed and connected with the circuit substrate 2150 via lead wires not shown herein. Regarding the connection plates 2472 to 2475 disposed at the lower layer side, since it is difficult to connect them with the circuit substrate 2150 via drawer tabs, connection terminals 2472a to 2475a are disposed for connection with the circuit substrate 2150 via lead wires 2496 to 2499.

FIG. 65 is a perspective view illustrating a state where the circuit substrate 2150 is fixed to the separator 2445 and showing a state viewed from the upper-front-left side. In the circuit substrate 2150, the upper portions of slit-shaped through holes 2152c and 2152b are exposed to the upper side from the surface of the circuit substrate 2150. By soldering the portions, the circuit substrate 2150 is electrically connected with the drawer tabs 2471a and 2476a. As described above, the battery cells 2146a to 2146e of the upper cell unit 2146 are directly connected, and while the battery cells 2147a to 2147e of the lower cell unit 2147 are in series connection, the lead wires 2496 to 2499 (2497 and 2499 are not visible in FIG. 65) for measuring the potentials of the connection plates 2462 to 2464 and the connection plates 2472 to 2474 are connected therewith. The ends 2494b, 2496b, 2497b, 2498b, and 2499b of the lead wires shown in FIG. 58 are soldered at the circuit substrate 2150. These lead wires are firstly soldered at the circuit substrate side. After the circuit substrate 2150 is fixed to the separator 2445, the ends of the lead wires on the sides opposite to the ends 2494b, 2496b, 2497b, 2498b, and 2499b are soldered at the connection plates 2464, 2465, and 2472 to 2475. Besides, the connection plates 2462 and 2463 close to the circuit substrate 2150 are not connected to the circuit substrate 2150 via lead wires, but are bent into an L shape to be directly connected thereto using the intermediate drawer tabs 2462a and 2463a where the vertical plate portion extends upward.

In a front view or a rear view, the drawer tabs 2461a and 2466a for the output (+output, −output) of the upper cell unit 2146 are substantially in an L shape, and the length direction of the drawer tabs 2461a and 2466a is arranged to be parallel to the long sides of the circuit substrate 2150 substantially in a rectangular shape. The drawer tabs 2461a and 2466a are bent thin metal plates. The thin metal plates are formed as follows. The surfaces of the drawer plates 2461 and 2466 fixed to the terminals of the battery cells extend upward and are bent inward, slightly extend inward toward the horizontal direction on the upper surface of the separator, and are bent upward at suitable locations to form the L shape. The vertical wall parts formed by bending are thus adopted as the drawer tabs 2461a and 2466a. However, for the battery cells disposed at the lower layer, the same drawing method is not applicable due to presence of the electrodes for the battery cells at the upper layer. Although it is not impossible to adopt the same drawing method, the drawer plates may be superposed on the connection tabs disposed in the electrodes of the upper cell part, and sufficient insulation therefore needs to be ensured. Therefore, in the present embodiment, the drawer plate 2471 from the terminal surface 2471b (also see FIG. 64(1)) of the cells at the lower side is arranged to extend toward the front side and then is bent perpendicularly toward the left side to form a side surface part 2471c, and the side surface part 2471c is arranged to extend upward. In other words, the drawer plate 2471 is arranged to extend upward along a side surface of the separator 2445, which is the short side in a top view. The drawer plate 2471 is then bent toward the rear side from the front side surface of the separator 2445 to form a horizontal plane part 2471d. The horizontal plane part 2471d is arranged to extend upward perpendicularly like a tab, so as to form the drawer tab 2471a. The drawer tab 2471a penetrates through the slit-shaped through hole 2152c formed in the circuit substrate 2150 from the back surface to the top surface and is soldered. The length directions of the drawer tabs 2471a and 2476a are disposed to be parallel to the short sides of the circuit substrate 2150 substantially in a rectangular shape. By being formed in this way, the drawer plate 2471 from the battery cells at the lower layer side may be disposed without interfering with the drawer plate of the battery cells at the upper layer side.

The drawer plate 2476 from the negative electrode terminal at the lower layer is also drawn by the same method until the drawer tab 2476a is drawn out. In this way, by drawing the separator upward using not only the left and right side surfaces but also the front and rear side surfaces, the output of the battery cells disposed at the lower layer can be efficiently drawn to the upper portion of the battery cells at the upper layer, i.e., the upper surface part of the separator. In the present embodiment, a heat dissipation part 2471h is further formed in the drawer plate 2471. The heat dissipation part 2471h is formed as a surface having an enlarged surface area by extending leftward from the part indicated by the dotted line. The heat dissipation part 2471h is formed in order to cool off the battery cells with a rising temperature using the fact that the drawer plate 2471 is formed of a thin metal plate. The position where the heat dissipation part 2471h is disposed is a position exactly opposed to the slit 1104 (see FIG. 58) of the lower case 1101, and is therefore beneficial as a heat dissipation surface. Besides, in the case where the rising temperature of the battery cells does not cause a problem, the portion (the heat dissipation part 2471h) at the left side of the dotted line of the drawer plate 2451 is not required. The drawer plate 2471 further includes a portion, i.e., a fuse part 2471e, at which the width of the connection path is significantly reduced. The fuse part 2471e is obtained by forming a cutout part 2471f from the right side of the drawer plate 2471 forming a cutout part 2471g from the left side of the drawer plate 2471, and significantly reducing the width of the remaining part (the width in the left-right direction), and by this portion, the drawer plate 2471 may serve as a power fuse. In the case where a current equal to or exceeding a predetermined current flows through the fuse part 2471e for a predetermined time or longer, the fuse part 2471e is blown first to disconnect one (the output from the cell unit of the lower layer) of the output paths from the battery pack 2100. The same fuse function is implemented in the same way in the vicinity of the drawer tab 2461a of the drawer plate 2461 (see FIG. 64(1)) from the positive electrode terminal of the upper cell unit 2146. The oval-shaped connection plates 2462, 2464, 2473, and 2474 for connecting the electrodes of adjacent battery cells are formed of thin metal plates, such as stainless steel, and are fixed by performing spot soldering on the battery cells.

In the upper cell unit 2146, the drawer tab 2461a is disposed for a positive output, and the drawer tab 2466a is disposed for a negative output. Besides, in the lower cell unit 2147, the drawer tab 2471a is disposed for a positive output, and the drawer tab 2476a is disposed for a negative output. In the present embodiment, the positions where the drawer tabs 2461a, 2466a, 2471a, and 2476a are disposed are also designed. The left-right center line of the circuit substrate 2150 or the center line of the positive electrode terminal pair (2162, 2172) and the negative electrode terminal pair (2167, 2177) is set as a left-right center line A1 indicated by a dotted line. Besides, a line connecting two central positions, i.e., the central position between the leg parts of the upper positive electrode terminal 2162 and the lower positive electrode terminal 2172 and the central position between the leg parts of the upper negative electrode terminal 2167 and the lower negative electrode terminal 2177, is set as an imaginary line A2 indicated by a dotted line. When the left-right center line A1 and the leg part center line A2 in the front-rear direction are drawn, the drawer tab 2461a of the positive electrode of the upper cell unit 2146 is present in the region having the leg part of the upper positive electrode terminal 2162, and the drawer tab 2471a of the positive electrode of the lower cell unit 2147 is present in the region having the leg part of the lower positive electrode terminal 2172. By configuring the drawer tabs 2461a and 2471a in this way, the drawer tab 2461a and the upper positive electrode terminal 2162 as well as the drawer tab 2471a and the lower positive electrode terminal 2172 can be connected efficiently via the wiring pattern disposed on the circuit substrate 2150. Similarly, the drawer tab 2476a of the negative electrode of the lower cell unit 2147 is present in the region having the leg part of the upper negative electrode terminal 2167, and the drawer tab 2466a of the negative electrode of the upper cell unit 2146 is present in the region having the leg part of the lower negative electrode terminal 2177. By configuring the drawer tabs 2476a and 2466a in this way, the drawer tabs 2476a and 2466a can be efficiently connected with the upper negative electrode terminal 2167 and the lower negative electrode terminal 2177 via the wiring pattern disposed on the circuit substrate 2150.

FIG. 66 is a perspective view illustrating a state where the circuit substrate 2150 is fixed to the separator 2445 and showing a state viewed from the upper-rear-right side. Here, the soldered parts to the ends 2497b and 2499b of the lead wires 2497 and 2499 (see FIG. 65) not visible in FIG. 65 can also be confirmed. When viewed in the front-rear direction of the circuit substrate 2150, concave parts 2150c and 2150d for positioning the circuit substrate 2150 with respect to the separator 2445 are formed in the left and right edge parts near the center. These concave parts are engaged with convex parts 2445c and 2445d formed in the separator 2445. Besides, an abutting part 2445e holding the front end of the circuit substrate 2150 is formed at the front side of the separator 2445. The abutting part 2445e abuts against the front edge part of the circuit substrate 2150. Besides, a terminal surface 2461b extending in parallel with the electrodes of the battery cells and a horizontal plane part 2461c bent along a perpendicular direction from the terminal surface 2461b toward the upper side of the separator 2445 are formed in the drawer plate 2461. In addition, the horizontal plane 2461c is arranged to extend upward perpendicularly like a tab, so as to form the drawer tab 2461a. The width (the distance in the front-rear direction) of a fuse part 2461d is reduced by forming a cutout part 2461e where a large portion of the horizontal plane is cut off from the front side. In addition to the drawer plate 2461, other drawer plates 2466, 2471, and 2476 or the connection plates 2462 to 2465 and 2472 to 2475 are also formed by pressing thin plates made of such as stainless steel. Therefore, there is no need to add a separate type fuse element to the upper cell unit 2146 and the lower cell unit 2147.

FIG. 67 is a diagram for illustrating a method of connecting the battery pack 2100 to the drawer plates 2461, 2466, 2471, and 2476 and the positive electrode terminals (2162, 2172) and the negative electrode terminals (2167, 2177). FIG. 67(1) is a diagram viewed from the front side, and FIG. 67(2) is a diagram viewed from the rear side. In the connection terminal group, the connection terminals except for the positive electrode terminals (2162, 2172) and the negative electrode terminals (2167, 2177) for discharging are not illustrated in the figure. The drawer tab 2461a as the +output of the upper cell unit 2146 is connected to the circuit substrate 2150 in a rear side region (indicated by a circled 2) of the upper positive electrode terminal 2162. Therefore, as indicated by the dotted line, the drawer tab 2461a and the upper positive electrode terminal 2162 can be connected linearly in a short distance. The drawer tab 2466a as the −output of the upper cell unit 2146 is connected to the circuit substrate 2150 in a front side region (indicated by a circled 3) of the lower negative electrode terminal 2177. Therefore, as indicated by the dotted line, the drawer tab 2466a and the lower negative electrode terminal 2177 can be connected linearly in a short distance. The drawer tab 2471a as the +output of the lower cell unit 2147 is connected to the circuit substrate 2150 in a front side region (indicated by a circled 1) of the lower positive electrode terminal 2172. Therefore, as indicated by the dotted line, the drawer tab 2471a and the lower positive electrode terminal 2172 can be connected linearly in a short distance. The drawer tab 2476a as the −output of the lower cell unit 2147 is connected to the circuit substrate 2150 in a rear side region (indicated by a circled 4) of the upper negative electrode terminal 2167. Therefore, as indicated by the dotted line, the drawer tab 2476a and the upper negative electrode terminal 2167 can be connected linearly in a short distance. As described above, the connection terminals (2162, 2167, 2172, 2177) for electrical power can be linearly connected as indicated by the dotted lines on the circuit substrate 2150. Thus, a thick wiring pattern can be efficiently disposed without intersecting these wiring patterns.

FIG. 68 is a diagram illustrating the connection terminal group (2161 to 2162, 2164 to 2168) and the shape of the substrate cover 2180 disposed around it. FIG. 68(1) is a perspective view viewed from the upper-front-left side. FIG. 68(2) is a perspective view viewed from the upper-rear-right side. Here, the circuit substrate 2150 is not illustrated in the figure, but the substrate cover 2180 is disposed around the connection terminals after the leg parts of the connection terminal group (2161 to 2162, 2164 to 2168, 2171, 2172, 2177) are fixed to the circuit substrate 2150 by soldering. The substrate cover 2180 is integrally formed of a non-conductor, such as a synthetic resin, and covers around the connection terminals, particularly around the leg parts, to offer protection against a short circuit between adjacent connection terminals. The purpose of disposing the substrate cover 2180 is to separate the connection terminals by insulators. Therefore, a plurality of partition walls 2182 to 2189 extending along the vertical direction are disposed. These partition walls 2182 to 2189 are connected at the front side through a connection member 2181. A flat upper surface 2181a of the connection member 2181 and the lower step surface 1111 (see FIG. 38) of the upper case 1110 are formed as the same surface. In this way, it is easy to move the terminal part at the device body side relatively from the lower step surface 1111 to the connection member 2181. The horizontal wall of the connection member 2181 is held in a state of floating from the circuit substrate 2150, and a plurality of leg parts 2181b to 2181f are formed so that gaps are created between the lower surface of the horizontal wall of the connection member 2181 and the circuit substrate 2150. Besides, on the left and right ends of the connection member 2181, fitting ribs 2191a (see FIG. 68(2)) and 2191b for alignment are formed. The fitting ribs 2191a and 2191b are fit so as to sandwich the circuit substrate 2150 on the left and right sides. Besides, in the vicinity of the center of the connection member 2181 in the left-right direction, a vertical wall part 2185a extends to the front side to partition at the center of the upper surface 2181a. The front end of the vertical wall part 2185a serves for alignment when an external charging device not shown herein is mounted.

The substrate cover 2180 also serves as a covering part blocking the opening of a region (the slot 1123 in FIG. 38) not in use. As shown in FIGS. 68(1) and 68(2), vertical wall parts 2184a and 2184d and a closing plate 2184c connecting the vertical wall parts 2184a and 2184d at the rear side are formed in portions corresponding to the slot 1123. In this way, the portion of the region (the slot 1123 in FIG. 38) not in use is blocked by the substrate cover 2180, thereby making it difficult for dirt or dust to enter the inside of the case of the battery pack 2100 via the empty slot.

As can be construed based on FIG. 68(2), the rear positions of the partition walls 2182 to 2189 are closer to the rear side than the rear positions of the respective connection terminals (2161 to 2168). Here, the circuit substrate 2150 is not illustrated in the figure, but the lower side portions of the respective partition walls 2182 to 2189 extend to the positions abutting against the surface of the circuit substrate 2150. On the left side of the partition wall 2188 (see FIG. 68(1)) and the right side portion of the partition wall 2182, stepped parts 2192a and 2192b are formed. The stepped parts 2192a and 2192b are abutting parts contacting projection parts 2516a and 2516b of the terminal part to be described with reference to FIG. 78. The power terminals (2161, 2162, and 2167) for power transmission are formed by metal plates thicker than the signal terminals (2164 to 2166, 2168) only transmitting signals. The power terminals of the present embodiment include upper side terminals (2161, 2162, 2167) and lower side terminals (2171, 2172, 2171, see FIG. 65 for all the terminals) electrically independent of each other. The power terminals respectively have arm part sets adjacent in the left-right direction. The substrate cover 2180 offers protection so that the power terminals do not cause a short circuit with terminals (power terminals or signal terminals) adjacent in the left-right direction, and also prevents a short circuit from occurring between the arm part sets of the upper side terminals (2161, 2162, 2167) and the arm part sets of the lower side terminals (2171, 2172, and 2177, see FIG. 65 for all the terminals) adjacent in the upper-lower direction. Therefore, in the substrate cover 2180, the partition walls (2182, 2183, 2184, 2187, 2188) adjacent to the power terminals are formed as walls that are tall in the upper direction, and horizontal wall parts 2182b, 2183b, 2183c, 2184b, 2187b, and 2188b extending along the horizontal direction are further formed as shown in FIG. 68(1).

FIG. 68(3) is a front view illustrating the connection terminal group and the substrate 2180. In the partition wall part, the partition walls 2185 and 2186 disposed between the signal terminals are formed as low wall parts in a height of H2 from the upper surface 2181a. The upper end positions of the partition walls 2185 and 2186 are lower than the signal terminals (2164 to 2166) or the lower arm part of the LD terminal 2168. Comparatively, the partition walls 2182 to 2184 and 2187 to 2189 adjacent to the power terminals are formed as high wall parts in a height of H3 from the upper surface 2181a. The upper end positions of the partition walls 2182 to 2184 and 2187 to 2189 are closer to the upper side than the upper end positions of the lower positive electrode terminals 2171 and 2172 or the upper end position of the lower negative electrode terminal 2177, and closer to the lower side than the arm parts of the upper positive electrode terminals 2161 and 2162 or the arm part of the upper negative electrode terminal 2167.

In the connection terminal group, the power terminals are as described with reference to FIGS. 60 to 63, wherein the leg parts of the upper positive electrode terminals 2161 and 2162 and the lower positive electrode terminals 2171 and 2172 are disposed side by side in the front-rear direction, and the respective arm part sets are disposed to be separated in the upper-lower direction. Similarly, the leg parts of the upper negative electrode terminal 2167 and the lower negative electrode terminal 2177 are disposed side by side in the front-rear direction, and the respective arm part sets are disposed to be separated in the upper-lower direction. When the battery pack 2100 is mounted to the electrical device body rated at 18V, the potentials of the arm parts of the upper positive electrode terminals 2161 and 2162 and the upper negative electrode terminal 2167 become the same as the potentials of the lower positive electrode terminal 2171 and 2172 and the lower negative electrode terminal 2177. Therefore, no problem occurs even if the upper terminal part contacts the lower terminal part. However, when the battery pack 2100 is mounted to the electrical device body rated at 36V, the upper positive electrode terminals 2161 and 2162 and the lower positive electrode terminals 2171 and 2172 have different potentials, and the upper negative electrode terminal 2167 and the lower negative electrode terminal 2177 also have different potentials. Therefore, it is important to avoid a short circuit caused by contact between the upper and lower arm parts. Besides, it is also important to form a shape in which a short circuit caused by insertion of a foreign object is unlikely to occur. Therefore, in the substrate cover 2180 of the present embodiment, among the partition walls 2182 to 2189 formed to extend upward the partition walls 2182 to 2184, 2187, and 2188 adjacent to the power terminals (positive electrode terminals and negative electrode terminals) are formed in the manner that the upper end positions of these partition walls are formed to be significantly higher so as to reach a height of H3. Also, these partition walls are also significantly extended on the rear side. Moreover, the horizontal walls 2182b, 2183b, 2183c, 2184b, 2187b, and 2188b extending along the left-right horizontal direction from the upper end positions of the vertical wall parts 2182a, 2183a, 2184a, 2187a, and 2188a of the partition walls 2182 to 2184, 2187, and 2188 are also formed.

The partition wall 2182 has the vertical wall part 2182a and the horizontal wall part 2182b, and has an L-shaped cross-section. The horizontal wall part 2182b is formed in a shape which extends along the horizontal direction from the vicinity of the upper end of the vertical wall part 2182a to a space between the arm parts of adjacent power terminals (the upper positive electrode terminal 2161 and the lower positive electrode terminal 2171). Besides, the partition wall 2183 has a T-shaped cross-section, and includes the vertical wall part 2183a and the horizontal wall parts 2183b and 2183c extending along two directions from the upper end of the vertical wall part 2183a. The horizontal wall part 2183b extends toward the side close to the adjacent horizontal wall part 2182b, and the front end of the horizontal wall part 2183b enters the space between the arm parts of the upper positive electrode terminal 2161 and the lower positive electrode terminal 2171. Similarly, the horizontal wall part 2183c extends toward the side close to the adjacent horizontal wall part 2184b, and the front end of the horizontal wall part 2183c enters the space between the arm parts of the upper positive electrode terminal 2162 and the lower positive electrode terminal 2172. As shown in FIG. 68(3), when the positive electrode terminal group is viewed from the front side, the position of the right side surface of the upper positive electrode terminal 2161 and the position of the right side surface of the lower positive electrode terminal 2171 are the same position. The left end position 2182c of the horizontal wall part 2182b is extended to be closer to the left side than the positions of the right side surfaces of the upper positive electrode terminal 2161 and the lower positive electrode terminal 2171, i.e., extended to be as long as entering the lower portion of the arm part 2161a of the upper positive electrode terminal 2161. At this time, the horizontal wall part 2182b is located at the upper side of the arm part 2171a of the lower positive electrode terminal 2171.

As clear from FIG. 68(2), the length of the vertical wall part 2182a and the horizontal wall part 2182b in the front-rear direction is formed to be greater than the length of the lower positive electrode terminal 2171 in the front-rear direction, and the front end position of the vertical wall part 2182a and the horizontal wall part 2182b is substantially at the same position as the front ends of the arm part of the lower positive electrode 2171. The rear end position of the vertical wall part 2182a and the horizontal wall part 2182b is closer to the rear side than the rear end position of the lower positive electrode terminal 2171. In this way, when covering the whole right side surface and the whole left side surface of the lower positive electrode terminal 2171, the vertical wall part 2182a also covers the upper portion except for the space in the vicinity of the center in the left-right direction for inserting a device side terminal. Here, only the shapes of the vertical wall part 2182a and the horizontal wall part 2182b at the portion of the lower positive electrode terminal 2171 are described herein. Nevertheless, regarding the lower positive electrode terminal 2172, the partition walls 2183 and 2184 are also disposed to cover the whole right side surface of the lower positive electrode terminal 2172, the whole left side surface of the lower positive electrode terminal 2172, and the upper portion except for the central portion of the lower positive electrode terminal 2172. Therefore, even if an external force is applied to the lower positive electrode terminals 2171 and 2172 to bend the lower positive electrode terminals 2171 and 2172, the lower positive electrode terminals 2171 and 2172 can still be held effectively by the substrate cover 2180. In this way, the chance of unexpectedly causing a short circuit between the terminal part at the lower side and the terminal part at the upper side for power transmission can be reduced significantly.

Regarding the negative electrode terminal (2167, 2177) side, out of the same consideration for the positive electrode terminal (2161, 2162, 2171, 2172) side, the large partition walls 2187 and 2188 are disposed on the left and right sides of the negative electrode terminals. The partition wall 2187 has the same shape as that of the partition wall 2182, and includes the vertical wall part 2187a and the horizontal wall part 2187b. The partition wall 2187 has an L-shaped cross-section. The horizontal wall part 2187b is formed to extend from the upper end portion of the vertical wall part 2187a toward the negative electrode terminal side. The partition wall 2188 is formed in symmetry with the partition wall 2187 in the left-right direction, and includes the vertical wall part 2188a and the horizontal wall part 2188b. The horizontal wall parts 2187b and 2188b are formed in a size that the front end portions enter the space between the arm part set of the upper negative electrode terminal 2167 and the arm part set of the lower negative electrode terminal 2177. Accordingly, the partition walls 2187 and 2188 are formed to cover around the negative electrode terminals (2167, 2177) as power terminals. Therefore, even if a strong external stress is applied to the upper negative electrode terminal 2167 or the lower negative electrode terminal 2177 for moving (bending) in the front-rear direction, the possibility that a short circuit occurs is still reduced significantly due to the presence of the wall parts such as the horizontal wall parts 2187b and 2188b.

The partition walls 2185 and 2186 between the signal terminals (2164 to 2166) of the signal terminal group are in the height of H2 which is low in the upper direction. This is because the necessity of insulation for the signal terminal group (2164 to 2166) is low, since only signals with small power flow through the signal terminal group (2164 to 2166), and the level of danger at the time of a short circuit is lower than that at the power terminal side. Besides, another reason is that each one in the signal terminal group (2164 to 2166) is one component, and the arm parts at the upper side and the arm parts at the lower side have the same potential, so it is less necessary to worry about a short circuit between the upper and lower arm parts. The partition wall 2184 includes the vertical wall parts 2184a and 2184d, and the vertical wall parts 2184a and 2184d are connected through the closing plate 2184c and a rear connection plate 2184e. The closing plate 2184c is a flat plate extending along the vertical direction and the left-right direction, and serves to close up the empty space (the internal space of the empty slot 1123 in FIG. 38) between the upper positive electrode terminal 2162 and the T terminal 2164. In the vicinity of the upper end of the vertical wall part 2184a, the horizontal wall part 2184b extending toward the positive electrode terminal side is formed.

The connection member 2181 connects the front end portions of the vertical walls parts 2182a, 2183a, 2184a, 2184d, 2185a, 2186, 2187a, and 2188a located between the connection terminals. The horizontal wall of the connection member 2181, which forms the upper surface 2181a, is rendered in a state of floating from the circuit substrate 2150. The lower edge parts of the vertical wall parts 2182a, 2183a, 2184d, 2185a, 2186, 2187a, 2188a, and 2189 are positioned to contact the circuit substrate 2150 not shown in the figure. The lower portion of the connection member 2181 is also coated with a liquid curable resin covering the upper surface of the circuit substrate 2150, as described with reference to FIG. 48, and then cured. By curing the curable resin, the vicinity of the lower ends of the vertical wall parts 2182a, 2183a, 2184a, 2184d, 2185a, 2186, 2187a, 2188a, and 2189 and the circuit substrate 2150 are firmly fixed. The leg parts 2181b to 2181f are formed on the front wall surface of the connection member 2181, and notch parts are formed between the leg parts 2181b to 2181f. The reason why the leg parts 2181b to 2181f are formed as notch parts instead of wall parts continuous in the left-right direction is to distribute the liquid resin evenly across the rear portion and the front portion of the circuit substrate 2150. The liquid resin has a relatively low viscosity. Therefore, the resin may flow in the front-rear direction between the leg parts 2181b to 2181f (details will be described afterwards).

FIG. 69 is a diagram of the substrate cover 2180 alone, and FIG. 69(1) is a perspective view viewed from the upper-left-front side. In FIG. 69(1), a length L1 of the horizontal wall parts 2182b, 2183b, 2183c, 2184b, 2187b, and 2188b in the front-rear direction is formed to correspond to the length of the arm parts 2265 and 2266 of the upper terminal part 2260 and the arm parts 2285 and 2286 of the lower terminal part 2280 shown in FIG. 49. Here, the length is formed as described in the following: the front ends of the horizontal wall parts 2183b, 2183c, 2184b, 2187b, and 2188b are at positions closer to the front than the front end positions of the arm parts 2265 and 2266 of the upper terminal part 2260 and the arm parts 2285 and 2286 of the lower terminal part 2280 shown in FIG. 49, and the rear ends are closer to the rear side than the right side surface 2263 and the left side surface 2264 of the upper terminal part 2260 shown in FIG. 49. In the partition wall 2184, the closing plate 2184c extending along the vertical direction is formed, and the rear connection plate 2184e is also formed on the rear side of the partition wall 2184. A space 2184f is formed between the rear connection plate 2184e and the closing plate 2184c.

FIG. 69(2) is a perspective view viewing the substrate cover 2180 alone from the lower-right-front side. As clear from the figure, the bottom side positions of the partition walls 2182 to 2189 are formed to be the same as the bottom side positions of the leg parts 2181b to 2181f. These partition walls carry the substrate cover 2180 so that the bottom side portions of these partition walls contact the surface of the circuit substrate 2150. In the leg parts 2181b and 2181f, the two fitting ribs 2191a and 2191b further projecting in the lower direction are formed. The circuit substrate 2150 is located in the space between the opposing fitting ribs 2191a and 2191*b*, so as to position the substrate cover 2180 in the left-right direction. A bottom plate 2184*g* is disposed between the vertical wall parts 2184*a* and 2184*d* to close up the lower surface of the slot 1123 (see FIG. 38) not in use.

FIG. 69(3) is a front view viewing the substrate cover 2180 alone. After the connection terminal group is fixed to the circuit substrate 2150, i.e., after the connection terminal group (2161 to 2162, 2164 to 2168, 2171 to 2172, 2177) is fixed to the circuit substrate 2150 as shown in FIG. 65, the substrate cover 2180 is installed by sliding the circuit substrate 2150 in a direction from the front side toward the connection terminal group. Therefore, the substrate cover 2180 may be installed without contacting the arm parts or the right or left side surfaces of the connection terminal group. In addition, after being installed, the substrate cover 2180 is rendered in a position relationship in which the substrate cover 2180 normally does not contact the arm parts or the right or left side surfaces of the connection terminal group. A height H7 of the fitting ribs 2191*a* and 2191*b* is formed to be the same or greater than the plate thickness of the circuit substrate 2150 not shown in the figure.

FIG. 70 is a diagram illustrating the connection terminal group and the substrate cover 2180 disposed around it. FIG. 70(1) is a top view. FIG. 70(2) is a rear view. The positive electrode terminal pair (2161, 2171) for charging are disposed to be slightly offset toward the front side than the adjacent positive electrode terminal pair (2162, 2172). This is due to a spatial limitation for avoiding the moving range of a latch mechanism (not shown) immediately behind the positive electrode terminal pair (2161, 2171). Thus, if there is no spatial limitation, the positive electrode terminal pair (2161, 2171) may be disposed in the manner that the front end positions of the positive electrode terminal pair (2161, 2171) and the negative electrode terminal pair (2167, 2177) are disposed side by side. Besides, the LD terminal 2168 differs from other signal terminals (the T terminal 2164, the V terminal 2165, the LS terminal 2166) in size and is formed to be slightly small. This is also because of a spatial limitation. Since the latch mechanism not shown herein may reach a location immediately behind the LD terminal 2168, the purpose of the spatial limitation is to avoid the latch mechanism. Since the LD terminal 2168 is formed to be small, the length of the partition wall 2189 in the front-rear direction is also smaller.

FIG. 71(1) is a right side view of the connection terminal group and the substrate cover 2180 disposed around it. Here, hatching is applied to the portion excluding the vertical wall part 2185*a* in the vicinity of the center in the left-right direction in the substrate cover 2180 to distinguish the portion from the connection terminal part. As known from the figure, the whole right side of the lower positive electrode terminal 2171 is substantially covered by the partition wall 2182 of the substrate cover 2180. Besides, in the upper positive electrode terminal 2161, except for the rear end portion, the lower portion of the arm part set (2161*a*, 2161*b*) is also covered. Besides, the circuit substrate 2150 is omitted from the figure, so the leg parts of the upper positive electrode terminal 2161 and the lower positive electrode terminal 2171 are viewable. However, these leg parts are actually disposed inside the through holes of the circuit substrate. FIG. 71(2) is a left side view. Here, the partition wall 2189 is also disposed on the left side of the LD terminal 2168 and is thus mostly covered. Besides, it can be understood from the figure that the upper end position of the partition wall 2188 reaches an upper position between the arm part 2167*b* of the upper negative electrode terminal 2167 and the arm part 2177*b* of the lower negative electrode terminal 2177.

FIG. 72 is a diagram for illustrating a situation where a device side terminal is inserted into the substrate cover 2180, and illustrates the vicinity of the upper positive electrode terminal 2162 and the lower positive electrode terminal 2172. In the partition walls 2183 and 2184 located on the left and right sides of the upper positive electrode terminal 2162, the horizontal wall parts 2183*c* and 2184*b* are formed to enter between the arm parts 2162*a* and 2162*b* of the upper positive electrode terminal 2162 and the arm parts 2172*a* and 2172*b* of the lower positive electrode terminal 2172. The interval between the horizontal wall parts 2183*c* and 2184*b* in the left-right direction is L2. As indicated by the dotted line, the terminal part 2052*a* of the positive input terminal 2052 is inserted between the set of the arm parts 2162*a* and 2162*b* between the horizontal wall parts 2183*c* and 2184*c*. Here, the thickness of the terminal part 2052*a* is TH1. Since TH1<L2, L2 is an interval about twice of TH1. As a result, even if the terminal part 2052*a* is fiercely inserted, or some foreign objects are inserted, the phenomenon that the minimum interval portion between the arm parts 2162*a* and 2162*b* and the minimum interval portion between the arm parts 2172*a* and 2172*b* are separated by L2 or more in the left-right direction can be effectively suppressed. Besides, since the front end positions of the horizontal wall parts 2183*c* and 2184*b* are disposed to the front by a distance F1 with respect to the front end positions of the arm parts 2162*a* and 2162*b*, when the terminal part 2052*a* of the positive input terminal at the side of the electrical device body is inserted, the terminal part 2052*a* can be reliably guided between the arm parts 2162*a* and 2162*b* by the horizontal wall parts 2183*c* and 2184*c*. With the configuration of the interval or the front end positions of the horizontal wall parts 2183*c* and 2184*b*, damages to the arm parts 2162*a* and 2162*b* and the arm parts 2172*a* and 2172*b* can be prevented, and favorable fitting states of the upper positive electrode terminal 2162 and the lower positive electrode terminal 2172 can be maintained over a long period of time.

Embodiment 9

FIG. 73(1) and FIG. 73(2) are perspective views illustrating a terminal part 2200 of the ninth embodiment of the invention. The terminal part 2200 is used in the electrical device body rated at 36V. The configuration and the basic shapes of the terminals are the same as the shapes shown in FIG. 62, and like components are marked with like symbols/numerals. In the electrical tool body 1030 for 36V, the terminal part 2200 may be installed in replacement of the terminal part 2050. At this time, the shapes of the connection terminals of the battery pack 2100 are the same. In FIG. 73, hatching is applied to the exposed portions of the metal terminals, so as to make the resin portions and metal portions more easily distinguishable. What differs here is the shape of a base 2201 made of a synthetic resin for holding the terminal parts 2052*a* and 2054*a* to 2058*a* and the terminal parts 2059*b* and 2059*c* of the short bar, which are made of metal. The basic shape is the same. The base 2201 has an upper surface 2201*a*, and concave parts 2201*c* and 2201*d* parallel to the upper surface 2201*a* are formed at the front side and the rear side in the vicinity of the upper surface 2201*a*. However, resin-made covering parts 2202*a* and 2204*a* to 2208*a* are formed in the vicinity of the rear root parts of the terminal parts 2052*a* and 2054*a* to 2058*a*. The covering parts are portion covering with a synthetic resin so that the metal surfaces are not exposed to the external environment, and are formed integrally with the base 2201 in the vicinity of the rear root parts not interfering with the connection terminals of the battery pack 2100. Covering parts 2202b and 2207b are also similarly formed in the vicinity of the rear root parts of the terminal parts 2059b and 2059c of the short bar 2059.

In the ninth embodiment, a partition 2210 made of a synthetic resin is formed at the position equivalent to the empty slot 1123 (see FIG. 38) with no terminal disposed. The partition 2210 serves as a separator formed of an insulating material which makes the positive input terminal 2052 and the terminal part 2059b of the short bar 2059 difficult to cause a short circuit with other terminal parts. The material of the metal terminal parts 2052a, 2054a to 2058a, 2059b, and 2059c includes a highly elastic material for springs, such as phosphor bronze, which exhibits high strength, bending resistance, and high wearing resistance. The terminal parts 2052a and 2054a to 2058a, and the terminal parts 2059b and 2059c are cast in the base 2201 made of a synthetic resin and thus fixed firmly. In particular, the upper portions are also cast in the base 2201. However, regarding the terminal parts 2059b and 2059c, these terminal parts merely extend forward from the rear vertical plane of the terminal part 2200, and the upper portions or the lower portions are in the opened state. The partition 2210 is a wall-shaped part integrally formed with the base 2201. The size of the partition 2210 in the upper-lower direction is formed to be larger than the size of the relatively adjacent terminal part (2054a) adjacent in the lower direction and the front direction.

FIG. 74(1) and FIG. 74(3) are perspective views of the terminal part 2200 from another angle. FIG. 74(2) is a front view. As can be understood from FIGS. 74(1) and 74(3), here, horizontal holders 2204b, 2205b, 2206b, and 2208b extending along the horizontal direction are formed in the vicinity of the lower root parts of the covering parts 2204a, 2205a, 2206a, and 2208a made of resin. As can be understood according to the front view of FIG. 74(2), the lower surfaces of the horizontal holders 2204b, 2205b, 2206b, and 2208b are neatly formed as the same surface when viewed in the height direction. When the battery pack 2100 is installed, the lower surfaces of theses horizontal holders are located at positions close to or abutting against the upper surface 2181a of the substrate cover 2180 (see FIG. 68). By arranging the lower surfaces of the horizontal holders 2204b, 2205b, 2206b, and 2208b to be close to or abut against the substrate cover 2180, the electrical insulating property between the adjacent metal terminals can be improved, and the relative moving range of the terminal part 2200 relative to the battery pack 2100 in the upper-lower direction can be limited. Besides, the horizontal holders 2204b, 2205b, 2206b, and 2208b are respectively separated by predetermined gaps 2202c to 2207c in the left-right direction. The connection terminals at the side of the battery pack 2100 are in a shape for sandwiching the terminal parts of the terminal part 2200 in the left-right direction. Thus, due to the installing operation of the battery pack 2100, the dirt or dust attached to the metal terminal portions is pushed to the rear side. As a result, the dirt or dust can be easily attached to the vicinity of the rear root parts of the metal terminals. Therefore, the gaps 2202c to 2207c are formed to make the attached dirt or dust fall along the lower direction easily. As can be confirmed by the front view shown in FIG. 73(2), the widths of the horizontal holders 2204b, 2205b, 2206b, and 2208b in the left-right direction are formed in the so-called tapered shape, which gradually increase from the front toward the rear. Besides, no horizontal holders are formed on the lower surfaces of the terminal parts 2059b and 2059c of the short bar. This is to allow the terminal parts 2059b and 2059c to be easily deformable downward, so that when a strong impact is applied due to falling of the battery pack 2100 or the like, the terminal parts 2059b and 2059c can hardly contact the terminal parts 2052a and 2057a to be contacted.

When viewed from the left and right side surfaces, the partition 2210 is substantially in a rectangular shape, and is integrally formed by connecting the upper side 2210a of the partition 2210 with the base 2201. In addition, the rear side 2210 as the root portion is connected with the base 2201. The lower side 2210c is formed integrally with the horizontal holder 2203b. In this way, the partition 2210 can be formed simultaneously when the base 2201 is molded. A thickness TH (a width TH in the left-right direction) of the partition 2210 is formed to be thicker than a plate thickness T6 of the terminal parts 2052a and 2054a to 2058a as the metal portions. A height H6 of the partition 2210 is the same as the height of a vertical wall 2200a of the terminal part 2200. A length L6 in the front-rear direction (see FIG. 73(1)) is substantially the same as the length of a horizontal wall 2200b of the terminal part 2200. Besides, compared with the terminal parts 2052a to 2058a, 2059b, and 2059c, the partition 2210 is longer in the front direction and is also greater in the lower direction. Besides, when the battery pack 2100 is installed toward the electrical tool body 1030 (see FIG. 36), the partition 2210 is merely inserted into the empty slot 1123 (see FIG. 38) and does not abut against any of the connection terminals of the battery pack 2100. Besides, regarding the partition wall 2184 of the substrate cover 2180 (see FIG. 68), the location of the closing plate 2184c may be moved toward the rear to avoid any interference from occurring when the partition 2210 is inserted. In the upper-lower direction, two small positive electrode terminal parts (2052a, 2059b) are disposed, and these positive electrode terminal parts may sometimes be deformed significantly due to a large impact such as falling of the battery pack. However, due to the material properties, the elastic deformation region of the positive electrode terminal parts (2052a, 2059b) is quite large, so they may be deformed but are hardly bent. In the present embodiment, when the positive electrode terminal parts (2052a, 2059b) are deformed toward the inner side (the side of the terminal part 2054a), the deformation range thereof may be limited by abutting against the partition 2210.

Embodiment 10

FIG. 75 illustrates the tenth embodiment of the invention. The terminal part 2050A shown herein is rendered by partially modifying the shape of the terminal part 2050 shown in FIG. 62, and parts using like configuring components are marked with like symbols/numerals. Here, a terminal part 2052f of the positive input terminal 2052A as the power terminal is set to have only the length of the front half as compared with the terminal part 2052a shown in FIG. 74, and a terminal part 2079b of the short bar is set to have only the length of the rear half as compared with the terminal part 2059b shown in FIG. 74. By reducing the lengths of the terminal part 2052f and the terminal part 2079b in this way, the terminal part 2052f and the terminal part 2079b of the short part do not overlap each other when viewed in the upper-lower direction and when viewed in the front-rear direction. As indicated by an arrow 2050d, the rear side of the terminal part 2052f is not disposed with a metal terminal.

The same applies to the side of the negative input terminal 2057A. A terminal part 2058f and a terminal part 2079c of the short bar are disposed to be displaced in the front-rear direction. Accordingly, when viewed in the upper-lower direction and viewed in the front-rear direction, the terminal part 2058f and the terminal part 2079c do not overlap each other. As indicated by an arrow 2050e, the rear side of the terminal part 2058f is not disposed with a metal terminal.

FIG. 75(2) and FIG. 75(3) are perspective views illustrating an upper terminal part 1220B and a lower terminal part 1230 corresponding to the terminal part 2050A. Here, the leg parts of the upper terminal part 1220B and the lower terminal part 1230 are disposed to be separated in the front-rear direction, and the arm part set (1225, 1226) and the arm part set (1235, 1236) are disposed to be separated in the upper-lower direction. In the aforesaid aspects, these terminal parts are the same as the upper terminal part 1200 and the lower terminal part 1220 shown in FIG. 40. However, these terminal parts are configured by reducing the length of the arm part set (1225, 1226) at the upper side in the front-rear direction, and increasing the length of the arm part set (1235, 1236) at the lower side in the front-rear direction. FIG. 75(3) illustrates a state where the conventional terminal part 2020 (see FIG. 63) is fit with the upper terminal part 1220B and the lower terminal part 1230 shown in FIG. 75(2). Here, if the terminal part 1022a of the positive input terminal 1022 is inserted, the locations of the fitting region of the upper terminal 1220B and the fitting region of the lower terminal part 1230 in the front-rear direction are separated by a distance L7. Nevertheless, as long as the fitting pressure of the arm part set (1225, 1226) is equal to the fitting pressure of the arm part set (1235, 1236), the function same as the function of the upper terminal part 1200 and the lower terminal part 1220 can be realized.

Embodiment 11

Then, the eleventh embodiment of the invention is described with reference to FIGS. 76 and 77. FIG. 76 is a schematic circuit diagram of a battery pack and an electrical device body of the eleventh embodiment. The battery pack 2100 has the same configuration as the configuration of the battery pack described in the eighth embodiment with reference to FIGS. 58 and 72. Here, only the circuit diagram of the battery pack 2100 is shown. Compared with the eighth embodiment, the characteristic of the electrical device body is that a switch circuit, i.e., a short bar connection switch 2059d, is disposed in the short bar 2059. Except for the above, the configuration remains unchanged. Drive parts such as a motor is controlled by a control part including a microcomputer. The drive part is connected with the positive input terminal 2052 and the negative input terminal 2057. An operation switch 2034 such as a trigger switch is disposed in the circuit of these components. The short bar connection switch 2059d is an additional changeover switch serving to establish or release the electrical connection between the terminal 2059b and the other terminal part 2059c of the short bar 2059. By disposing the changeover switch in the short bar 2059 in this way, various methods of use can be realized.

The first method of use is that the short bar connection switch 2059d is turned on or turned off in a manner of being interlocked with the trigger switch 2034. For example, when the electrical device body has the trigger switch 2034 such as an impact driver, if the trigger switch 2034 is in the turn-off state, the negative electrode of the upper cell unit 2146 and the upper electrode of the lower cell unit 2147 are in a disconnected state and do not supply power to the positive input terminal 2052 and the negative input terminal 2057, even if the battery pack 2100 is installed in the electrical tool body. The second method of use is for a case where the short bar connection switch 2059d serves as the main switch of the electrical device body. In the electrical device using the battery pack 2100, there is a case of not using the trigger switch but only having the main switch. In such case, the short bar connection switch 2059d may serve as the main switch, or the operation of the short bar connection switch 2059d may also be interlocked with the main switch. In either of the first and second methods of use, the upper cell unit 2146 and the lower cell unit 2147 are reliably kept in the disconnected state during maintenance or transportation. Therefore, such methods are especially helpful in improving the safety of the battery pack 2100. Besides, these methods do not solely rely on the trigger switch 2034 to exert on/off control, and the on/off control may also be exerted at the side of the short bar 2059. Therefore, when an emergency stop is needed, the microcomputer at the electrical device body side may also cut off power supply by controlling the short bar connection switch 2059d. The trigger switch 2034 and the short bar connection switch 2059d may also be configured as being fully interlocked, and the on/off switching of the trigger switch 2034 and the on/off switching of the short bar connection switch 2059d are carried out without delay time. In such case, the on/off interlocking can be realized by using a mechanical mechanism. Alternatively, an electrical circuit configuration may be adopted to realize on/off at the same timing. Furthermore, an electrical circuit configuration may also be adopted to control the on/off switching of the short bar connection switch 2059d corresponding to the on/off switching of the trigger switch 2034 in a slightly shifted manner. FIG. 77 illustrates the method of slightly shifting the on/off switching of the short bar connection switch 2059d with respect to the on/off switching of the trigger switch 2034.

FIG. 77(1) is a diagram showing the timings of the operation (a connection operation 2196) of the short bar connection switch 2059d and the operation (a trigger operation 2197) of the trigger switch 2034. The respective horizontal axes indicate time (unit: seconds), and are illustrated in the same scale. FIG. 77(1) is a diagram showing the timings of the operation (a connection operation 2196) of the short bar connection switch 2059d and the operation (a trigger operation 2197) of the trigger switch 2034. When using the electrical tool, the short bar connection switch 2059d is turned on interlockingly by turning on the main switch not shown herein. Then, at times $t_2$, $t_4$, $t_6$, and $t_8$, the operator turns on the trigger switch 2034 to make the motor rotate. If the operator turns off the trigger switch at times $t_3$, $t_5$, $t_7$, and $t_9$, the motor stops rotating. If the operator turns on the main switch not shown herein at a time t10, the short bar connection switch 2059d interlocked with the main switch is also turned on. Therefore, the upper cell unit 2146 and the lower cell unit 2147 of the battery pack 2100 are rendered in the disconnected state. Therefore, even in the state where the battery pack 2100 is inserted into the electrical tool body, if the main switch is turned off, the upper cell unit 2146 and the lower cell unit 2147 is still released from series connection.

FIG. 77(2) is a diagram showing the control timings of the short bar connection switch 2059d, the microcomputer, and the motor in a case where the electrical tool has a changeover switch for only turning on or turning off, such as a grinder or a circular saw, and does not have a trigger switch which needs to be constantly operated during an operation process. In some models of the electrical device body, such as a grinder or a circular saw, which do not have the trigger switch 2034 that needs to be constantly operated by the operator, the short bar connection switch 2059*d* may serve as the main switch of the electrical tool. In such case, the main switch (the short bar connection switch 2059*d*) is turned on at a time $t_{11}$, and the electrical tool is thus in a usable state. In this way, the operation voltage is also supplied to the microcomputer included in the control part at the electrical tool body side, and the microcomputer 2198 is thus turned on. The microcomputer 2198 that is turned on makes the motor rotate. However, the timing is slightly delayed and the microcomputer 2198 is turned on at a time $t_{12}$. After the operation at a time $t_{20}$ ends, the operator switches the main switch (the short bar connection switch 2059*d*) to the off side. In this way, the power supply to the microcomputer is cut off, so the microcomputer and the motor are stopped. As described above, setting a slight lag in time prior to the motor is started with respect to the short bar connection switch 2059*d* being turned on helps suppress excessive currents from accumulating at the contact portion of the short bar connection switch 2059*d*. Besides, by turning off the short bar connection switch 2059*d* as the main switch, the state that the output of the battery pack 2100 is not supplied to the positive input terminal 2052 and the negative input terminal 2057 is reliably sustained. If the main switch is turned off, the upper cell unit 2146 and the lower cell unit 2147 is released from series connection. In this way, the safety during transportation is also improved.

Embodiment 12

Then, the shapes of the terminal holders (2500, 2550) at the electrical device body side is described with reference to FIGS. 78 to 88. In FIG. 78(1), a terminal holder 2500 is in a novel shape installed to replace the terminal part 2020 (see FIG. 63) of the conventional electrical device body, and the terminal holder 2500 is for the rated 18V. In the terminal part 2020 shown in FIG. 63, a base 2021 made of a synthetic resin and serving to fix the terminals is in a small shape. However, in the terminal part 2500 of the twelfth embodiment, a horizontal wall 2501 forming the horizontal plane 2501*a* is formed to be greater in the front-rear and left-right directions. The terminal holder 2500 is a component for fixing a plurality of terminals (2522, 2524 to 2528) at the electrical device body side. The metal components having plate-shaped terminal parts are cast through integral formation of a non-conductor, such as a synthetic resin, so as to be fixed. In the terminal holder 2500, a positive input terminal 2522, a T terminal 2524, a V terminal 2525, an LS terminal 2526, a negative input terminal 2527, and an LD terminal 2528 are plate-shaped and are disposed in the left-right direction. The T terminal 2524, the V terminal 2525, the LS terminal 2526, and the LD terminal 2528 serve as signal terminals for outputting signal inputs or outputting information or signals relating to the battery pack 2100. The battery pack 2100 further includes positive electrode terminals (2161, 2171, as shown in FIG. 65) for charging, but the terminal holder 2500 shown herein is used in an electrical device exclusive for discharging, so no terminals to be fit with the positive electrode terminals (2161, 2171, as shown in FIG. 58) for charging are disposed. The multiple terminals (2522, 2524 to 2528) extending toward the front from the base body part 2510 of the terminal holder 2500 are firmly fixed with the rear side portions and a portion of the upper sides being cast to the horizontal wall 2501. Curved ribs 2503*a* to 2503*d* for fixing the terminal holder 2500 to the housing at the electrical device body side are formed on the rear side of the horizontal wall 2501. At positions opposing to the curved ribs 2503*a* and 2503*d*, curved ribs 2504*a* and 2504*b* curved in an opposite direction with respect to the curved ribs 2503*a* and 2503*d* are formed. By insert-fitting cylindrical-shaped components between the multiple curved ribs 2503*a* to 2503*d* and 2504*a* and 2504*b*, the rear side of the terminal holder 2500 is fixed to the housing at the electrical device body side. At this time, the front side of the terminal holder 2500 is hooked to the housing at the electrical device body side via a hooking claw 2502. At the lower side of the multiple terminals (2522, 2524 to 2528) close to a vertical plane 2501*b*, a horizontal plane 2515 thin and elongated in the left-right direction is formed. The horizontal plane 2515 is manufactured by being integrally formed with the base body part 2510, and is a horizontal plate in a rectangular shape longer in the lateral direction. On the right end of the horizontal plane 2515, a projection part 2516*b* projecting to be closer to the right side than the right end of the base body part 2510 is formed. Similarly, a projection part 2516*a* projecting to be closer to the left side than the left end of the base body part 2510 is formed.

FIG. 78(2) is a left side view of the terminal holder 2500. In the terminal holder for 18V, the horizontal plane 2515 continuous in the lateral direction is formed at the lower side portions of the multiple terminals (2522, 2524 to 2528), and the projection parts 2516*a* and 2516*b* are formed at the left and right ends of the horizontal plane 2515. At the rear end portions of the multiple terminals (2522, 2524 to 2528) cast to the rectangular parallelopiped base body part 2510, connection parts (2522*b*, 2524*b*, 2527*b*, etc.) for soldering are formed. A cylindrical component thin and elongated in the left-right direction may be inserted into the curved rib 2503*d* at the lower side of the connection parts (2522*b*, 2524*b*, 2527*b*, etc.) and the curved rib 2504*b* opposed to the curved rib 2503*d*, and the cylindrical component is fixed to the housing of the electrical device body by a spring, etc.

FIG. 79 is a diagram illustrating the terminal holder 2500. FIG. 79(1) is a front view. FIG. 79(2) is a bottom view. The terminal holder 2500 is further formed with the horizontal plane (horizontal wall) 2515 below a bottom surface part 2510*b* for connecting the lower side of the terminals (2522, 2524 to 2528). In the vicinity of the center of the horizontal plane 2515 in the left-right direction, a concave part 2516 is formed with a concave-shaped cutout. The concave part 2516 is a notch formed so as not to interfere with the vertical wall 2185*a* (see FIG. 38) of the battery pack 2100 when the terminal holder 2500 is installed. The rear side portions and a portion of the upper side portions of the terminals (2522, 2524 to 2538) are cast in the base body part 2510, and a portion of the rear end at the lower side is cast by the horizontal wall 2515. Therefore, the terminals (2522, 2524 to 2528) are firmly fixed without wobbling in the left-right direction. In the base body part 2510, the multiple terminals (2522, 2524 to 2528) are cast in a manner of penetrating to the rear side. At this time, in the base body part 2510 at the rear side of the horizontal plane 2515, cavity parts 2532 to 2538 and 2544 to 2546 not filled by a resin material are formed. These cavity parts are parts unnecessary for covering the terminals (2522, 2524 to 2528) cast inside, and are formed to reduce the weight of the terminal holder 2500. FIG. 79(3) is a top view and exposes a portion to the extent of the internal space of the housing 1003 of the electrical tool body 1001. The terminal holder 2500 of the twelfth embodiment is relatively large-sized, and a stepped surface 2506 whose height increases toward the upper side is formed on the upper surface of the horizontal plane 2501*a*. The outer peripheral side edge part of the horizontal plane 2510a is sandwiched by the opening part formed in the housing 1003 of the electrical tool body 1001 so as to be fixed to the electrical tool body 1001. At this time, a sealing component (not shown) formed of rubber may also be interposed on the outer peripheral surface of the horizontal wall 2501 to fill the gap between the terminal holder 2500 and the housing 1003.

FIG. 80 is a partial side view illustrating a state where the conventional battery pack 1015 is mounted to the electrical tool body using the terminal holder 2500. In the conventional battery pack 1015, a connection terminal 1018 is fixed onto the circuit substrate 1016 of the battery pack 1015. The connection terminal 1018 is in a size corresponding to the terminal part of the positive input terminal 2522. The connection terminal 1018 has arm parts 1018a and 1018b (1018b not visible in the figure) located at the right and left sides and extending toward the front side of the mounting direction of the battery pack, and an electrically favorable contact state is rendered by sandwiching the terminal part of the positive input terminal 2522 between the arm parts 1018a and 1018b. If the conventional battery pack 1015 is installed to the electrical device body, the horizontal plane 2515 is located at a position close to the upper step surface 1115 of the upper case 1110 (see FIG. 38), and the vertical plane 2501b is located at a position opposing to the stepped part 1114 (see FIG. 38). At this time, the arm parts 1018a and 1018b of the connection terminal 1018 are fit by sandwiching the plate-shaped positive input terminal 2522 at the left and right sides, so as to establish a state of being electrically connected. In the conventional part 2020 (see FIG. 63), the horizontal plate 2515 is not formed. Therefore, a gap is created at the part indicated by an arrow 2517. However, in the present embodiment, the horizontal plane 2515 is in contact with or close to the substrate cover 1019. Therefore, the state that the gap between the terminal holder 2500 and the substrate cover 1019 is already filled is rendered, such that the relative movable range of the connection terminal group of the battery pack 1015 relative to the side of the electrical tool body 1001 is limited. In this way, when the electrical tool is being operated, the amount of relative movement between the fitting portions of the arm parts 1018a and 1018b and the terminal part 2027a is significantly limited, and the friction between the arm parts 1018a and 1018b and the fitting parts of the connection terminal 1018 can be suppressed. As a result, the electrical properties are stable, and the lifespan of the battery pack 1015 or the electrical tool body 1001 can be extended. Besides, the upward movement of the terminal holder 2500 relative to the battery pack 1015 is also limited by the projection parts 2516a and 2116b (see FIG. 78). The functions of the projection parts 2516a and 2516b will be described afterwards with reference to FIG. 85.

FIG. 81 is a diagram illustrating a shape of the terminal holder 2550 for 36V of the twelfth embodiment of the invention. FIG. 81(1) is a perspective view viewed from the lower side. FIG. 81(2) is a left side view. FIG. 81 only differs slightly from the terminal holder 2550 for 18V as shown in FIG. 78, and the shape of the resin portion can be considered as the same. The only differences are that, like the eighth embodiment, those with a narrow width in the upper-lower direction are adopted for a positive input terminal 2572 and a negative input terminal 2577, and terminal parts 2588b and 2588c of the short bar are disposed in a parallel manner at the lower portions of the positive input terminal 2572 and the negative input terminal 2577. The side surface shape in FIG. 81(2) is also substantially the same. On the lower side of the connection terminal group, a horizontal plane 2565 is formed. On the left and right sides of the horizontal plane 2565, projection parts 2566a and 2566b are formed.

FIG. 82 is a diagram illustrating the terminal holder 2550 of FIG. 81. FIG. 82(1) is a front view. FIG. 82(2) is a bottom view. FIG. 82(3) is a top view. Here, the widths of the positive input terminal 2572 and the negative input terminal 2577 in the upper-lower direction are formed to be less than the widths of other terminals (2574 to 2578). The terminal part 2588b is formed on the lower side of the positive input terminal 2572, and the terminal part 2588c is formed on the lower side of the negative input terminal 2577. The terminal parts 2588b and 2588c are two ends of the short bar cast inside the base body part 2560 of the terminal holder 2550 and are electrically connected. The shape of the bottom surface part of FIG. 82(2) is also substantially the same as that of the terminal holder 2550 shown in FIG. 79. Multiple terminals (2572, 2574 to 2578) and the short bar not shown herein are cast in the base body part 2560. On the rear side of the horizontal plane 2565, a great number of cavity parts 2582 to 2588 and 2594 to 2596 are formed. These cavity parts are parts unnecessary for covering the terminals (2522, 2524 to 2528) cast inside, and are formed to reduce the weight of the terminal holder 2550. FIG. 82(3) is a top view and exposes a portion to the extent of the internal space of the housing 1032 of the electrical tool body 1030. A stepped surface 2556 is formed in a horizontal plane 2551a as the upper surface of the terminal holder 2550.

FIG. 83 is a diagram for illustrating a connection state between the electrical tool body using the terminal holder 2550 and the connection terminal of the battery pack 2100 of the embodiment. FIG. 83(1) is a side view. FIG. 83(2) is a side view in which a side wall portion of the substrate cover 2380 is omitted from FIG. 83(1). Here, the upper positive electrode terminal 2162 is only fitted with the positive input terminal 2572, and the lower positive electrode terminal 2172 is connected with the terminal part 2588b of the short bar. Here, multiple power terminals (2162, 2172, etc.), multiple device side power terminals (2572, etc.), and the short bar 2588 as the voltage switching element and the switching element are disposed at positions at substantially the same height in the upper-lower direction. The horizontal plane 2565 is located at a position in contact with or close to the lower step surface 1111 of the upper case 1110 (see FIG. 38) and the upper surface 2381a of the substrate cover 2380. In the terminal holder 2550, the horizontal plane 2565 and the projection parts 2566a and 2566b are also formed. Therefore, the movement of the terminal holder 2550 relative to the battery pack 2100 in the upper-lower direction can be limited.

Then, with reference to FIG. 84, another method for limiting the amount of relative movement of the terminal holder 2550 relative to the battery pack is described. The method shown in FIGS. 78 to 83 only limits the movement of the terminal holder 2500 or 2550 in the direction toward the circuit substrate 1016 or 2150, i.e., the downward movement. For this purpose, the horizontal plane 2515 or 2565 is formed in the terminal holder 2500, 2550. However, if only the horizontal plane 2515 or 2565 is disposed, the relative movement of the terminal holder 2500 or 2550 in the direction away from the circuit substrate 1016 or 2150, i.e., the upward movement, cannot be limited. The terminal holder 2550 is held by the housing 1032 of the electrical tool body 1030. At this time, the fixing method of the terminal holder differs as the type of the electrical tool body or the electrical device body differs. Normally, an opening part for sandwiching the terminal holder 2500 is disposed on a split surface of a split type housing, and the terminal holder 2500 is tucked into the opening part. At this time, to improve water resistance or avoid transmission of vibration, sometimes a rubber-made sealing component is also interposed for holding in a slightly movable state, other than the method of firmly fixing the opening part and the terminal holder 2500. In such case, when the electrical tool is in a state which generates significant vibrations during operation, the terminal holder 2550 may vibrate very slightly in a cycle different from that of the housing at the electrical tool body side, i.e., vibrating within a movable range formed by the sealing component, and thereby cause a relative movement between the connection terminal of the battery pack 2100 and the plate-shaped device side terminal. To suppress such a relative movement between the connection terminal and the device side terminal, it is worth exploring to increase the fitting pressure of the connection terminal of the battery pack 2100. However, in such case, the battery pack 2100 may become difficult to mount and install. Therefore, in the present embodiment, the projection part 2516a or 2566a projecting toward the right and the projection part 2516b or 2566b projecting toward the left are formed in the vicinity of the left and right ends of the horizontal plane 2515 or 2565. In this way, the upward movement of the terminal holder 2550 relative to the battery pack 2100 can also be suppressed. Regarding the limitation on the upward movement of the terminal holder 2500 or 2550, abutting components (engaged parts) that hold the projection parts 2516a, 2516b, 2566a, and 2566b from the upper side need to be disposed. Here, as the engaged part, a convex part is formed in a portion of the upper case 1110 of the present embodiment, or a convex part is formed in the substrate cover 2380 of the present embodiment, and the projection part 2516a or 2516b or the projection part 2566a or 2566b is arranged to abut against the lower side of the convex part. In this way, in the state where the battery pack is connected with the electrical device body, the positive electrode terminal, the positive input terminal, the negative electrode terminal, the negative input terminal, the voltage switching element, and the switching element are disposed at positions at substantially the same height in the upper-lower direction. Therefore, a battery pack not only installed with the voltage switching element and the switching element but also tightly arranged in the upper-lower direction can be realized.

FIG. 84(1) is a right side view illustrating a state where the terminal holder 2550 is mounted in the battery pack 2100. Here, the horizontal plane 2551a of the terminal holder 2550 is opposed to the upper step surface 1115 of the upper case 1110. The battery pack 2100 is installed to the electrical tool body 1030 via a rail mechanism. FIG. 84(2) is a cross-sectional view of the C-C part of FIG. 84(1). Here, multiple device side terminals (2572, 2574 to 2578, 2588b, and 2588c) formed at the terminal holder 2550 are fit with the connection terminals (see FIG. 58) at the side of the electrical tool body 1001. On the lower surface of the device side terminals (2572, 2574 to 2578, 2588b, and 2588c), the horizontal plane 2565 is formed. The horizontal plane 2565 abuts against the upper surface 2381a of the substrate cover 2380. However, in the vicinity of arrows 2590a and 2590b, the lateral side of the terminal holder 2550 and the upper case 1110 are in a non-contact state.

FIGS. 85(1) and 85(2) are diagrams illustrating a terminal part 2650 of a modification example of the twelfth embodiment. FIG. 85(1) is a cross-sectional diagram corresponding to a portion of the D-D part in FIG. 84. FIG. 85(2) is a partially enlarged view of FIG. 85(1). As can be understood from the figure, projection parts 2666a and 2666b are disposed in the terminal part 2650 in the left-right direction. In the upper case 1110, two projection parts 1139a and 1139b which extend along the front-rear direction and are in parallel are disposed. In addition, rails 1138a and 1138b which project toward the left and right sides from the vicinity of the respective upper ends of these projection parts projecting upward and are engaged with the rail grooves at the electrical tool side. Besides, in the opening part formed between the projection parts 1139a and 1139b, ribs 1140a and 1140b as the engaged parts to be fit with the terminal part 2650 are disposed, so as to prevent the relative upward movement of the terminal part 2650 relative to the battery pack 2100. The relative downward movement of the terminal part 2650 relative to the battery pack 2100 is limited by arranging the projection parts 1139a and 1139b to abut against stepped parts 2386a and 2386b formed in the left and right ends of the upper surface 2381a of the substrate cover 2380. Here, if the interval between the lower surfaces of the ribs 1140a and 1140b forming stepped portions and the upper surfaces of the projection parts 1139a and 1139b is set at 3.0 mm, and the height of the projection parts 2666a and 2666b is set at about 2.5 mm, the battery pack 2100 can be smoothly installed to and removed from the electrical tool body 1030, and the wobbling of the terminal part 2650 in the upper-lower direction can be effectively suppressed.

FIG. 86 is a diagram illustrating a modification example of fixing the terminal part 2650 to a substrate cover 2680. FIG. 86(1) is a cross-sectional diagram corresponding to the portion of the D-D part in FIG. 84. FIG. 86(2) is a diagram of the terminal part 2650 of FIG. 86(1) alone. FIG. 86(3) is a left side view of the terminal part 2650. Here, guide rails 2695a and 2695b fit with the projection parts 2666a and 2666b of the terminal part 2650 are formed on the two ends of the substrate cover 2680. The guide rails 2695a and 2695b are the concave second rail grooves extending in the front-rear direction. If the terminal part 2650 is moved relatively by sliding from the front side of the battery pack 2100, the configuration that the projection parts 2666a and 2666b of the terminal part 2650 enter the guide rails 2695a and 2695b is rendered. In other words, the electrical tool body 1001 or 1030 is engaged with the rail mechanism for installation, i.e., the rails 1138a and 1130b, through the rail grooves 1011a and 1011b. Besides, the projection parts 2666a and 2666b of the second rail mechanism are fit with the guide rails 2695a and 2695b, so as to limit the relative movement between the terminal part 2650 and the battery pack 2100. When viewed according to the side view of FIG. 86(3), the shape of the terminal part 2650 is different from the shapes of the terminal holders 2500 and 2550 of the twelfth embodiment and is formed to be small-sized. However, the sizes of the metal terminal parts (e.g., a positive input terminal 2672 and a terminal part 2688b of the short bar) forming the connection terminals are the same. Besides, the following components are also in the same shapes with the terminal holders 2500 and 2550 of the twelfth embodiment shown in FIGS. 78 to 83: a horizontal plane 2665 formed at the lower side of the multiple metal terminals, and the projection parts 2666a and 2666b further formed on the left and right sides of the horizontal plane 2665. By forming in this way, the relative moving range of the installed terminal part 2650 relative to the electrical tool body or the electrical device body installed with the battery pack in the upper-lower direction can be effectively suppressed.

FIG. 87 illustrates a configuration where a cushion material 2690 is interposed on the lower surface 2665a of the horizontal plane 2665 of the terminal part 2650A of FIG. 86. The cushion material 2690 only needs to have a favorable relative slidability, so as not to generate a great resistance force when the battery pack 2100 is being installed toward the electrical tool body, and be sufficiently elastic. Here, the flat lower surface 2665a of the terminal part 2650A is attached to the cushion material 2690 via an adhesive component, such as a double-sided tape. Besides, in the vicinity of the center of the lower surface 2665a in the left-right direction, a convex part 2665b is formed. The convex part 2665b is formed with a predetermined length in the front-rear direction. The convex part 2665b is integrally manufactured in the base body part 2660A, and is a stopper which protects the cushion material 2690 from being compressed to or over a necessary extent. When viewed according the side view of FIG. 87(2), the cushion material 2690 is closer to the rear side than the projection part 2666b, and is located at the lower side of the base body part 2660. However, it is favorable that the total length of the cushion material 2690 in the left-right direction is about less than or equal to a half of the region of the lower surface 2665a in the left-right direction.

FIG. 88 is a diagram illustrating a terminal part 2650B of another modification example of the twelfth embodiment. FIG. 88(1) is a front view. FIG. 88(2) is a left side view. FIG. 88(3) is a left side view of the terminal part 2650B in a state of being fit with a connection terminal on the side of the battery pack 2100. Here, between the upper and lower edge parts of the positive input terminal 2672 and the terminal part 2688b of the short bar, guide parts 2692a to 2692c made of a synthetic resin are interposed. Similarly, between the upper and lower edge parts of the negative input terminal 2677 and the terminal part 2688c of the short bar, guide parts 2697a to 2697c made of a synthetic resin are interposed. The guide parts 2697a to 2697c are made of a non-conductor such as a synthetic resin, and may be configured as components different from the base body part 2660 or manufactured by being integrally formed with the base body part 2660. As shown in the side view of FIG. 88(2), the guide parts 2692a to 2692c are formed continuously from a portion closer to the front side than the front end of the positive input terminal 2672 to the point that they are connected with a vertical wall 2661b. The same applies to the guide parts 2697a to 2697c. Therefore, the metal terminal portions are as shown in FIG. 88(2). The positive input terminal 2672 is exposed between the guide parts 2692a and 2692b, and the terminal part 2688b of the short bar is exposed between the guide parts 2692b and 2692c. By forming the guide parts 2692a to 2692c and the guide parts 2697a to 2697c in this way and being guided by the guide parts 2692a to 2692c as shown in FIG. 88(3), the arm part 2162a of the upper positive electrode terminal 2162 is guided between the guide parts 2692a and 2692b, and the arm part 2172a of the lower positive electrode terminal 2172 is guided between the guide parts 2692b and 2692c. With the configuration, the connection terminal at the side of the battery pack 2100 can be reliably guided to the predetermined position of the terminal part 2650B during installation. Furthermore, the phenomenon that the terminals are wore due to relative sliding between the device side terminals of the terminal part and the connection terminals at the battery pack side when the electrical tool is being operated can be significantly suppressed.

Embodiment 13

Then, the thirteenth embodiment of the invention is described with reference to FIGS. 89 and 94. In the eighth embodiment, upper terminals (2162, 2167) and lower terminals (2172, 2177) are respectively disposed as power terminals (positive electrode terminals and negative electrode terminals), and when the battery pack is installed to the low voltage electrical tool body, the upper terminals and the lower terminals are commonly connected to the power terminals of the low voltage electrical tool body. Besides, when the battery pack is installed to the high voltage electrical tool body, only either of the upper and lower terminals are connected to the power terminals of the electrical tool body, and the other of the upper and lower terminals not connected to the power terminals are short circuited by the short bar. Compared with the above, in the thirteenth embodiment, the arm parts that serve as power terminals are not disposed to be separated in the upper-lower direction, but are disposed to be separated in the front-rear direction.

FIG. 89 is a perspective view for illustrating mounting of a battery pack 2860 of an electrical tool of a thirteenth embodiment. The electrical tool includes an electrical tool body 2801 and a battery pack 2860 installed in the electrical tool body 2801, and a front end tool or an operation device is drive by the rotary driving force of the motor. The electrical tool body 2801 has a housing 2802 as an outer case for forming the appearance. In the housing 2802, a handle part 2803 is formed. In the vicinity of the upper end of the handle part 2803, a trigger switch 2804 for the operator to operate is disposed. Below the handle part 2803, a battery pack mounting part 2810 for installing the battery pack 2860 is formed.

Here, like the eighth embodiment, a mounting direction 2818 of the battery pack 2860 is set as the direction in which the battery pack 2860 approaches the electrical tool body 2801 for description. However, the definition is made only for the ease of description. In reality, the battery pack 2860 can be held and the electrical tool body 2801 is moved forward to realize relative movement in the same direction as the movement indicated by an arrow 2818. Besides, the front, rear, left, and right directions of the battery pack 2860 are determined based on the mounting direction. Besides, regarding the electrical tool body side, the front, rear, left, and right directions are determined based the holding direction of the operator. Therefore, it should be noted that, when the electrical device is an electrical tool body such as an impact type driver, the orientation of the front-rear direction as shown in FIG. 89 will be reversed.

Compared with the battery pack 2100 described in the eighth embodiment, the shape of the battery pack 2860 differs in the configuration of the connection terminals and the latch mechanism. Rails 2864a and 2864b (2864b not visible in the figure) are formed on the left and right sides of the battery pack 2860. A latch button 2865 is formed at the upper part of the rear surface of the battery pack 2860, and only a large button is disposed at the center in the left-right direction. When the battery pack 2860 is installed to an electrical tool body 2830, the battery pack 2860 can be removed by moving the battery pack 2860 in the opposite direction of the direction indicated by the arrow 2818 (or moving the electrical tool body 2830 away from the battery pack 2860) after pressing the latch button 2865.

FIG. 90 is a diagram for illustrating mounting of the battery pack of the thirteenth embodiment toward the electrical tool. In an electrical tool body 2801 or 2830, a housing 2802 or 2832, a handle 2803 or 2833, and a trigger switch 2804 or 2834 are disposed. The battery pack mounting part 2810 or 2840 for installing the battery pack 2860 is formed below the handle part 2803 or 2833.

The electrical tool body 2801 is operated with a voltage rated at 18V, and the electrical tool body 2830 is operated with a voltage rated at 36V. Two cell unit sets, each formed by five 3.6V Li-ion battery cells connected in series, are accommodated inside the battery pack 2860. By switching the connection between the two cell unit sets between series connection and parallel connection, the voltage output can be switched between a low voltage (18V) output and a high voltage (36V) output. The battery pack 2860 is configured to correspond to two voltages. Therefore, the battery pack 2860 can be installed to the electrical tool body 2830 corresponding to 36V as indicated by an arrow b4, and can also be installed to the electrical tool body 2801 as indicated by an arrow b3. In the battery pack mounting part 2810 of the electrical tool body 2801, rail grooves 2811*a* and 2811*b* extending in parallel along the front-rear direction are formed at inner wall portions on the left and right sides. In the space portion surrounded by the rail grooves 2811*a* and 2811*b* on the left and right, a terminal part 2820 is disposed. The terminal part 2820 is integrally manufactured with a non-conductive material such as a synthetic resin, and is formed with a vertical plane 2820*a* as a supporting surface in the mounting direction (front-rear direction) and a horizontal plane 2820*b*. The horizontal plane 2820*b* is configured as a surface adjacent and opposed to an upper step surface 2862 when the battery pack 2860 is installed. In the terminal part 2820, multiple metal connection elements, such as a positive input terminal 2822, a negative input terminal 2827, and an LD terminal (anomaly signal terminal) 2828, are disposed. The LD terminal (anomaly signal terminal) 2828 serves as a signal terminal for inputting or outputting information or signals. The positive input terminal 2822 and the negative input terminal 2827 are formed by metal plates, and have lengths twice or more of the length of the terminal part 2020 (see FIG. 63) in the eighth embodiment. The LD terminal 2828 is disposed on the right side of the negative input terminal 2827. In the way to be described afterwards, the positive input terminal 2822 and the negative input terminal 2827 serve as switching terminals for switching the output voltage of the battery pack 2860 to a low voltage, and serve as low voltage connection terminals for connecting the multiple cell units 2146 and 2147 in parallel.

On the upper side of the battery pack 2860, a flat lower step surface 2861 is formed at the front side, and an upper step surface 2862 higher than the lower step surface 2861 is formed in the vicinity of the center. The connection portion between the lower step surface 2861 and the upper step surface 2862 is formed to be stepped, and a slot group for inserting the device side terminals are disposed at the stepped portion. The slot group include notch-shaped large slots 2872 and 2877 which are long in the front-rear direction and a slot 2878 whose length is about half of the length of these large slots. The slot 2872 is formed as the first slot for the positive electrode terminal, the slot 2877 is the second slot for the negative electrode terminal, and the slot 2878 is the third slot for the LD terminal. Inside the slots 2872 and 2877 that are cut open, multiple connection terminals that can be fit with the device side terminals at the side of the electrical tool body 2801 or 2830 are disposed. Besides, while only three slots are disposed herein, it is also possible to configure a greater number of slots. On the right side surface and the left side surface of the upper step surface 2862, the rails 2864*a* and 2864*b* are formed. The rails 2864*a* and 2864*b* are convex parts projecting toward the right direction and the left direction. On the rear side of the upper step surface 2862, a raised part 2863 is disposed, and the latch button 2865 is disposed on the rear side of the raised part 2863.

The electrical tool body 2830 is operated with a voltage rated at 36V. Based on the same idea with the eighth embodiment, the electrical tool body 2830 is disposed with two connection terminal sets separated in the front-rear direction, and the two connection terminal sets are inserted into the positive electrode side slot 2872 and the negative electrode side slot 2877. The connection terminals corresponding to the positive electrode side slot 2872 are the terminal part 2859*b*, which is one of the terminal parts of the short bar 2859, disposed at the front side and the positive input terminal 2852 disposed at the rear side. Similarly, the connection terminals corresponding to the negative electrode side slot 2877 are the terminal part 2859*c*, which is the other of the terminal parts of the short bar 2859, disposed at the front side, and the negative input terminal 2857 disposed at the rear side. In the eighth embodiment, the positive input terminal and the short bar as well as the negative input terminal and the short bar are disposed separately by a distance in the upper-lower direction. In the present embodiment, such a configuration is applied to the front-rear direction. That is, these components are disposed separately by a predetermined distance in a direction parallel to the mounting direction of the battery pack 2860. The short bar 2859 may serve as a short circuit element or a conduction terminal. In the way to be described afterwards, the terminal part 2859*b* of the short bar 2859 and the other terminal part 2859*c* of the short bar 2859 serve as switching terminals for switching the output voltage of the battery pack 2860 to a high voltage, and serve as high voltage connection terminals for connecting the multiple cell units 2146 and 2147 in series.

FIG. 91 is a perspective view illustrating a connection state of the power terminals to the electrical tool body. FIG. 91(1) illustrates a state where the battery pack 2860 is mounted to an electrical tool body 2801 for 18V. FIG. 91(2) illustrates a state where the battery pack 2860 is mounted to the electrical tool body 2830 for 36V. Here, the mounting direction of the battery pack 2860 is the direction of the two arrows indicated by dotted lines. Inside the positive electrode side slot 2872 of the battery pack 2860, a front positive electrode terminal 2882 and a rear positive electrode terminal 2892 as a power switching terminal group (or a positive electrode terminal group in parallel connection) are disposed separately in the front-rear direction. Similarly, inside the negative electrode side slot 2877, a front negative electrode terminal 2887 and a rear negative electrode terminal 2897 as a power switching terminal group (or a negative electrode terminal group in parallel connection) are disposed separately in the front-rear direction. Inside the battery pack 2860, the upper cell unit 2146 and the lower cell unit 2147 including five Li-ion battery cells are accommodated. The positive electrode output of the upper cell unit 2146 is connected to the rear positive electrode terminal 2892, and the negative electrode output is connected to the front negative electrode terminal 2887. The positive electrode output of the lower cell unit 2147 is connected to the front positive electrode terminal 2882, and the negative electrode output is connected to the rear negative electrode terminal 2897. In the present embodiment, the voltage switching element for realizing switching between parallel connection and series connection is realized through the front positive electrode terminal 2882, the rear positive electrode terminal 2892, the front negative electrode terminal 2887, and the rear negative electrode terminal 2897. The front positive electrode terminal 2882 serves as a positive electrode terminal, and the front negative electrode terminal 2887 serves as a negative electrode terminal. Besides, in the way to be described afterwards, the front positive electrode terminal 2882 and the rear positive electrode terminal 2892 serve as switching terminals for switching the output voltage of the battery pack 2860 to a low voltage, and serve as parallel connection terminals for connecting the multiple cell units 2146 and 2147 to each other in parallel. The multiple parallel connection terminals, i.e., the front positive electrode terminal 2882 and the rear positive electrode terminal 2892, are disposed to be adjacent to each other, and form a parallel terminal group. Similarly, the front negative electrode terminal 2887 and the rear negative electrode terminal 2897 serve as switching terminals for switching the output voltage of the battery pack 2860 to a low voltage, and serve as parallel connection terminals for connecting the multiple cell units 2146 and 2147 to each other in parallel. The multiple parallel connection terminals, i.e., the front negative electrode terminal 2887 and the rear negative electrode terminal 2897, are disposed to be adjacent to each other, and form a parallel terminal group. Besides, in the way to be described afterwards, the rear positive electrode terminal 2892 and the rear negative electrode terminal 2897 serve as switching terminals for switching the output voltage of the battery pack 2860 to a high voltage, and serve as series connection terminals for connecting the multiple cell units 2146 and 2147 to each other in series.

The device side terminals of the electrical tool body 2801 includes the positive input terminal 2852, the negative input terminal 2857, and the short bar 2859. The device side terminals basically have the same function as that of the configuration of the eighth embodiment, and are configured in the following way: the terminal group (2852, 2857, 2859b, 2859c) of the electrical tool body is relatively moved as indicated by an arrow 2855, so as to be installed to the connection terminal group (2882, 2887, 2892, 2897) of the battery pack 2860 indicated by the dotted line arrow. Regarding the terminal group (2852, 2857, 2859b, 2859c) of the electrical tool body, not the whole terminal part 2850 (see FIG. 90) is shown, but only the metal terminal portions are shown. The positive input terminal 2852 is a metal plate material bent into a crank shape. A terminal part 2852a fit with the front positive electrode terminal 2882 is formed on one side, and a wiring terminal part 2852c toward the side of a motor 2836 is formed on the other side. The connection part 2852b extending along the lateral direction is between the terminal part 2852a and the wiring terminal part 2852c. The whole connection part 2852b, a portion of the terminal part 2852a at the rear side, and a portion of the wiring terminal part 2852c at the front side are cast in the synthetic resin portion of the terminal part 2850 (see FIG. 90). The negative input terminal 2857 is also in the same shape. A terminal part 2857a fit with the front negative electrode terminal 2887 is formed on one side, and a wiring terminal part 2857c toward the side of the motor 2836 is formed on the other side. The positive input terminal 2852 and the negative input terminal 2857 are in plane symmetry. The connection part 2857b extending along the lateral direction is between the terminal part 2857a and the wiring terminal part 2857c. The whole connection part 2857b, a portion of the terminal part 2857a at the rear side, and a portion of the wiring terminal part 2857c at the front side are cast in the synthetic resin base of the terminal part 2850. The horizontal portion of the short bar 2859, the connection part 2852b of the positive input terminal 2852, and the connection part 2857b of the negative input terminal 2857 are completely cast in the terminal part 2850 together. Therefore, the relative positions of the terminal parts 2852a, 2857b, 5859b, and 2859c, particularly the positions in the front-rear direction and left-right direction, do not change.

When the battery pack 2860 is installed, the terminal part 2859b of the short bar 2859 is fit with the rear positive electrode terminal 2892 and the rear negative electrode terminal 2897. Besides, the positive input terminal 2852 is fit with the front positive electrode terminal 2882, and the negative input terminal 2857 is fit with the front negative electrode terminal 2887. As a result, a series connection circuit of the upper cell unit 2146 and the lower cell unit 2147 is formed, so as to supply a voltage rated at 36V to the electrical tool body 2830. In the state where the battery pack 2860 is connected to the electrical device body 2801 in this way, the positive electrode terminal (2882) is connected with the positive input terminal (2852) via the first slot (the slot 2872), and the negative electrode terminal (2887) is connected with the negative input terminal (2857) via the second slot (the slot 2877), and the voltage switching element and the switching element are engaged via the first slot and the second slot.

FIG. 91(2) is a diagram for illustrating a state where the battery pack 2860 is mounted to the low voltage electrical tool body 2801. The positive input terminal 2822 is a metal plate material bent into a crank shape. A terminal part 2822a fit with the front positive electrode terminal 2882 and the rear positive electrode terminal 2892 at the same time is formed on one side, and a wiring terminal part 2822c toward the side of a motor 2806 is formed on the other side. The connection part 2822b extending along the lateral direction is between the terminal part 2822a and the wiring terminal part 2822c. The whole connection part 2822b, a portion of the terminal part 2822a, and a portion of the wiring terminal part 2822c are cast in the synthetic resin portion of the terminal part 2820. Similarly, the negative input terminal 2827 is also formed in a crank shape, and is formed with a terminal part 2827a fit with the front negative electrode terminal 2887 and the rear negative electrode terminal 2897 at the same time, a wiring terminal part 2827c, and a connection part 2827b. As a result, a voltage rated at 18V is supplied to the side of the electrical tool body 2801. Here, the terminal part 2822a is formed with a length sufficient to be fit with the front positive electrode terminal 2882 and the rear positive electrode terminal 2892 at the same time, and the terminal part 2827a is formed with a length sufficient to be fit with the front negative electrode terminal 2887 and the rear negative electrode terminal 2897 at the same time.

When viewed from the inserting direction of the device side terminals (the direction indicated by the dotted line arrow), the rear positive electrode terminal 2892 is in an inverted "Ω" shape. Here, a rectangular flat plate part 2892a configured to be fixed to the circuit substrate is formed, and two arm parts 2982b and 2892d bent upward from the left and right side edge parts of the flat plate part 2892a are formed. The two arm parts 2982b and 2982d are curved in a manner of gradually approaching each other upward, and are formed with a contact terminal part 2892c and a contact terminal part 2892e (see FIG. 94 for both terminal parts) at the upper end portions of the arm parts 2892b and 2892d. The contact terminal parts 2892c and 2892e are substantially rectangular electrodes disposed in parallel and separated by a predetermined interval, and are formed in the following shape: the front side and the rear side of the contact terminal part are curved away from the opposing contact terminal part, so that the device side terminal can be easily fit in a direction from the front toward the rear. The metal terminal part serving as the rear positive electrode terminal 2892 is a common component generally applicable in the front positive electrode terminal 2882, the front negative electrode terminal 2887, and the rear negative electrode terminal 2897. Also, the metal terminal part is fixed to the circuit substrate (not shown) by a screw not shown herein or/and through soldering.

FIG. 92 is a diagram for illustrating a situation where the battery pack 2860 is mounted to the electrical tool body 2830 of a specification of 36V. If the electrical tool body 2830 is moved relatively toward the battery pack 2860 from the state of FIG. 91(1), the terminal parts 2859*b* and 2859*c* of the short bar 2859 are firstly fit with the front positive electrode terminal 2882 and the front negative electrode terminal 2887. At this time point, the positive electrode of the upper cell unit 2146 and the negative electrode of the lower cell unit 2147 are in the disconnected state. Therefore, the power of the battery pack 2860 is not transmitted to the side of the electrical device body 2830.

If the electrical tool body 2830 and the battery pack 2860 are further moved relatively toward the direction of the arrow 2855, the short bar 2859 then approaches the rear positive electrode terminal 2892 and the rear negative electrode terminal 2897 by passing through the front positive electrode terminal 2882 and the front negative electrode terminal 2887. At this time, the short bar 2859 is not in contact with any of the connection terminals, the positive input terminal 2852 does not abut against the front positive electrode terminal 2882, and the negative input terminal 2857 does not abut against the front negative electrode terminal 2887. Therefore, at this time point, the upper cell unit 2146 and the lower cell unit 2147 are also in the disconnected state. Therefore, the power of the battery pack 2860 is not transmitted to the electrical device body 2830.

If the electrical tool body 2830 and the battery pack 2860 are further moved relatively toward the direction of the arrow 2855, the short bar 2859 is then fit with the rear positive electrode terminal 2892 and the rear negative electrode terminal 2897. Meanwhile, the terminal part 2852*a* of the positive input terminal 2852 is fit with the front positive electrode terminal 2882, and the terminal part 2857*a* of the negative input terminal 2857 is fit with the front negative electrode terminal 2887. As a result, the series connection state of the upper cell unit 2146 and the lower cell unit 2147 is realized, and a direct current rated at 36V is thereby supplied between the positive input terminal 2852 and the front negative electrode terminal 2887.

FIG. 93 is a diagram for illustrating a situation where the battery pack 2860 is mounted to the electrical tool body 2801 of a specification of 18V. If the electrical tool body 2801 is moved relatively toward the battery pack 2860 from the state shown in FIG. 91(2), the terminal parts 2822*a* and 2827*a* are fit with the front positive electrode terminal 2882 and the front negative electrode terminal 2887 as shown in FIG. 93(2) from FIG. 93(1). At this time point, the positive electrode of the upper cell unit 2146 and the negative electrode of the lower cell unit 2147 are in the disconnected state. Therefore, the power of the battery pack 2860 is not transmitted to the electrical tool body 2801.

In FIG. 93(2), if the electrical tool body 2801 and the battery pack 2860 are further moved relatively toward the direction of an arrow 2825, the terminal parts 2822*a* and 2827*a* longer in the front-rear direction then contact the front positive electrode terminal 2882 and the front negative electrode terminal 2887 while approaching the rear positive electrode terminal 2892 and the rear negative electrode terminal 2897. In the state of FIG. 93(2), the terminal parts 2822*a* and 2827*a* do not abut against the rear positive electrode terminal 2892 and the rear negative electrode terminal 2897. Therefore, at this time point, the positive electrode of the upper cell unit 2146 and the negative electrode of the lower cell unit 2147 are also in the disconnected state. Thus, the power of the battery pack 2860 is not transmitted to the electrical tool body 2801.

If the electrical tool body 2801 and the battery pack 2860 are further moved relatively toward the direction of the arrow 2825, the terminal parts 2822*a* and 2827*a* then abut against the rear positive electrode terminal 2892 and the rear negative electrode terminal 2897. At this time, the terminal parts 2822*a* and 2827*a* are also in a state of being fit with the front positive electrode terminal 2882 and the front negative electrode terminal 2887. Therefore, a parallel connection circuit of the upper cell unit 2146 and the lower cell unit 2147 is established, and a direct current rated at 18V is thus supplied between the positive input terminal 2822 and the negative input terminal 2827.

FIG. 94 is a top view of terminal arrangement on the side of the battery pack 2860 and terminal shapes of the electrical tool body 2830. To describe the sizes or configuration of the respective terminals, the scale-down ratios of the respective components are unified in the figure. In the front positive electrode terminal 2882, the rear positive electrode terminal 2892, the front negative electrode terminal 2887, and the rear negative electrode terminal 2897, contact terminal parts 2882*c*, 2882*e*, 2892*c*, 2892*e*, 2887*c*, 2887*e*, 2897*c*, and 2897*e* separated and opposed in the left-right direction are respectively disposed. The contact terminal parts 2882*c*, 2892*c*, 2887*c*, and 2897*c* are connected to arm parts 2882*b*, 2892*b*, 2887*b*, and 2897*b* on the right side, and the contact terminal parts 2882*e*, 2892*e*, 2887*e*, and 2897*e* are connected to arm parts 2882*d*, 2892*d*, 2887*d*, and 2897*d* on the left side. A length L7 of these contact terminal parts in the front-rear direction is set to be sufficiently smaller than an interval L8 between the front positive electrode terminal 2882 and the rear positive electrode terminal 2892. Besides, all the terminal parts (2882, 2892, 2887, 2897) are common terminal parts. Therefore, the lengths of the terminal parts 2882*c*, 2882*e*, 2892*c*, 2892*e*, 2887*c*, 2887*e*, 2897*c*, and 2897*e* in the front-rear direction are all L7. The front negative electrode terminal 2887 and the rear negative electrode terminal 2897 also have the same interval L8. A length L9 of the terminal parts of the short bar 2859 in the front-rear direction is configured to be smaller than the interval L8 between the front terminals (2882, 2887) and the rear terminals (2892, 2897). By being formed in this way, when the battery pack 2860 is installed, the possibility of causing a short circuit between the front terminals (2882, 2887) and the rear terminals (2892, 2897) can be effectively reduced. The lengths of the terminal part 2852*a* of the positive input terminal 2852 and the terminal part 2857*a* of the negative input terminal 2857 may be at least L9 or more.

FIG. 94(2) is a diagram for illustrating a state where the battery pack 2860 is mounted to the electrical tool body 2830. While a horizontal portion 2859*a* of the short bar 2859 is exposed and visible here, the horizontal portion 2859*a* is actually cast inside the resin part of the terminal part not shown herein, and is therefore not exposed to the external environment. As described above, in the battery pack 2860, the multiple power terminals (the positive electrode terminals and the negative electrode terminals) are adopted as the voltage switching element for switching between parallel connection and series connection, and the power terminals (equivalent to "power source terminals" in the present specification) are disposed separately in the front-rear direction. Therefore, the assistance of a mechanical switch mechanism for switching between output voltages is not required, and the suitable output voltage can be automatically obtained by simply installing the battery pack to the electrical device body. Besides, the battery pack can be shared between electrical devices of different voltages. Consequently, in the state where the battery pack is connected with the electrical device body, the positive electrode terminal, the positive input terminal, the negative electrode terminal, the negative input terminal, and the switching element formed by the voltage switching element and the short bar 2859 are disposed at positions (ranges) at substantially the same height in the upper-lower direction. Therefore, a battery pack not only installed with the voltage switching element and the switching element but also tightly arranged in the upper-lower direction can be realized. Besides, the rear positive electrode terminal 2892 and the rear negative electrode terminal 2897 serving as the series connection terminals are disposed at positions substantially at the same height with the front positive electrode terminal 2882 serving as the positive electrode terminal, and the front negative electrode terminal 2887 serving as the negative electrode terminal in the upper-lower direction. Therefore, a battery pack tightly arranged in the upper-lower direction can be realized.

Embodiments 1 to 13 of the invention are described in the foregoing. However, the invention is not limited to the above embodiments, and various modifications can be made without departing from the scope of the subject matter thereof. For example, the voltage switchable battery pack for 18V and 36V is described in the above embodiments, but the voltage rates for switching are not limited thereto. Other voltage rates can also be adopted for switching with the combination of series connection and parallel connection.

What is claimed is:

1. A battery pack, comprising:
    a plurality of cell units, including a first cell unit and a second cell unit other than the first cell unit;
    a housing, housing the plurality of cell units, and having a mounting portion configured to be connected to an electrical device body forward in a front-rear direction;
    a plurality of slot parts, formed on the mounting portion so as to be arranged in a left-right direction with each other, and including a slot that extends in a direction substantially perpendicular to the left-right direction; and
    a switching terminal group, including a first switching terminal connected to the first cell unit and a second switching terminal connected to the second cell unit, the first and second switching terminals being adjacently and separately disposed in a direction substantially perpendicular to the left-right direction in the slot, the slot being included in the plurality of slot parts arranged in the left-right direction and formed on the mounting portion, and the first switching terminal and the second switching terminal disposed in the slot are configured to directly contact a terminal of the electrical device body,
    wherein the switching terminal group is configured such that, when the terminal of the electrical device body is inserted into the slot, the first and second switching terminals are short-circuited by the terminal of the electrical device body to thereby switch the connection state of the plurality of cell units from a disconnected state where the first and second cell units are disconnected with each other to a connected state where the first and second cell units are connected with each other.

2. An electrical device, comprising the battery pack according to claim 1 and a high voltage electrical device body connectable to the battery pack, wherein
    the high voltage electrical device body comprises a short circuit element connecting the plurality of cell units to each other in series,
    when the battery pack is connected to the high voltage electrical device body, the first and second switching terminals are connected to the short circuit element, such that the first and second cell units are connected to each other in series, and
    when the battery pack is not connected to the high voltage electrical device body, the first and second switching terminals are not connected to the short circuit element, such that the first and second cell units are disconnected from each other.

3. An electrical device, comprising the battery pack according to claim 1 and a low voltage electrical device body connectable to the battery pack, wherein
    the low voltage electrical device body comprises an input terminal connecting the plurality of cell units to each other in parallel,
    when the battery pack is connected to the low voltage electrical device body, the first and second switching terminals are connected to the input terminal, such that the first and second cell units are connected to each other in parallel, and
    when the battery pack is not connected to the low voltage electrical device body, the first and second switching terminals are not connected to the input terminal, such that the first and second cell units are disconnected from each other.

4. An electrical device system, comprising:
    the battery pack according to claim 1;
    a high voltage electrical device body connectable to the battery pack, wherein the high voltage electrical device body comprises a short circuit element connecting the plurality of cell units to each other in series, when the battery pack is connected to the high voltage electrical device body, the first and second switching terminals are connected to the short circuit element, such that the first and second cell units are connected to each other in series, and when the battery pack is not connected to the high voltage electrical device body, the first and second switching terminals are not connected to the short circuit element, such that the first and second cell units are disconnected from each other; and
    a low voltage electrical device body connectable to the battery pack, wherein the low voltage electrical device body comprises an input terminal connecting the plurality of cell units to each other in parallel, when the battery pack is connected to the low voltage electrical device body, the first and second switching terminals are connected to the input terminal, such that the first and second cell units are connected to each other in parallel, and when the battery pack is not connected to the low voltage electrical device body, the first and second switching terminals are not connected to the input terminal, such that the first and second cell units are disconnected from each other.

5. The battery pack according to claim 1, wherein
    the battery pack comprises: a pair of rails, extending in the front-rear direction on left and right sides of the battery pack; and a first slot and a second slot, arranged in the left-right direction between the pair of rails, and
    the switching terminal group comprises: a first switching terminal group, formed by adjacently disposing a plurality of positive electrode terminals connected to positive electrodes of cell units forming the plurality of cell units in the first slot; and a second switching terminal group, formed by adjacently disposing a plurality of negative electrode terminals connected to negative electrodes of the cell units forming the plurality of cell units in the second slot.

6. An electrical device, comprising the battery pack according to claim 5 and a high voltage electrical device body connectable to the battery pack, wherein
the high voltage electrical device body comprises a short circuit element connecting the plurality of cell units to each other in series,
when the battery pack is connected to the high voltage electrical device body, at least one positive electrode terminal among a plurality of positive electrode terminals forming the first switching terminal group is connected to the short circuit element, and at least one negative electrode terminal among a plurality of negative electrode terminals forming the second switching terminal group is connected to the short circuit element, such that the plurality of cell units are connected to each other in series, and
when the battery pack is not connected to the high voltage electrical device body, any one terminal among the plurality of terminals forming the first switching terminal group and the second switching terminal group is not connected to the short circuit element, such that the plurality of cell units are disconnected from each other.

7. An electrical device, comprising the battery pack according to claim 5 and a low voltage electrical device body connectable to the battery pack, wherein
the low voltage electrical device body comprises a positive input terminal and a negative input terminal connecting the plurality of cell units to each other in parallel,
when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and
when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

8. An electrical device system, comprising:
the battery pack according to claim 5;
a high voltage electrical device body connectable to the battery pack, wherein the high voltage electrical device body comprises a short circuit element connecting the plurality of cell units to each other in series, when the battery pack is connected to the high voltage electrical device body, at least one positive electrode terminal among a plurality of positive electrode terminals forming the first switching terminal group is connected to the short circuit element, and at least one negative electrode terminal among a plurality of negative electrode terminals forming the second switching terminal group is connected to the short circuit element, such that the plurality of cell units are connected to each other in series, and when the battery pack is not connected to the high voltage electrical device body, any one terminal among the plurality of terminals forming the first switching terminal group and the second switching terminal group is not connected to the short circuit element, such that the plurality of cell units are disconnected from each other; and
a low voltage electrical device body connectable to the battery pack, wherein the low voltage electrical device body comprises a positive input terminal and a negative input terminal connecting the plurality of cell units to each other in parallel, when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

9. The battery pack according to claim 5, wherein
the plurality of positive electrode terminals forming the first switching terminal group are disposed to be arranged in a direction substantially perpendicular to the left-right direction in the first slot, and the plurality of negative electrode terminals forming the second switching terminal group are disposed to be arranged in a direction substantially perpendicular to the left-right direction in the second slot.

10. An electrical device, comprising the battery pack according to claim 9 and a high voltage electrical device body connectable to the battery pack, wherein
the high voltage electrical device body comprises a short circuit element connecting the plurality of cell units to each other in series,
the short circuit element comprises a first terminal part and a second terminal part extending in a direction substantially perpendicular to the left-right direction, and a connection part connecting the first terminal part and the second terminal part,
when the battery pack is connected to the high voltage electrical device body, at least one positive electrode terminal among the plurality of positive electrode terminals forming the first switching terminal group is connected to the first terminal part of the short circuit element, and at least one negative electrode terminal among the plurality of negative electrode terminals forming the second switching terminal group is connected to the second terminal part of the short circuit element, such that the plurality of cell units are connected to each other in series, and when the battery pack is not connected to the high voltage electrical device body, any one terminal among the plurality of terminals forming the first switching terminal group and the second switching terminal group is not connected to the short circuit element, such that the plurality of cell units are disconnected from each other.

11. An electrical device, comprising the battery pack according to claim 9 and a low voltage electrical device body connectable to the battery pack, wherein
the low voltage electrical device body comprises a positive input terminal and a negative input terminal connecting the plurality of cell units to each other in parallel,
the positive input terminal and the negative input terminal are formed to extend in a direction substantially perpendicular to the left-right direction,
when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and
when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

12. An electrical device system, comprising:
the battery pack according to claim 9;
a high voltage electrical device body connectable to the battery pack, wherein the high voltage electrical device body comprises a short circuit element connecting the plurality of cell units to each other in series, the short circuit element comprises a first terminal part and a second terminal part extending in a direction substantially perpendicular to the left-right direction, and a connection part connecting the first terminal part and the second terminal part, when the battery pack is connected to the high voltage electrical device body, at least one positive electrode terminal among the plurality of positive electrode terminals forming the first switching terminal group is connected to the first terminal part of the short circuit element, and at least one negative electrode terminal among the plurality of negative electrode terminals forming the second switching terminal group is connected to the second terminal part of the short circuit element, such that the plurality of cell units are connected to each other in series, and when the battery pack is not connected to the high voltage electrical device body, any one terminal among the plurality of terminals forming the first switching terminal group and the second switching terminal group is not connected to the short circuit element, such that the plurality of cell units are disconnected from each other; and
a low voltage electrical device body connectable to the battery pack, wherein the low voltage electrical device body comprises a positive input terminal and a negative input terminal connecting the plurality of cell units to each other in parallel, the positive input terminal and the negative input terminal are formed to extend in a direction substantially perpendicular to the left-right direction, when the battery pack is connected to the low voltage electrical device body, at least two positive electrode terminals among the plurality of positive electrode terminals forming the first switching terminal group are connected to the positive input terminal and are electrically short-circuited with respect to each other, and at least two negative electrode terminals among the plurality of negative electrode terminals forming the second switching terminal group are connected to the negative input terminal and are electrically short-circuited with respect to each other, such that the plurality of cell units are connected to each other in parallel, and when the battery pack is not connected to the low voltage electrical device body, any one terminal among the plurality of terminals forming the first switching terminal group and the second switching terminal group is not connected to the positive input terminal and the negative input terminal, such that the plurality of cell units are disconnected from each other.

13. The battery pack according to claim 1, wherein the switching terminal group connected to the positive electrode is an upper terminal and a lower terminal that are electrically independent,
the switching terminal group connected to the negative electrode is an upper terminal and a lower terminal that are electrically independent,
the upper terminal of the positive electrode and the lower terminal of the negative electrode are connected to a first cell unit, and
the lower terminal of the positive electrode and the upper terminal of the negative electrode are connected to a second cell unit.

14. The battery pack according to claim 1, wherein
an insulating partition wall is disposed between the plurality of terminals forming the switching terminal group, and the partition wall allows terminals of the electrical device body to connect the switching terminal group.

15. An electrical device system, comprising: the battery pack according to claim 1, wherein
one switching terminal forming the switching terminal group is disposed at a position above the plurality of cell units and is connected to one battery cell included in one cell unit forming the plurality of cell units,
another switching terminal forming the switching terminal group is disposed at a position above the plurality of cell units and is connected to another battery cell included in another cell unit forming the plurality of cell units, and
the another switching terminal is disposed at a position above or behind the one switching terminal, and the another battery cell is disposed at a position behind the one battery cell.

16. A battery pack according to claim 1,
wherein the battery pack further comprises a plurality of signal terminals for inputting or outputting information or signal, the plurality of signal terminals being disposed in the plurality of slot parts formed on the mounting portion.

17. A battery pack, comprising:

a plurality of cell units each, having at least one cell;

a housing, housing the plurality of cell units and configured to mount the battery pack on an electrical device body forward in a front-rear direction, the housing comprising a plurality of slot parts arranged in a left-right direction;

a positive electrode terminal connected to a positive electrode of a first cell unit that constitutes the plurality of cell units;

a negative electrode terminal, connected to a negative electrode of a second cell unit that constitutes the plurality of cell units, and disposed apart from the positive electrode terminal in the left-right direction; and a plurality of switching terminals, disposed separately from the positive and negative electrode terminals, and configured to change a connection state of the plurality of cell units, the plurality of switching terminals being connected to a positive electrode or a negative electrode of each cell unit that substitutes the plurality of cell units, the plurality of switching terminals including a first switching terminal connected to a positive electrode of a cell unit other than the first cell unit, and a second switching terminal connected to a negative electrode of a cell unit other than the second cell unit;

wherein the positive electrode terminal and the first switching terminal are separately disposed in a first slot that constitutes the plurality of slot parts arranged in the left-right direction, and the negative electrode terminal and the second switching terminal are separately disposed in a second slot that constitutes the plurality of slot parts other than the first slot, and wherein each one of the positive electrode terminal, the negative electrode terminal, the first switching terminal, and the second switching terminal is configured to directly contact one of a plurality of terminals of the electrical device body.

18. The battery pack according to claim 17, wherein the plurality of switching terminals are disposed above the plurality of cell units at positions substantially as high as the positive electrode terminal and the negative electrode terminal in an upper-lower direction.

19. The battery pack according to claim 17, wherein the housing comprises a lower step surface, an upper step surface formed to be higher than the lower step surface at the rear side of the lower step surface, and a stepped part formed between the lower step surface and the upper step surface, the plurality of slot parts being formed at the stepped part;

wherein, when viewed in the front-rear direction, the positive electrode terminal, the negative electrode terminal, and the plurality of switching terminals are disposed inside the plurality of slot parts formed at the stepped part.

20. The battery pack according to claim 17, wherein a signal terminal inputting or outputting information or a signal is disposed in a third slot that constitutes the plurality of slot parts and that is provided between the first slot and the second slot in the left-right direction.

21. An electrical device comprising the battery pack according to claim 17, and a low voltage electrical device body connectable to the battery pack, the low voltage electrical device body comprising a first low voltage connection element configured to connect with the first switching terminal and the positive electrode terminal, and a second low voltage connection element configured to connect with the second switching terminal and the negative electrode terminal, when the battery pack is connected to the low voltage electrical device body, wherein the plurality of switching terminals are configured to change the connection state of the plurality of cell units into a parallel connection state to connect the plurality of cell units in parallel, when the battery pack is connected to the low voltage electrical device body.

22. The electrical device according to claim 21, wherein the first low voltage connection element is configured as a first plate-shape terminal extending in an extending direction substantially perpendicular to the left-right direction, and the second low voltage connection element is configured as a second plate-shape terminal extending in the extending direction, and wherein the positive electrode terminal and the first switching terminal are aligned in the extending direction, and the negative electrode terminal and the second switching terminal are aligned in the extending direction.

23. An electrical device comprising the battery pack according to claim 17, and a high voltage electrical device body connectable to the battery pack, the high voltage electrical device body comprising a high voltage connection element configured to connect with the first switching terminal and the second switching terminal when the battery pack is connected to the high voltage electrical device body, wherein the plurality of switching terminals are configured to change the connection state of the plurality of cell units into a series connection state to connect the plurality of cell units in series, when the battery pack is connected to the high voltage electrical device body.

24. The electrical device according to claim 23, wherein the high voltage connection element is configured as a short bar having a first terminal part connectable to the first switching terminal, a second terminal part connectable to the second switching terminal, and a connection part connecting the first terminal part and the second terminal part.

* * * * *